United States Patent [19]

Lin et al.

[11] Patent Number: 4,878,240

[45] Date of Patent: Oct. 31, 1989

[54] MULTI-SERVICE TELEPHONE SWITCHING SYSTEM

[75] Inventors: Steve M. Lin, East Brunswick; Joseph F. Rizzo, Lincroft, both of N.J.

[73] Assignee: Bell Communications Research, Inc., Livingston, N.J.

[21] Appl. No.: 148,331

[22] Filed: Jan. 25, 1988

[51] Int. Cl.$^4$ .......................... H04M 3/50; H04Q 3/42
[52] U.S. Cl. ......................................... 379/67; 379/89; 379/201; 379/269
[58] Field of Search .................... 379/67, 88, 201, 211, 379/334, 269, 89; 370/58, 62

[56] References Cited

U.S. PATENT DOCUMENTS

| | | | |
|---|---|---|---|
| 3,668,317 | 6/1972 | Vitalo | 379/84 |
| 3,920,908 | 11/1975 | Kraus | 379/91 |
| 4,232,199 | 11/1980 | Boatwright et al. | 379/197 |
| 4,376,875 | 3/1983 | Beirne | 379/88 |
| 4,540,850 | 9/1985 | Herr et al. | 379/67 |
| 4,611,094 | 9/1986 | Asmuth et al. | 379/89 |
| 4,612,416 | 9/1986 | Emerson et al. | 379/88 |
| 4,653,085 | 3/1987 | Chan et al. | 379/94 |
| 4,747,127 | 5/1988 | Hansen et al. | 379/94 |

OTHER PUBLICATIONS

"The Software Architecture for a Large Telephone Switch", B. K. Penny et al., *IEEE Trans. on Communications*, vol. COM-30, Jun. 1982, pp. 1369–1378.

"Functional Programming Language for Switching Description and its Hardware Architecture", M. Imase et al., *Proc. of ISS 84, Florence, Italy*, 7–11 May 1984, Sec. 13C, Paper 2, pp. 1–7.

"Using Artificial Intelligence Technique in the Design of Software for Digital Switching System (DSS)", S. Bourgault et al. *Proc. of ISS 84, Florence, Italy*, 7–11 May 1984, Sec. 13C, paper 4, pp. 1–6.

"Evolution of High Level Programming Languages used in the Development of Large Telephone Systems", D. R. Anderson et al., *Proc. of ISS 84, Florence, Italy*, 7–11 May 1984, Sec. 13C, Paper 3, pp. 1–7.

"Intelligent Network/2: A Flexible Framework for Exchange Services", P. Miller, Bell Communications Research Exchange, vol. 3, Issue 3, May/June 1987, pp. 9–13.

J. T. Boatwright, "Access Electromechanical Switching Enhancements", Conference Record of *IEEE International Conference on communications: Integrating Communication for World Progress, Boston, MA*, Jun. 19–22, 1983, vol. 1, pp. 250–257.

*Primary Examiner*—Thomas W. Brown
*Attorney, Agent, or Firm*—James W. Falk

[57] ABSTRACT

Enhanced telephone services are provided through a multi-service telephone switching system that contains a programmable adjunct connected to a telephone switching system. Specifically, this system includes a telephone switch that serves at least one subscriber and an adjunct connected both through one or more distinct paths, such as a number of hunt group lines, and through a datalink, such as a simplified message desk datalink, to the telephone switch. The telephone switch routes a telephone call involving this subscriber to the adjunct through an available hunt group line and provides a message to the adjunct over the datalink specifying a condition under which the call was routed. In response to this message, the adjunct takes complete control of the call substantially throughout the remainder of its duration and provides a desired enhanced service that has been pre-defined by a service script stored within the adjunct. Different service scripts can be invoked to provide correspondingly different enhanced services to the subscriber depending upon the specific condition for which the call was routed to the adjunct and/or a specific event occurring during the call.

35 Claims, 47 Drawing Sheets

BASIC ARCHITECTURE
100

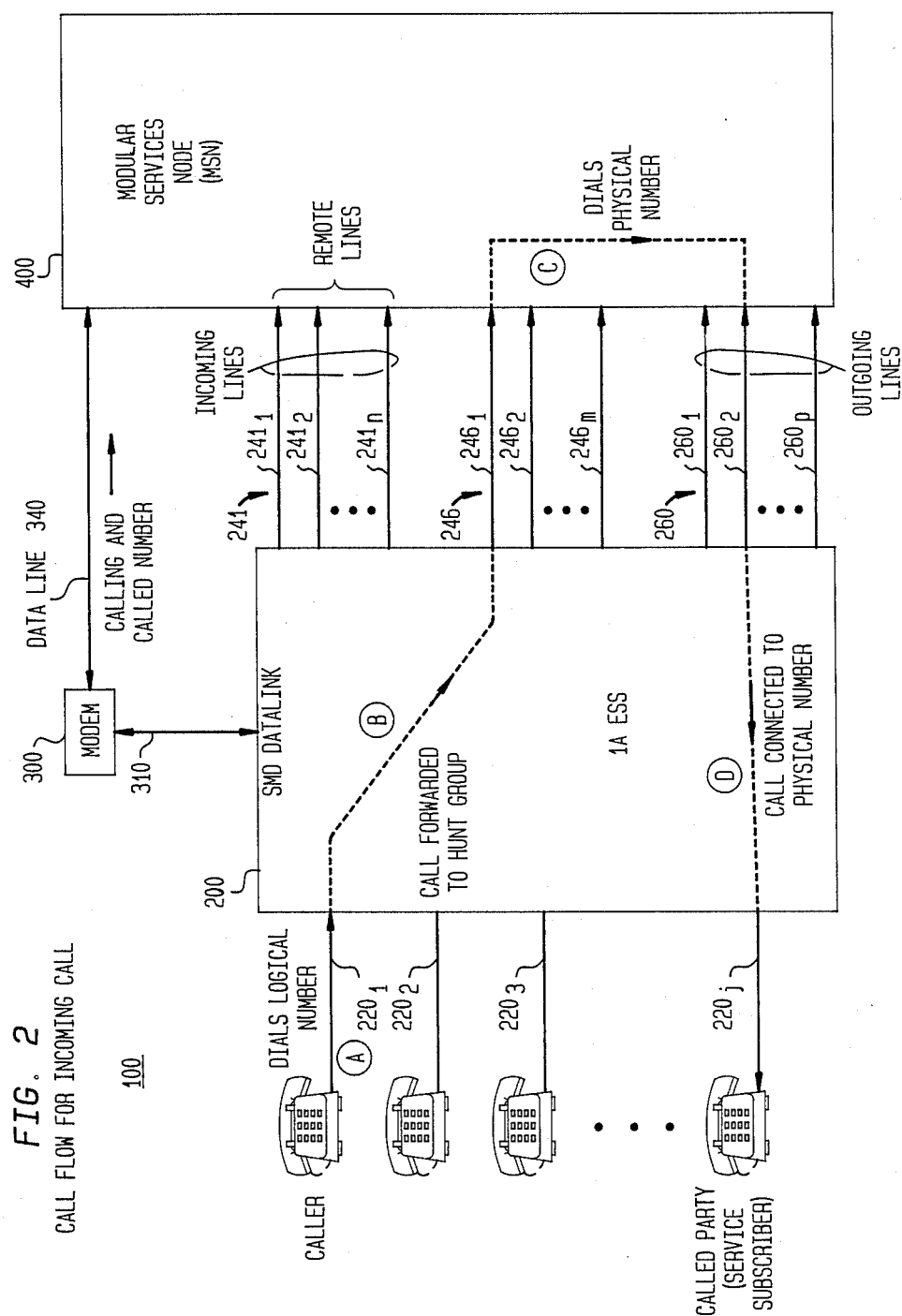

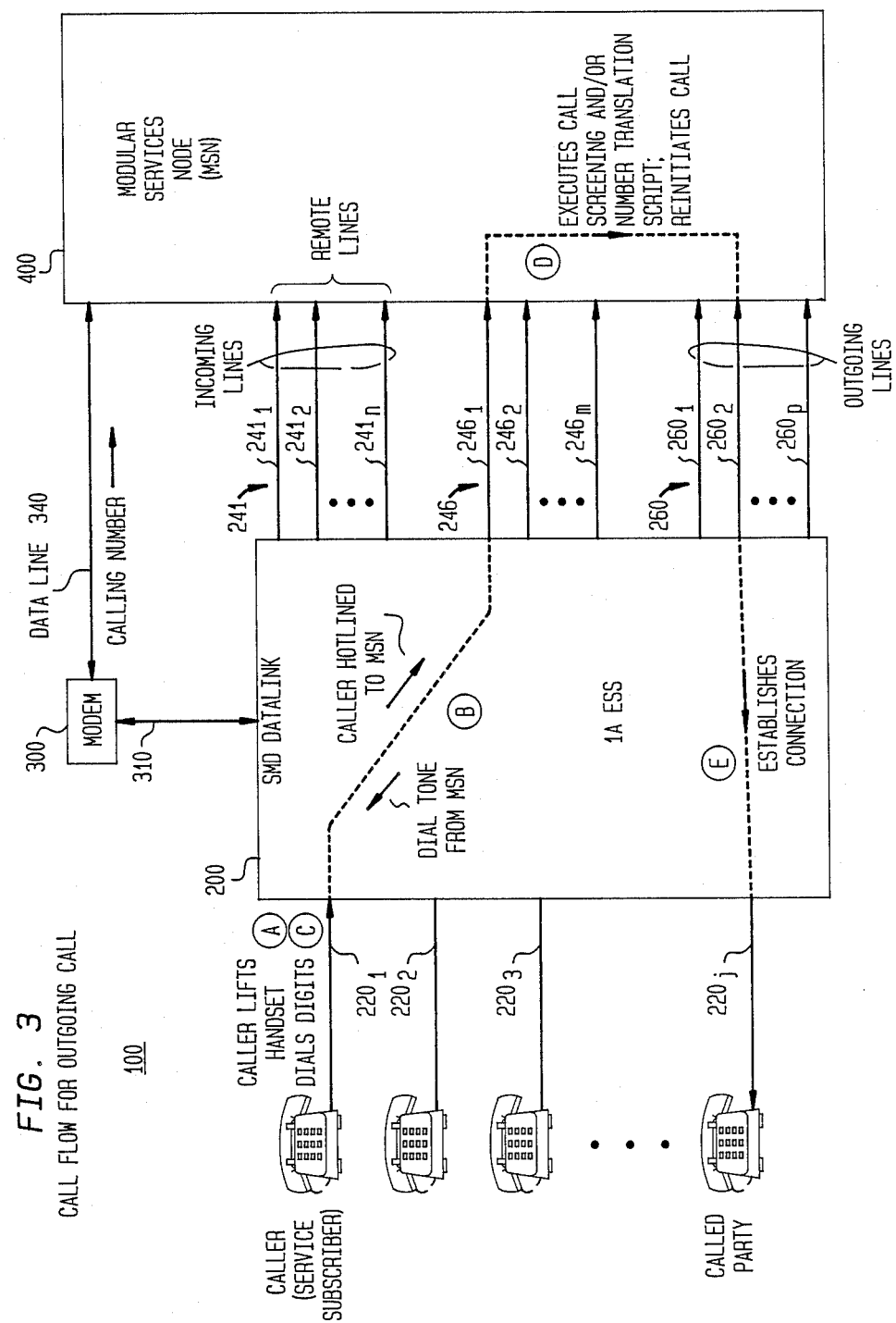

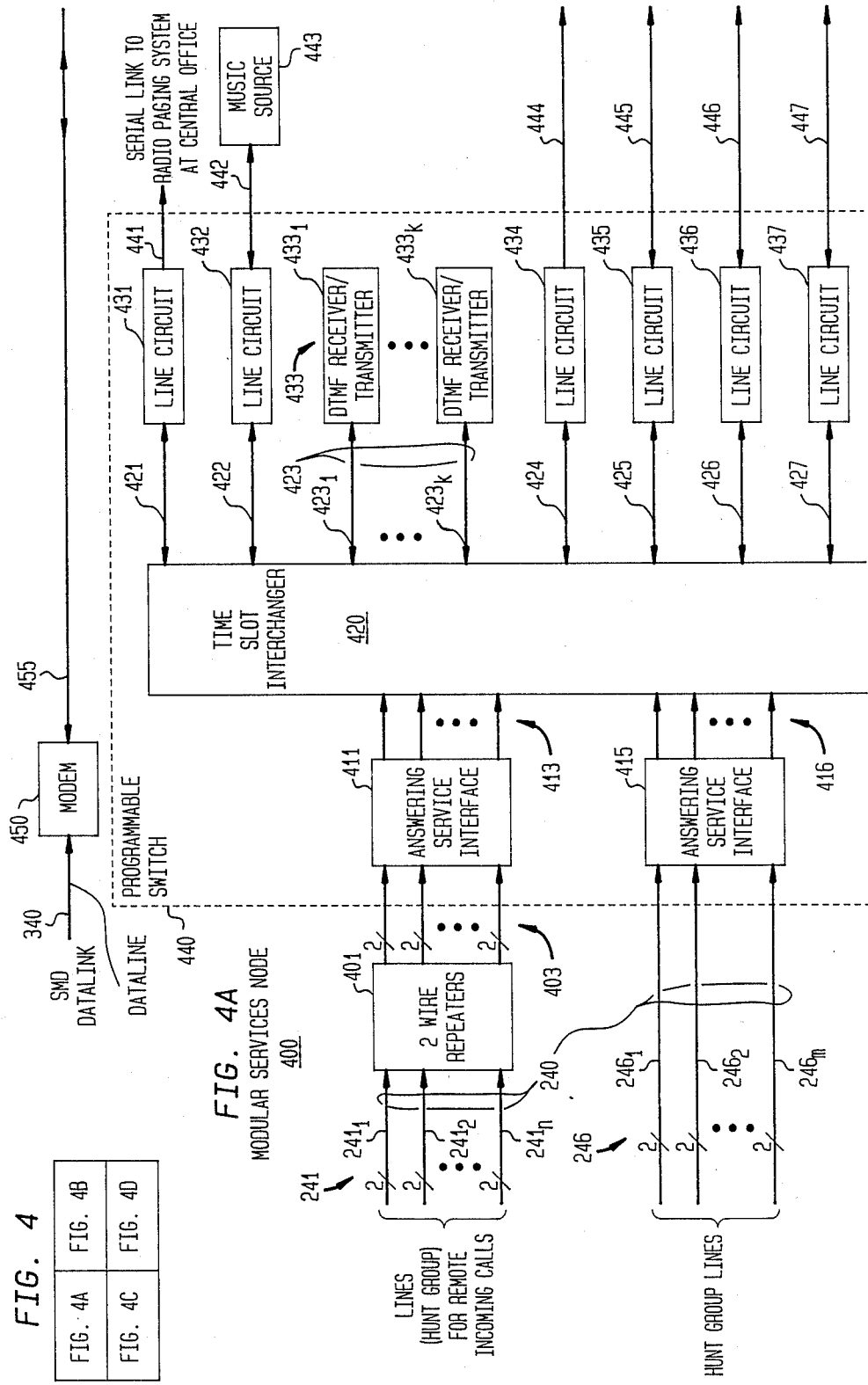

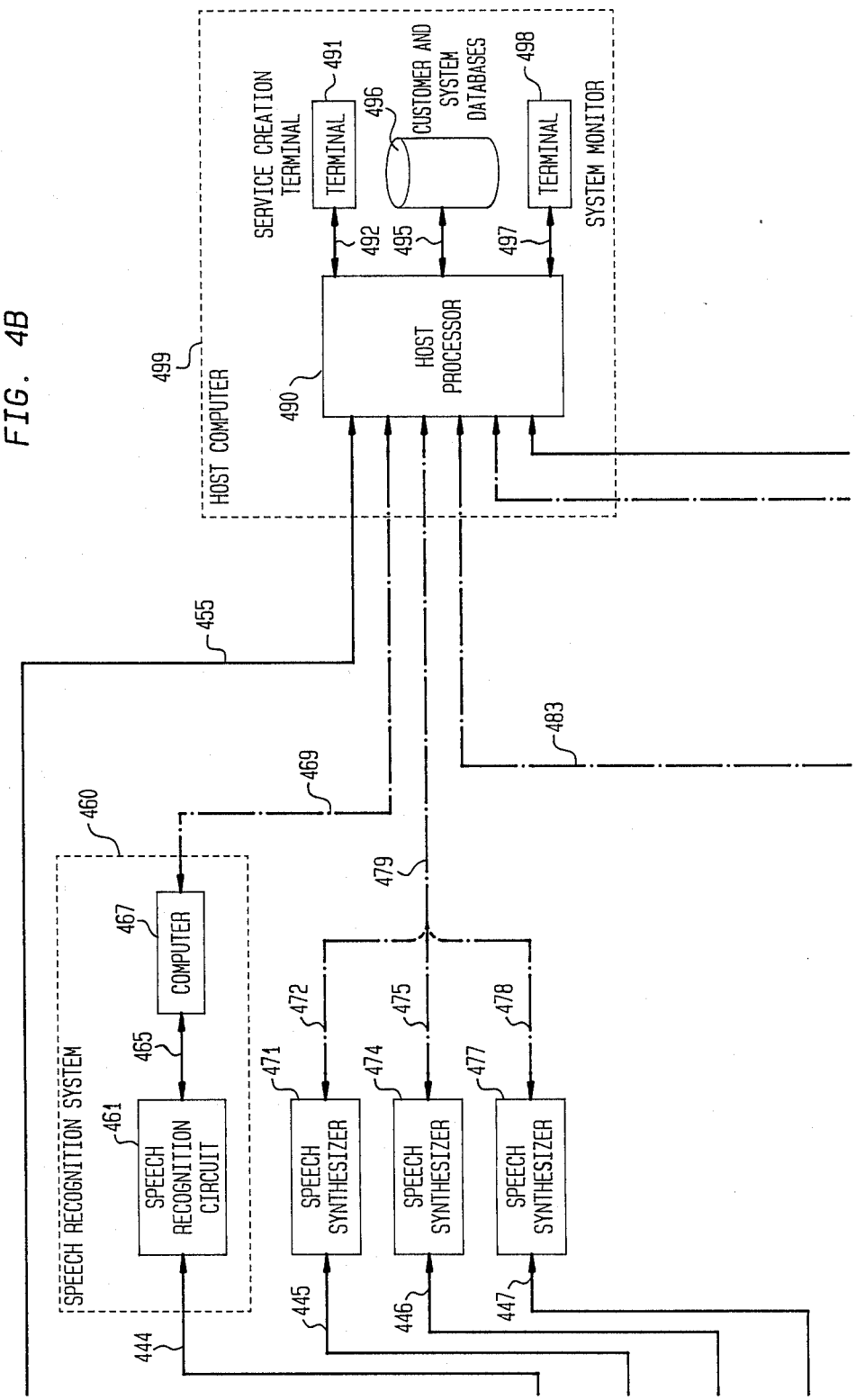

SIGN DETECTOR

HOST COMPUTER SOFTWARE OVERVIEW

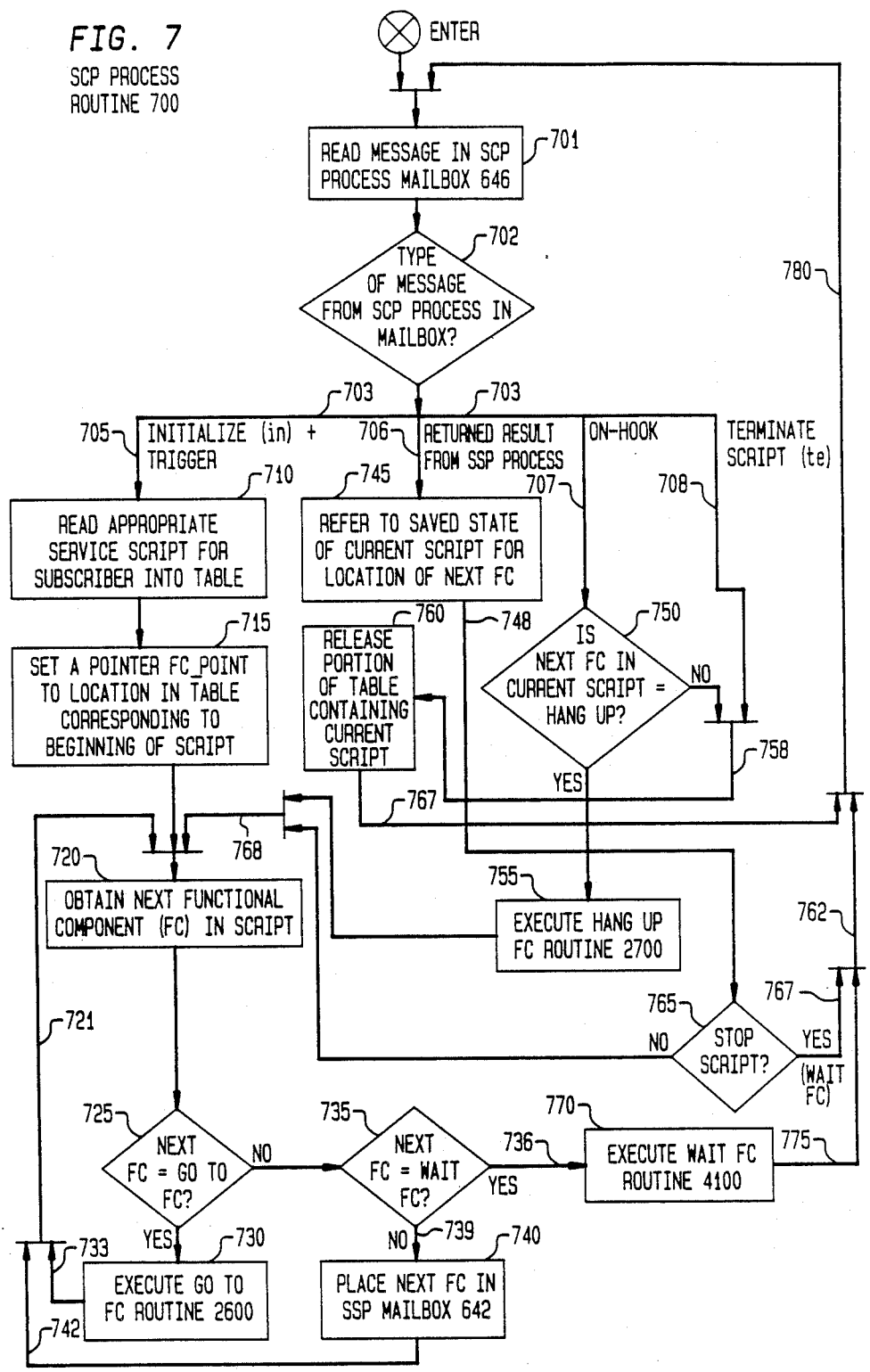

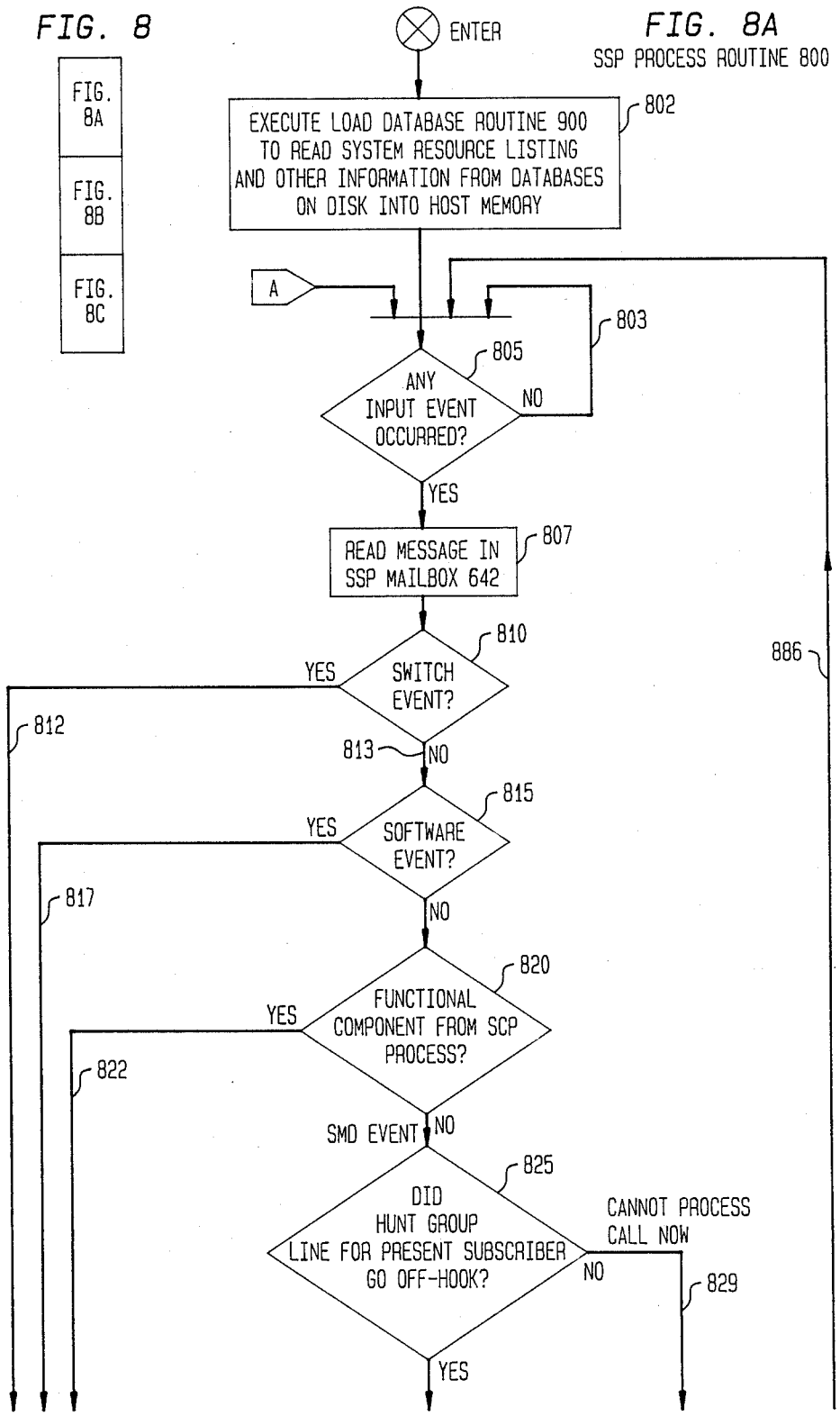

| FIG. 9A |
|---|
| FIG. 9B |

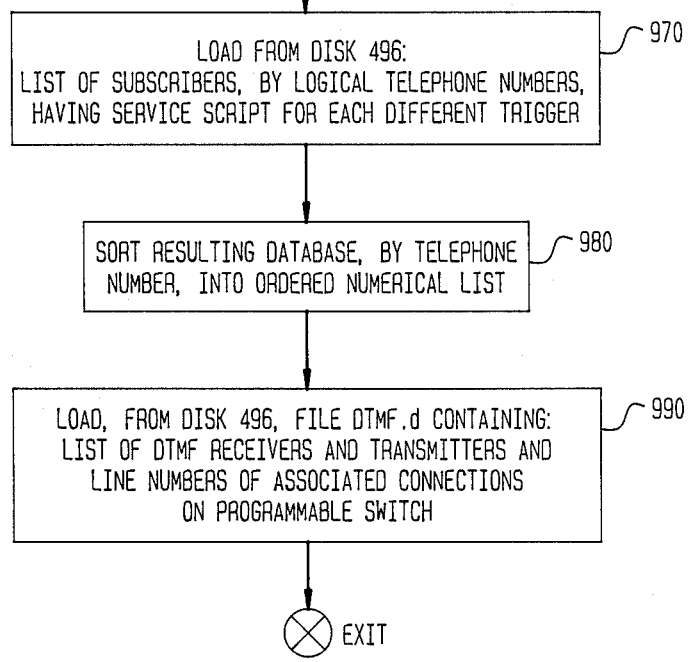

SMD N-NO ANSWER ROUTINE 1000

SMD B-BUSY ROUTINE 1100

SMD D-DIRECTLY DIALED ROUTINE 1200

SMD A-FORWARDED CALL ROUTINE 1300

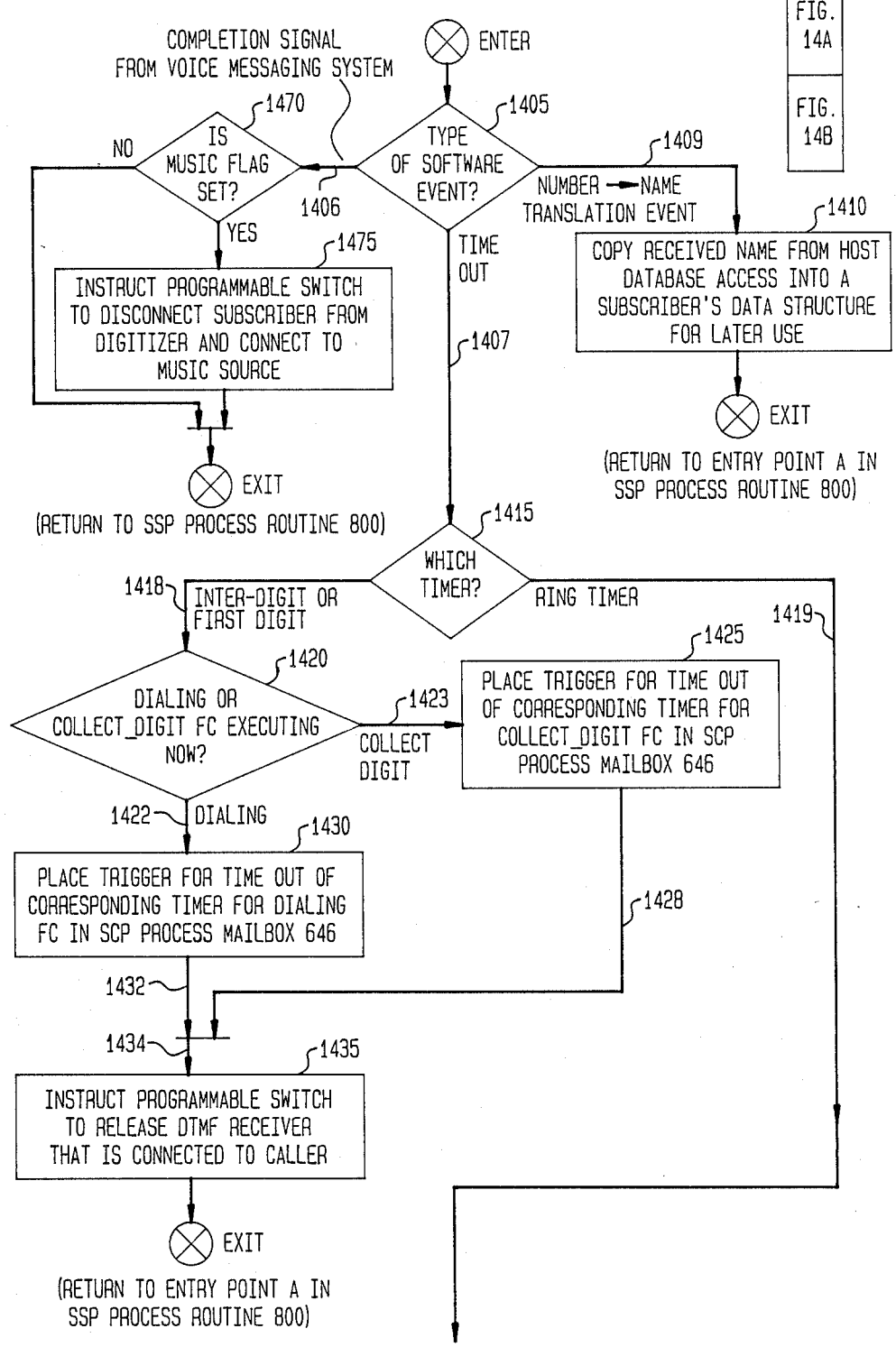

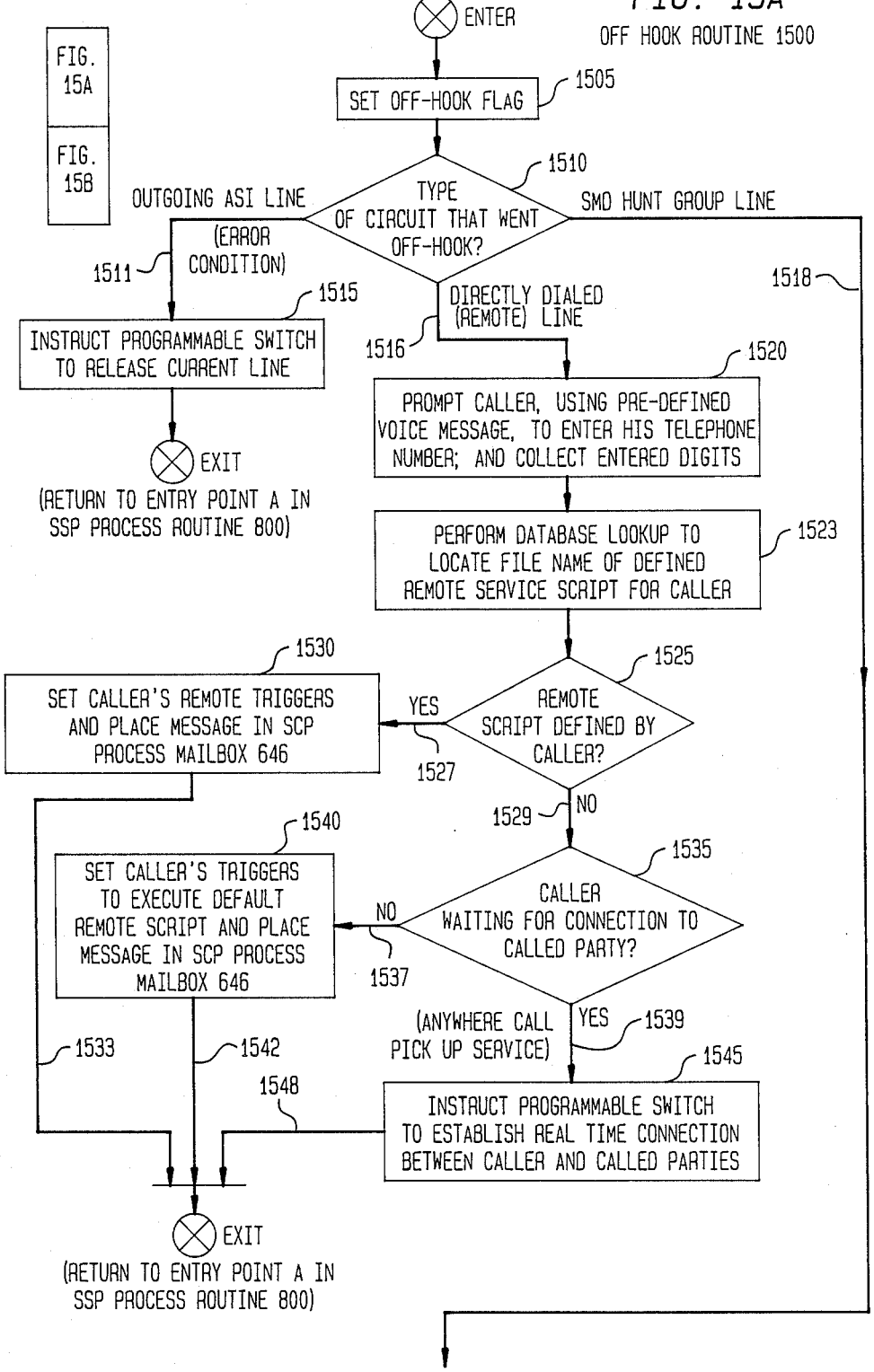

ON HOOK ROUTINE 1600

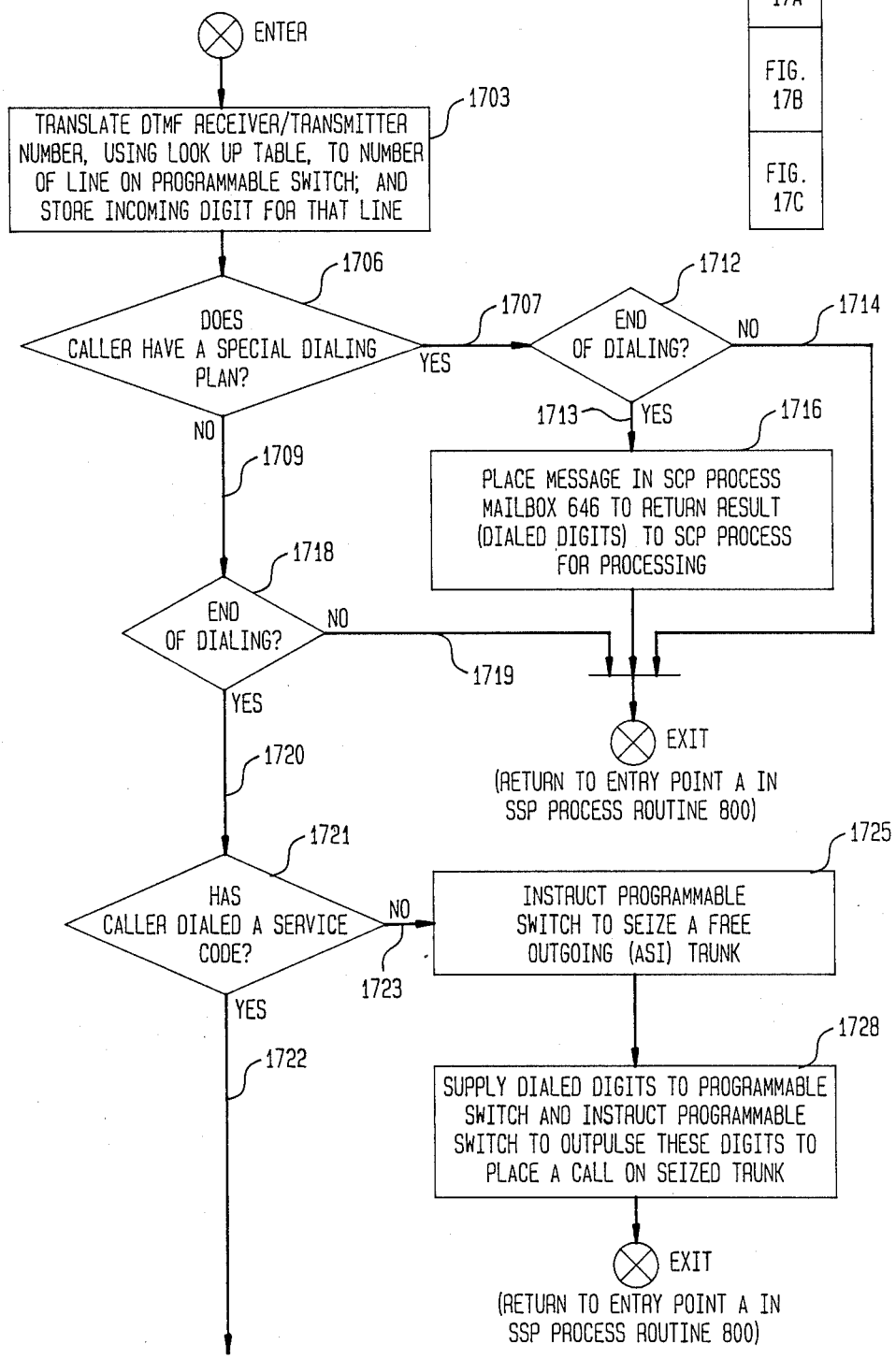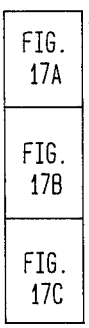

ANSWER FC ROUTINE 1800

CUSTOMER ANSWER FC ROUTINE 2300

CALL FORWARD ROUTINE 1900

CHECK ANI FC ROUTINE 2000

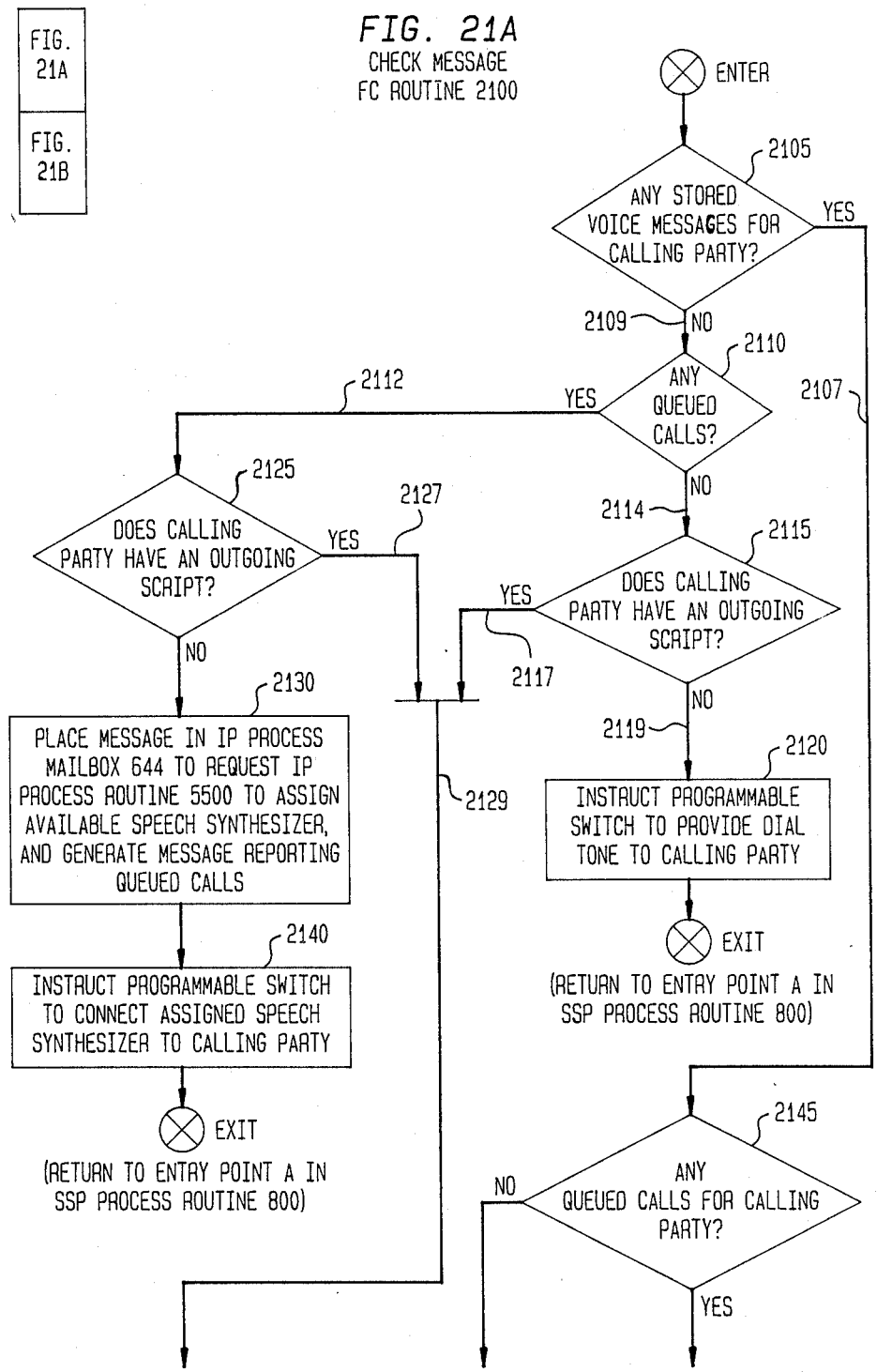

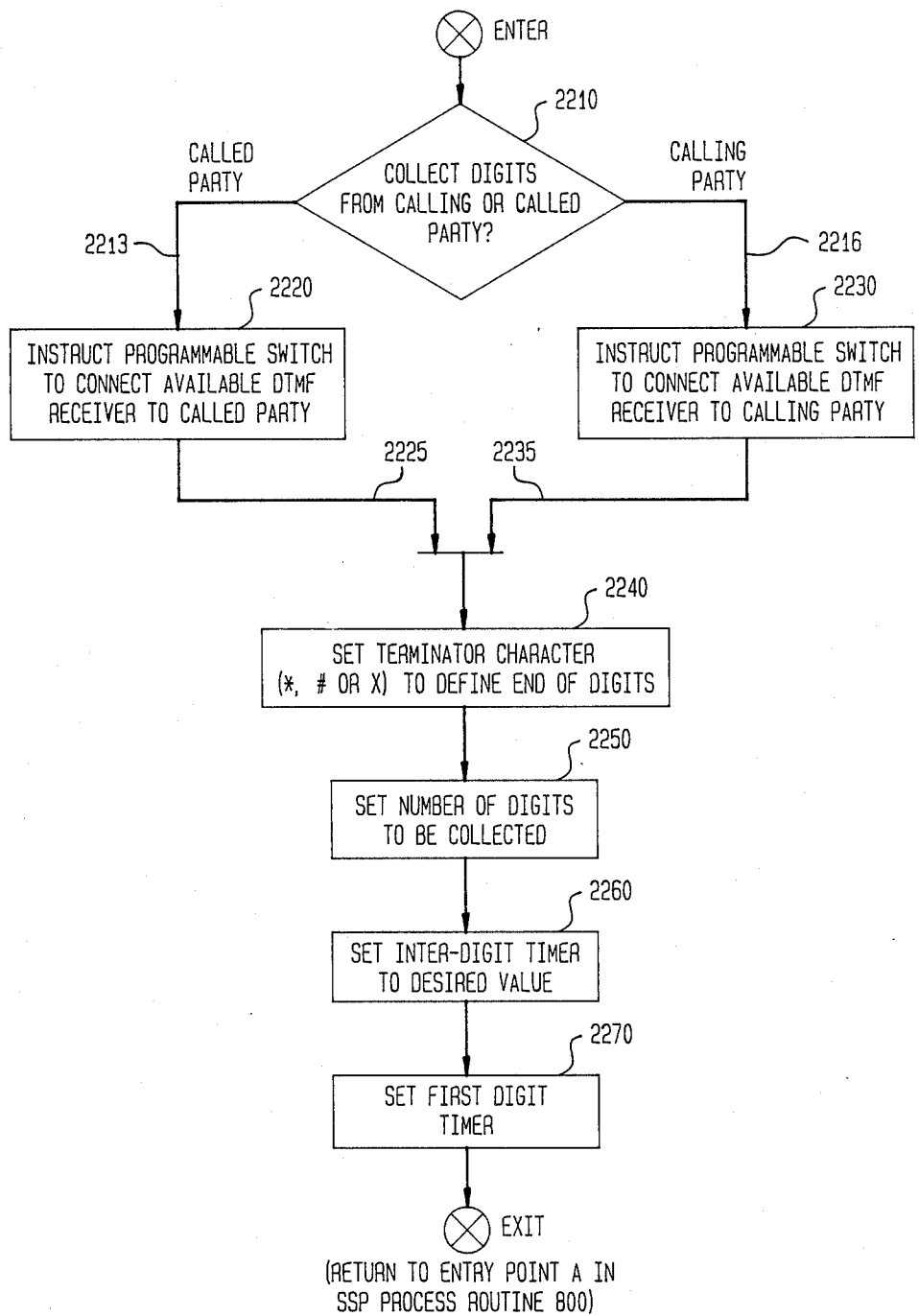

DIALING FC ROUTINE 2400

GIVE PATH FC ROUTINE 2500

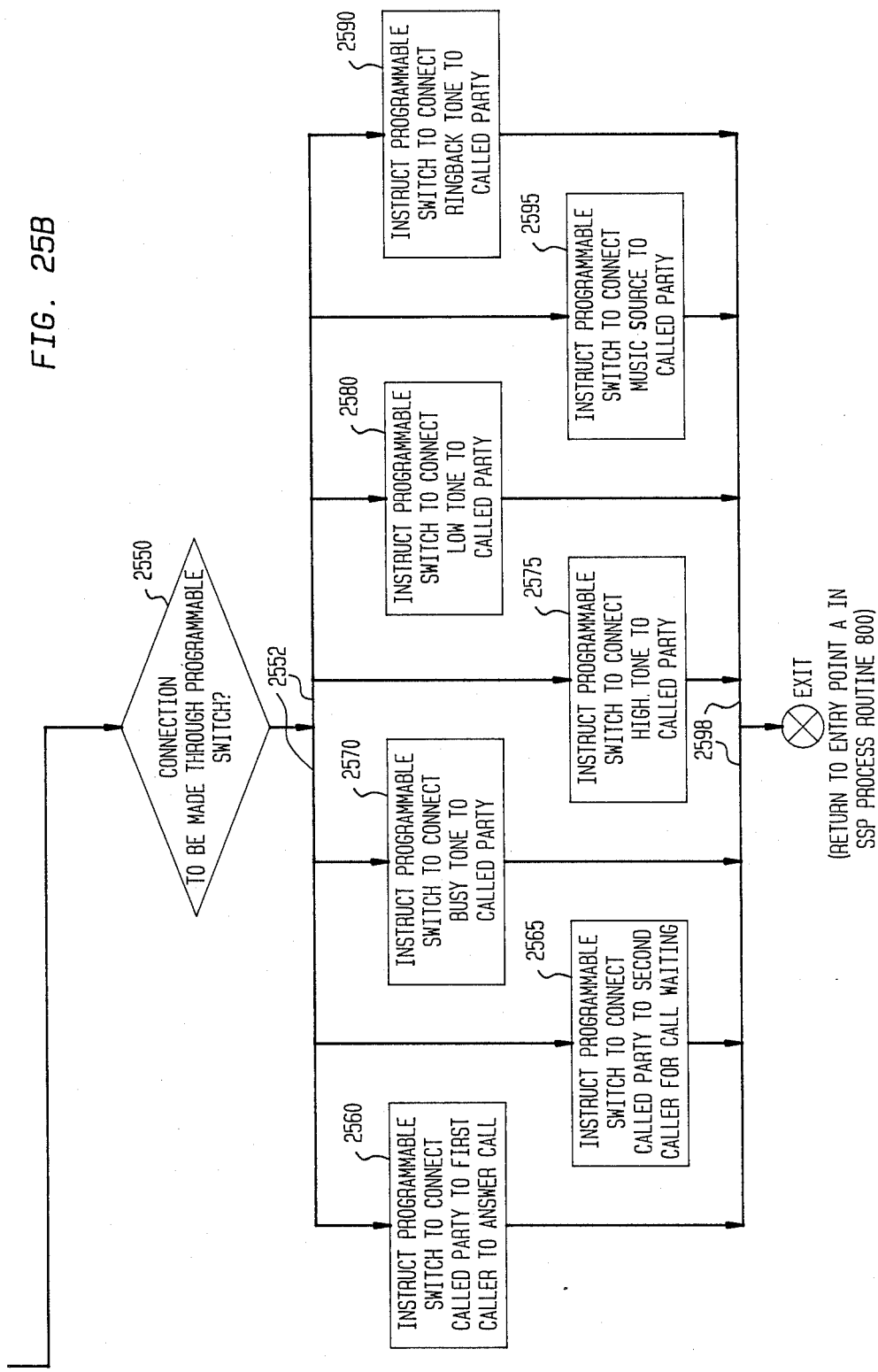

FIG. 26

GO TO FC ROUTINE 2600  ⊗ ENTER

2610
ADJUST VALUE OF POINTER FC_POINT TO POINT TO LOCATION OF FC DEFINED BY ARGUMENT IN GO TO FC STATEMENT

⊗ RETURN
(RETURN TO SCP PROCESS ROUTINE 700)

FIG. 27

HANG-UP FC ROUTINE 2700  ⊗ ENTER

2710
ADJUST VALUE OF POINTER FC_POINT TO POINT TO LOCATION OF FC DEFINED BY ARGUMENT IN HANG UP FC STATEMENT

⊗ RETURN
(RETURN TO SCP PROCESS ROUTINE 700)

FIG. 39

STOP PERIPHERAL FC ROUTINE 3900  ⊗ ENTER

3910
PLACE REQUEST IN IP PROCESS MAILBOX 644 TO INSTRUCT IP PROCESS 5500 TO TERMINATE MESSAGE PRODUCED BY ANY PERIPHERAL FOR CURRENT PARTY

⊗ EXIT
(RETURN TO ENTRY POINT A IN SSP PROCESS ROUTINE 800)

FIG. 28
QUIT FC ROUTINE 2800

 ENTER

2810
PLACE TERMINATE SCRIPT (te) MESSAGE IN SCP PROCESS MAILBOX 646 TO INSTRUCT SCP PROCESS ROUTINE 700 TO TERMINATE CURRENT SCRIPT

 EXIT
(RETURN TO ENTRY POINT A IN SSP PROCESS ROUTINE 800)

FIG. 34
RELEASE LINE FC ROUTINE 3400

 ENTER

3410
INSTRUCT PROGRAMMABLE SWITCH TO RELEASE LINE DEFINED BY ARGUMENT

 EXIT
(RETURN TO ENTRY POINT A IN SSP PROCESS ROUTINE 800)

FIG. 41
WAIT FC ROUTINE 4100

 ENTER

4110
STOP SENDING FUNCTIONAL COMPONENTS IN CURRENT SCRIPT TO SSP PROCESS ROUTINE 800

 EXIT
(RETURN TO SCP PROCESS ROUTINE 700)

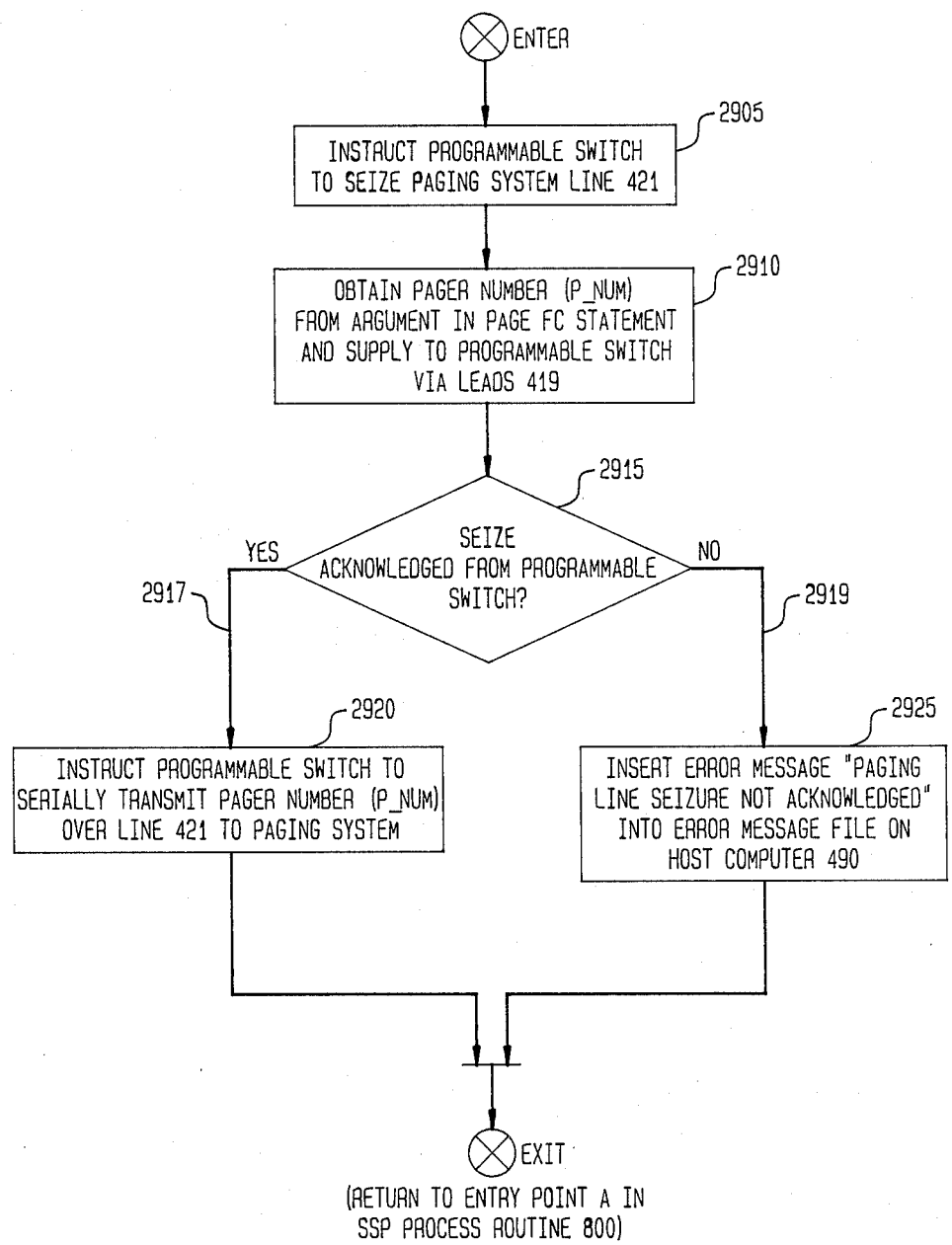

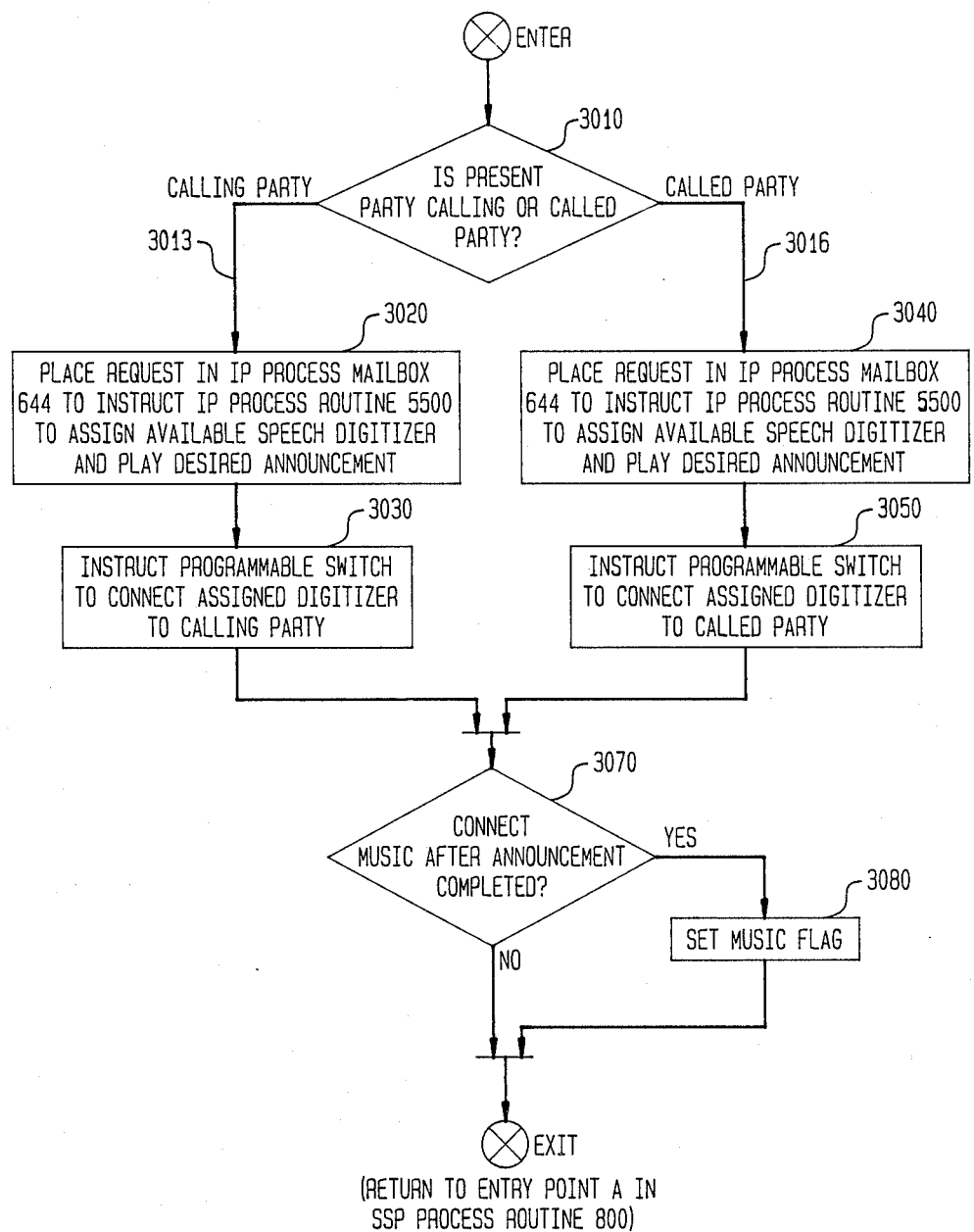

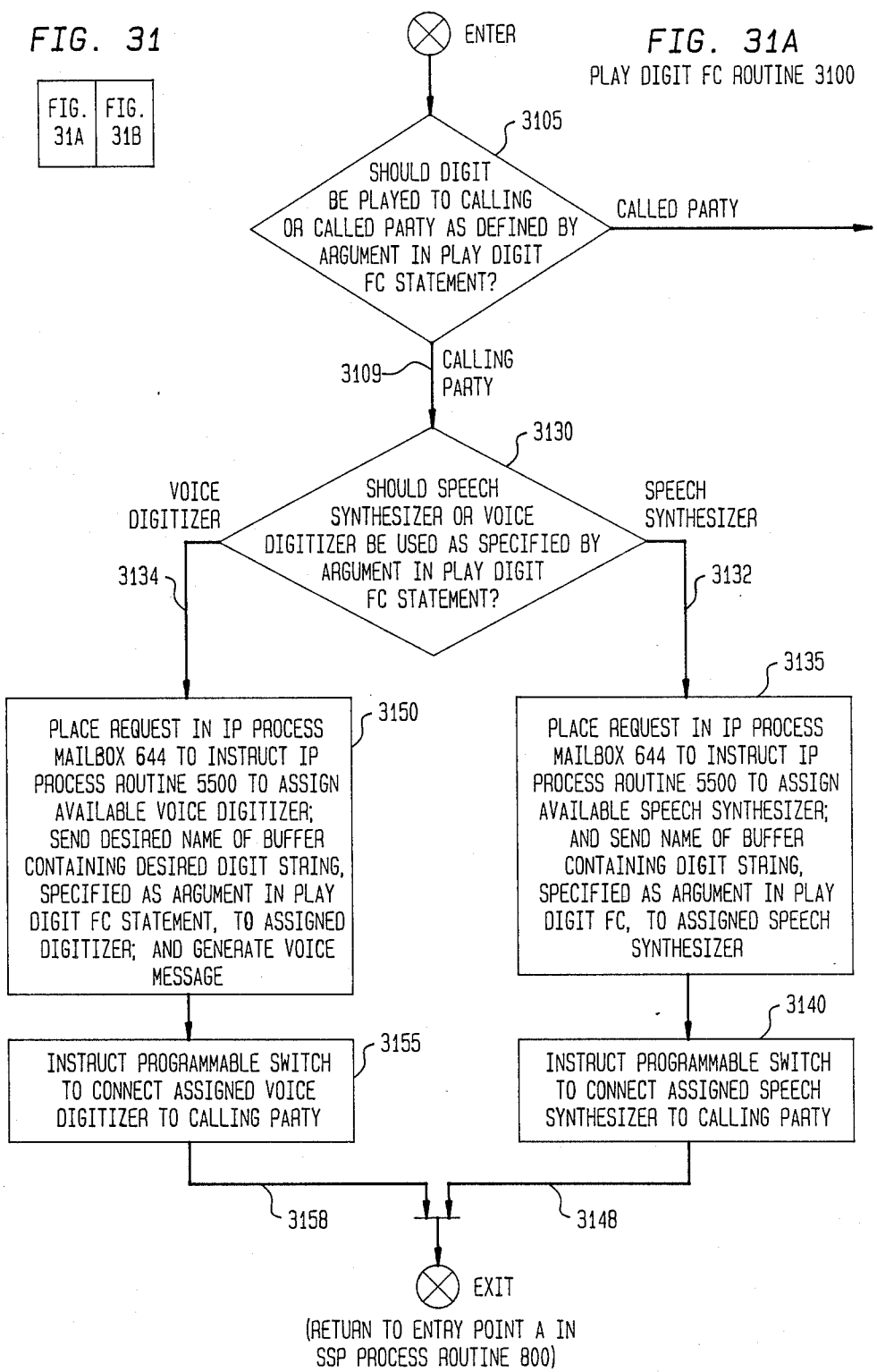

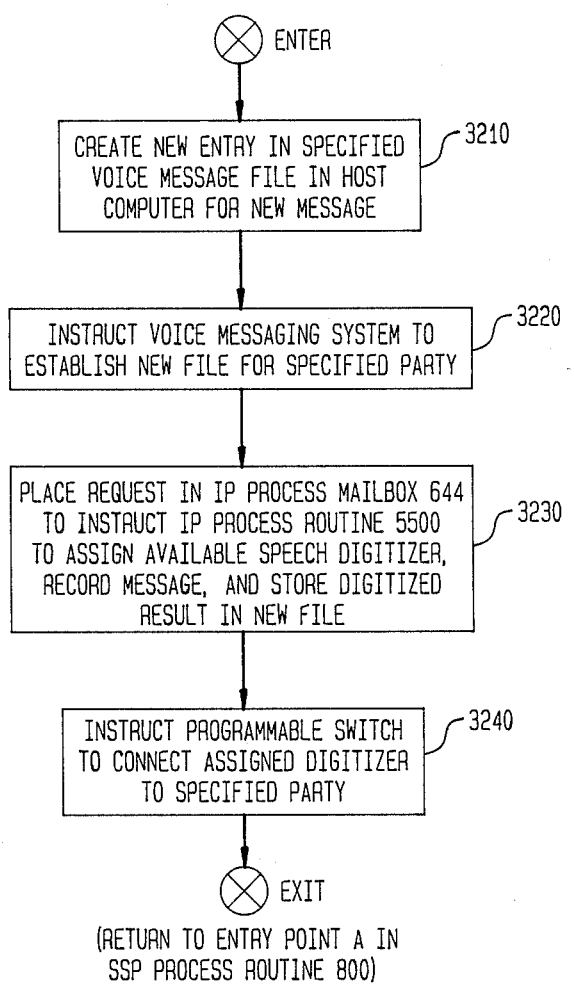

RECORD TELEPHONE FC ROUTINE 3300

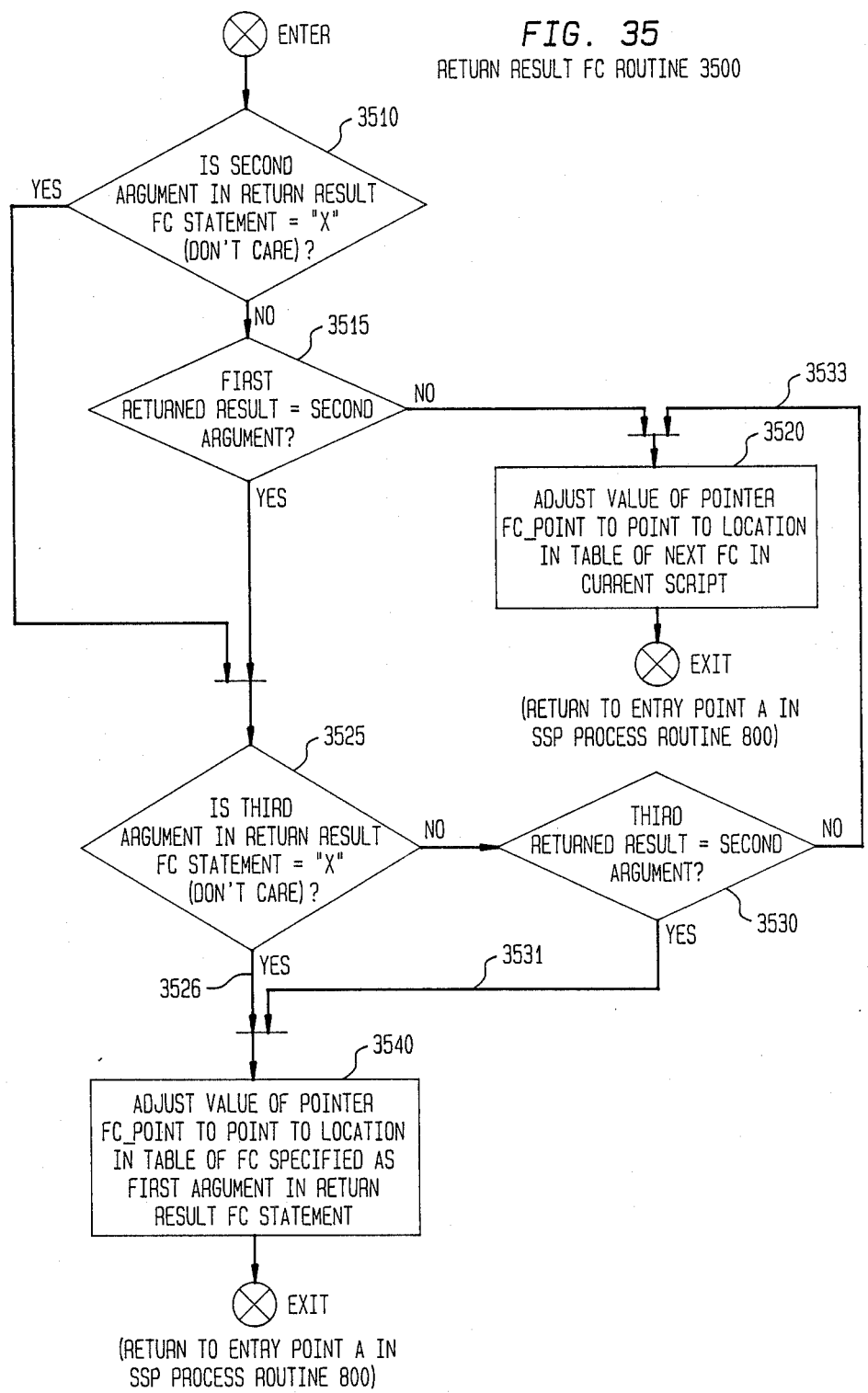

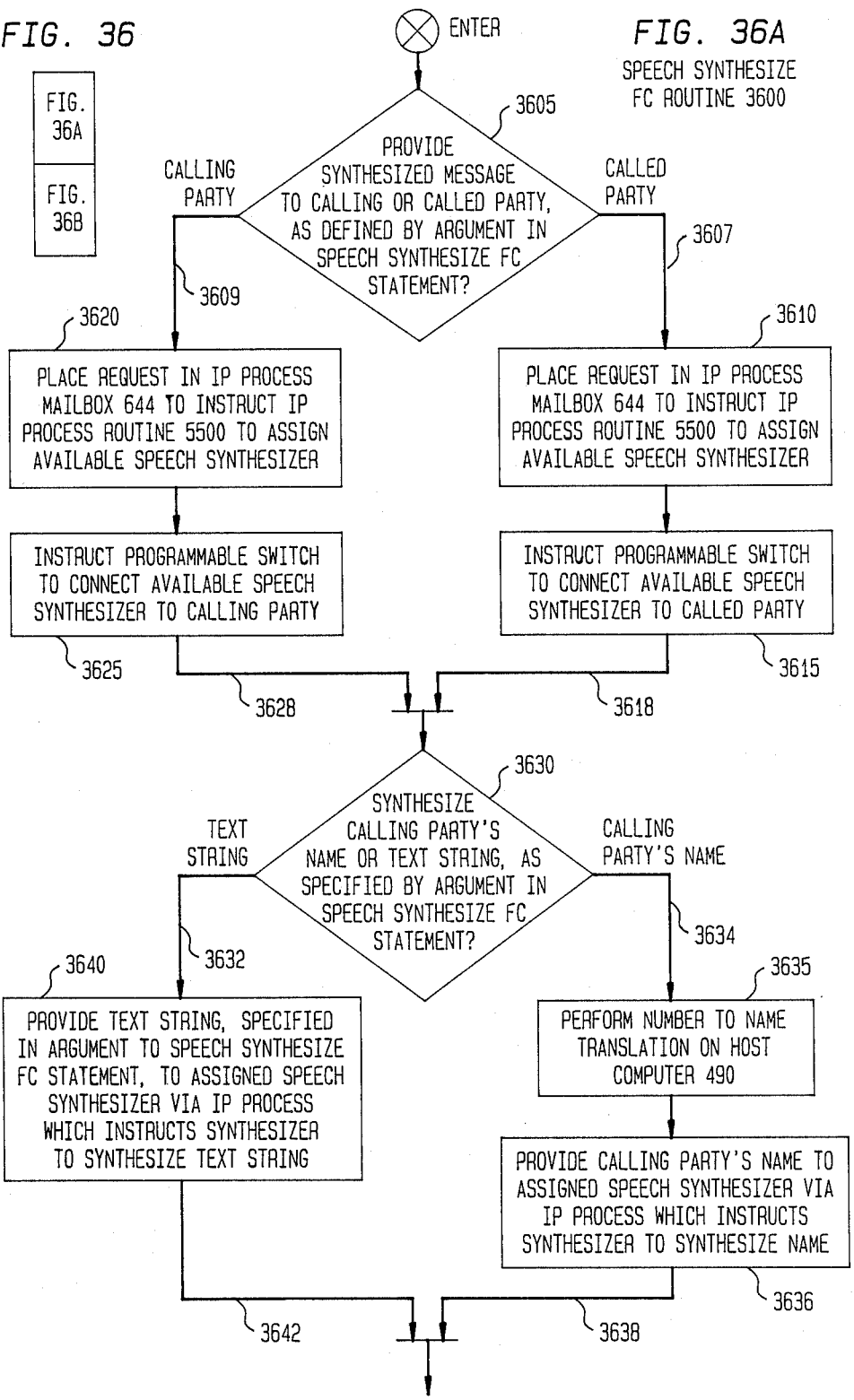

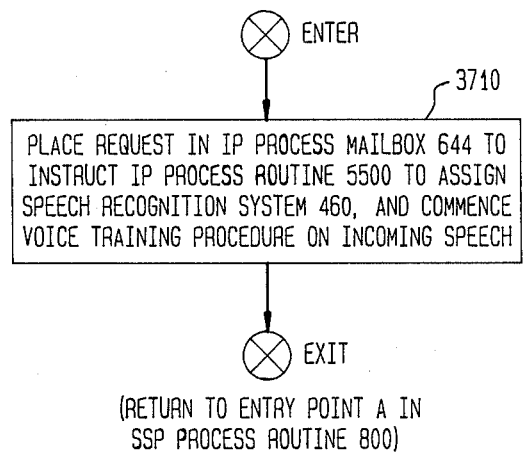
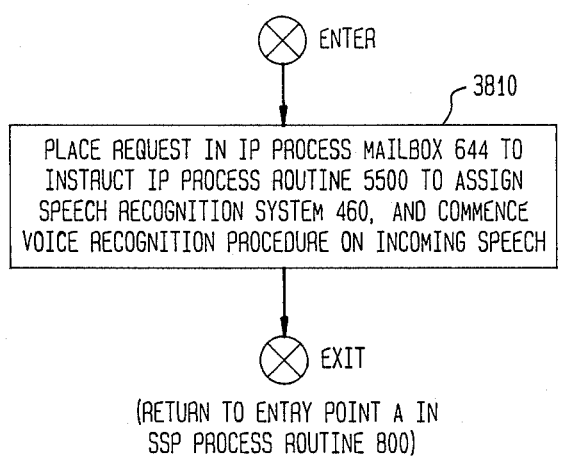

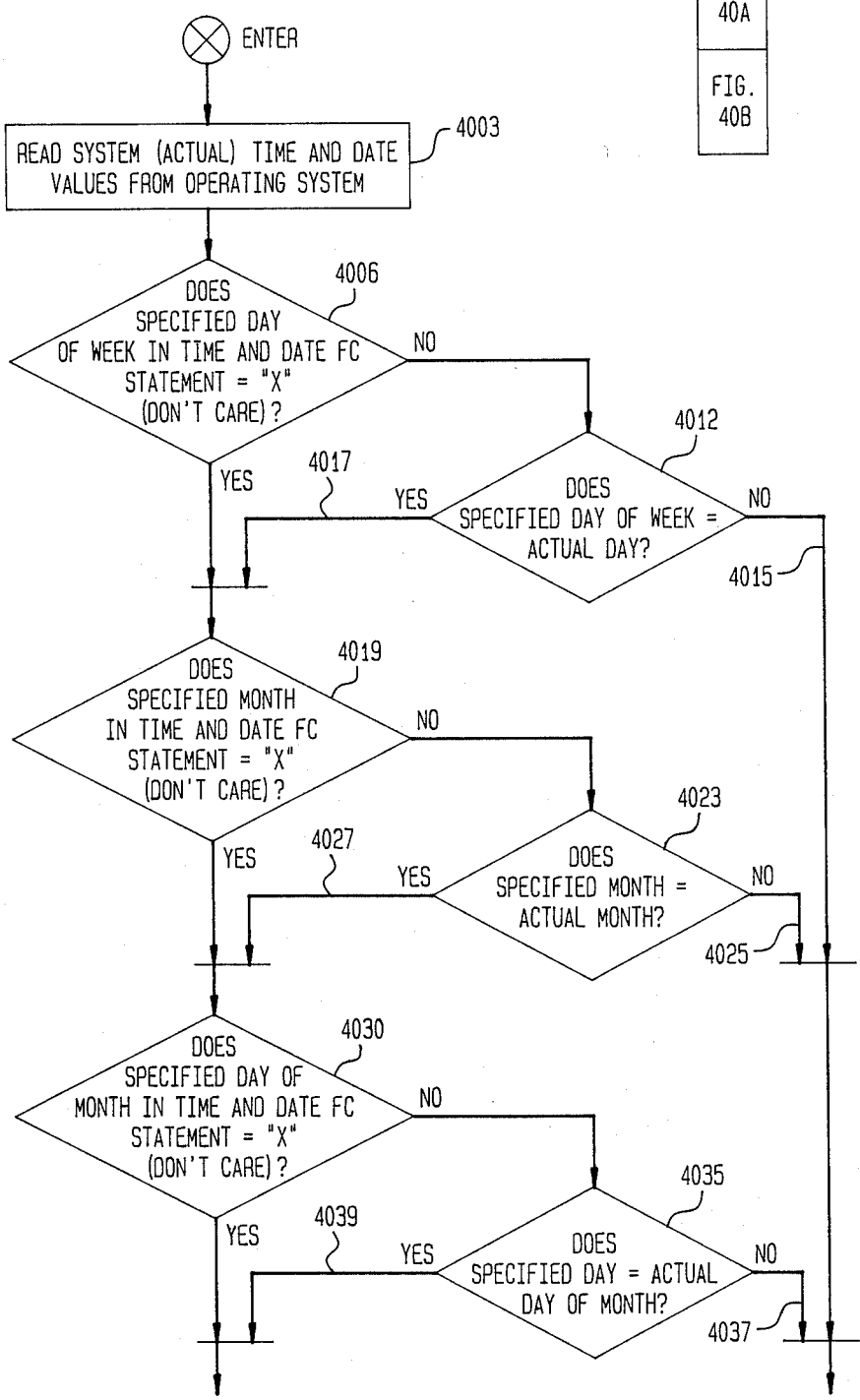

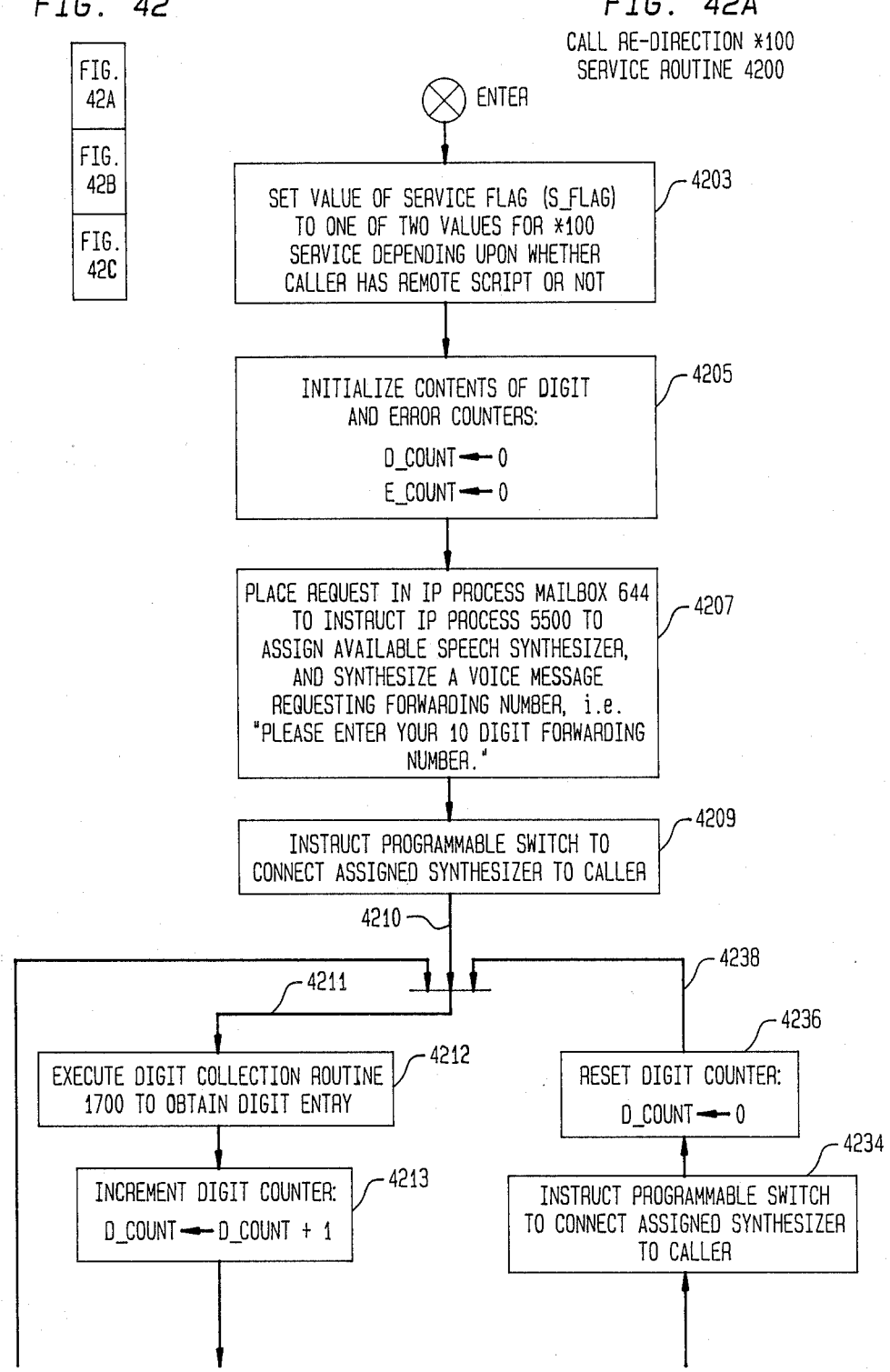

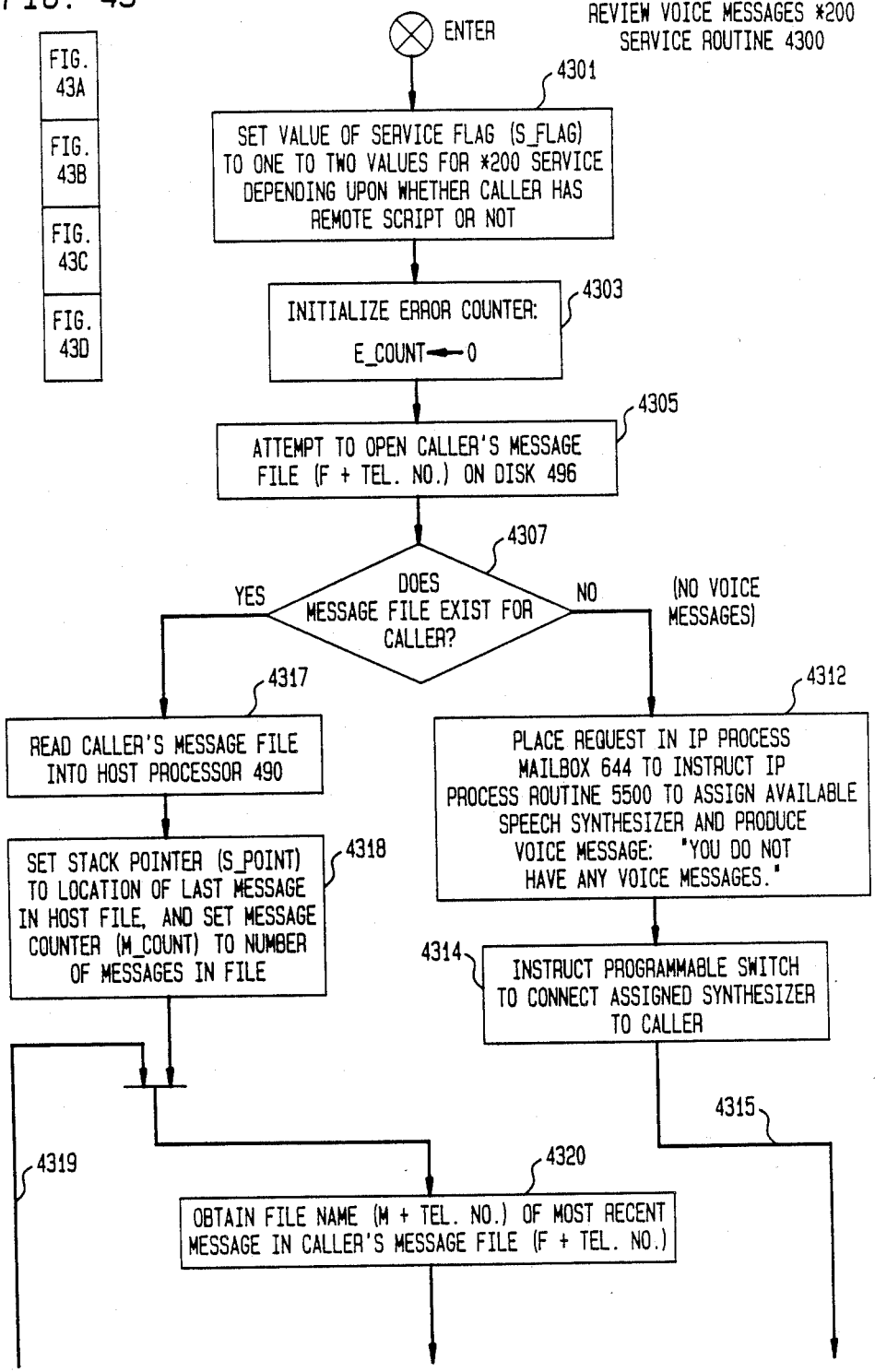

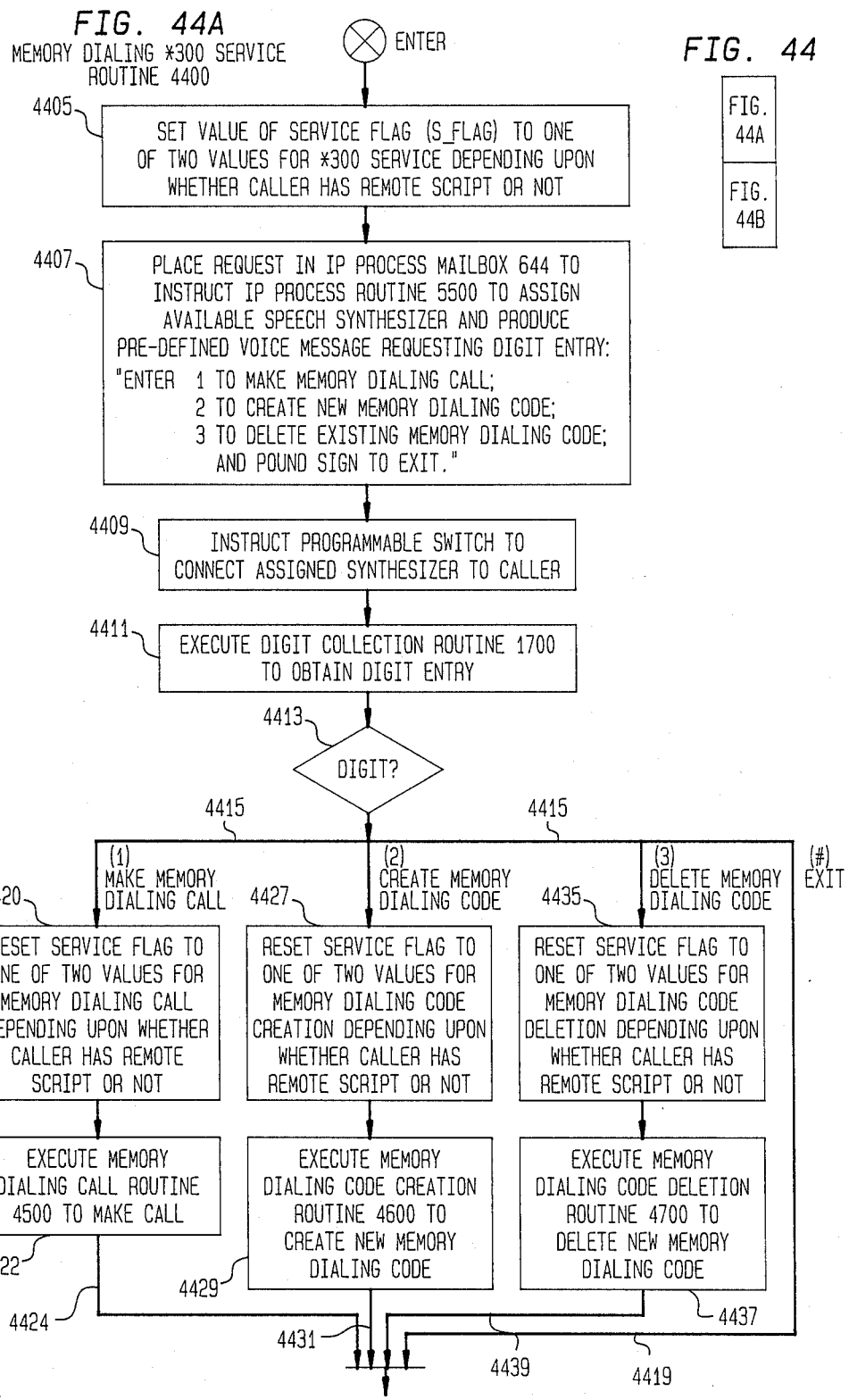

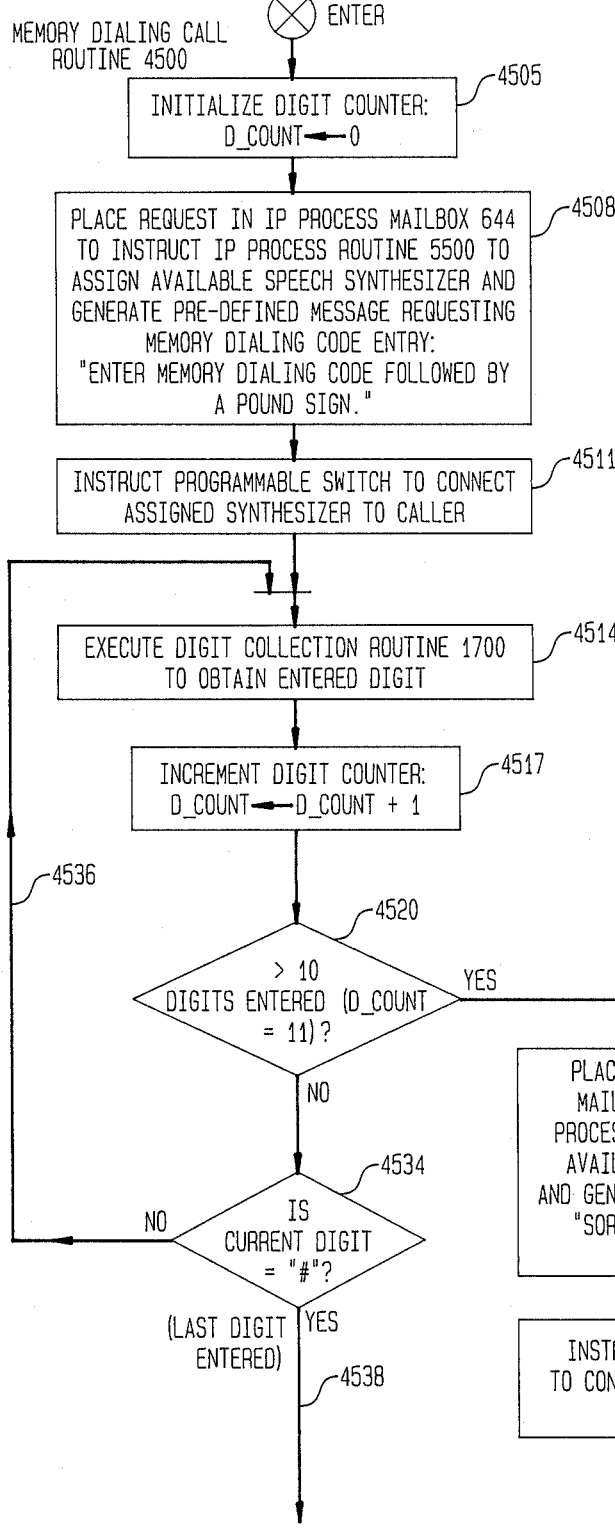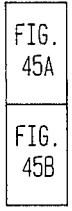

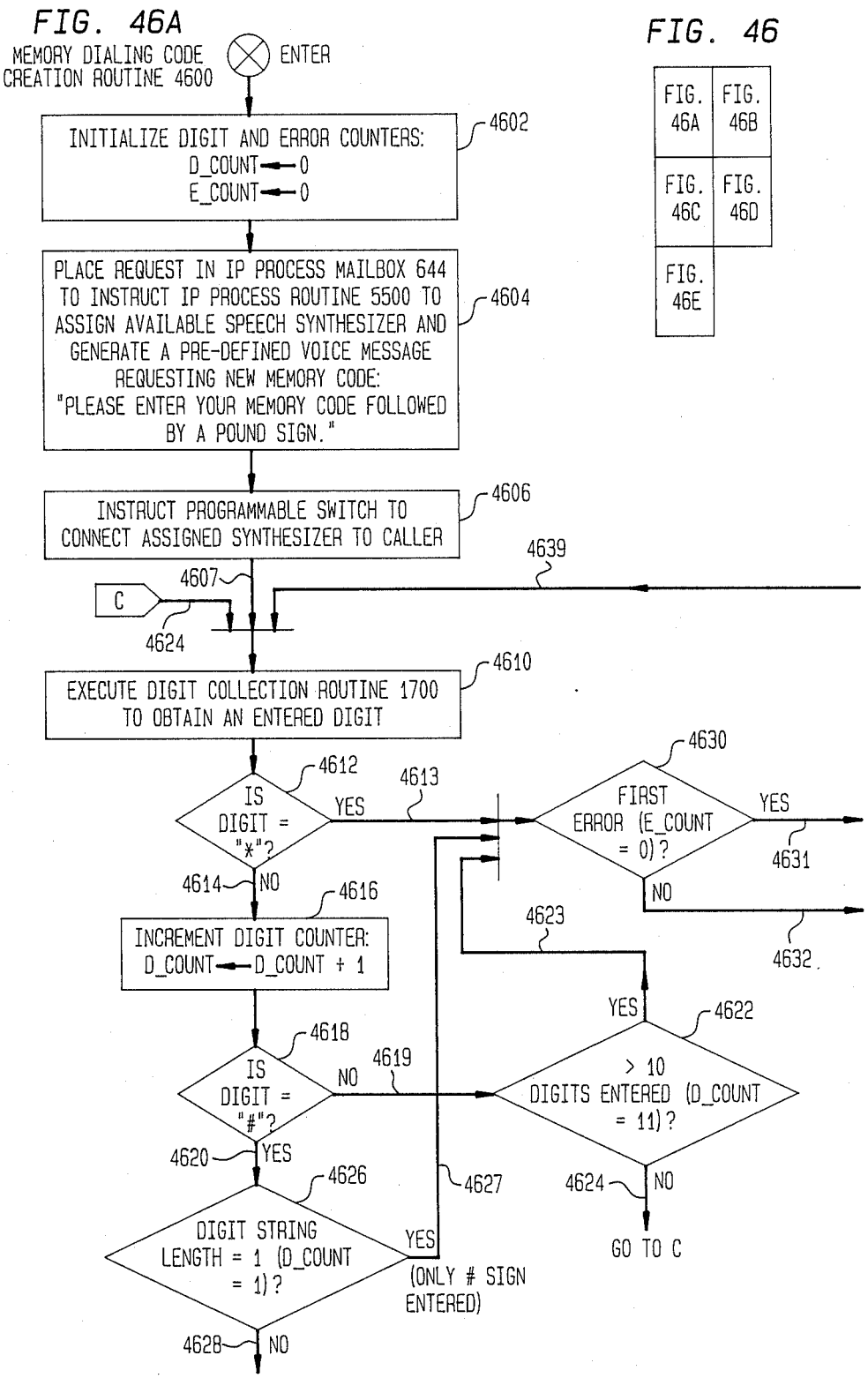

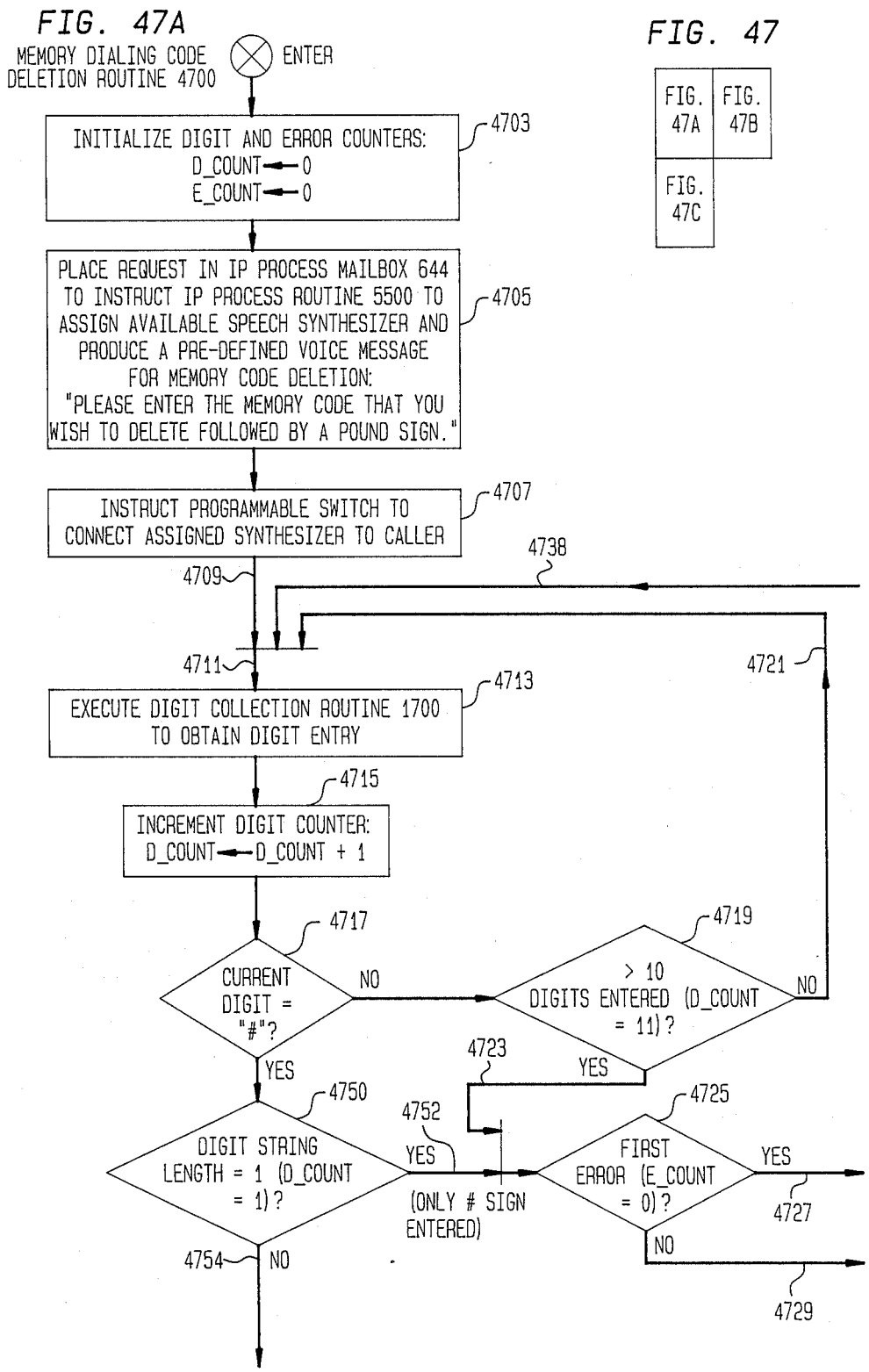

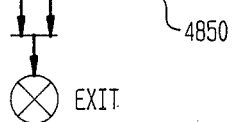

VOICE ANNOUNCEMENT RECORDING *700 SERVICE 4900

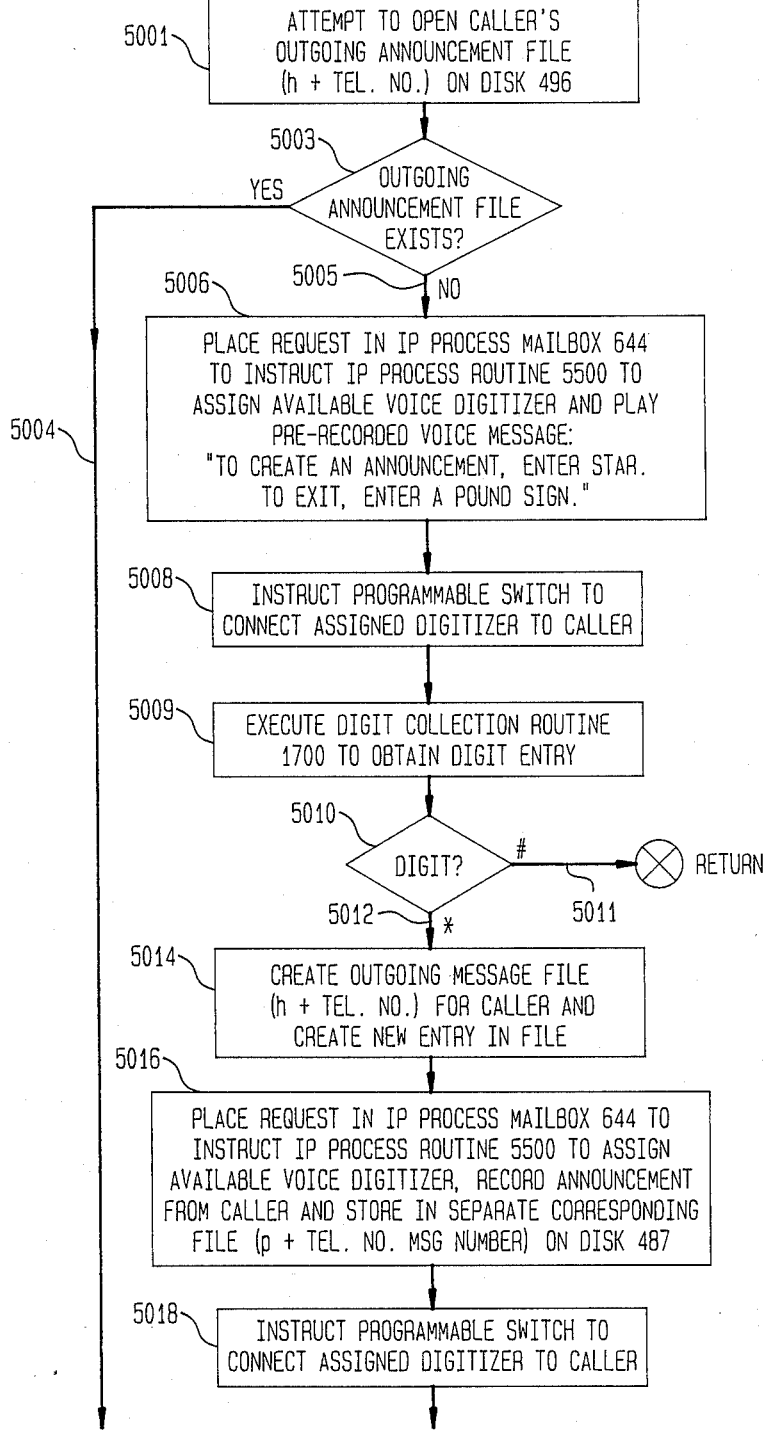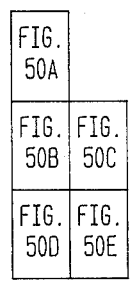

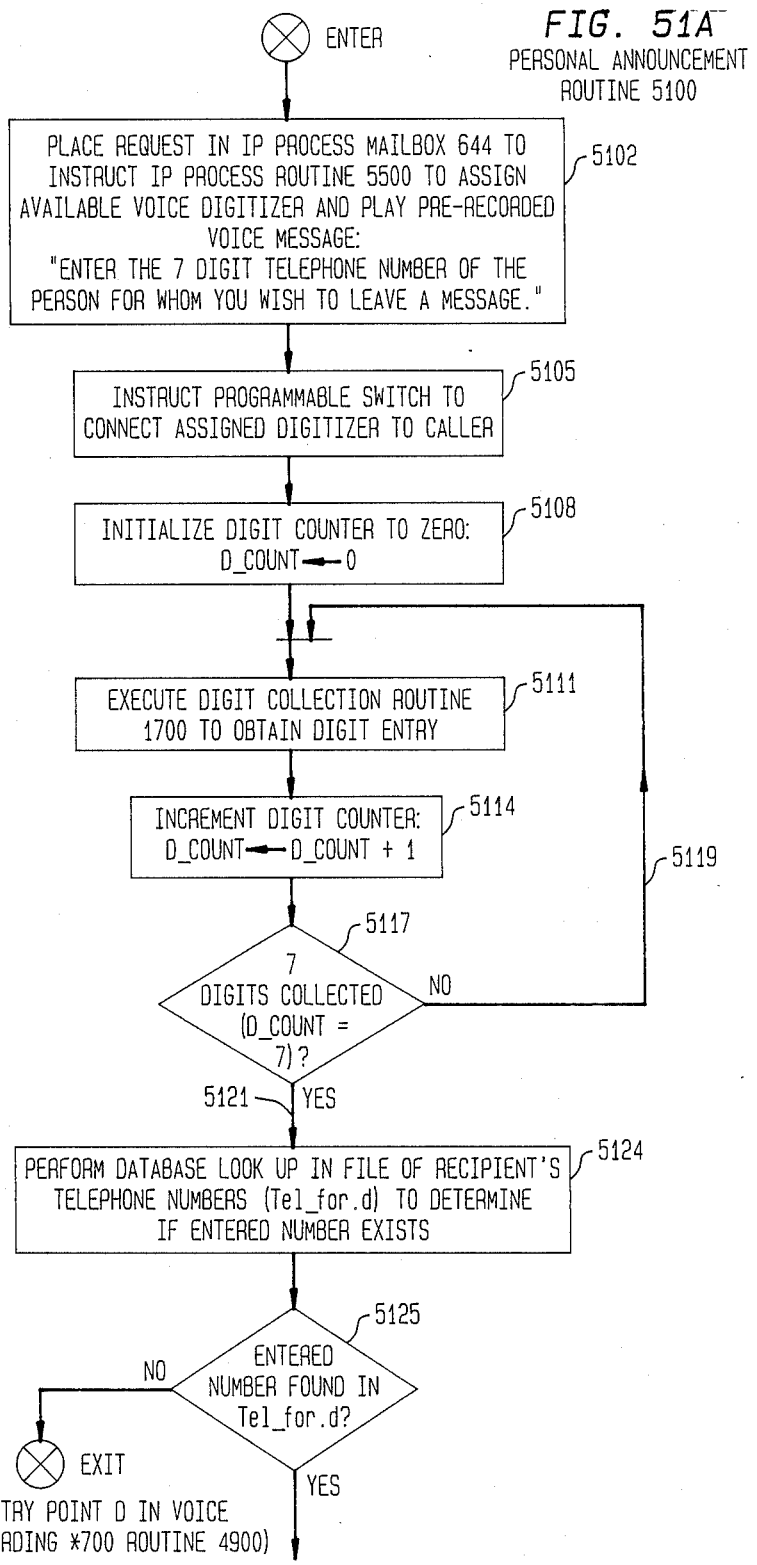

GROUP ANNOUNCEMENT ROUTINE 5200

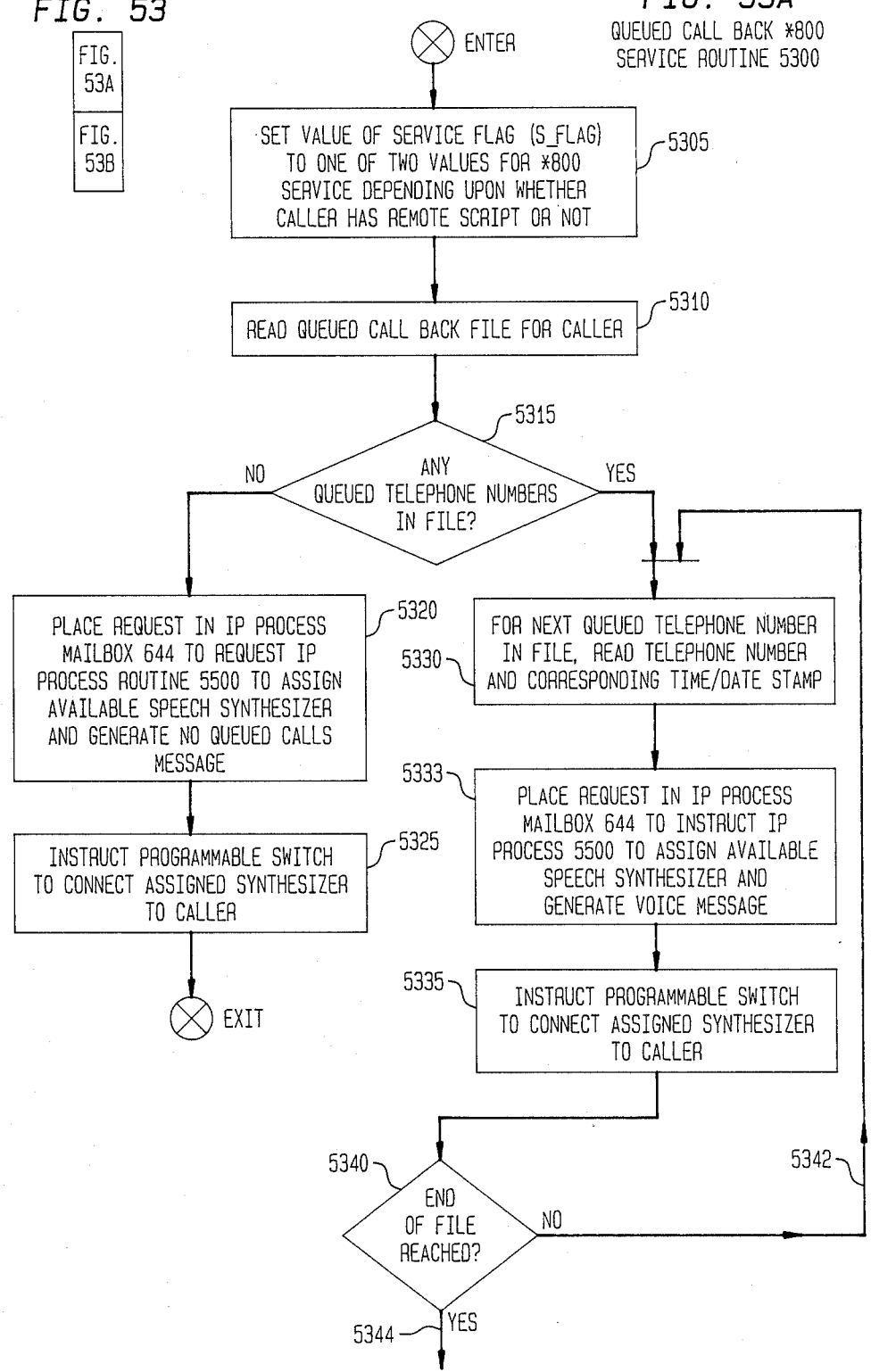

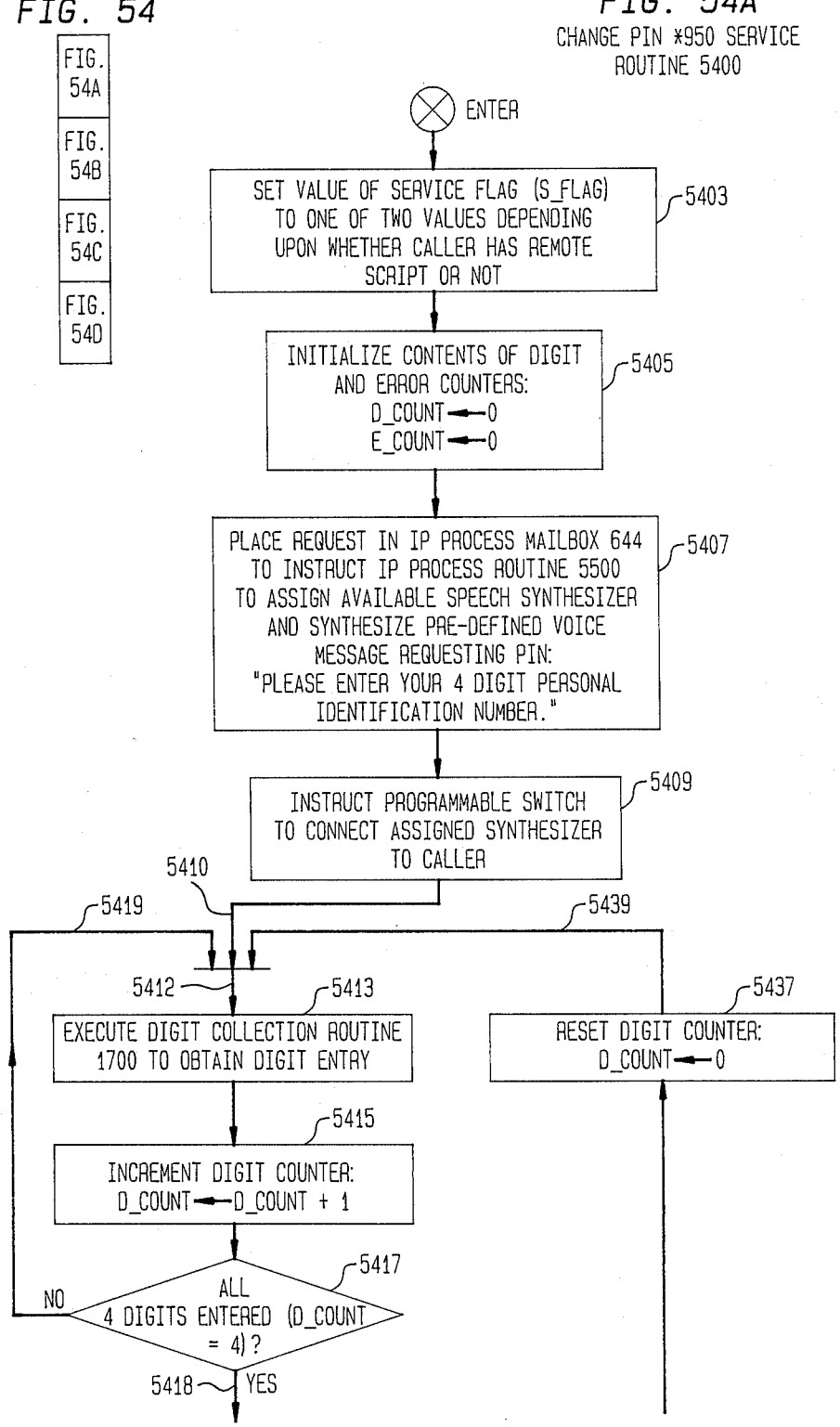

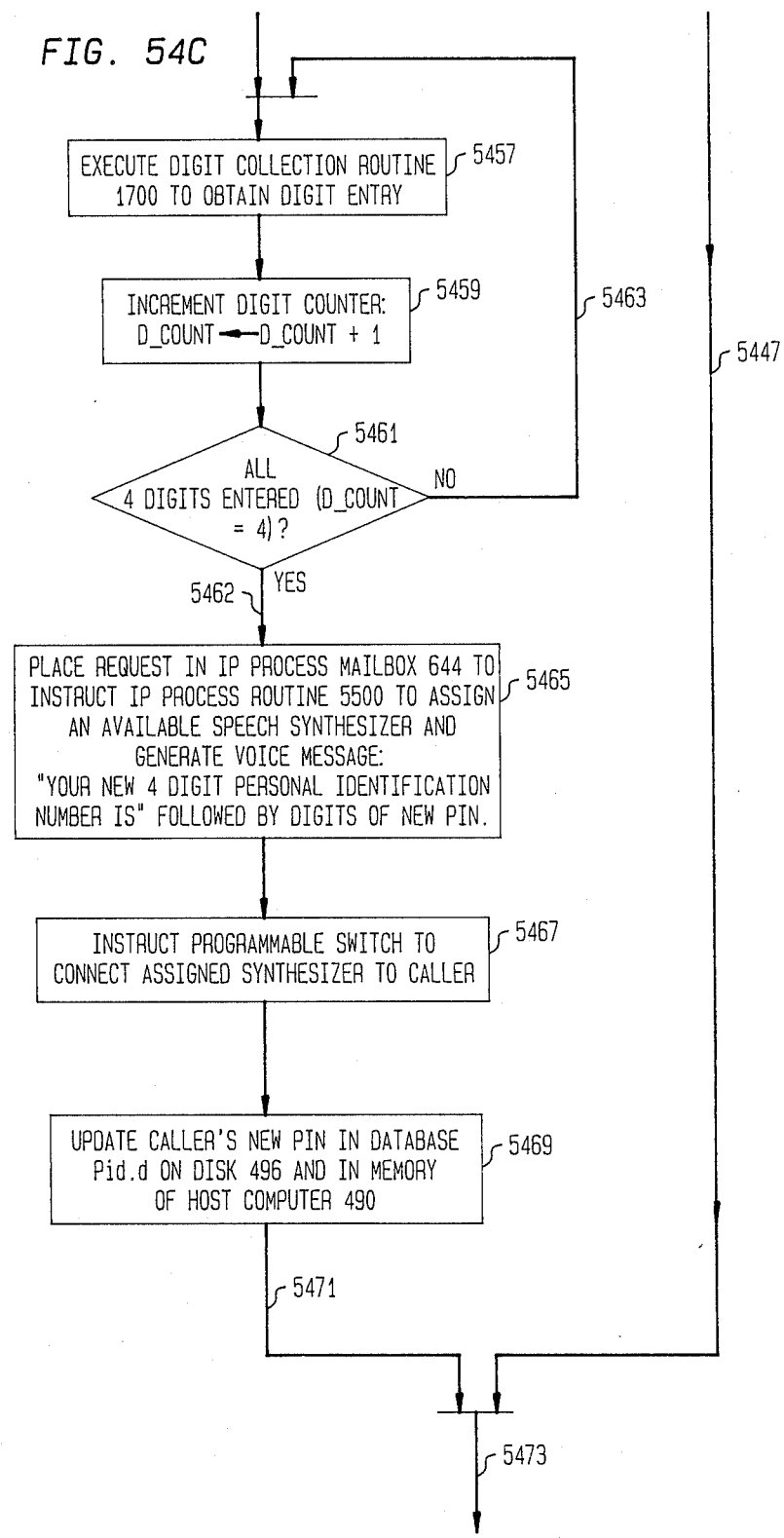

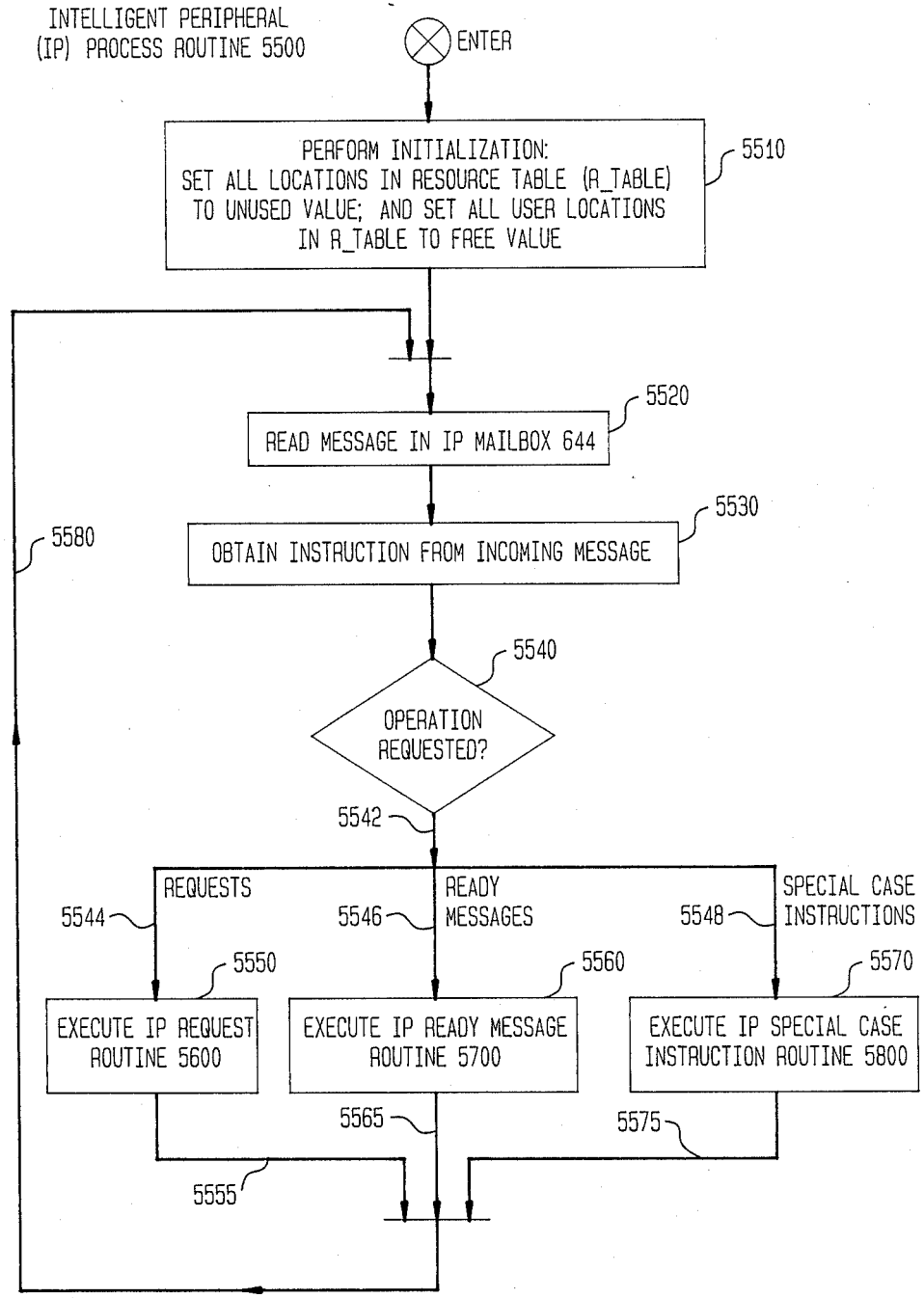

IP REQUEST
ROUTINE 5600

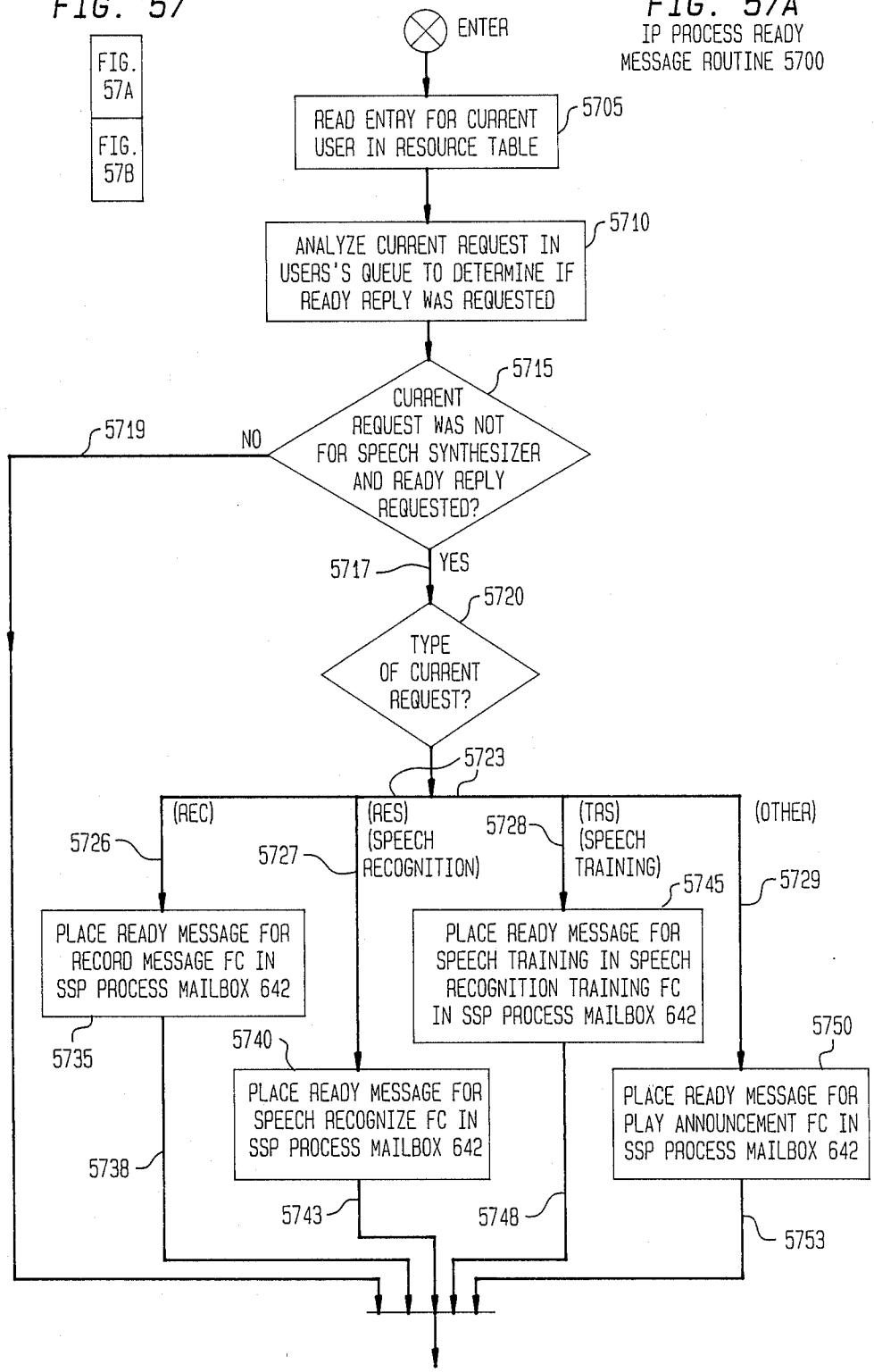

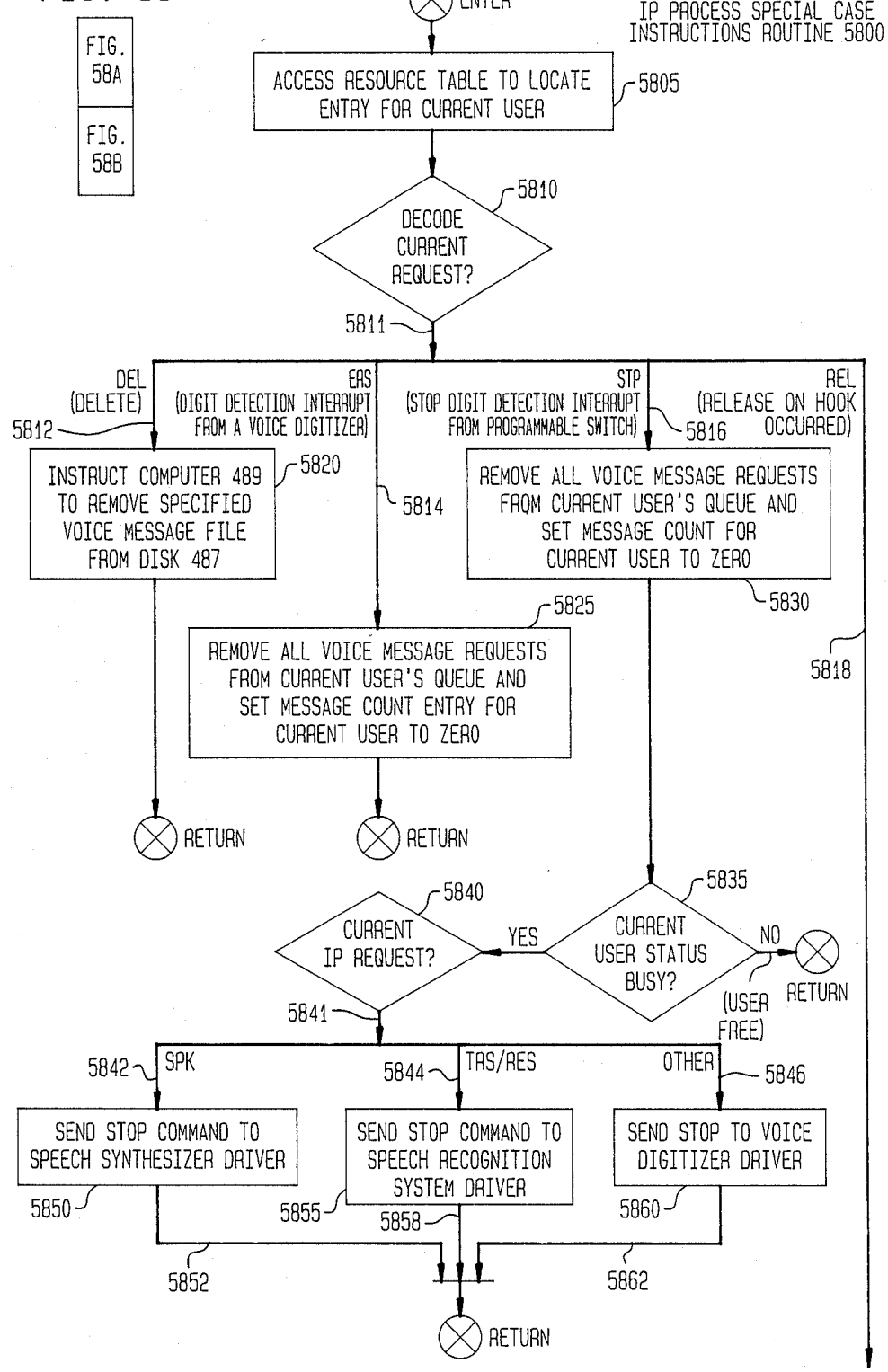

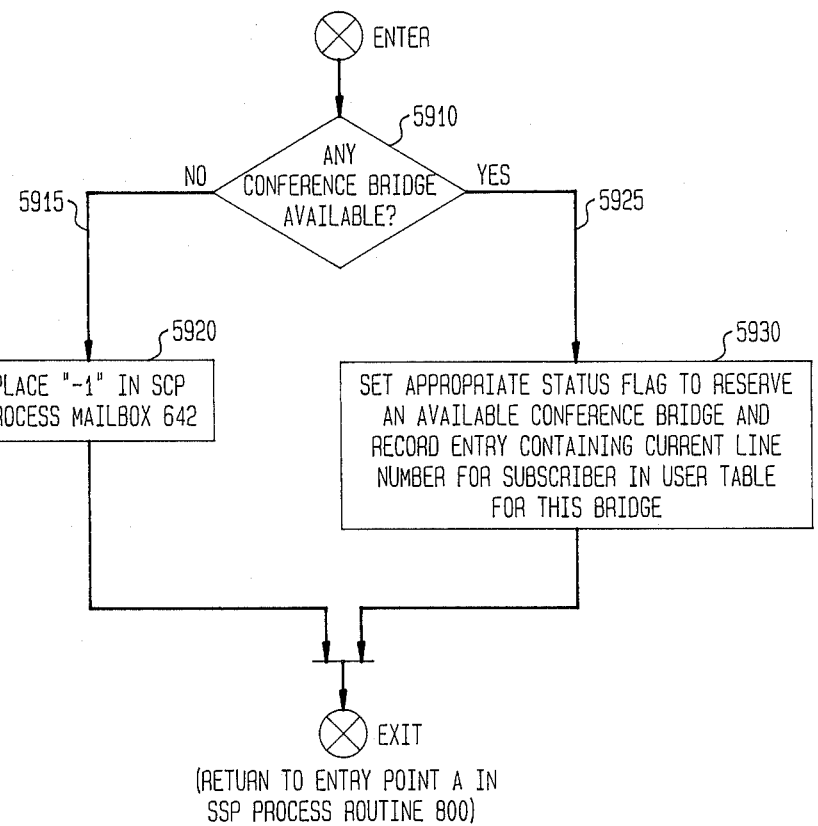

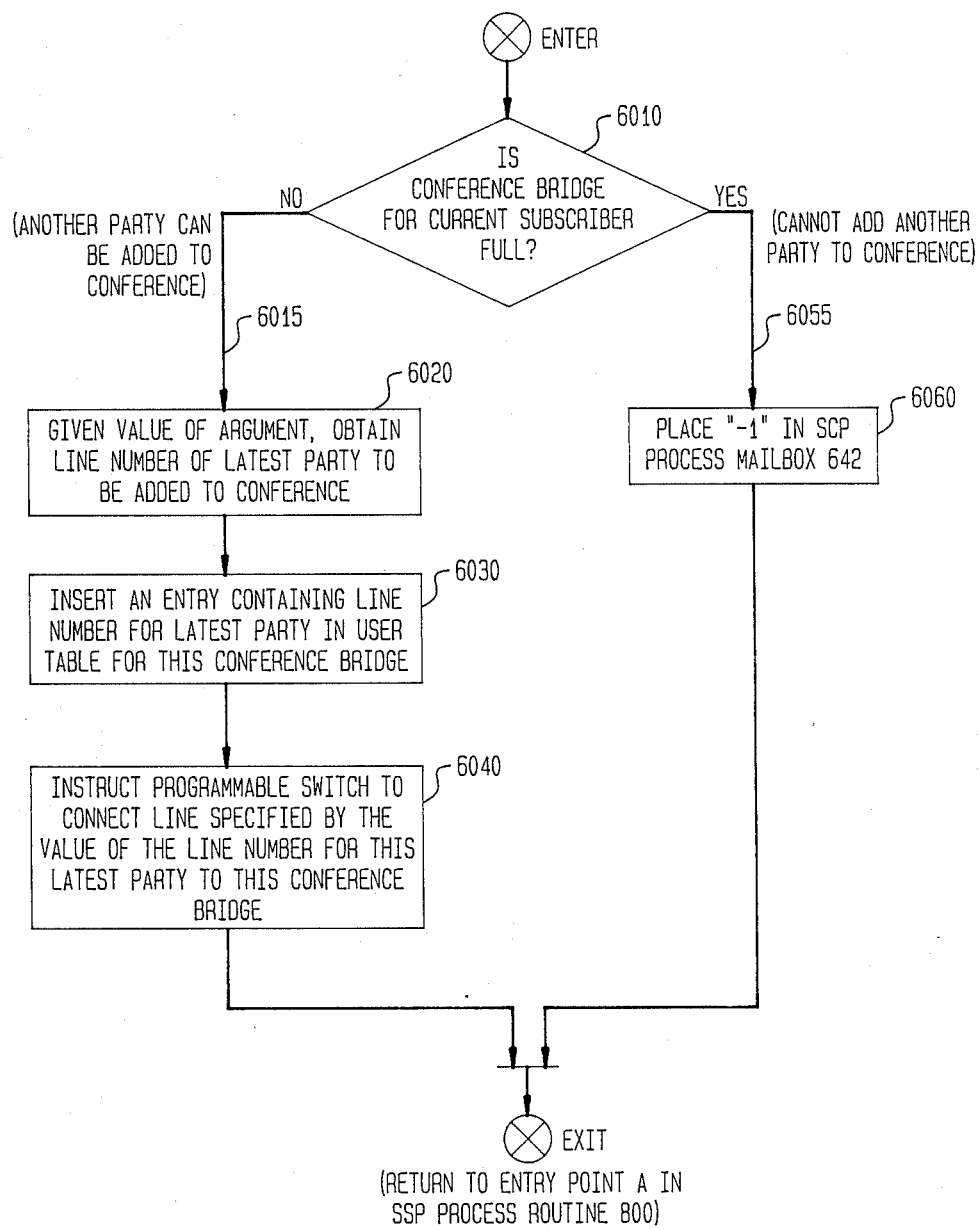

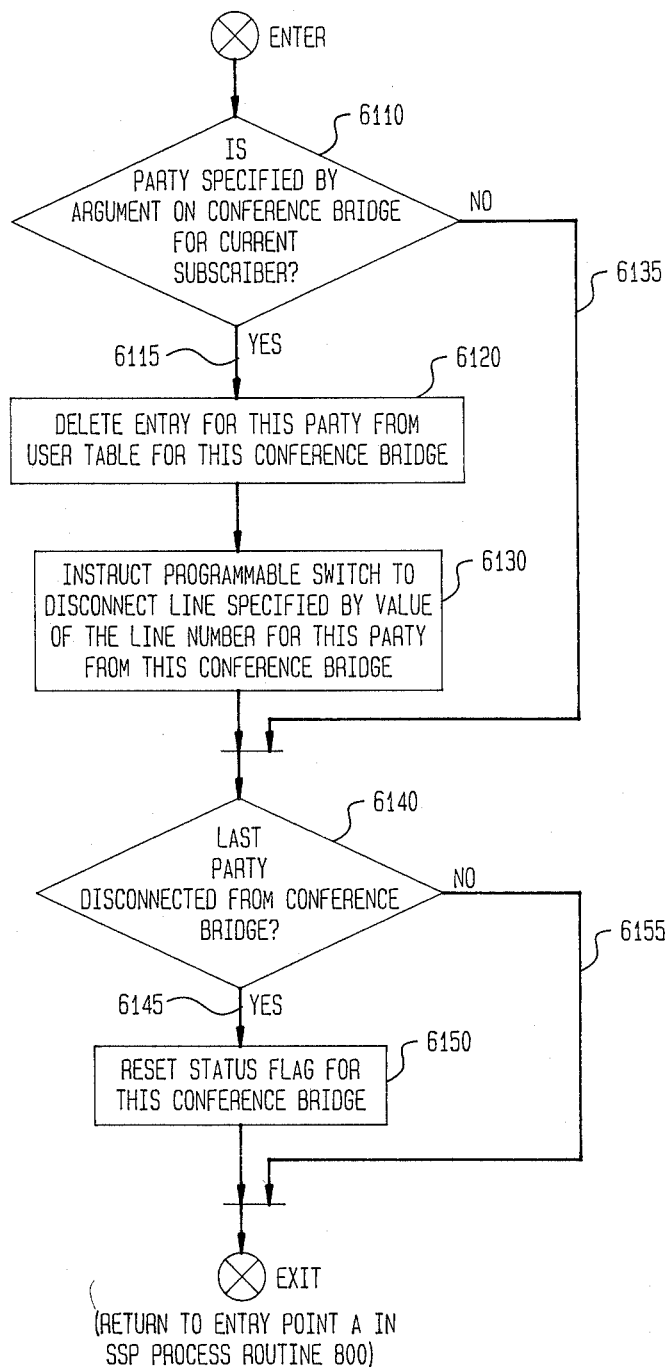

MULTI-SERVICE TELEPHONE SWITCHING SYSTEM

BACKGROUND OF THE INVENTION

1. Field of the Invention

The invention relates to a multi-service telephone switching system which includes a programmable adjunct that is to be used in conjunction with a local switching system for providing enhanced telephone services.

2. Description of the Prior Art

A large expanding market exists for enhanced telephone services. Currently, enhanced telephone services, such as call waiting, speed calling and call forwarding, are provided through a local telephone switching system. Local switching systems that provide these services are generally large, handling upwards of 50,000 separate lines, and are typified by the 1AESS and 5AESS electronic switching systems manufactured by American Telephone and Telegraph (AT&T) Corporation. In general, telephone switches directly inter-connect local calling and called parties and, when required for long distance communication, route telephone calls from a calling party over a series of one or more trunk lines to a local switch situated some distance away from the calling party and located in the vicinity of the called party.

At present, these electronic switching systems are computer controlled with the specific switching functions implemented in a series of software routines which are commonly referred to as generics. These generics are developed by the switch manufacturer and then loaded into the switch for subsequent use at a customer's site, typically a local switching office. Through these generics, the switch is able to provide a predefined selection of enhanced services to any local customer that is connected to the switch.

As in any industry, customer needs frequently change over time. The telephone industry is no exception. For example, once a customer has utilized a particular enhanced service for a period of time sufficient for him or her to discover its limitations, the customer will demand an improved service that cures these limitations. For example, call waiting was offered, initially a few years ago, to provide a service through which customers would not automatically miss a telephone call if their line was busy. In essence, this service first provided a signal (typically a short tone) to a called party on a busy line that another party was attempting to reach him and then allowed the called party to switch between the two calling parties by flashing a switch hook on his telephone. At first, this service adequately met customer demand. However, after this service was used by a customer for a sufficient period of time, the customer quickly realized that every telephone call that occurred during the time his line was busy would generate a tone on his line regardless of who was calling him. This occurred simply because the local switch, which provided this service, was not programmed to discriminate between incoming calls to a customer. Yet many customers find that some calls are more important than others. Hence, call waiting customers felt that calls from certain parties could be interrupted while calls from other parties were simply too important and could not be interrupted. Therefore, a demand, yet unsatisfied, has arisen for selective call waiting in which the customer would define those telephone numbers to the local telephone operating company that are important to him. An incoming call from any of these numbers, that would occur during the time the customer's line was busy, would be allowed to generate a tone and interrupt any on-going call on that line. The customer could then switch back and forth between the two callers at will. Incoming telephone calls from other numbers would simply receive a busy signal. Similarly, new service demands constantly arise from customer experiences with other presently available enhanced services.

Therefore, enhanced services that are new, when first introduced, later become commonplace after being used for several years and spawn a demand for new services. Hence, to maximize revenue, local telephone operating companies must constantly change their available service mix to satisfy customer demand. Thus, the development of enhanced services should ideally become an ongoing rapid evolutionary process between a telephone company and its customers. Unfortunately, in practice, this is simply not the case, as will now be discussed.

As noted above, software generics that provide enhanced services reside within the local switch. Because these generics are developed by the switch manufacturer and not by the local telephone companies, the local telephone companies generally must rely on the switch manufacturer to develop and then disseminate an entirely new set (a so-called "release") of generics or alternatively supplement an existing release with various new generics before any new enhanced services could be offered to customers, even on a trial basis. This generally necessitated a complete or substantial re-programming of a switch. Specifically, these generics often vary widely among switches produced by different manufacturers. Inasmuch as a local telephone company frequently utilizes switches from a variety of different manufacturers, the local telephone company simply does not have the resources to expeditiously write generics for each different switch it uses and therefore must rely on the switch manufacturer to do so. Consequently, the local telephone companies are constrained to wait until the switch manufacturer completes a lengthy development effort to offer, what it believes to be, either a new release of generics or supplementary generics to an existing release. Now, even when either of these events occurs, the new release (or supplementary generics from an existing release) has yet to be loaded into an operational switch for field trials (actual market tests) in order to accurately assess customer demand for the newly available enhanced services. Frequently, during the course of such a trial, the local telephone company learns that certain services, just now provided by the switch manufacturers are not particularly useful or usable by customers while other services, not previously foreseen or implemented by the manufacturer, are highly in demand. These results are then fed back to the switch manufacturer which, in turn, appropriately modifies the current generics in the present release. As one can appreciate, this iterative development process results in both a great deal of delay and considerable expense to the switch manufacturers in developing each release and substantial business opportunities and concomitant revenues that are missed by the local telephone companies. Moreover, there is no guarantee that, when the modified release becomes available in a fully operational release, the marketplace demand for certain enhanced telephone services will still remain. In particular, as the capability of the telephone network increases, a customer who demands a particular enhanced service might well decide, over time, to utilize a readily available substitute, though non-identical service, for the service initially demanded. This, in turn, decreases the eventual sales for the initially demanded service once that service finally becomes available. Hence, as the delay lengthens between the time a demand for a particular enhanced service is first foreseen and the time that service is finally implemented in an operational release and then made available to customers on a wide scale, increasing uncertainty, as to the ultimate marketplace acceptance of this new service, will tend to corrupt any early prediction of revenue for this service.

Thus, as can be seen, the long lead times associated with developing fully functional generics has, in the past, and continues to significantly inhibit the ability of local telephone companies to expeditiously develop and field test new enhanced telephone services and then modify the services, if necessary, to quickly satisfy customer demand. As a result, local telephone companies often provided enhanced telephone services that were out of step with current customer demand and were thereby unable to tap significant business opportunities. Now, if new services could be very quickly developed and expeditiously trialed on a small scale, then the local telephone companies would be much more able to adequately define each new service to meet customer requirements and rapidly deploy that service with a markedly reduced chance of failure than that which presently occurs.

Thus, a need exists for a telephone switching system that can readily provide new enhanced telephone services without requiring that any of the generics utilized in a local telephone switch be re-programmed.

SUMMARY OF THE INVENTION

The above-described drawbacks in the provisioning of new enhanced telephone services are advantageously eliminated in accordance with the teachings of the present invention by a multi-service telephone switching system that utilizes a programmable adjunct in conjunction with a telephone switch. Specifically, this system includes a telephone switch that serves at least one subscriber and an adjunct that is connected to the telephone switch both through one or more distinct paths, such as a number of hunt group lines, and through a datalink, such as a simplified message desk datalink. The telephone switch routes a telephone call (e.g. forwards an incoming call and directly connects an outgoing call) involving this subscriber to the adjunct through an available hunt group line and provides a corresponding message to the adjunct over the datalink. This message typically specifies the calling number and a condition under which the call was routed to the available hunt group line. In response to this message, the adjunct takes complete control of the call substantially throughout the remainder of its duration and provides a desired enhanced service that has been pre-defined by a service script stored within the adjunct.

In particular, the telephone switch, typically a local switch, is connected to each one of a plurality of telephone subscribers through a separate corresponding one of a plurality of lines. The adjunct itself utilizes: a programmable switch providing first and second sets of interfaces, wherein various ones of the first set are connected to corresponding lines within the hunt group supplied by the telephone switch; at least one peripheral device connected to a particular interface within the second set; a storage device, typically a disk drive; and a host processor connected to the telephone switch, via the simplified message desk datalink, and also connected to the storage device, the peripheral device and the programmable switch.

In operation, the host processor controls the peripheral device and the programmable switch in accordance with a sequence of functional components which form a service script. The service script is stored within the storage device and collectively defines an enhanced service. To provide an enhanced service anytime during the call, the adjunct routes a call, that has been forwarded by the telephone switch, through the programmable switch throughout the remainder of the duration of the call in order for the adjunct to exercise substantial control over the call during this time. Since at this point and thereafter the adjunct has substantially complete control over the call, it is able to provide enhanced services to either the caller or called party on that call independently of any software, such as generics, executing within the local switch. This, in turn, eliminates any need to re-program the telephone (local) switch to provide the enhanced service.

Service scripts are sequences of functional components. Each functional component is a high level command that provides a certain function required to provide an enhanced service. An entire set of functional components provides all the necessary commands, in terms of high level telephone switching operations, to provide enhanced services. For example, some of these functional components, when executed, instruct the programmable switch to transmit a digit, collect a dialed number, establish a voice path through the switch between a caller and either a called party or a peripheral, and the like. Other functional components, when executed, instruct the peripheral device to provide a specific function, such as play a message, record a message, synthesize or recognize speech and the like.

Now, whenever an enhanced service is to be provided, specifically in response to a so-called trigger, an appropriate service script is read from a storage device. An interpretive process, illustratively called the SCP Process, determines, based upon an immediately prior state of the script and the value of a returned result, which functional component in the script is to be executed. The appropriate functional component is then sent to another process, illustratively referred to as the SSP Process. This process, similar to a run time compiler, decodes each functional component it receives into a pre-determined sequence of instructions. This sequence is used to appropriately instruct the programmable switch or a peripheral device used in the adjunct to perform the desired function specified by the functional component. Once the function has been performed, the SSP Process may provide a returned result. In addition, the SSP Process also detects events and sets appropriate triggers to invoke associated service scripts for separately processing each detected event. These events may originate within the programmable switch, such as illustratively an incoming call or a busy line, or may take the form of a software event occurring within the host processor, such as a time-out indication provided by a software timer.

By separating the software used to provide service logic functions (i.e. functional components) from the software used to implement actual switching and peripheral functions (decoding process), a programmer developing new telephone services is substantially, if not completely, relieved of the need to know any details of both the software which controls actual switching operations on the telephone switch and the software which controls actual switching and peripheral operation on the adjunct. Re-programming a short relatively simple high level service script becomes all that is required to provide a new enhanced service. Furthermore, the developed service script becomes independent of the actual hardware used in the adjunct. Consequently, the service logic (service scripts) becomes easily transportable; while, the switching logic (decoding process) is customized for a particular adjunct being controlled (e.g. much like a compiler is written for the instruction set of a particular machine; while the high level code to be compiled is usually machine independent, i.e. tansportable and executable on computers having significantly disparate instruction sets). Thus, use of the inventive adjunct advantageously permits enhanced telephone services to be quickly developed, trialed and modified, as needed, in order to expeditiously satisfy customer demand with a minimal expenditure of time and effort.

To easily provide enhanced services through existing telephone switches, each subscriber, in accordance with a preferred embodiment of the present invention, has two telephone numbers. One such number is a logical or published number. This is the number known to the telephone switch and is the one that others would dial to reach this subscriber. The other number is a physical number known only to the adjunct. Incoming calls to a subscriber's logical number are routed by the telephone switch (illustratively using a "call forwarding" feature) to a hunt group line. The call is then routed by the adjunct through the programmable switch for the duration of the call and, based upon the services desired by the called party and the condition (e.g. answered, busy or not answered) of his telephone line, routed to the physical number of the called party to ring his telephone or, for call forwarding, to the physical number of another party in order to ring the telephone there.

In accordance with a feature of the present invention, the adjunct can provide enhanced services based upon call screening. Since the adjunct, at least with respect to calls originating within a service area of the local switch, obtains the calling party's telephone number (so-called ANI information) from the local telephone switch for each incoming call, enhanced services can be provided which selectively prevent calls from reaching a subscriber or which selectively allow calls to be routed to the subscriber based upon the number of the calling party or information obtained through a database access using the number of the calling party.

BRIEF DESCRIPTION OF THE DRAWING

The teachings of the present invention can be readily understood by considering the following detailed description in conjunction with the accompanying drawing, in which:

FIG. 2 is a block diagram showing typical call flow through inventive system 100, depicted in FIG. 1, for processing an incoming telephone call;

FIG. 3 is a block diagram showing typical call flow through inventive system 100, depicted in FIG. 1, for processing an outgoing telephone call;

FIG. 4 shows the proper alignment of the drawing sheets for FIGS. 4A-4D;

FIGS. 4A-4D collectively depict a block diagram of Modular Switching Node (MSN) 400 that forms a portion of inventive system 100 shown in FIG. 1;

FIG. 7 depicts a flowchart of SCP Process Routine 700 shown in FIG. 6;

FIG. 8 shows the proper alignment of the drawing sheets for FIGS. 8A-8C;

FIGS. 8A-8C collectively depict a flowchart of SSP Process Routine 800 shown in FIG. 6;

FIGS. 9A and 9B collectively depict a flowchart of Load Database Routine 900 that is executed as part of SSP Process Routine 800 shown in FIGS. 8A-8C;

FIG. 14 shows the proper alignment of the drawing sheets for FIGS. 14A and 14B;

FIGS. 14A and 14B collectively depict a flowchart of Software Event Routine 1400 that is also executed as part of SSP Process Routine 800 shown in FIGS. 8A-8C;

FIG. 15 shows the proper alignment of the drawing sheets for FIGS. 15A and 15B;

FIGS. 15A and 15B collectively depict a flowchart of Off Hook Routine 1500 that is also executed as part of SSP Process Routine 800 shown in FIGS. 8A-8C;

FIG. 17 shows the proper alignment of the drawing sheets for FIGS. 17A-17C;

FIGS. 17A-17C collectively depict a flowchart of Digit Collection Routine 1700 that is also executed as part of SSP Process Routine 800 shown in FIGS. 8A-8C;

FIG. 21 shows the proper alignment of the drawing sheets for FIGS. 21A and 21B;

FIGS. 21A and 21B collectively depict a flowchart of Check Message FC Routine 2100;

FIG. 22 depicts a flowchart of Collect Digits FC Routine 2200;

FIG. 25 shows the proper alignment of the drawing sheets for FIGS. 25A–25B;

FIGS. 25A–25B collectively depict a flowchart of Give Path FC Routine 2500;

FIG. 26 depicts a flowchart of Go To FC Routine 2600;

FIG. 27 depicts a flowchart of Hang-Up FC Routine 2700;

FIG. 28 depicts a flowchart of Quit FC Routine 2800;

FIG. 29 depicts a flowchart of Page FC Routine 2900;

FIG. 30 depict a flowchart of Play Voice Message FC Routine 3000;

FIG. 31 shows the proper alignment of the drawing sheets for FIGS. 31A and 31B;

FIGS. 31A and 31B collectively depict a flowchart of Play Digit FC Routine 3100;

FIG. 32 depicts a flowchart of Record Message FC Routine 3200;

FIG. 34 depicts a flowchart of Release Line FC Routine 3400;

FIG. 35 depicts a flowchart of Return Result FC Routine 3500;

FIG. 36 shows the proper alignment of the drawing sheets for FIGS. 36A and 36B;

FIGS. 36A and 36B collectively depict a flowchart of Speech Synthesize FC Routine 3600;

FIG. 37 depicts a flowchart of Speech Recognition System Training FC Routine 3700;

FIG. 38 depicts a flowchart of Speech Recognize FC Routine 3800;

FIG. 39 depicts a flowchart of Stop Peripheral FC Routine 3900;

FIG. 40 shows the proper alignment of the drawing sheets for FIGS. 40A and 40B;

FIGS. 40A and 40B collectively depict a flowchart of Time and Date FC Routine 4000;

FIG. 41 depicts a flowchart of Wait FC Routine 4100;

FIG. 42 shows the proper alignment of the drawing sheets for FIGS. 42A–42C;

FIGS. 42A–42C collectively depict a flowchart of Call Re-direction *100 Service Routine 4200 that is executed within Digit Collection Routine 1700 shown in FIGS. 17A–17C;

FIG. 43 shows the proper alignment of the drawing sheets for FIGS. 43A–43D;

FIGS. 43A–43D collectively depict a flowchart of Review Voice Messages *200 Service Routine 4300 that is executed within Digit Collection Routine 1700 shown in FIGS. 17A–17C;

FIG. 44 shows the proper alignment of the drawing sheets for FIGS. 44A and 44B;

FIGS. 44A and 44B collectively depict a flowchart of Memory Dialing *300 Service Routine 4400 that is executed within Digit Collection Routine 1700 shown in FIGS. 17A–17C;

FIG. 45 shows the proper alignment of the drawing sheets for FIGS. 45A and 45B;

FIGS. 45A and 45B collectively depict a flowchart of Memory Dialing Call Routine 4500 that is executed as part of Memory Dialing *300 Service Routine 4400 shown in FIGS. 44A and 44B;

FIG. 46 shows the proper alignment of the drawing sheets for FIGS 46A–46E;

FIGS. 46A–46E collectively depict a flowchart of Memory Dialing Code Creation Routine 4600 that is also executed as part of Memory Dialing *300 Service Routine 4400 shown in FIGS. 44A and 44B;

FIG. 47 shows the proper alignment of the drawing sheets for FIGS. 47A–47C;

FIGS. 47A–47C collectively depict a flowchart of Memory Dialing Code Deletion Routine 4700 that is also executed as part of Memory Dialing *300 Service Routine 4400 shown in FIGS. 44A and 44B;

FIG. 48 depicts a flowchart of Ring Update *600 Service Routine 4800 that is executed within Digit Collection Routine 1700 shown in FIGS. 17A–17C;

FIG. 50 shows the proper alignment of the drawing sheets for FIGS. 50A–50E;

FIGS. 50A–50E collectively depict a flowchart of Outgoing Announcement Routine 5000 that is executed as part of Voice Announcement Recording *700 Service Routine 4900 shown in FIGS. 49A–49C;

FIG. 51 shows the proper alignment of the drawing sheets for FIGS. 51A and 51B

FIGS. 51A and 51B collectively depict a flowchart of Personal Announcement Routine 5100 that is executed as part of Voice Announcement Recording *700 Service Routine 4900 shown in FIGS. 49A–49C;

FIG. 53 shows the proper alignment of the drawing sheets for FIGS. 53A and 53B;

FIGS. 53A and 53B collectively depict a flowchart of Queued Call Back *800 Service Routine 5300 that is executed within Digit Collection Routine 1700 shown in FIGS. 7A–17C;

FIG. 54 shows the proper alignment of the drawing sheets for FIGS. 54A–54D;

FIGS. 54A–54D collectively depict a flowchart of Change PIN *950 Service Routine 5400 that is executed within Digit Collection Routine 1700 shown in FIGS. 17A–17C;

FIG. 55 depicts a flowchart of Intelligent Peripheral (IP) Process Routine 5500 shown in FIG. 6;

FIG. 57 shows the proper alignment of the drawing sheets for FIGS. 57A and 57B;

FIGS. 57A and 57B collectively depict a flowchart of IP Process Ready Message Routine 5700 that is executed as part of IP Process Routine 5500 shown in FIG. 55;

FIG. 58 shows the proper alignment of the drawing sheets for FIGS. 58A and 58B;

FIGS. 58A and 58B collectively depict a flowchart of IP Process Special Case Instructions Routine 5800 that is executed as part of IP Process Routine 5500 shown in FIG. 55;

FIG. 59 depicts a flowchart of Reserve Conference FC Routine 5900;

FIG. 60 depicts a flowchart of Add A Party FC Routine 6000; and

FIG. 61 depicts a flowchart of Delete A Party FC Routine 6100.

To facilitate understanding, identical reference numerals have been used to designate identical elements that are common to the figures.

DETAILED DESCRIPTION

After reading the following description, those skilled in that art will readily appreciate that the inventive system can service in a wide variety of telephone switching applications, some of which are discussed below. For purposes of illustration, the inventive system will be described in terms of an adjunct used in conjunction with a local telephone switching system for expeditiously providing enhanced telephone services without the need to modify any of the generics stored within the local switch.

Through the use of such an adjunct in conjunction with a local switch, a local telephone company can quickly develop and field trial an enhanced telephone service and then modify the service, if necessary, to expeditiously provide an enhanced service that satisfies customer demand with an minimal expenditure of time and effort. Advantageously, the service is fully developed by a local telephone company and not by a switch manufacturer and can be repetitively modified, if necessary, based upon actual customer feedback. Since the service is fully defined before it is incorporated into the switch generics, the service has a much higher probability of marketplace acceptance than that previously possible.

I. System Overview

A. Hardware Overview

Figure 1:
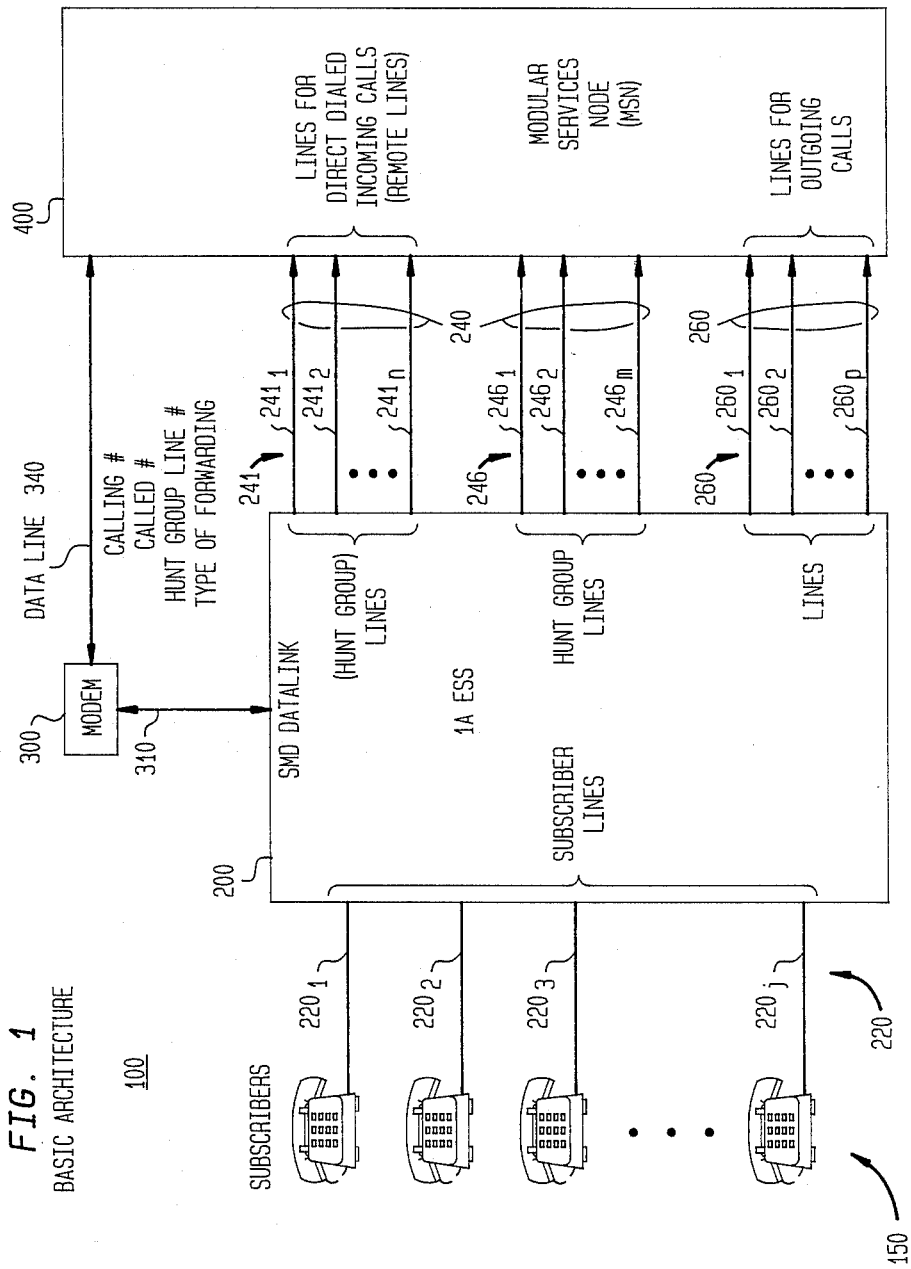
FIG. 1 is a block diagram of a preferred embodiment of a system, that incorporates the teachings of the present invention, for providing enhanced telephone services.

A block diagram of a preferred embodiment of the inventive system is shown in FIG. 1. As shown, system 100 utilizes local electronic telephone switching system 200, which is preferably a 1AESS system manufactured by the American Telephone and Telegraph (AT&T) Corporation, modem 300 and modular services node (MSN) 400. MSN 400 is a relatively small self-contained computer controlled telephone switching system that functions as a switching adjunct to local switch 200. MSN 400 is connected to local switch 200 through a number of lines provided by the switch and through a simplified message desk (SMD) interface which contains an SMD datalink and various hunt group lines available on the switch.

To offer enhanced services through the inventive system to any one of enhanced service subscribers 150 (hereinafter referred to simply as subscribers 150), the local switch is programmed in a well known manner to directly forward an incoming call from anywhere, including but not limited to those subscribers appearing on a corresponding one of lines $220_1, 220_2, \ldots, 220_j$ that collectively form lines 220, to an available hunt group line $246_1, 246_2, \ldots,$ or $246_m$, appearing within lines 246 that form a portion of hunt group lines 240. Coincident with the connection of such a call, a message is simultaneously transmitted over the SMD datalink. This message contains information regarding the manner in which the call was routed to the hunt group line, the directory number of the called party and, if the caller is within the local service area of local switch 200, the directory number of the calling station. This message, in its most expanded form, consists of:

MD ggg mmm c xxx yyy where:
MD refers to a SMD message originating within local switch 200;
ggg = a pre-defined message desk number (within the range of 001–063);
mmm = specific hunt group line number (within a range of 0001–2047) on which the call appears;
c = SMD call routing code:
D for directly dialed calls to the hunt group;
A for calls forwarded to the hunt group;
B for calls forwarded to the hunt group resulting from a busy line at the called station; and
N for calls forwarded to the hunt group due to no answer at the called station;
xxx = directory number of called party; and
yyy = directory number of calling party (if available).

The SMD Datalink itself is a well known serial datalink. To connect this datalink through a dedicated telephone line, such as dataline 340, the datalink is connected, via lead 310, to 1200 baud modem 300. For an in-depth discussion of the SMD interface appearing on the 1AESS switch, the reader is referred to "Interface Description: Interface Between Customer Premise Equipment; Simplified Message Desk and Switching System: 1AESS", *Bell Communications Research Technical Reference TR-TSY-000283*, Issue 1, July 1985 (©1985: Bell Communications Research, Inc.).

MSN 400 is also connected to a group of lines 241, consisting of lines $241_1, 241_2, \ldots, 241_n,$ for use in receiving directly dialed incoming ("remote") calls from local switch 200, and to a group of lines 260, consisting of lines $260_1, 260_2, \ldots, 260_p,$ for placing outgoing calls to the local switch. In general, the remote lines are used to permit a subscriber to access (dial into) the MSN from any telephone other than his own. To simplify implementation, lines 241 and 246 collectively form a single hunt group 240; however, this implementation is not critical. All the lines carrying calls connected to the local switch are preferably ground start lines wherein all ringing occurring on these lines is preceded by a momentary application of a ground level.

Through use of the SMD datalink and the hunt group lines available on the local switch, the MSN, in a manner to be described in detail below, processes incoming and outgoing calls from subscribers 150 without any direct appearance of the subscriber's loops on the MSN. Inasmuch as the MSN takes complete control of any call once that call has been routed to it by the local switch either through forwarding or a direct connection, the MSN provides enhanced services without any further involvement by the local switch other than to route traffic to and from the MSN and provide automatic number identification (ANI) information, if available, regarding the caller. This, in turn, advantageously allows a local telephone operating company to program the MSN to provide enhanced call services without modifying any of the generics stored on local switch 200. Moreover, the MSN is inventively structured and programmed in a manner, described in great detail below, that separates call processing from call switching. As a result, a user desiring to implement a new enhanced service does not need to re-program any switching function but rather utilizes these functions through pre-defined subroutines in order to implement a high level program that provides the desired service.

B. Operational Overview

Now, with this overall architecture in mind and to facilitate understanding, the discussion will now proceed to describe how calls are routed through the inventive system before discussing in detail the hardware and software which collectively form this system.

A block diagram showing typical call flow for an incoming telephone call through system 100, depicted in FIG. 1, is provided in FIG. 2. To allow the MSN to take complete control of a call and provide enhanced services, each subscriber has two telephone numbers within the local switch: a so-called "logical" number which is published in telephone directories and a so-called "physical" number which is the number of the actual line that is connected to the local switch and associated with his telephone. The subscriber is only aware of his logical number; the physical number is only known by the MSN. All calls to a subscriber's logical number are forwarded by the local switch to a hunt group line for subsequent connection to the MSN. All calls, originating from the MSN, to a physical number are routed by the local switch to the corresponding subscriber.

Specifically, to receive a call from, e.g. a caller connected to line $220_1$ as depicted in step A, the caller first picks up the receiver of his telephone and then dials a logical number of a called party. Thereafter, as shown in step B, the local switch forwards the call through any available line, illustratively line $246_1$, within the hunt group. The MSN then detects ringing in this hunt group line. Simultaneously therewith, the local switch, through the SMD datalink, provides a message, as described above, over serial dataline 340 to MSN 400 that contains the reason the call reached (was routed to) the hunt group (here it was forwarded), the directory ("logical") number of the called party and, if an intra-office call, the directory number of the caller. In response to this message, the MSN provides whatever enhanced services are desired, such as not dialing this call to the called party.

Where a connection is to be made between the caller and called parties, the MSN, once having received an incoming forwarded call, dials ("outpulses") the physical number associated with the called party, as shown in step C, using any available line, such as line $260_2$, located within outgoing lines 260. Thereafter, local switch 200, as shown in step D, completes the routing of the call to the called party.

Now, to gain an appreciation of the enhanced services available through inventive system 100, assume that a caller has just dialed a call. The MSN can then outpulse the physical number of the called party, as noted above, and, for an intra-office call, announce to the called party, using a voice synthesizer, the identity of the caller. The MSN will then prompt the called party to dial a given digit to either accept or reject the incoming call. In the event, the called party accepts the call, then the MSN connects the call to the called party. Alternatively, in the event the called party refuses to take the call, the MSN will then illustratively return a voice announcement to the caller indicating that the called party refuses to take the call and will then release the called party. If the called party utilizes a call forwarding service, as described below, the MSN could initiate a call to a forwarded telephone number instead of to the called party's physical number.

In addition, various enhanced services are provided to handle no answer situations. In this case, if the called party did not answer the telephone, further call processing would depend upon the services to which the called party subscribes. For example, if the called party subscribed to a queued call back service and an intra-office call occurred, then, after a specified number of rings have occurred, the name and number of the caller, and date and time at which the call occurred, in a manner to be described in detail below, would all be automatically recorded ("queued") within a database internal to the MSN for later retrieval by the called party. This would occur without any further action required by the caller. Later, whenever the called party picks up the receiver of his telephone, he or she would be informed of the existence of any queued calls by either a stutter dial tone, an announcement or some other indication depending upon how this service was defined. Alternatively, if the called party subscribed to a so-called anywhere call pick-up service, an announcement would typically be provided to the caller informing him that the called party is being paged. Concurrently, the MSN would instruct the local switch to page the called party using a standard radio paging system. Upon being paged, the called party could then respond to the call in real time by directly dialing into the MSN through a remote line. In this case, the called party would, after being prompted, provide a personal identification number to the MSN. The MSN would then connect the caller to the called party. Now, alternatively, if the called party subscribed to a voice messaging service, as described later, then the caller, in lieu of waiting for the called party to be paged, could leave a voice message for the called party.

The above call flow shown in FIG. 2 assumes that all calls to a called party are forwarded to the MSN by the local switch. Clearly, this procedure could be readily modified such that calls are only forwarded to the MSN in the event the called party is either busy or does not answer his telephone. Now, as before, if the called party's line was busy and depending upon what enhanced services the called party subscribes to, the MSN will either record calling party's name and number along with the date and time of the call, initiate a radio page to the called party or accept a voice message from the caller. Alternatively, if the called party's line does not answer within a specified number of rings, the MSN would determine if the called party desires to have his calls forwarded to a remote number and if so would re-dial the call accordingly.

A similar block diagram showing typical call flow for an outgoing telephone call through system 100, depicted in FIG. 1, is provided in FIG. 3. In general, a variety of new enhanced outgoing services can be provided that rely on a switch to perform call screening based upon calling and called numbers and to translate a dialed-number to a routing number. Many electronic switches in use today, such as the 1AESS, do not provide this capability. However, inventive system 100 does. Specifically, once a calling party goes off-hook as shown in step A, local switch 200 directly connects ("hotlines") him to an available hunt group line, such as line $246_1$ within lines 246. At the same time, the local switch transmits an SMD message over the SMD datalink to dataline 340. This message states that this caller went "off-hook", provides his number and indicates that this call was a direct connect to the hunt group. MSN 400, as shown in step B, provides dial tone to the caller or alternatively an announcement indicating that queued calls exist. If the caller desires to retrieve these calls, he dials a star followed by a pre-defined code (e.g. *800 as explained in detail below). Alternatively, if he desires to place an outgoing call, he simply dials the digits, as shown in step C, of the desired telephone number. Upon receipt of these digits, the MSN, as shown in step D, performs, through database look up operations, whatever screening or number translation is required. Thereafter, the MSN re-initiates the call by outpulsing the physical number associated with the call on any available line, e.g. line $260_2$, within outgoing lines 260. Upon receipt of all the digits, local switch 200 then, as shown in step E, connects the call, via illustratively line $220_j$, to the called party.

Call screening can arise in a variety of enhanced services. For example, in the event an individual called party does not wish to accept calls during a specified time period, such as for example between 10 PM and 7 AM, the MSN upon receipt of such a call will return an appropriate voice message or busy signal to the caller and not complete the call. Here, the MSN can be provided with a database of callers from which a called party will accept calls and corresponding times, if desired.

Screening based upon ANI or other caller identification information obtained through the MSN can be used to implement an automated pay-per-view cable system (not shown). Here, as in any cable system, a large number of cable television viewers are all connected to a common cable system fed by a transmitter located at a cable head end station. Each viewer has a separately addressable decoder connected between a cable termination and the viewer's video equipment. The decoder, upon receipt of a suitable address and an instruction, transmitted from the cable head end transmitter, would set itself to de-scramble a specified video signal subsequently transmitted down the cable to the viewer. To receive a specific pay program, a viewer would dial a logical access number associated for the cable service. The telephone call would be automatically routed by the local switch into the MSN. The MSN would sequentially query the viewer, using voice messaging and or speech synthesis, for his or her telephone number—in the event ANI information was not available, followed by his or her unique personal identification number, and finally followed by a number corresponding to a desired video program. The host processor located within the MSN could be connected by a serial datalink, through either a dedicated or dial-up line, with a remote processor (also not shown) situated at the cable head end station. After a caller had dialed into the MSN and provided the requested information, the host processor within the MSN would transmit the telephone number of the caller (or his or her name through use of number to name translation) along with the personal identification number and program number to the remote processor. The remote processor would access its internal databases, via a database look-up operation using the caller's telephone number (or name, if translation occurred) and his or her personal identification number, to verify whether the viewer, that is now requesting service, is authorized to receive it and, if so, to obtain the address of the decoder associated with that viewer. If the remote processor determines that this viewer can receive the desired program, then the remote processor would update its billing database to reflect a new charge to the viewer for the upcoming program. Thereafter, the remote processor would cause the transmitter located at the cable head end station to transmit, through the cable system, the decoder address for that viewer followed by a suitable de-scramble instruction for the particular program desired by the viewer. This information when received at the viewer's decoder would, in turn, instruct this decoder to de-scramble the desired program and apply it to the viewer's video equipment. Alternatively, a database of valid viewers, accessed by name and personal identification number, could be stored within the MSN itself. In this case, the MSN, after having received a valid request from a viewer, would simply provide both the name of the viewer (after being suitably translated from the caller's number) and the desired program number to the remote processor which, in turn, would perform a look-up operation to determine the address of the viewer's decoder. If, however, the viewer could not receive the program, due to for example a mismatch occurring between the viewer's name and those stored within the database at the MSN, then the MSN will first playback or synthesize a pre-defined message to the viewer stating that he or she can not receive the selected program and thereafter will terminate the incoming call from the viewer. Advantageously, use of such a system permits video signals to be selectively de-scrambled on a viewer-by-viewer basis to substantially reduce theft of cable services.

Enhanced outgoing services based upon number translation would also include traditional speed (memory) dialing. Here, a list is stored within the MSN of various subscriber specified telephone numbers and their associated speed dialing codes. Once the MSN provides dial tone, the subscriber can enter a service code, such as "*300", followed by the particular code for the number desired. As discussed in detail below the MSN would query its internal database, obtain the corresponding telephone number and initiate a call to this number. One variant of this service would permit a subscriber to record a speech pattern, e.g. the word "Mom", in lieu of a numeric dialing code. After the MSN connects to the subscriber and before dial tone is provided, a speech recognition circuit could be set to recognize one of a number of pre-defined words spoken by the calling party. Once recognition occurs, a database access occurs within the MSN to locate the corresponding telephone number, provide dial tone and then outpulse the desired call.

The above outgoing call flow shown in FIG. 3 assumes that all calls from a caller are hotlined to the MSN by the local switch. Clearly, this procedure could be readily modified such that dial tone would be provided by the local switch instead of by the MSN. In the event a voice message or queued call exists, the MSN, at the time either was first stored within the MSN, would provide a suitable instruction, through the SMD datalink, to the local switch instructing the switch to provide a short "stutter" dial tone signal to the caller whenever he next takes the receiver of his telephone off-hook. Upon hearing this dial tone, the caller would know to directly dial into the MSN through a hunt group line to retrieve queued calls and/or stored voice messages. Once these stored messages and queued calls have been completely deleted from the MSN, the MSN would appropriately instruct the local switch, again through the SMD datalink, to eliminate the stutter dial tone signal for this particular caller.

II. System Hardware

A. Modular Services Node 400

Now, with the foregoing concepts in mind, the discussion will progress to a detailed examination of the hardware used to implement MSN 400.

Figure 4C:
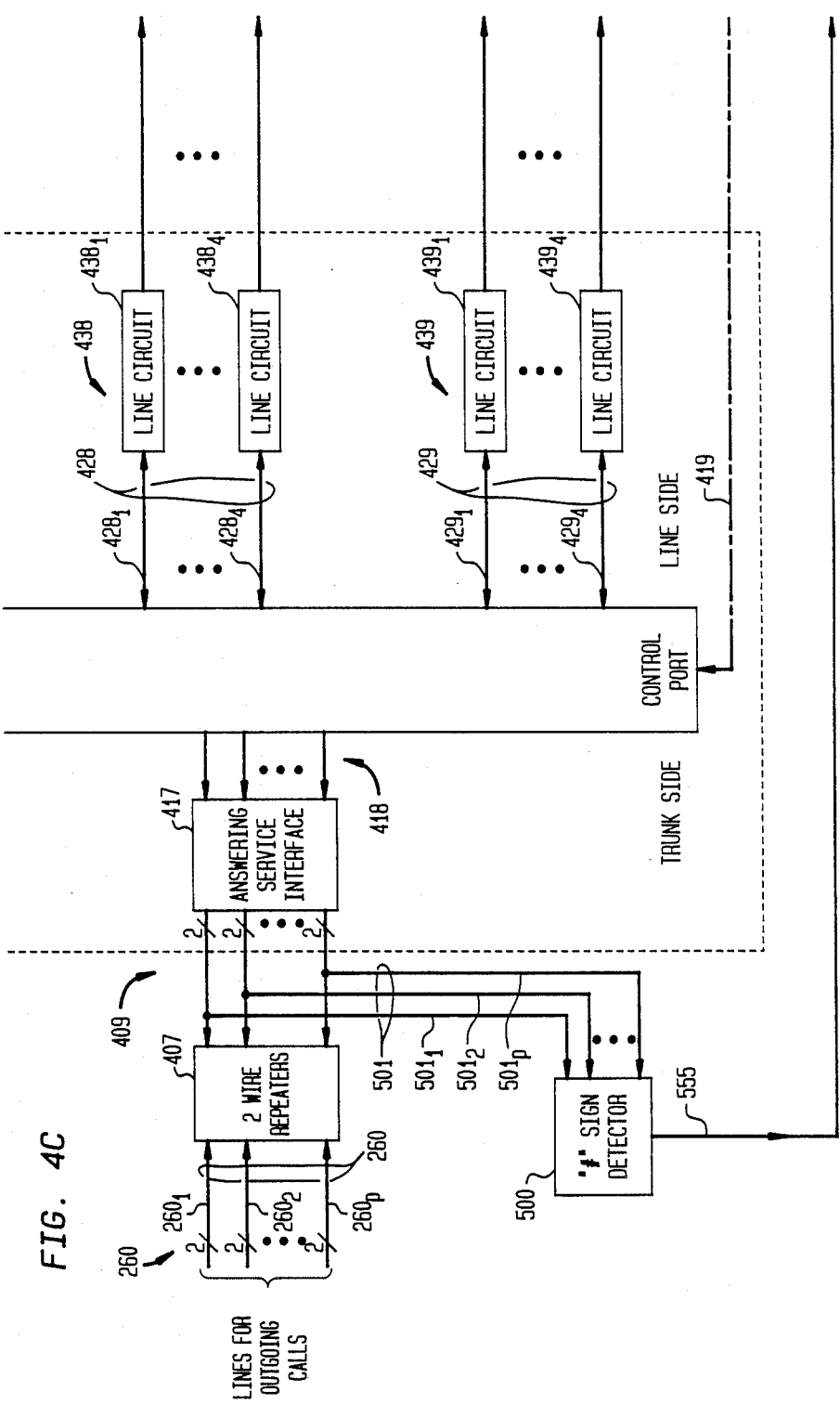
Figure 4D:
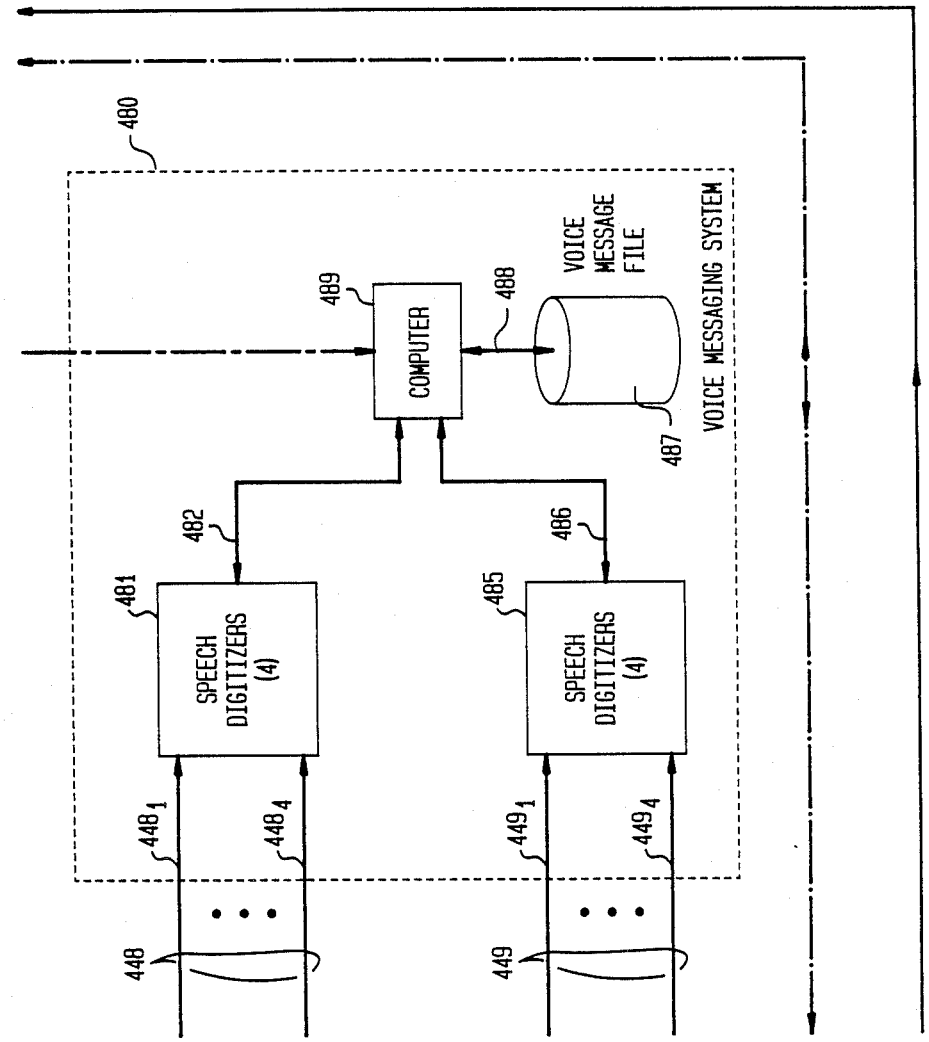

A block diagram of MSN 400 that forms a portion of inventive system 100 shown in FIG. 1 is depicted in FIGS. 4A-4D for which the correct alignment of the drawing sheets for these figures is given in FIG. 4.

The heart of MSN 400 is programmable switch 440, such as the Modular Switching Peripheral presently manufactured by and available from Redcom Laboratories, Inc. located in Victor, N.Y. This programmable switch is a relatively small telephone switching system that interfaces to and is controlled by a separate computer system, which includes host processor 490, associated terminals and disk storage devices. The programmable switch provides trunk interfaces on lines 413, 416 and 418 and line interfaces for lines 421-429. Events, such as on-hook/off-hook, answer detect, line/trunk seizure, ringing and digit detection, occurring on any line or trunk are detected by the programmable switch. This switch provides a corresponding response, in digital form, to each detected event, via serial port 419, to host processor 490. In response to the software controlling the MSN, as discussed in detail below in conjunction with FIGS. 6-58, the host processor provides appropriate instructions to programmable switch 440 to produce a desired switching function for each detected event. These instructions, which contain the appropriate trunk and/or line numbers, principally include: answer (supply answer supervision to a trunk), give path (set up a one or two way talk path), obtain digits from a trunk, release a line, ring a line, send digits to a line and seize a trunk.

As shown, programmable switch 440 contains time slot interchanger 420 that is controlled by host processor 490. This interchanger is connected, on its trunk side, via hunt group lines 240 and outgoing lines 260, to the local switch. As noted, hunt group lines 240 contain lines 241, consisting of lines $241_1, 241_2, \ldots, 241_n$, used for directly dialed ("remote") calls to the MSN through the SMD interface and hunt group lines 246, consisting of lines $246_1, 246_2, \ldots, 246_m$ that are used for forwarding calls to the MSN through the SMD interface. Lines 241 are applied to well-known 2-wire repeaters 401 which provide a desired level of amplification for the signals appearing on each of these lines. The resulting outputs of the repeaters, appearing on leads 403, are fed into well-known answering service interface 411. This interface detects various incoming signals, such as ringing signals, appearing on each trunk and provides an appropriate interface to standard 48 volt trunk signaling levels used in a central office. For each trunk, answering service interface 411 provides a corresponding output on leads 413 which are, in turn, connected to corresponding trunk connections on time slot interchanger 420. Hunt group lines 246 are also connected through an answering service interface, specifically answering service interface 415, via leads 416, to corresponding trunk inputs of time slot interchanger 420. In addition, outgoing lines originate on leads 418 that are connected to corresponding trunk connections on time slot interchanger 420. These leads are connected to answering service interface 417 with the resultant trunk outputs appearing on leads 409. These leads are applied to well-known 2-wire repeaters 407 for appropriate amplification of the signals appearing thereon. The amplified signals are then applied to leads 260 for connection to the local switch.

Since a switch hook flash is unable to propagate through the 1AESS switch, depression of a pound sign ("#") pushbutton on a telephone keypad is used to replace a switch hook flash. Consequently, whenever a party (e.g. a caller or a called party) is in a stable call state, that party can access one or more pre-defined services by momentarily depressing the pound sign pushbutton to invoke a corresponding service script, as will be discussed in detail later. Such a service might illustratively include recording a subsequent portion of a call or adding a party to a conference call. Specifically, pound sign detector 500 detects a depression of a pound sign pushbutton occurring during any one of all the calls currently routed through MSN 400. By simultaneously monitoring all these calls, use of the pound sign detector eliminates the need to maintain a permanent connection, through programmable switch 440 and throughout the duration of a call, between any one of DTMF receivers 433 located within DTMF receiver/transmitters and any party to the call, thereby advantageously conserving system resources.

As shown, pound sign detector 500 is connected, via leads 501, containing corresponding leads $501_1, 501_2, \ldots, 501_p$ to corresponding leads within leads 409 to detect the depression of a pound sign pushbutton occurring during any telephone call routed through the MSN. In the event a caller depresses a pound sign pushbutton for more than 0.07 seconds, pound sign detector 550 (discussed in detail in FIG. 5) provides an indication, including the number of an associated trunk on which the pound sign depression was detected, to host processor 490, over serial leads 555. As explained in detail below, the host processor will then take appropriate action.

Each line connection provided by time slot interchanger 420 is connected to a particular peripheral. These peripherals include a radio paging system located at a central office; music source 443; DTMF (dual tone multi-frequency) receiver/transmitters 433; speech recognition system 460; speech synthesizers 471, 474 and 477; and voice messaging system 480. These peripherals are sequentially connected to a caller, via the time slot interchanger and in a manner defined by the software executed by host processor 490, to provide various functions associated with enhanced services.

Specifically, line circuit 431 connects a line on time slot interchanger 420 and associated with lead 421, via serial link 441, which is a standard dedicated telephone line, to a well-known paging system located at the central office. Upon instruction from host processor 490, time slot interchanger 420 will provide a serial four digit number associated with a desired pager (called party) over lead 421. This number is routed by serial link 441 to the paging system which, in response to this number, performs a database access to determine a paging frequency that has been assigned to the called party. The paging system then transmits a radio signal at this frequency to page the called party.

Line circuit 432 connects via lead 442 a line on time slot interchanger 420 and associated with lead 422 to music source 443. This source provides a constant supply of music and can be used to provide music to a caller, when so instructed by host processor 490. This music may be connected to a caller during those time intervals during which the caller is waiting for a called party to answer a page.

DTMF receiver/transmitters 433 consist of separate DTMF receiver/transmitters $433_1, \ldots, 433_k$ (where k is typically eight). Each of these receiver/transmitters is connected, via a corresponding lead $423_1, \ldots, 423_k$ of leads 423, to a corresponding line provided by time slot interchanger 420. Under control of host processor 490, time slot interchanger 420 can switch any of these receiver/transmitters to a trunk connection on an opposite side of the interchanger in order to detect the occurrence of any dialed DTMF digit and so signal the interchanger, or to produce such a digit.

Speech recognition system 460 provides the MSN with the capability to recognize human speech spoken by any caller. This system is connected, via line circuit 434, to lead 424 associated with a corresponding line provided by time slot interchanger 420. System 460 is illustratively formed of speech recognition circuit 461 that is connected to computer 467, via leads 465, and controlled by this computer. Speech recognition circuit 461 is preferably implemented using the IBM Voice Card currently available from the International Business Machines Corporation (which also owns the registered trademark IBM). This card is a single user device that is contained within and controlled by an IBM (or compatible) personal computer which forms computer 467. In conjunction with the processing power and disk storage provided by computer 467, this card performs speech training and recognition. To initiate either of these functions, host processor 490 provides an appropriate instruction, as explained in detail below, via a bi-directional control path, implemented using leads 469, to computer 467. The result of the recognition process is then provided by computer 467 and routed to leads 469 for subsequent use by host processor 490. To differentiate the control paths, running between the host processor and the peripherals and between the host processor and time slot interchanger 420, from the voice paths involving these peripherals, the control paths are shown in dot-dashed fashion.

Speech synthesizers 471, 474 and 477 each provide the capability to convert a pre-defined voice message into humanly recognizable speech. All of these synthesizers are identical and are each implemented using the DECtalk system currently available from Digital Equipment Corporation (which also owns the trademark DECtalk). Each synthesizer is connected through a separate line circuit to a corresponding line connection on time slot interchanger 420. Specifically, synthesizers 471, 474 and 477 are respectively connected, via leads 445, 446 and 447, to line circuits 435, 436 and 437 that provide corresponding interfaces, via leads 425, 426 and 427, to corresponding line inputs on time slot interchanger 420. Each synthesizer is a single user device that functions totally independently of the other synthesizers. These synthesizers are controlled by host processor 490 through separate bi-directional control paths appearing on leads 472, 475 and 478 that collectively form leads 479. To synthesize a pre-defined voice message, the host processor first determines which synthesizer is free. Thereafter, the host processor provides a specific instruction, over the appropriate control lead 472, 475 or 478, to that synthesizer to speak a message. This instruction typically includes an op code followed by the specific message given in ASCII form. Once the synthesizer receives the message, it changes its status from free to busy and so informs the host. After it has finished producing the message, it changes its status from busy to free to enable a software driver (discussed in detail below) on the host processor to provide the next queued message, if it exists, to the free speech synthesizer.

Voice messaging system 480 provides the capability to store multiple voice messages spoken by callers and then to play these messages back later upon request. These messages, as explained in detail later, can take the form of a voice message, i.e. a message from a caller to a called party requesting return of a telephone call, or an announcement from a caller to any one of a number of called parties. The voice messaging system is implemented using two separate digitizer groups 481 and 485, each of which contains four separate speech digitizers. Each digitizer group is implemented using a Dialog/40 board currently available from Dialogic Corporation. The Dialog/40 board provides voice storage and playback capability for four separate telephone lines. Each digitizer is connected, via a corresponding line circuit, to a corresponding line appearing on time slot interchanger 420. Specifically, speech digitizer group 481 is connected, via leads $448_1, \ldots, 448_4$ that collectively form leads 448, to line circuits $438_1, \ldots, 438_4$ that collectively form line circuits 438 which are, in turn, respectively connected, via leads $428_1, \ldots, 428_4$ that collectively form leads 428, to corresponding line connections appearing on time slot interchanger 420. Similarly, speech digitizer group 485 is connected, via leads $449_1, \ldots, 449_4$ that collectively form leads 449, to line circuits $439_1, \ldots, 439_4$ that collectively form line circuits 439 which are, in turn, respectively connected, via leads $429_1, \ldots, 429_4$ which collectively form leads 429, to corresponding line connections appearing on time slot interchanger 420. Both digitizer groups (Dialog/40 boards) are connected, via leads 482 and 486, to computer 489 which is preferably an IBM or compatible personal computer. This computer also contains hard disk 487 which contains a voice messaging file that stores a file of recorded voice messages for each service subscriber as well as a variety of pre-defined voice messages. Although the components that form voice messaging system 480 are depicted for illustrative purposes as being separate, they are, in fact, all mounted within the enclosure of the personal computer. Voice messaging system 480 is controlled by host processor 490 over a bi-directional path formed of lead 483. Computer 487 contains appropriate well-known software that keeps track of the status of each digitizer and queues messages for the synthesizers. To either record or play a voice message, host processor 490 provides an appropriate instruction over leads 483 to computer 489. This instruction includes a particular op code, a specific line (circuit) number onto which the message is to appear and a file name. This file name designates the file on disk 487 that is or will be used to store the message.

Host processor 490, as discussed above, controls all the peripherals and the time slot interchanger. This processor is typically a minicomputer manufactured by Plexus Corporation operating under the UNIX Version 5.0 operating system (UNIX is a registered trademark of AT&T). This processor is connected, via leads 495, to disk 496 which contains various customer and system databases, as will be fully described below. This processor is also connected, via leads 492 and 497, to terminals 491 and 498. The host processor together with terminals 491 and 498 and disk 496 forms host computer 499. Terminal 491 is used by a local programmer to create, develop and/or alter software (so called "service scripts"—which will be discussed in detail below) that is stored within disk 496 and executed by host processor 490 and is used to define a subscriber's enhanced services. Terminal 498 is used to access the operating system and other administrative software executing within the host processor in order to monitor the status of the MSN and provide a port for instituting corrective action (such as re-booting the system, resetting a real time clock and the like), if necessary. Lastly, the SMD datalink appearing on serial dataline 340 is connected through well-known 1200 baud modem 450 and leads 455 to host processor 490.

B. Pound Sign Detector 500

Figure 5:
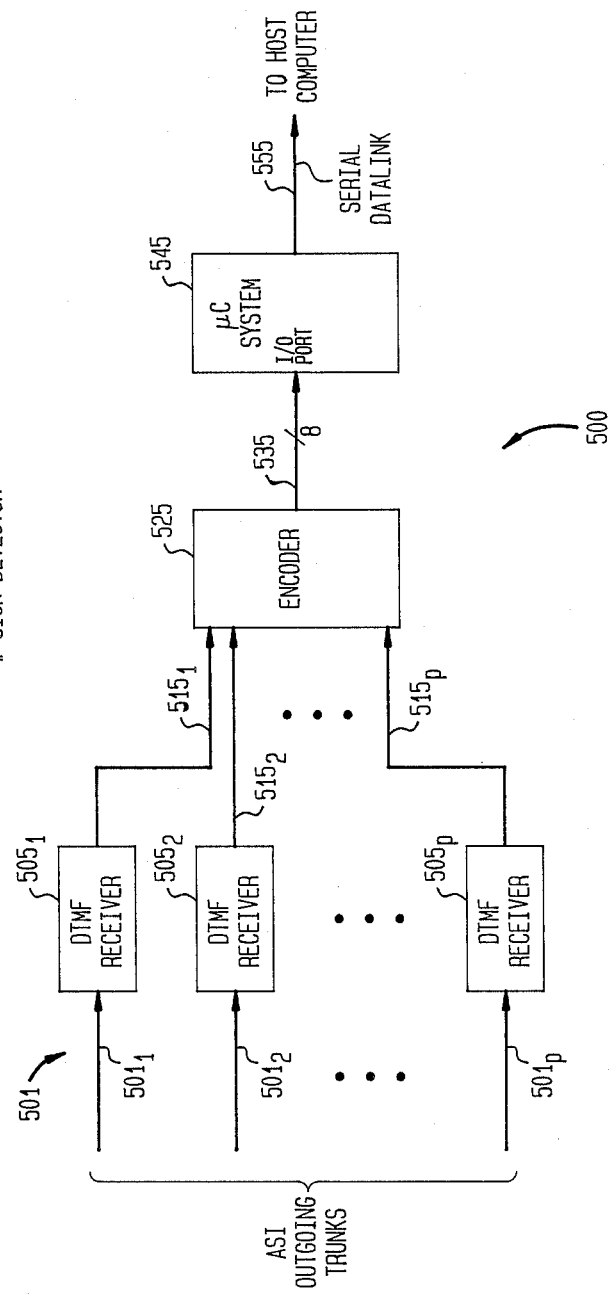
FIG. 5 is a block diagram of "#" sign detector 500 shown in FIGS. 4A-4D.

A block diagram of pound sign ("#") detector 500 shown in FIGS. 4A-4D is depicted in FIG. 5. As noted above, this circuit detects the occurrence of a depression of a "#" sign pushbutton on the keypad of any telephone that is connected to any of the outgoing lines. Specifically, the outgoing answering service interface (ASI) trunks, produced by answering service interface 417 shown in FIG. 4, are connected, as shown in FIG. 5, through leads $501_1, 501_2, \ldots, 501_p$ that collectively form leads 501, to individual DTMF receivers $505_1, 505_2, \ldots, 505_p$. Each of these receivers detects the specific combination of tones that form a "#" sign and, in response, produces a high level on its corresponding output lead, i.e. $515_1, 515_2, \ldots,$ or $515_p$. All these output leads feed respective inputs of encoder 525 that produces a binary 8-bit code on its output leads 535 given the individual high levels present on its p separate input leads. Typically, eight separate receivers are used and the resulting code, although in 8-bit form, contains 3 varying binary digits. The binary code appearing on leads 535 is routed to an input/output (I/O) port of microcomputer system 545. This microcomputer system merely monitors the status of its I/O port on a continuous basis and, in the event of any non-zero signal appearing thereon, converts the code to serial form and then serially transmits the code over a serial datalink formed of leads 555 to host processor 490.

III. System Software

At this point, the discussion will now turn to a detailed examination of the software executed by host processor 490. This examination will first proceed with a descriptive overview, as shown in FIG. 6, of all the software processes executed within the host processor followed next by a detailed description of the software that implements each process, as shown in flowchart form in FIGS. 7-58.

A. Host Processor Software Processes and Inter-Process Communication

Figure 6:
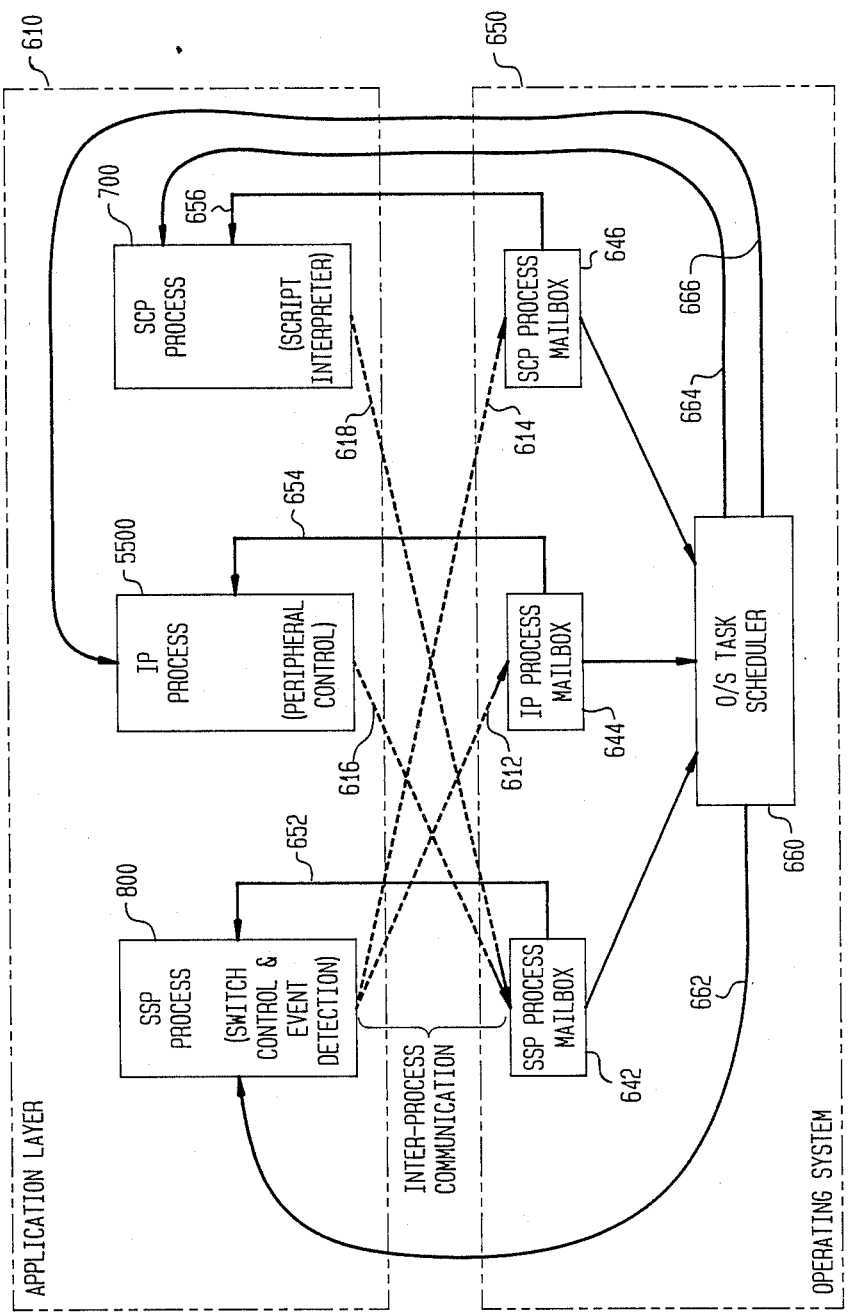
FIG. 6 diagrammatically shows an overview of the organization of and inter-process communication occurring within the software executing on host processor 490 shown in FIGS. 4A-4D.

FIG. 6 provides a diagrammatic overview of the organization of and inter-process communication occurring within the software executing on host processor 490 shown in FIGS. 4A-4D.

The host software can basically be viewed as having an application layer 610 and an operating system layer 650. The application layer contains three separate event driven inter-communicating software processes: SCP Process 700 (see FIG. 7), SSP Process 800 (see FIGS. 8A-8C) and Intelligent Peripheral (IP) Process 5500 (see FIG. 55). The SCP process interprets high level routines, so-called service scripts which will be discussed in detail shortly, that provide a custom definition of the specific manner in which enhanced services are to be provided to each subscriber. Specifically, each statement in each service script instructs the MSN to produce a specific function. As will be seen shortly, each such statement is implemented using a so-called "functional component (FC)". SCP Process 700 selects the statement that is to be currently executed and passes the associated functional component and its accompanying arguments to SSP Process 800. This latter process executes the functional component. Certain functional components that form part of a service script, when executed by SSP Process 800, instruct the programmable switch to provide a specific switching function, such as transmit a digit, collect a dialed number, establish a voice path through the programmable switch between a caller and either a called party or a peripheral and the like. Other functional components that form part of the service script, when executed by the SSP Process, request the IP Process to cause a peripheral (e.g. voice messaging system, speech synthesizers, speech recognition system) to provide a specific function, such as message recording, message playback, speech synthesis and the like. The IP Process, as explained in detail below, assigns peripherals to separate specific tasks while coordinating the operation of all the peripherals and thereby preventing any conflicts from occurring therebetween.

Each of these three processes is in an active state within host processor 490; although only one such process is actually executing at any given instant of time. Within UNIX version 5.0 operating system 650, inter-process communication occurs through mailboxes. Specifically, each process has a mailbox assigned to it: mailbox 642 for SSP Process 800, mailbox 644 for IP Process 5500 and mailbox 646 for SCP Process 700. Whenever any process desires to communicate to any other process, the sending process places a message in the mailbox associated with the recipient process. For example, SSP Process 800 can send messages to IP Process 5500 or SCP Process 700, as symbolized by dashed lines 612 and 614, by placing messages within respective mailboxes 644 or 646. Similarly, IP Process 5500 can send a message to the SSP Process, as symbolized by dashed line 616, by placing a message in mailbox 642. Also, SCP process 700 can send a message to the SSP Process, as symbolized by dashed line 618, by placing a message in mailbox 642. The operating system (O/S) contains task scheduler 660 which constantly monitors the status (full/empty) of each mailbox and prioritizes the execution of the separate processes accordingly. Specifically, if no messages exist in any of the mailboxes and all the processes have finished their current tasks, then none of the processes will execute until the programmable switch detects an incoming event and so sends a message to the host processor. Upon receipt of such a message, an interrupt is generated within the host processor which, in turn, causes the scheduler to execute SSP Process 800 in order to provide messages based upon the detection of the incoming event by programmable switch 440 (see FIGS. 4A-4D), such as an incoming call, and then report the event to SCP Process 700. Alternatively, if a process, e.g. the SSP Process, is executing and a message exists for another process, e.g. the IP or SCP Process, scheduler 660 will transfer current execution to the latter process as soon as the former process completes its present task. In the event messages exist for any two or even all three processes, then the scheduler will prioritize these messages and transfer execution to the process having the highest priority as soon as the currently executing process completes its current task. Once execution is transferred to a given process, that process reads its mailbox to obtain the current message, as symbolized by line 652 running between mailbox 642 to SSP Process 800, line 654 running between mailbox 644 to IP Process 5500 and line 656 running between mailbox 646 to SCP Process 700. Although not specifically shown, the operating system includes typical well-known administrative routines to provide database management and other necessary functions, and a real time clock to provide a real time value of the system date and time.

Now, with this overview in mind, the discussion will turn to a detailed examination of each of the three processes.

B. Service Scripts, Personal Communication Services and SCP Process Routine 700

As noted above, the SCP Process first reads an appropriate service script. Thereafter, this process selects a statement in the script for current execution. Once such a statement has been selected, the SCP Process passes a message, formed of a functional component and its accompanying arguments that form the selected statement, to the SSP Process to execute this functional component and invoke a corresponding switching and/or peripheral operation.

To facilitate reader understanding, the discussion will now digress somewhat in order to explain service scripts and personal communication services before turning to a detailed discussion of SCP Process Routine 700.

1. Service Scripts and Personal Communication Services

Enhanced telephone services that can be provided through the MSN are divided into two categories: services that are controlled by services scripts and services that have been pre-defined (personal communication services). Service scripts are specific high level routines that are composed of functional components. Use of functional components effectively separates the software, and particularly the algorithms, used within each script to define a desired enhanced service from the software that implements switching and peripheral functions and initiates software triggers.

Various software triggers (specific inter-process software messages) are set by the SSP Process in response to pre-defined detected events. At present five events are based on conditions detected by the programmable switch and the sixth concerns time and date. Specifically, these triggers are: (a) incoming call trigger, (b) no-answer trigger, (c) busy trigger, (d) outgoing call trigger, (e) remote access trigger, (f) scheduler trigger and (g) pound sign trigger. Each of these triggers can have an associated service script which defines the specific service that should be invoked once the trigger occurs. Triggers associated by other events also exist. A message associated with a trigger and conveyed between the SCP and SSP processes has the following general format: two letters signifying the functional component associated with the trigger, followed by the circuit (line) number on the programmable switch associated with the trigger, followed by a single letter defining the type of service script being executed, followed by the telephone number of the party causing the trigger and lastly followed by associated data related to the trigger. For example, a trigger message generated in response to a digit being detected by the programmable switch for a COLLECT_DIGIT functional component executing within an outgoing script for caller 758-1234 presently connected to circuit 123 with four digits being returned will illustratively be: RD 123 t 7581234 4.

In particular, whenever an incoming call is detected by the programmable switch, the SSP Process sends an incoming call trigger message, along with the called telephone number obtained through the SMD datalink, to the SCP Process. In response to this message, the SCP Process will access the called party's incoming answer service script (illustratively named "o" followed by the called telephone number, e.g. o758-1234) from appropriate files on disk 496 within host computer 499 (see FIGS. 4A–4D) and begin interpreting this script. An illustrative example of an incoming service script is as follows:

|     |     |
| --- | --- |
|     | PAGE 0 8520 |
|     | CUSTOMER_ANSWER L0 |
|     | WAIT |
| L0  | ANSWER |
|     | GIVE_PATH 0 0 0 |
|     | QUIT |

Whenever an incoming call occurs for a subscriber, then execution of this script causes that subscriber to be paged. Specifically, his or her pager code (here number 8520) is sent to the paging system. The script then waits until the subscriber comes to his or her telephone and goes off-hook. When that occurs, the subscriber is immediately connected to the caller. This script advantageously provides an individual with mobility. Specifically, this script allows an individual to be paged and then return to his or her desk to receive an incoming call rather than being required to remain in his or her office to hear the telephone ring.

In the event a called party does not define an incoming service script, then the host processor will execute a default incoming script through which the SSP Process will instruct the programmable switch to connect the caller to the called party as soon as the called party picks up the telephone.

Now, whenever a call to a number is not answered within a specified number of rings, the SSP Process sends a no-answer trigger message, along with the called telephone number, to the SCP Process. In response to this message, the SCP Process will access the called party's no-answer service script (illustratively named "n" followed by the called telephone number, e.g. n758-1234) from appropriate files on disk 496 within host computer 499 (see FIGS. 4A–4D) and begin interpreting this script. A basic illustrative example of a no-answer service script for subscriber 758-1234 is as follows:

```
ANSWER
PLAY_ANNOUNCEMENT 0 0 p7581234.4 0 0
RECORD_MESSAGE 0 TEL_NO
```

-continued

|      |      |
| ---- | ---- |
|      | QUIT |

This script implements a telephone answering machine. Specifically, after a called party's telephone rings a specified number of times, the telephone is answered and a pre-recorded voice message existing in file p7581234.4 (as discussed below) is played back to the caller. Once this is completed, a voice message is recorded from the caller and stored within in a voice message file for subscriber 7581234.

In the event a called party does not define a no-answer service script, then the host processor will execute a default no-answer script through which the SSP Process will merely instruct the programmable switch to allow the telephone at the called party to ring until the caller hangs up.

If, alternatively, a call is made to a busy number, then the SSP Process sends a busy trigger message, along with the called telephone number, to the SCP Process. In response to this message, the SCP Process will access the called party's busy service script (illustratively named "b" followed by the called telephone number, e.g. b758-1234) from appropriate files on disk 496 within host computer 499 (see FIGS. 4A–4D) and begin interpreting this script. A basic illustrative example of a busy service script for subscriber 758-1234 is as follows:

|     |                           |
| --- | ------------------------- |
|     | GIVE_PATH 1 3 2           |
|     | COLLECT_DIGIT L1 1 1 A 5 10 |
|     | WAIT                      |
| L1  | RETURN_RESULT L3 1 X      |
| L3  | ANSWER                    |
|     | GIVE_PATH 1 1 1           |
|     | GIVE_PATH 2 5             |
| L6  | COLLECT_DIGIT L7 1 1 A 0 0 |
|     | WAIT                      |
| L7  | RETURN_RESULT L8 1 X      |
|     | GO_TO L6                  |
| L8  | GIVE_PATH 1 0 1           |
|     | GIVE_PATH 0 5             |
| L10 | COLLECT_DIGIT L81 1 1 A 0 0 |
|     | WAIT                      |
| L81 | RETURN_RESULT L9 1 X      |
|     | GO_TO L10                 |
| L9  | GIVE_PATH 1 1 1           |
|     | GIVE_PATH 2 5             |
|     | GO_TO L6                  |
|     | QUIT                      |

In the event a subscriber's telephone line is busy and an another, i.e. second, incoming call occurs, then this script puts the second caller in a call waiting state and provides a tone to the called party. A call waiting state occurs where the called party is connected to one of two earlier callers and the other caller is waiting to be connected to the called party. Thereafter, the called party can depress the "1" pushbutton on his or her telephone to be connected to the second caller and to place the first caller is a call waiting state in which the first caller is connected to the music source. By repetitively depressing the "1" pushbutton, the called party can repetitively switch between the first and second callers with the other caller being connected to music.

Should a called party not define a busy service script, then the host processor will execute a default busy script through which the host processor will merely instruct the programmable switch to connect a busy signal to the caller.

Now, should a caller go off-hook, this condition will be detected by the programmable switch and reported to host processor 490. In response, the SSP Process sends a outgoing call trigger message, along with the called telephone number, to the SCP Process. In response to this message, the SCP Process will access the called party's outgoing service script (illustratively named "t" followed by the called telephone number, e.g. t758-1234) from appropriate files on disk 496 within host computer 499 (see FIGS. 4A–4D) and begin interpreting this script. A basic illustrative example of an outgoing service script for subscriber 758-1234 is as follows:

|         |                                |
| ------- | ------------------------------ |
|         | CHECK_MSG L000                 |
|         | WAIT                           |
| L000    | RETURN_RESULT L0 0 X           |
|         | RETURN_RESULT TEL 1 X          |
|         | RETURN_RESULT MSG 2 X          |
|         | WAIT                           |
| MSG     | SPEECH_SYNTHER L0 0 1 0 "messages" |
|         | WAIT                           |
| TEL     | SPEECH_SYNTHER L0 0 1 0 "calls" |
|         | WAIT                           |
| L0      | DIALING L1 1 0 4 # * 5 10      |
|         | WAIT                           |
| L1      | RETURN_RESULT PER_MSG *200 X   |
| PER_MSG | RETRIEVE_MESSAGE L0 0 TEL_NO   |
|         | QUIT                           |

Now, when a caller goes off hook, this script first checks his or her messages for the existence of either stored voice messages or queued telephone calls. In the event only a stored message(s) exists, then execution is directed to statement MSG at which point a voice synthesizer will state the word "messages" to the caller. Thereafter, execution will proceed to statement L0 which will connect a dial tone to the caller. If the caller depresses a "*" pushbutton on the keypad of his or her telephone, then execution will proceed to statement L1 which detects whether the caller will sequentially depress the pushbuttons for "*200". If thereafter the caller enters "*200", then execution proceeds to the RETRIEVE_MESSAGE functional component which invokes the Voice Message Retrieval *200 personal communication service for the caller. If the caller enters other digits, then this script will simply ignore them. Alternatively, if the caller has only queued telephone calls, then execution is directed to statement TEL at which the voice synthesizer will be instructed to state the word "calls". Dial tone will then be provided to the caller, through execution of statement L0, as set forth above. If the caller does not have any stored voice messages or queued telephone calls, then execution proceeds directly to statement L0 to provide dial tone to the caller.

In the event that a caller does not have an outgoing service script, then the host processor will execute a default outgoing script. This script, when executed through the SCP Process, will instruct a voice digitizer to generate a voice message to allow the caller to dial specific codes to retrieve voice messages or names/numbers in a callback queue or to receive dial tone from the programmable switch in order to place an outgoing call.

Now, if a caller directly dials through a remote line directly into a hunt group on the MSN, then this condition will be detected by the programmable switch and reported to host processor 490. In response, the SSP Process sends a remote access trigger message, along with the called telephone number, to the SCP Process. In response to this message, the SCP Process will access the called party's remote service script (illustratively named "r" followed by the called telephone number, e.g. r758-1234) from appropriate files on disk 496 within host computer 499 (see FIGS. 4A-4D) and begin interpreting this script. A basic illustrative example of an outgoing service script for subscriber 758-1234 is as follows:

|  | SPEECH SYNTHER 0 0 0 0 "please enter your service code" |
|---|---|
|  | COLLECT_DIGIT L1 0 4 A 5 30 |
|  | WAIT |
| L1 | RETURN_RESULT L2 *200 X |
| L2 | RETRIEVE_MESSAGE 0 1 ANI |
|  | QUIT |

Once a caller has remotely dialed into the MSN, this script when executed, first synthesizes a message to the caller requesting entry of his or her service code, i.e. a "*" pushbutton followed by sequential depression of three numeric pushbuttons. Thereafter, through execution of the COLLECT_DIGIT functional component, the MSN is instructed to collect values of four digits from the caller with the inter-digit and first digit timers being set to five seconds and thirty seconds, respectively. If the caller enters "*200" then execution is directed to statement L2 which permits the caller to obtain his stored voice messages using the Voice Message Retrieval *200 personal communication service.

Now, in the absence of a remote service script for any caller, the host processor, through the SCP Process, will execute a default remote script through which the caller will be prompted to enter digits to utilize any of the personal communication services, as explained below.

Furthermore, a caller can instruct the MSN to provide an enhanced service at a specific time and date by appropriately programming a software timer. Once the real time clock provided through the operating system reaches the programmed date add time, the SSP Process will send a scheduler trigger message, along with the called telephone number, to the SCP Process. In response to this message, the SCP Process will access the called party's time and date service script (illustratively named "s" followed by the called telephone number, e.g. s758-1234) from appropriate files on disk 496 within host computer 499 (see FIGS. 4A-4D) and begin interpreting this script. A basic illustrative example of a time and date service script for subscriber 758-1234 is as follows:

|  | TIME_&_DATE HOME = XX XX XX 08 09 |
|---|---|
|  | GO_TO BYE |
| HOME | CALL_FORWARD 7584567 1 |
|  | WAIT |
|  | CUSTOMER_ANSWER H0 |
|  | WAIT |
|  | GO_TO BYE |
| H0 | SPEECH_SYNTHER BYE 1 1 0 "good morning, it is now time to get out of bed" |
|  | WAIT |
| BYE | QUIT |

This script provides a "wake up" call everyday at 8:09 AM. Specifically, whenever the time reaches 8:09 AM on any day, execution passes to statement HOME; otherwise, execution merely exists from this script. Execution of statement HOME causes a call to be placed by the MSN to number 758-4567. If the subscriber at that number answers, within the number of rings he or she has specified, then control goes to statement H0. This statement causes a synthesized message to be produced for the called party, e.g. instructing that party to get on with the morning's activities. The script terminates once the message has been fully produced. There is no default time and date service script.

Lastly, a subscriber can instruct the MSN to provide one or more enhanced services (e.g. record a subsequent portion of a call using a voice digitizer or add a party to an existing or new conference call) by appropriately programming a pound sign detector. Then, whenever the subscriber depresses the pound sign on his telephone keypad during a stable call state, the SSP Process will send a pound sign trigger message, along with that subscriber's telephone number, to the SCP Process. In response to this message, the SCP Process will access the subscriber's pound sign service script (illustratively named "p" followed by the subscriber's telephone number, e.g. p758-1234) from appropriate files stored on disk 496 within host computer 490. A basic illustrative example of a pound sign service script for subscriber 758-1234 is as follows:

|  | RESERVE_CONFERENCE |
|---|---|
|  | WAIT |
|  | RETURN_RESULT L0 0 X |
|  | RETURN_RESULT L6 −1 X |
| L0 | DIALING L1 1 0 4 # * 5 40 |
|  | WAIT |
|  | ADD_A_PARTY L41 0 |
|  | WAIT |
| L1 | COLLECT_DIGIT L2 1 1 # 0 0 |
|  | WAIT |
| L2 | RETURN_RESULT L3 0 X |
|  | RETURN_RESULT L4 1 X |
|  | RETURN_RESULT L5 2 X |
| L3 | ADD_A_PARTY L41 1 |
|  | WAIT |
|  | GO_TO L1 |
| L4 | ADD_A_PARTY L41 2 |
|  | WAIT |
| L41 | RETURN_RESULT L7 −1 X |
|  | GO_TO L1 |
| L5 | DELETE_A_PARTY 2 |
|  | GO_TO L1 |
| L6 | SPEECH_SYNTHER BYE 0 0 0 "a conference call can not be made now" |
| L7 | SPEECH_SYNTHER BYE 0 0 0 "a party can not be added to your conference call now" |
| BYE | QUIT |

This script allows a subscriber to set up a conference call and then add and delete parties to and from that call. Specifically, upon entry into this script, a RESERVE_CONFERENCE functional component executes to instruct programmable switch 440 to determine if an internal conference bridge is available. If all such bridges are currently in use, then execution passes to statement L6 which, when executed, causes an appropriate synthesized message to be produced that specifies that a conference call can not be made now. Alternatively, if a conference bridge is available, then that bridge is allocated for current use and execution proceeds to statement L0, which provides dial tone and sets up a special dialing plan, illustratively a 4 digit Centrex plan. Thereafter, the present subscriber is connected by the programmable switch to the conference bridge through execution of an ADD_A_PARTY functional component. Once this occurs, execution passes to statement L1 which instructs the MSN to obtain a single digit entry from the subscriber: "0" or "1" to add either the original caller or a successive party to the conference call, or "2" to remove the most recently added party from the conference call. If the subscriber enters either a "0" or "1", then execution proceeds to a ADD_A_PARTY functional component in statement L3 or L4, respectively to attempt to add the appropriate party to the current conference. If this conference bridge can not accommodate another party, then execution proceeds, via RETURN_RESULT statement L41, to statement L7 which causes an appropriate message to be synthesized to the subscriber. If, however, the bridge can accommodate another party, then that party is connected to the bridge and thereby added to the current conference. Execution then returns to statement L1 to await the next digit entered by the subscriber. Now, should the subscriber enter a "2", then execution proceeds to statement L5 which, when executed, removes that party that was most recently added to the conference from the conference, i.e. this statement instructs the programmable switch to disconnect this party from the conference bridge.

The personal communication services are simply a collection of pre-defined routines which each implements a certain specific telecommunication service. Each of the personal communication services can be executed through use of a single functional component appearing within a service script, as will be explained below. Presently, these personal communication services include: call re-direction, message retrieval, memory dialing, ring updating, retrieval of queued call back numbers, announcement recording and changing a personal identification number. Incorporation of such single functional components into a service script advantageously permits service programmers at local operating companies to efficiently and easily program the MSN by eliminating the need to repetitively re-define certain frequently used telecommunication services in each subscriber's service scripts.

Hence, as one skilled in the art can now readily appreciate, the service scripts merely contain logic to define telephone services using a set of high level primitives (herein referred to as functional components). None of these functional components requires the service programmer at a local operating company to have any knowledge of how switching operations are actually implemented or how conditions are detected or how triggers are set within the MSN. By defining telephone services using functional components, the software that implements the service control logic becomes substantially independent of the software that controls the actual programmable switch used to fabricate the MSN. Advantageously then, the MSN can be implemented using any one of a variety of different programmable switches with no effect on the service programmer.

To increase the execution speed of the MSN software on the host processor, a compiler, for converting each SSP functional component into instructions appropriate for the switch then being used, could be provided on the host. This compiler would also enable the host to understand incoming communication from the switch to the host and thereby set appropriate triggers for each event that can be detected by the switch and communicated back to the host. The inner workings of the compiler would be completely transparent to the service programmer. The programmer would merely invoke the compiler to generate run time code for use by the host processor prior to trialing the service. In fact, once the compiler is loaded into the host, its execution can be automatically invoked at appropriate times, such as after a file containing a service script is closed, without any intervention by the service programmer. Since the service programmer is freed of any need to modify the software that controls the switch itself and only needs to concern himself with high level service logic, the programmer can develop, trial and modify new enhanced services in a significantly reduced period of time than that previously possible in the art.

2. SCP Process Routine 700

A flowchart of SCP Process Routine 700, depicted in FIG. 6, is shown in FIG. 7.

Upon entry into SCP Process routine 700, execution is first directed to block 701 which reads the current message appearing in SCP mailbox 646. Thereafter, execution proceeds to decision block 702 to decode this message. This message can either be an initialize command followed by a trigger type, a result returned from a functional component executed by the SSP Process, an on-hook condition or a terminate script ("te") request also returned from a functional component executed by the SSP Process.

Now, in the event the message consists of an initialize command with an accompanying trigger, then decision block 702 routes execution, via paths 703 and 705, to execution block 710. This block, when executed, reads the script appropriate for the trigger from disk 496 and loads that script into a table within memory on the host processor. Thereafter, execution proceeds to block 715 which sets a pointer (illustratively called FC_POINT) to point to the first location in the table at which the script begins. Execution then passes to block 720 which reads the table and obtains the next (in this case first) functional component in this script. This functional component is then tested by decision blocks 725 and 735. Specifically, execution proceeds from block 720 to decision block 725 to determine whether the functional component is a Go_To FC. Go_To functional components merely route execution to other functional components. Therefore, if the present functional component is a Go_To FC, then decision block 725 routes execution, via its YES path, to block 730. This latter block, when executed, invokes Go_To Routine 2600 (see FIG. 26) which merely obtains the location of the next FC to be executed from the Go_To FC and appropriately changes the value of pointer FC_POINT. Execution then loops back, via paths 733 and 721, to block 720 to obtain the next FC from the current script. Alternatively, in the event the present FC is not a Go_To FC, then decision block 725 routes execution, via its NO path, to decision block 735. This latter decision block determines whether the current FC is a Wait FC. If this FC is not a Wait FC, then execution passes, via NO path 739, to block 740 which when executed places the present functional component into SSP mailbox 642 for processing by the SSP Process. Once this has occurred, execution loops back, via paths 742 and 721, to block 720. In the event the current FC is a Wait FC, then decision block 735 routes execution, via YES path 736, to execution block 770. This block, when executed, invokes Wait FC Routine 4100. Inasmuch as the MSN software is event driven, execution of a Wait FC merely halts execution of the current script until the next event occurs. Such an event could be a response from a caller or an acknowledgement from a peripheral, e.g. a speech synthesizer, that it has finished its current task, e.g. playing an announcement. Once Wait FC Routine 4100 has executed, execution loops back, via paths 775, 762 and 780, to block 701. At this point the scheduler suspends execution of SCP Process 700 until the next message arrives in its mailbox.

Alternatively, if the message in the SCP mailbox is a result returned from the SSP process, then decision block 702 routes execution, via paths 703 and 706, to block 745. This latter block, when executed, reads a register which contains a saved state of the current script, i.e. the location of the current FC being processed. A RETURN_RESULT FC includes the label of the next FC that is to be executed in the script if the returned result matches pre-defined values, as will be more fully described below in conjunction with Return_Result FC Routine 3500 (see FIG. 35). If a match does not occur, then the next FC in sequence in the script is executed instead. In either event, block 745 shown in FIG. 7 obtains from the state information the location of the next FC in the current script. Thereafter, execution proceeds, via path 748, to decision block 765 which tests whether the current FC should temporarily stop execution of the current script, i.e. whether the current FC is a Wait FC. In the event the current FC is not a Wait FC, then decision block 765 routes execution, via its NO path and path 768 back to block 720 to obtain the next FC and thereby continue interpreting the current service script. Alternatively, in the event the current FC is a Wait FC, then decision block 765 routes execution, via its YES path 767 and paths 762 and 780 back to block 701. At this point the scheduler suspends execution of SCP Process 700 until the next message arrives in its mailbox.

Now, should the message in the SCP mailbox indicate an on-hook condition, this means that the caller has simply hung up the telephone. In this case, execution is routed by decision block 702, via paths 703 and 707, to decision block 750. This latter block tests whether the next FC in the current script is a Hang_Up FC. A Hang_Up FC contains the label in the current script to where execution should branch in the event the caller hangs up. Consequently, if the current FC is a Hang_Up FC, then decision block 750 routes execution, via its YES path, to block 755 which invokes Hang_Up Routine 2700 (discussed in detail in conjunction with FIG. 27) to obtain the location of the next FC to be interpreted. Execution then proceeds, via path 768, back to block 720 to obtain the next FC in the current script. Now, if the next FC is not a Hang_Up FC, then decision block 750 routes execution, via its NO path and path 758, to block 760. In this case, since the caller went on-hook, the current script is completely terminated. Consequently block 760, when executed, releases the entire portion of the table containing the current script.

Lastly, in the event the current message in the SCP mailbox is a request to terminate script (a "te" request), then decision block 702 routes execution, via paths 703, 708 and 758 to block 760, to terminate the current script.

C. SSP Process Routine 800

Figure 8B:
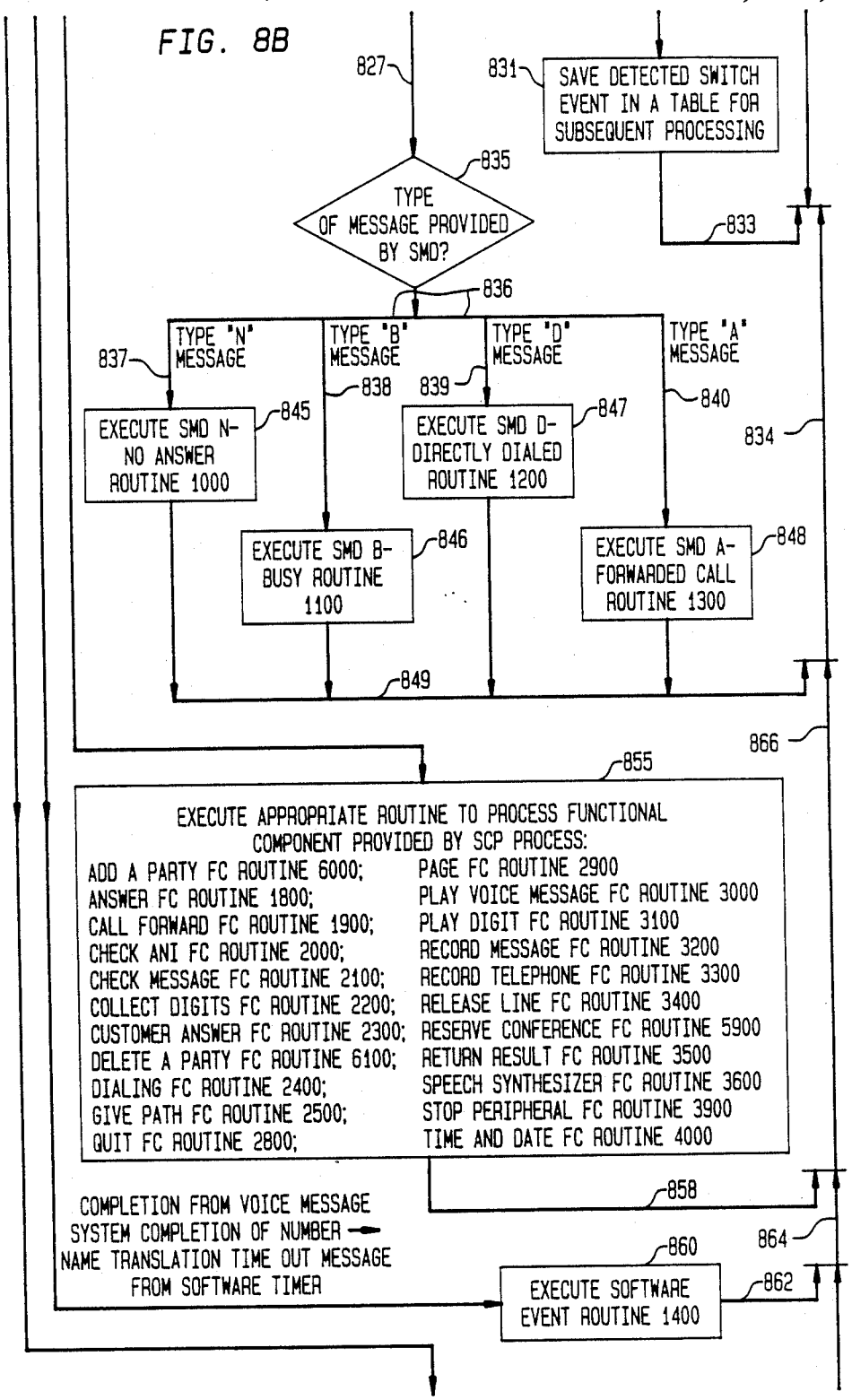
Figure 8C:
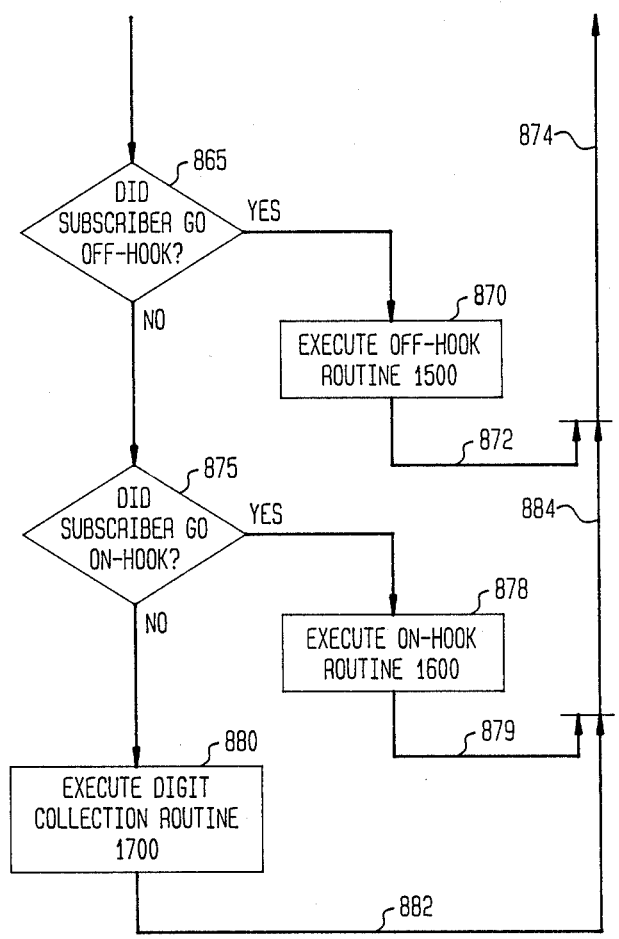

A flowchart of SSP Process Routine 800, shown in FIG. 6, is collectively depicted in FIGS. 8A-8C, for which the correct alignment of the drawing sheets for these figures is shown in FIG. 8. As discussed above, the SSP Process, which is executed by SSP Process routine 800, responds to events detected by the programmable switch or occurring in software, such as timers, and executes functional components supplied by the SCP Process.

Upon entry into this routine, which illustratively occurs whenever the operating system is instructed to bring the SSP Process "up" through an appropriate command manually fed into system monitor terminal 498 (see FIGS. 4A-4D), execution proceeds to block 802. This block, when executed as shown in FIGS. 8A-8C, invokes Load Database routine 900 (see FIG. 9) which reads various databases from disk 496 (see FIGS. 4A-4D) into memory of the host processor. These databases contain resource listings and subscriber information.

Once all the desired information has been copied from disk 496 into memory, execution proceeds as shown in FIGS. 8A-8C, to decision block 805 to determine if an input event has occurred. If no such event has occurred, i.e. no message exists in SSP Process mailbox 642, then execution merely loops back, via NO path 803, to re-execute decision block 805. In the event an input event has occurred, then decision block 805 routes execution, via its YES path, to block 807 which, when executed, reads the message in SSP mailbox 642. At this point, execution proceeds through a series of decision blocks to determine the nature of the event and then, if possible, invoke appropriate routines to process the event. Specifically, execution first proceeds to decision block 810 determine if the input event is a switch event, e.g. a off-hook condition, an on-hook condition or a digit entry. If the event is not a switch event, then decision block 810 routes execution, via NO path 813, to decision block 815 which determines if the input event is a software event, i.e. a software timer has expired or the host processor in conjunction with the speech recognition system has completed a spoken name to telephone number translation operation. If the event is not a software event, then execution proceeds, via the NO path emanating from decision block 815, to decision block 820. This latter decision block determines if the event is a request by the SCP Process to process a functional component.

Now, if the input event is not such a request, then the event is a message provided by the SMD datalink to the host processor. In this case, the SMD datalink is supplying an SMD message that a call has been forwarded to a hunt group line of the local switch and is to be processed accordingly. At this point, execution proceeds to decision block 825, via the NO path emanating from decision block 820. Decision block 825, when executed, determines if a hunt group line specified in the message appearing over the SMD datalink did in fact go off-hook. If not, then this event can not be processed at this time and execution proceeds, via NO path 829 from decision block 825, to block 831. This latter block, when executed, saves the SMD message in a table for subsequent processing, i.e. at the point in time when the specified hunt group line actually goes off-hook and the call can be processed. Execution then loops back, via paths 833 and 886, to decision block 805 to wait for the occurrence of the next input event.

Alternatively, in the event the specified hunt group line did go off-hook, then execution proceeds, via YES path 827 emanating from decision block 825, to decision block 835. This latter decision block decodes the type of message provided by the SMD datalink, i.e. using the SMD call routing code which indicates the manner in which the call was forwarded to the hunt group, to route execution to a specific routine to appropriately process the call. In particular, if the SMD routing code indicates that the call was forwarded to the hunt group because no answer occurred at the called party, then decision block 835 routes execution, via paths 836 and 837, to block 845 to invoke SMD N - No Answer routine 1000 (discussed in detail below in conjunction with FIG. 10). Alternatively, if the SMD routing code indicates that the call was forwarded to the hunt group because the called party was busy, then decision block 835 routes execution, via paths 836 and 838, to block 846 to invoke SMD B - Busy routine 1100 (discussed in detail below in conjunction with FIG. 11). Now, if the SMD routing code indicates that the call was directly dialed into the hunt group, then decision block 835 routes execution, via paths 836 and 839, to block 847 to invoke SMD D - Directly Dialed routine 1200 (discussed in detail below in conjunction with FIG. 12). Lastly, if the SMD routing code indicates that the caller has instructed the local switch to forward all his calls into the hunt group and the present call is such a call, then decision block 835 routes execution, via paths 836 and 840, to block 848 to invoke SMD A - Forwarded Call routine 1300 (discussed in detail below in conjunction with FIG. 13). Once the call has been appropriately processed and execution of blocks 845, 846, 847 or 848 has concluded, execution proceeds from the corresponding block and loops back, via paths 849, 834 and 886, to decision block 805 to await the occurrence of the next input event.

If, however, the input event was a request from the SSP Process to process a functional component, then decision block 820 routes execution, via YES path 822, to block 855. This block, when executed, invokes an appropriate routine for the specific functional component to be executed. These routines will be separately discussed in detail below in conjunction with FIGS. 18 through 40A and 40B and 59-61. Once the appropriate FC routine has completely executed, execution proceeds from block 855 to loop back, via paths 858, 866, 834 and 886, to decision block 805 to await the occurrence of the next input event.

Now, if alternatively the input event was a software event, then decision block 815 routes execution, via YES path 817, to block 860. This block, when executed invokes Software Event routine 1400 (see FIG. 14), which will be discussed in detail later, to appropriately process this event. Once this processing has concluded, execution proceeds from block 860 as shown in FIGS. 8A-8C to loop back, via paths 862, 864, 866, 834 and 886, to decision block 805 to await the occurrence of the next input event.

Lastly, if the input event was a switch event, then alternatively decision block 810 routes execution, via YES path 812, to two decision blocks to decode the particular event and route execution accordingly. First, execution proceeds to decision block 865 which determines, based upon a message from the programmable switch appearing on leads 419 (see FIGS. 4A-4D), whether a subscriber went off-hook. If this occurred, as shown in FIGS. 8A-8C, then decision block 865 routes execution, via its YES path, to block 870 which invokes execution of Off-Hook routine 1500 (see FIGS. 15A and 15B), which will be discussed in detail later. Alternatively, if a subscriber did not go off-hook, then decision block 865 as shown in FIGS. 8A-8C passes execution, via its NO path to decision block 875. This latter decision block, when executed, determines whether a subscriber went on-hook. If this occurred, then decision block 875 routes execution, via its YES path to block 878 which invokes execution of On-Hook routine 1600 (see FIG. 16), which will be discussed in detail later. Alternatively, if a subscriber did not go off- or on-hook, then the subscriber is assumed to have entered a digit through the keypad on his telephone and execution proceeds as shown in FIGS. 8A-8C to block 880 to collect that digit. Block 880, when executed, invokes Digit Collection routine 1700 (see FIGS. 17A-17C) to obtain the value of that digit and then undertake appropriate call processing. Once Digit Collection Routine 1700 has fully executed, execution proceeds from block 880 and loops back via paths 882, 884, 874, 864, 866 and 886 to decision block 805 to await the occurrence of the next input event. Since, various alarms and other events, such as for example acknowledgement of port (line or trunk) seizure and incoming command syntax errors, are produced by the programmable switch, appropriate routines would be located between blocks 875 and 880 to process these additional switch events. Since these routines are unimportant for call processing and readily apparent to those skilled in the art, they have been omitted from both FIGS. 8A-8C and the accompanying discussion.

1. Load Database Routine 900

Figure 9:
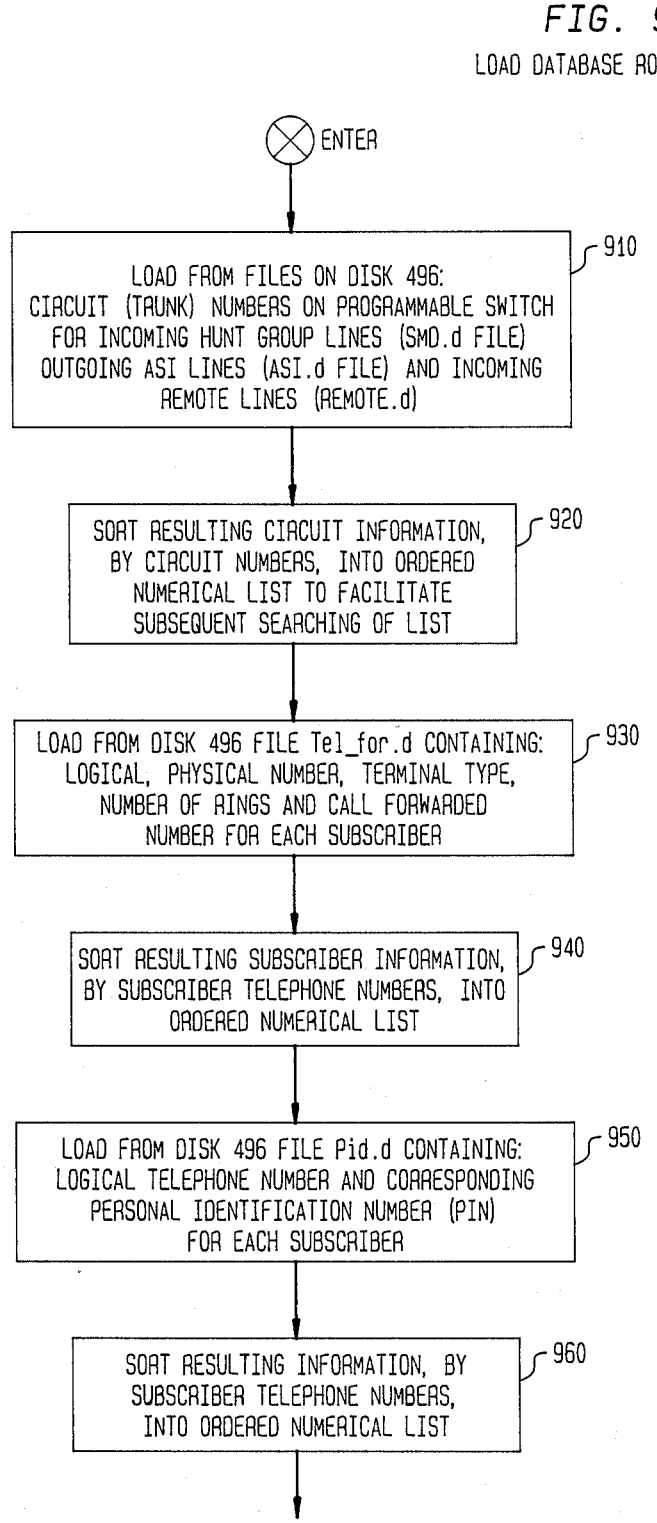
FIG. 9 shows the proper alignment of the drawing sheets for FIGS. 9A and 9B.

A flowchart of Load Database Routine 900 that is executed as part of SSP Process Routine 800 shown in FIGS. 8A-8C is collectively depicted in FIGS. 9A and 9B, for which the proper alignment of the drawing sheets for these figures is shown in FIG. 9. As discussed above, this routine, which is executed upon initial entry into SSP Process routine 800 (see FIGS. 8A-8C), loads system resource and other information from various databases resident on disk 496 (see FIGS. 4A-4D) into memory within host processor 490 for subsequent use in processing calls.

Specifically, upon entry into routine 900, as shown in FIGS. 9A and 9B, execution first proceeds to block 910. This block, when executed, reads file SMD.d on disk 496 to load into memory the circuit (trunk) number on the programmable switch that is associated with each incoming hunt group line. Thereafter, this block reads a disk file, illustratively named "ASI.d", to load into memory the circuit (trunk) number on the programmable switch that is associated with each outgoing (ASI—answering service interface) line. Lastly, this block reads another disk file, illustratively named "Remote.d", to load into memory the circuit (trunk) number on the programmable switch that is associated with each incoming remotely accessible line. Execution now proceeds to block 920 which sorts this information into an ordered numerical list to facilitate subsequent searching of this information. Once this occurs, execution proceeds to block 930 which reads a different disk file, illustratively named "Tel_for.d", to obtain the following information and load it into memory for each subscriber: the logical number of the subscriber, the physical number of the subscriber, the type of terminal being used by the subscriber (e.g. standard telephone alone or in conjunction with a separate keypad), number of rings and call forwarding number. Once this information has been loaded into memory, execution proceeds to block 940 which constructs this information into a list which is ordered by the logical telephone numbers of all the subscribers. Execution then proceeds to block 950 which reads another disk file, illustratively named "pid.d", to obtain the personal identification number for each subscriber. Once this occurs, block 960 is executed to construct a list, containing both the logical and physical telephone numbers of all the subscribers and the corresponding personal identification numbers, which is numerically ordered in terms of corresponding logical telephone numbers. Thereafter, execution proceeds to block 970 which, when executed, loads from disk 496 into memory other disk files that contain lists of subscribers, in terms of their logical telephone numbers, that possess a service script for each different trigger. Each of these files (typified for example by separate files named "SCP_t.d", "SCP n.d" and "SCP_b.d") contains a list of logical telephone numbers of subscribers that possess a service script for a certain trigger (e.g. outgoing, no answer and busy). Once this information has been loaded into a database in memory, execution proceeds to block 980 which converts the information in this database into a list that is numerically ordered by corresponding logical telephone numbers. Lastly, execution proceeds to block 990 which, when executed, reads a disk file illustratively named "DTMF.d" to obtain a listing of the DTMF receivers and transmitters and the specific line number on the programmable switch (specifically the time slot interchanger) to which each is connected. After this information has been read into memory, execution exits from load database routine 900 and appropriately returns to SSP Process routine 800.

2. SMD N - No Answer Routine 1000

Figure 10:
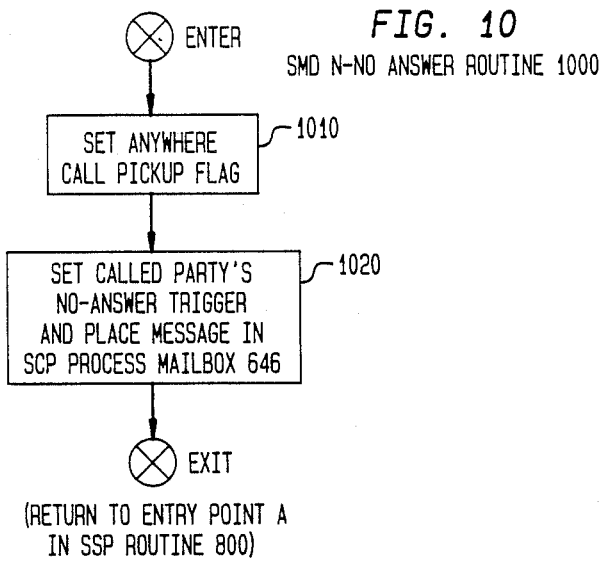
FIG. 10 depicts a flowchart of SMD N - No Answer Routine 1000 that is also executed as part of SSP Routine 800 shown in FIGS. 8A-8C.

FIG. 10 depicts a flowchart of SMD N - No Answer Routine 1000, that is also executed as part of SSP Routine 800 shown in FIGS. 8A-8C. As noted above routine 1000 is invoked in response to a message on the SMD datalink indicating that a call that has been forwarded to a hunt group line because the called party has not answered within a specified number of rings.

Upon entry into routine 1000, execution proceeds, to block 1010 which sets the ANYWHERE CALL PICKUP FLAG. Execution then proceeds to block 1020 which sets the no answer trigger for the called party. This block then places an appropriate message in SCP mailbox 646 (see FIG. 6) to invoke a no answer service script for that party in order, to appropriately process the call. Inasmuch as the ANYWHERE CALL PICKUP flag has been set, the no answer service script, if appropriately programmed, can instruct the radio paging system, as discussed above, to page the called party. After block 1020 has executed, then execution exits from routine 1000 and returns to entry point A in SSP Process routine 800 (see FIGS. 8A-8C).

3. SMD B - Busy Routine 1100

Figure 11:
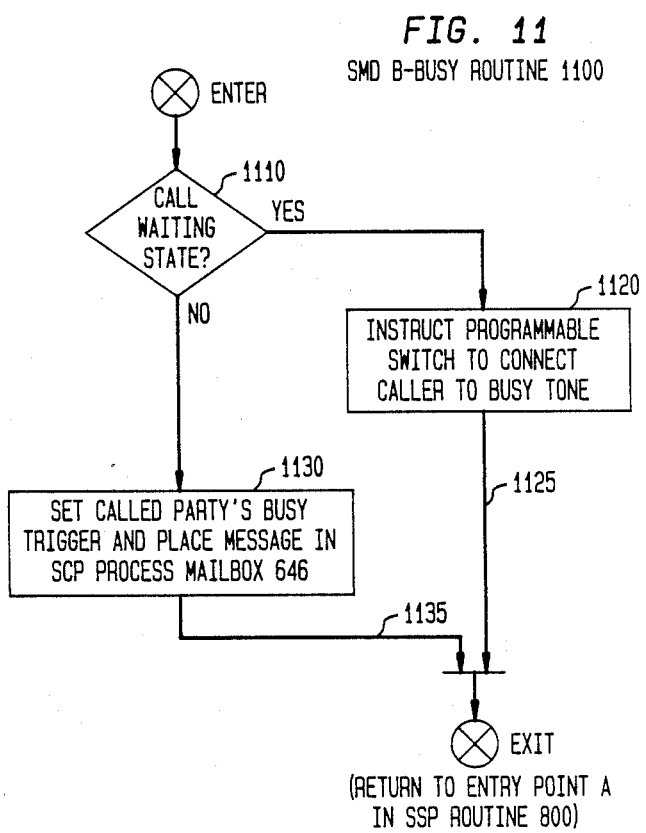
FIG. 11 depicts a flowchart of SMD B - Busy Routine 1100 that is also executed as part of SSP Routine 800 shown in FIGS. 8A-8C.

FIG. 11 depicts a flowchart of SMD B - Busy Routine 1100, that is also executed as part of SSP Routine 800 shown in FIGS. 8A-8C. As noted above routine 1100 is invoked in response to a message on the SMD datalink indicating that a call that has been forwarded to a hunt group line because the called party is busy.

Upon entry into routine 1100, execution first proceeds to decision block 1110 which determines whether the called party is in a call waiting state, i.e. the called party is connected to one of two earlier callers and the other caller is currently waiting to be connected to the called party. If the called party is in a call waiting state, then the present incoming call to that party can not be processed. In this case, decision block 1110 routes execution, via its YES path, to block 1120. This latter block, when executed, merely instructs the programmable switch to provide a busy tone to the caller. Alternatively, if the called party is not in call waiting state, then the call can be processed according to the called party's busy script. In this case, decision block 1110 routes execution, via its NO path, to block 1130. This latter block, when executed, sets the busy trigger for the called party and then places an appropriate message in SCP mailbox 646 to invoke a busy service script for that party in order to appropriately process the call. Once block 1120 or !130 has been executed, then execution exits from routine 1100 and returns to entry point A in SSP Process routine 800 (see FIGS. 8A-8C).

4. SMD D - Directly Dialed Routine 1200

Figure 12:
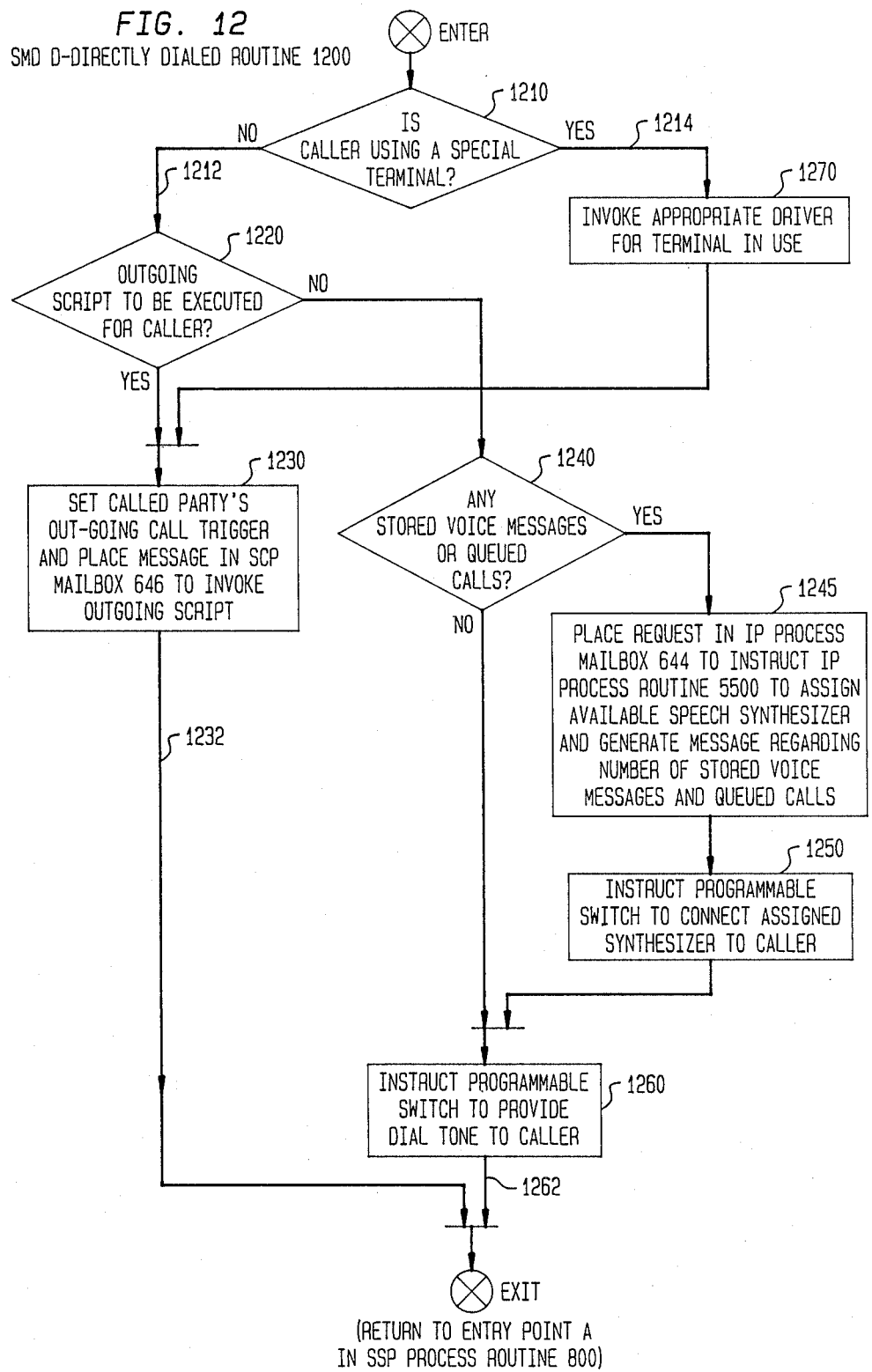
FIG. 12 depicts a flowchart of SMD D - Directly Dialed Routine 1200 that is also executed as part of SSP Routine 800 shown in FIGS. 8A-8C.

FIG. 12 depicts a flowchart of SMD D - Directly Dialed Routine 1200, that is also executed as part of SSP Routine 800 shown in FIGS. 8A-8C. As noted above routine 1200 is invoked in response to a message on the SMD datalink indicating that a call has been directly dialed into a hunt group line.

Upon entry into routine 1200, execution first proceeds to decision block 1210 to determine if the caller is using a special terminal, e.g. a separate keypad or touch pad in conjunction with a telephone. If a special terminal is not being used, i.e. the subscriber is merely using a "plain old telephone", then decision block 1210 routes execution, via NO path 1212, to decision block 1220. This block accesses a database within the memory of the host processor, using the caller's logical number, to determine if an outgoing service script exists for the caller. If such a script exists, the decision block 1220 passes execution, via its YES path, to block 1230. This latter block, when executed, sets the outgoing trigger for this party and places an appropriate message in SCP mailbox 646 to provide appropriate outgoing services to the caller. Thereafter, execution proceeds, via path 1232, to exit from routine 1200 and return to entry point A in SSP Process routine 800 (see FIGS. 8A-8C).

Now, in the event the caller does not have an outgoing service script, then decision block 1220 routes execution, via its NO path, to decision block 1240. This block reads an entry in a database in memory, as explained in detail below, to determine if any stored voice messages or queued calls exist for the caller. If no such stored voice messages or queued calls exist for the caller, then decision block 1240 routes execution, via its NO path, to block 1260. This latter block, when executed, instructs the programmable switch to provide dial tone to the caller in order to permit the caller to make an ordinary outgoing telephone call or access a personal communication service. Once block 1260 has executed, execution exits from routine 1200, via path 1262, and returns to entry point A in SSP Process routine 800 (see FIGS. 8A-8C). Alternatively, should any queued voice messages or queued calls exist for the caller, then decision block 1240 routes execution, via its YES path, to block 1245. This block, when executed, places a request in IP Process mailbox 644 to instruct IP Process 5500 (discussed in detail below in conjunction with FIG. 55) to assign an available speech synthesizer to synthesize a pre-defined voice message informing the caller of the number of voice messages and queued calls that exist. Such a message would illustratively resemble "You have three stored voice messages and two queued calls." Once the request has been placed in IP Process mailbox 644, then the IP Process will return a value indicating the circuit (line) number of the available synthesizer. Once this number is returned, execution passes from block 1245 to block 1250. Block 1250, when executed, instructs the programmable switch to connect the assigned synthesizer (i.e. the returned line number) to the caller. Once this has occurred, execution proceeds to block 1260 which, when executed, provides dial tone to the caller in order to permit the caller to make an ordinary outgoing telephone call or access a personal communication service.

Now, in the event the caller is using a special terminal, e.g. a separate keypad or touch pad for numeric entry along with a telephone handset for aural communication, then decision block 1210 routes execution, via YES path 1214, to block 1270. As noted above, a subscriber can select a terminal other than a "plain old telephone" in which case an appropriate entry designating that terminal would exist in the entry for that subscriber in the "Tel_for.d" file on disk 496 (see FIGS. 4A-4D). As shown in FIG. 12, block 1270, when executed, invokes an appropriate driver for the specific terminal being used by the caller. Once this driver is activated, execution proceeds, via path 1272, to block 1230 to set the outgoing trigger for the caller and place an appropriate message in SCP mailbox 646 which, in turn, instructs the SCP Process to obtain and then begin executing the outgoing service script for the caller.

5. SMD A - Forwarded Call Routine 1300

Figures 13, 13A:
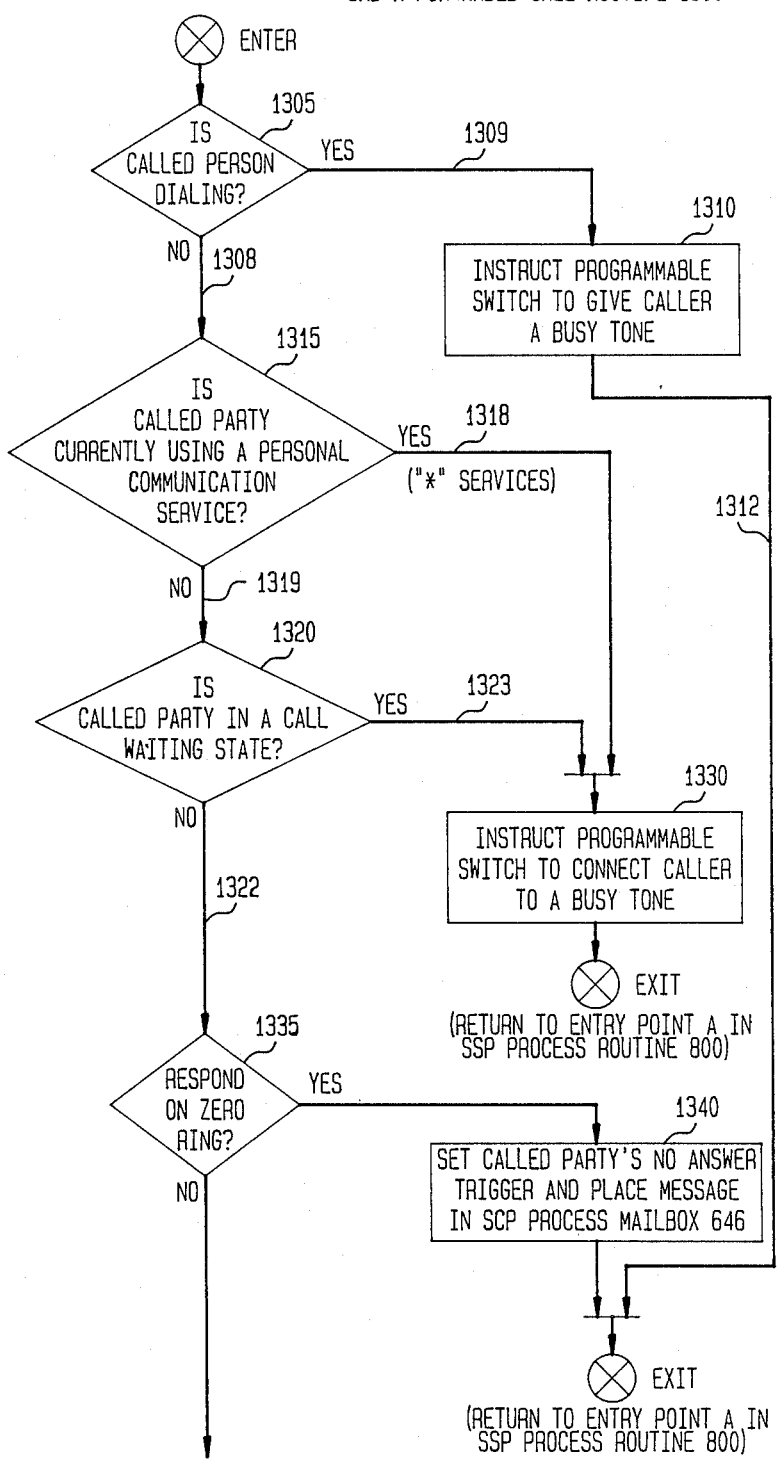
FIG. 13 shows the proper alignment of the drawing sheets for FIGS. 13A and 13B.
FIGS. 13A and 13B collectively depict a flowchart of SMD A - Forwarded Call Routine 1300 that is also executed as part of SSP Routine 800 shown in FIGS. 8A-8C.
Figure 13B:
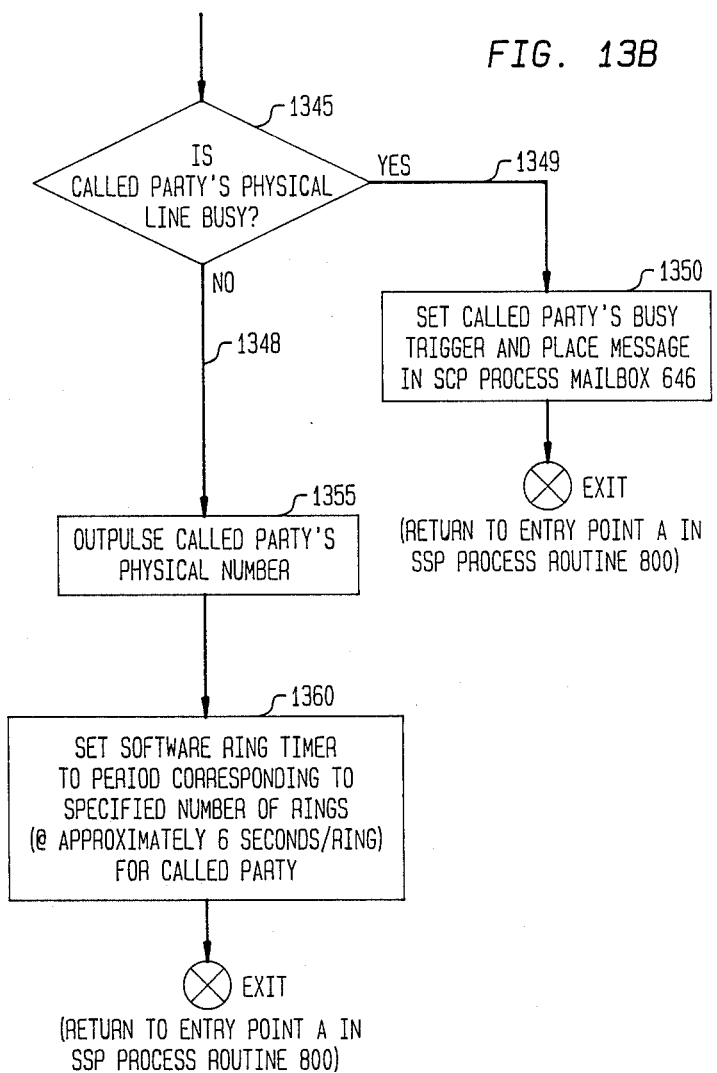

A flowchart of SMD A - Forwarded Call Routine 1300, that is also executed as part of SSP Routine 800 shown in FIGS. 8A-8C, is collectively depicted in FIGS. 13A and 13B, for which the correct alignment of the drawing sheets for these figures is shown in FIG. 13. As noted above routine 1300 is invoked in response to a message on the SMD datalink indicating that a call has been forwarded to a hunt group line because the local switch has been instructed to forward all calls to a caller's logical (published) number in that manner.

Upon entry into routine 1300, execution first passes to decision block 1305 to determine if the called party is dialing. If the called party is dialing then the current call to this party can not be processed. In this case, decision block 1305 routes execution, via YES path 1309, to block 1310. This latter block, when executed, instructs the programmable switch to connect a busy tone to the caller. Once this has occurred, then execution exits from routine 1300, via path 1312, and appropriately returns to entry point A in SSP Process routine 800 (see FIGS. 8A-8C). Alternatively, if the called party is not dialing, then, as shown in FIGS. 13A and 13B, decision block 1305 routes execution, via NO path 1308, to decision block 1315. This latter block, when executed, determines whether the called party is accessing any available personal communication service ("*" services). If the called party is using such a service, then a connection can not be made to that party and his or her busy service script can not be executed. In this case, decision block 1315 routes execution, via YES path 1318, to block 1330. This latter block, when executed, merely instructs the programmable switch to connect a busy tone to the caller. Once this occurs, execution exits from routine 1300 and returns to entry point A in SSP Process routine 800 (see FIGS. 8A-8C). If, on the other hand, the called party is not using a personal communication service, then decision block 1315 routes execution, via NO path 1319, to decision block 1320. This latter decision block determines whether the called party is in a call waiting state, i.e. the called party is connected to one of two earlier callers and the other caller is currently waiting to be connected to the called party. If the called party is in a call waiting state, then again the current call to this party can not be processed. Accordingly, decision block 1320 routes execution, via YES path 1323, to block 1330 to provide a busy tone to the caller. Alternatively, if the called party is not accessing a personal communication service or in a call waiting state, then execution proceeds, via NO path 1322, to decision block 1335. This latter decision block determines whether the called party has specified that his no answer service script should immediately execute, i.e. respond on the zeroth ring, whenever an incoming call exists for him and his line is not busy. If an immediate response is desired, then decision block 1335 routes execution, via its YES path, to block 1340. This latter block, when executed, sets the no answer trigger for the called party and then places an appropriate message in SCP Process mailbox 646 to process the incoming call. Thereafter, execution proceeds from block 1340 to exit from routine 1300 and appropriately return to entry point A in SSP Process routine 800 (see FIGS. 8A-8C).

Now, if the called party does not require an immediate response, i.e. he specified that his telephone must ring a certain number of times (1, 2, 3 etc.) before a response occurs, then decision block 1335 routes execution, via its NO path, to decision block 1345. This latter decision block determines whether the physical number of the called party is actually busy by checking the status of a flag ("OFF HOOK" flag) that indicates the state of this number as detected by the programmable switch. In the event the called party's physical number is busy, then decision block 1345 routes execution, via YES path 1349, to block 1350. This block, when executed, first sets the trigger for the busy script for the called party and then places an appropriate message in SCP Process mailbox 646 to handle the incoming call in the manner defined by that script. Once block 1350 has fully executed, then execution exits from routine 1300 and appropriately returns to entry point A in SSP Process routine 800 (see FIGS. 8A-8C).

If the programmable switch has previously reported that the called party is not busy, then a call can be put through to the physical number of the called party. Specifically, if the physical number is not busy, then decision block 1345 routes execution, via NO path 1348, to block 1355. This latter block, when executed, instructs the programmable switch to outpulse the physical number of called party. Since the programmable switch is unable to detect whether a call destined for any area not served by the local switch is answered, execution proceeds to block 1360 to set a software ring timer. This timer is set to time out and provide a signal (a software event trigger) after a pre-defined period of time has elapsed. This time period equals the specified number of rings for the called party times approximately 6 seconds/ring. Once this timer is set, then execution proceeds from block 1360 to exit routine 1300 and return to entry point A in SSP Process routine 800 (see FIGS. 8A-8C).

6. Software Event Routine 1400

Figure 14B:
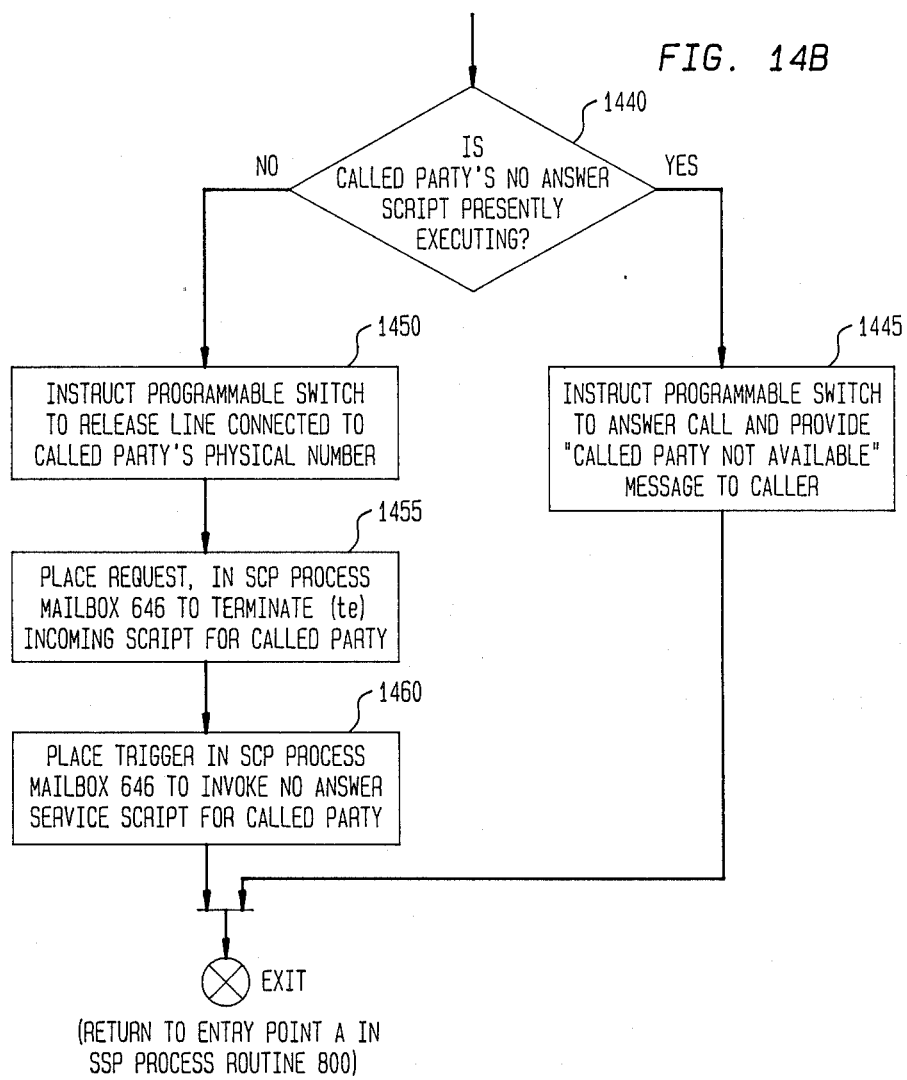

A flowchart of Software Event Routine 1400, that is also executed as part of SSP Process Routine 800 shown in FIGS. 8A-8C, is collectively depicted in FIGS. 14A and 14B, for which the correct alignment of the drawing sheets for these figures is shown in FIG. 14. As discussed above, routine 1400 appropriately processes a software event, e.g. a timeout message from a software timer which has just expired, an acknowledgement from the host processor specifying that it has just completed a telephone number to name translation operation, or a completion message from the voice messaging system.

Execution enters routine 1400 whenever a software timer or other software event occurs. When this occurs, execution proceeds to decision block 1405 which routes execution according to the specific event that occurred. Certain FC's, such as that which invokes the speech synthesizer (see Speech Synthesizer routine 3600 in FIGS. 36A and 36B and specifically block 3635 as will be discussed below) can, be programmed, to invoke, as part of their execution, a number to name translation. This causes the host processor to access an appropriate database stored on disk 496 (see FIGS. 4A-4D) to obtain the caller's name using a look-up operation given his or her telephone number. When this access is completed, the host processor returns a ready event. In response to this event, decision block 1405 routes execution as shown in FIGS. 14A and 14B, via path 1409, to block 1410. This latter block, when executed, copies the subscriber's name generated through this database access into an appropriate data structure for the subscriber for later use, such as synthesizing a voice message to identify a queued call from that subscriber. Thereafter, execution exits from routine 1400 and appropriately returns to entry point A in SSP Process routine 800 (see FIGS. 8A-8C).

Now, if the event is a timeout message from a timer then, as shown in FIGS. 14A and 14B, decision block 1405 routes execution, via path 1407, to decision block 1415. This latter decision block determines which timer is involved, i.e. either the inter-digit or first digit timer, or the ring timer. In the event the timeout occurred from the inter-digit or first digit timer, then decision block 1415 routes execution, via path 1418, to decision block 1420. This latter decision block determines which of two functional components was being executed during the occurrence of the timeout: either the DIALING FC (to be discussed below in conjunction with Dialing FC routine 2400 shown in FIG. 24) or the COLLECT_DIGIT FC (to be discussed below in conjunction with Collect Digit FC routine 2200 shown in FIG. 22). In the event the DIALING FC was executing, then decision block 1420 routes execution, via path 1422, to block 1430 which, when executed, places a trigger (either for the inter-digit or first digit timer depending upon which was involved) for the DIALING FC in SCP Process mailbox 646. As noted above, this trigger is used by the SCP Process in determining the next FC to execute in a current script. Alternatively, if the COLLECT_DIGIT FC was executing, then decision block 1420 routes execution, via path 1423, to block 1425 which, when executed, places a trigger (either for the inter-digit or first digit timer depending upon which was involved) for the COLLECT_DIGIT FC in SCP Process mailbox 646. After either block 1430 or block 1425 has finished executing, then execution proceeds, via paths 1432 or 1428, respectively, and path 1434, to block 1435. This latter block, when executed, instructs the programmable switch to release the DTMF receiver that was just connected to the caller. Thereafter, execution exits from routine 1400 and appropriately returns to entry point A in SSP Process routine 800 (see FIGS. 8A-8C).

Alternatively, if the timeout message was produced by the ring timer, which will be discussed in detail below, then decision block 1415 routes execution, via path 1419, to decision block 1440. The ring timer produces a timeout event after a period of time (approximately six seconds/ring) has elapsed which is sufficient for the local switch to ring a called party's telephone a specified number of times. Decision block 1440 determines whether a no answer service script is executing for the called party. In the event such a script is executing (to process another incoming call for this party), then the present incoming call can not be processed. In this case, decision block 1440 routes execution, via its YES path, to block 1445. This latter block, when executed, instructs the programmable switch to answer the present incoming call, then immediately connect the caller to a internal playback system (not shown) residing within the programmable switch that provides a message stating that the called party is not available and thereafter release the caller. Alternatively, if a no answer script is not executing for the called party, then decision block 1440 routes execution, via its NO path, to block 1450. This latter block terminates the ringing of the called party's telephone by instructing the programmable switch to release the line associated with the physical number of the called party. Thereafter, execution proceeds to block 1455 which, when executed, places a request ("te" request) in SCP Process mailbox 646 to terminate any incoming service script for the called party. Once the request has been processed, execution proceeds to block 1460. This block, when executed, places a trigger in SCP Process mailbox 646 to invoke processing of the called party's no answer service script. Once block 1460 or block 1445 has been executed, then execution exits from routine 1400 and appropriately returns to entry point A in SSP Process routine 800 (see FIGS. 8A-8C).

Now, if the event is a completion signal from the voice messaging system that it has completed a playback of a digitized voice message (or announcement), then decision block 1405 routes execution, via path 1406, to decision block 1470. If the PLAY ANNOUNCEMENT FC (to be discussed below in conjunction with Play Voice Message routine 3000 shown in FIG. 30) specifies that the caller is to be connected to the music source, then a music flag will be set. When the announcement is complete and depending upon the state of the music flag, the caller will be disconnected from a digitizer and connected to music source 443 (see FIGS. 4A-4D). In particular, as shown in FIGS. 14A and 14B, if the music flag has been previously set then decision block 1470 routes execution, via its YES path, to block 1475. This block, when executed, instructs the programmable switch to disconnect the caller from an assigned digitizer and connect the caller to the music source. Thereafter, execution exits from routine 1400 and appropriately returns to entry point A in SSP Process routine 800 (see FIGS. 8A-8C). In the event that the music flag has not been previously set, then, as shown in FIGS. 14A and 14B, execution merely exits, via the NO path emanating from decision block 1470,

7. Off Hook Routine 1500

Figure 15B:
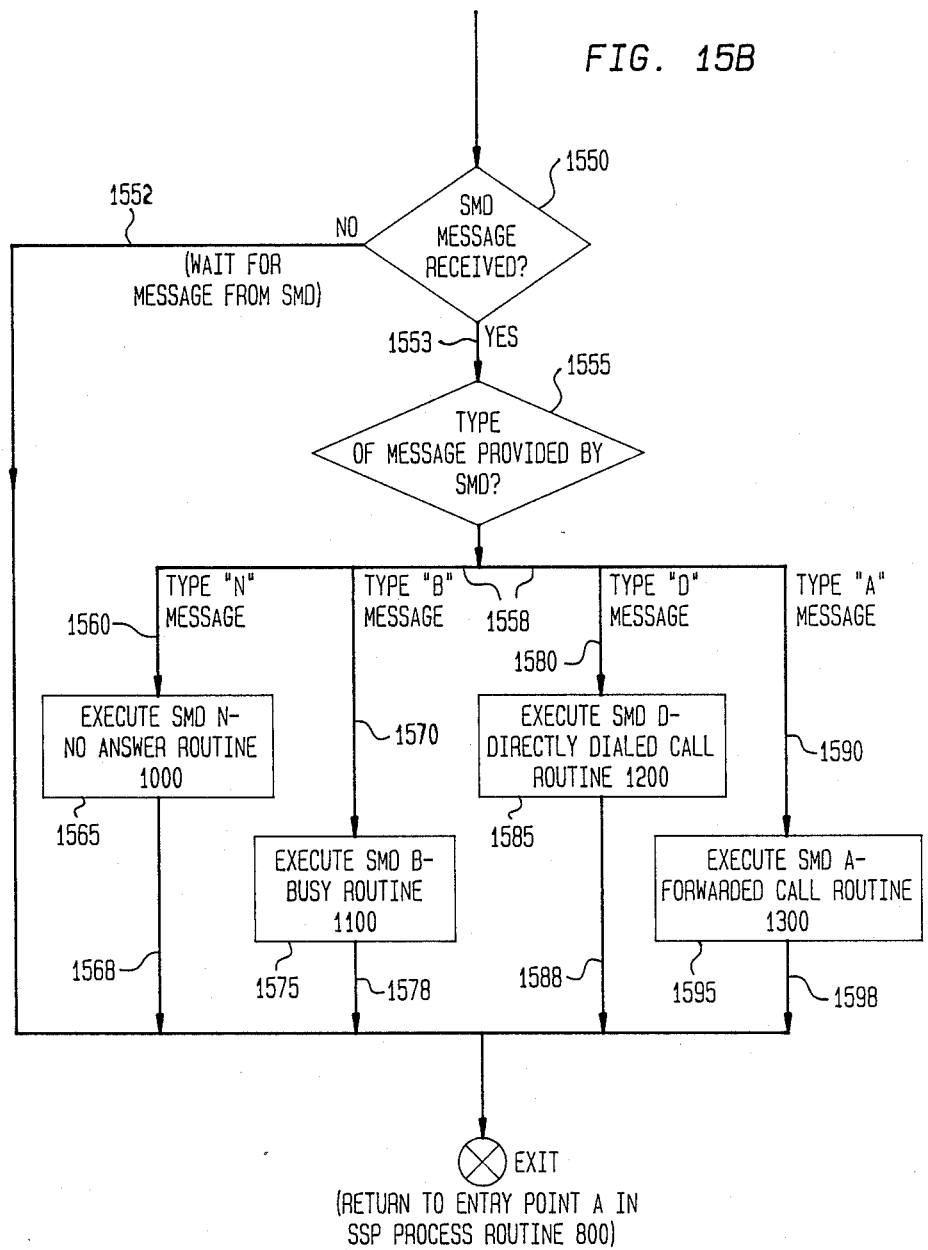

A flowchart of Off Hook Routine 1500, that is also executed as part of SSP Process Routine 800 shown in FIGS. 8A-8C, is collectively depicted in FIGS. 15A and 15B, for which the proper alignment of the drawing sheets for these figures is shown in FIG. 15. As noted above, routine 1500 processes an off-hook condition that has been detected by the programmable switch and provided as a switch event to SSP Process routine 800 (see FIGS. 8A-8C).

Upon entry into routine 1500, as shown in FIGS. 15A and 15B, execution first proceeds to block 1505 which sets the OFF-HOOK flag. Thereafter, execution proceeds to decision block 1510 which determines what type of circuit (outgoing ASI, incoming remote line or hunt group line associated with the SMD interface) went off-hook. First, under normal operating conditions, outgoing ASI lines can not go off-hook. Thus, should the programmable switch detected that an outgoing ASI line had gone off-hook, this is simply an error condition. As such, decision block 1510 routes execution, via path 1511, to block 1515. This latter block, when executed, merely instructs the programmable switch to release this line. Thereafter, execution proceeds from block 1515 to exit from routine 1500 and return to entry point A in SSP Process routine 800 (see FIGS. 8A-8C).

Alternatively, in the event a remote line went off-hook thereby indicating that a caller directly dialed into a hunt group line connected to the MSN to either invoke his remote script or, in response to having just been paged, for subsequent connection to a caller, then decision block 1510 routes execution, via path 1516, to execution block 1520. This latter block, when executed, prompts the caller, using a pre-defined voice message as described in detail below, to enter his telephone number and then collects the digits that form this number. Execution then proceeds to block 1523 which performs a database look-up operation, given the caller's number, to determine the file name of the remote service script that has been defined for the caller. Once this occurs, execution proceeds to decision block 1525 to determine if such a remote script does, in fact, exist. If this remote script exists, then decision block 1525 routes execution, via YES path 1527, to block 1530. This latter block, when executed, first sets the remote access trigger for the caller and then places an appropriate message in SCP Process mailbox 646 to load and execute this script in order to appropriately process the incoming remote call. Once block 1530 has completely executed, then execution proceeds, via path 1533, to exit from routine 1500 and then appropriately return to entry point A in SSP Process routine 800 (see FIGS. 8A-8C).

Now, if the caller has not defined a specific remote service script, then, as shown in FIGS. 15A and 15B, decision block 1525 routes execution, via NO path 1529, to decision block 1535. This latter decision block determines whether the caller is waiting for a connection to a called party. Such a condition occurs through the "anywhere call pickup" service in which a prior caller (the current called party) previously called the current caller and, as a result of the current caller's no answer service script, instructed the MSN to page the current caller. The prior caller would now be waiting for the current caller to dial into the MSN and then be connected therethrough to the prior caller. If this condition is indeed occurring, then decision block 1535 routes execution, via YES path 1539, to block 1545. This latter block, when executed, instructs the programmable switch to establish a real time voice connection between the current caller and called parties. Once the switch has been so instructed, execution proceeds, via path 1548, to exit from routine 1500 and appropriately return to entry point A in SSP Process routine 800 (see FIGS. 8A-8C). Alternatively, if a prior caller is not waiting for a connection to the current caller, then decision block 1535 routes execution, via NO path 1537, to block 1540. This latter block, when executed, first sets a trigger to access a default remote service script for the caller and then places an appropriate message in SCP Process mailbox 646 to obtain and execute this script in order to appropriately process the current incoming call. Thereafter, execution proceeds, via path 1542, to exit from routine 1500 and then appropriately return to entry point A in SSP Process routine 800 (see FIGS. 8A-8C).

If, however, a hunt group line associate with the SMD interface went off-hook, then decision block 1510 routes execution, via path 1518, to decision block 1550. This latter decision block, when executed, tests whether a message has just been received over the SMD datalink corresponding to this hunt group line. If such a message, as defined above, has not yet been received, then this off-hook condition can not be processed now but must wait until the corresponding message has been received. As a result, decision block 1550 routes execution to NO path 1552 from which execution will proceed to exit routine 1500 and return to entry point A in SSP Process Routine 800 (see FIGS. 8A-8C). Alternatively, if a message was just received over the SMD datalink, then decision block 1550 routes execution, via YES path 1553, to decision block 1555. This latter decision block, when executed, decodes the message and routes execution accordingly. Specifically, if the message indicates that a call was just forwarded to the hunt group by the local switch because either there was no answer at the called number or because the called number is busy, then decision block 1555 routes execution over paths 1558 and either path 1560 or 1570 to block 1565 or block 1575 to invoke SMD N - No Answer routine 1000 (see FIG. 10 and discussed above) or SMD B - Busy routine 1100 (see FIG. 11 and also discussed above), respectively, to appropriately process the call. If, however, the call was directly dialed into the hunt group line, then decision block 1555 routes execution, over paths 1558 and 1580, to block 1585. This latter block, when executed, invokes SMD D - Directly Dialed routine 1200 (see FIG. 12 which was discussed above) to appropriately process the call. Lastly, if the SMD message indicates that the caller previously instructed the local switch to forward the call to the hunt group, then decision block 1555 routes execution, via paths 1558 and 1590, to block 1595. This latter block, when executed, invokes SMD A - Forwarded Call routine 1300 (see FIGS. 13A and 13B which were also discussed above). Once block 1565, 1575, 1585 or 1595 completes execution, execution respectively proceeds, as shown in FIGS. 15A and 15B via path 1568, 1578, 1588 or 1598 to exit from routine 1500 and then appropriately return to entry point A in SSP Process routine 800 (see FIGS. 8A-8C).

8. On Hook Routine 1600

Figure 16:
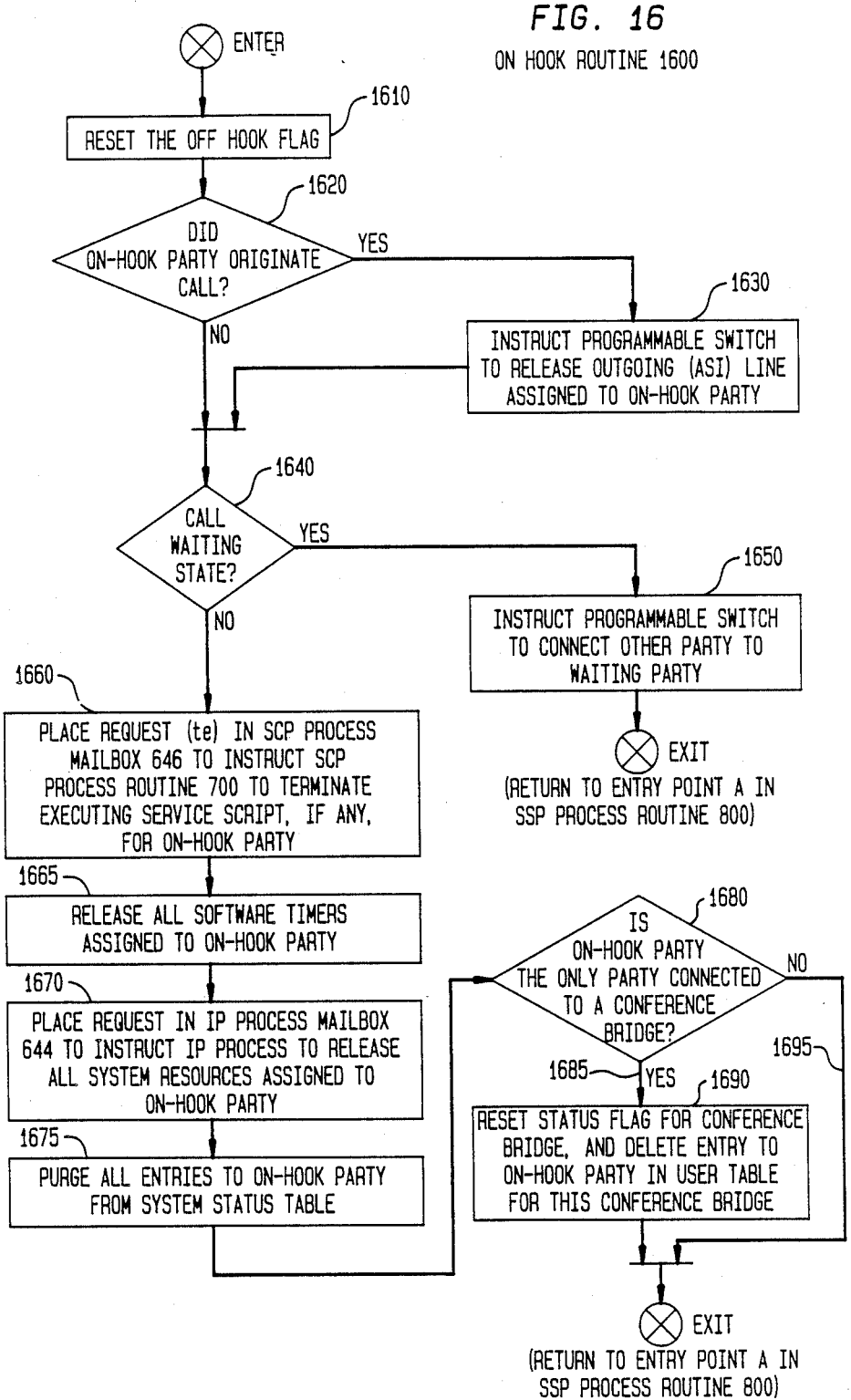
FIG. 16 depicts a flowchart of On Hook Routine that is also executed as part of SSP Process Routine shown in FIGS. 8A-8C.

FIG. 16 depicts a flowchart of On Hook Routine 1600, that is also executed as part of SSP Process Routine 8A–8C. As noted above, routine 1600 processes an on hook (hang up) condition that has been detected by the programmable switch and provided as a switch event to SSP Process routine 800 (see FIGS. 8A–8C).

Upon entry into routine 1600, execution first proceeds to block 1610 which, when executed, resets the OFF HOOK flag. Next, execution proceeds to decision block 1620 which determines whether the on-hook party originated a call on the line that went on-hook. If the party that went on-hook originated the call, then decision block 1620 routes execution, via its YES path, to block 1630. This block, when executed, instructs the programmable switch to release an outgoing (ASI) line that had been assigned to the on-hook party thereby making the line available for use by another call. Execution then proceeds to decision block 1640. Alternatively, in the event the on-hook party did not originate the call, then decision block 1620 routes execution, via its NO path, to decision block 1640. This latter decision block determines whether another caller, who has been assigned to that line, is in a call waiting state. If such a caller is in a call waiting state, then execution proceeds from decision block 1640, via its YES path, to block 1650. This latter block, when executed, instructs the programmable switch to establish a real time voice connection between the waiting caller and called parties. Once block 1650 executes, execution exists from routine 1600 and appropriately returns to entry point A in SSP Process routine 800 (see FIGS. 8A–8C).

Now, if no one that has been assigned to the on-hook line is in a call waiting state, then decision block 1640 routes execution, via its NO path, to block 1660. This latter block, when executed, places a terminate script request ("te" request) in SCP mailbox 646 (see FIG. 6) to instruct the SCP Process to terminate the currently executing service script for the party that just went on-hook. Thereafter, as shown in FIG. 16, block 1665 is executed to release all software timers that have been assigned to the on-hook party. Once this occurs, execution passes to block 1670 which places a request in IP Process mailbox 644 (see FIG. 6) to instruct the IP Process to release all system resources that have previously been assigned to the on-hook party. Thereafter, as shown in FIG. 16, execution proceeds to block 1675 which purges all entries to the on-hook party in all system status tables currently residing on the host processor. At this point, execution then proceeds to decision block 1680 to test a user table for each conference bridge in order to determine whether the on-hook party was the only party connected to a conference bridge. In the event these tables reflect that the on-hook party was the only one connected to a conference bridge, then decision block 1680 routes execution, via YES path 1685, to block 1690. This latter block, when executed, first resets a status flag associated with this conference bridge in order to free this bridge for subsequent use in establishing another conference. Next, block 1690 deletes any entry to the on-hook party in a user table for this bridge. The status flag and user tables associated with the conference bridges are discussed in detail below in conjunction with FIGS. 59–61. Once block 1690 has fully executed, then execution exits from routine 1600 and appropriately returns to entry point A in SSP Process routine 800 (see FIGS. 8A–8C). Alternatively, if the on-hook party was not the only party connected to a conference bridge, then execution merely exits from routine 1600, via NO path 1695 emanating from decision block 1680, and also returns to entry point A in SSP Process routine 800 (see FIGS. 8A–8C).

9. Digit Collection Routine 1700

Figure 17B:
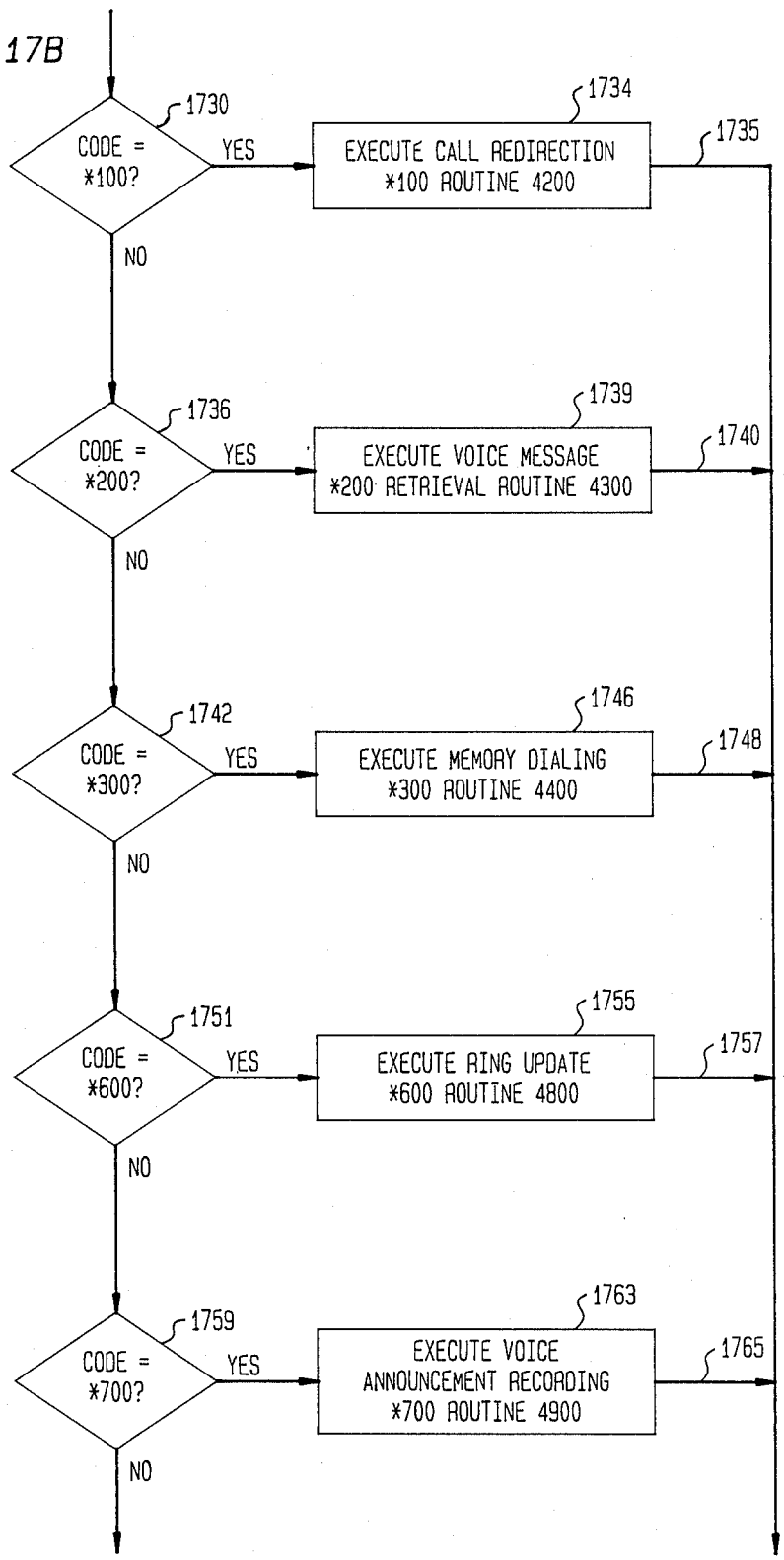
Figure 17C:
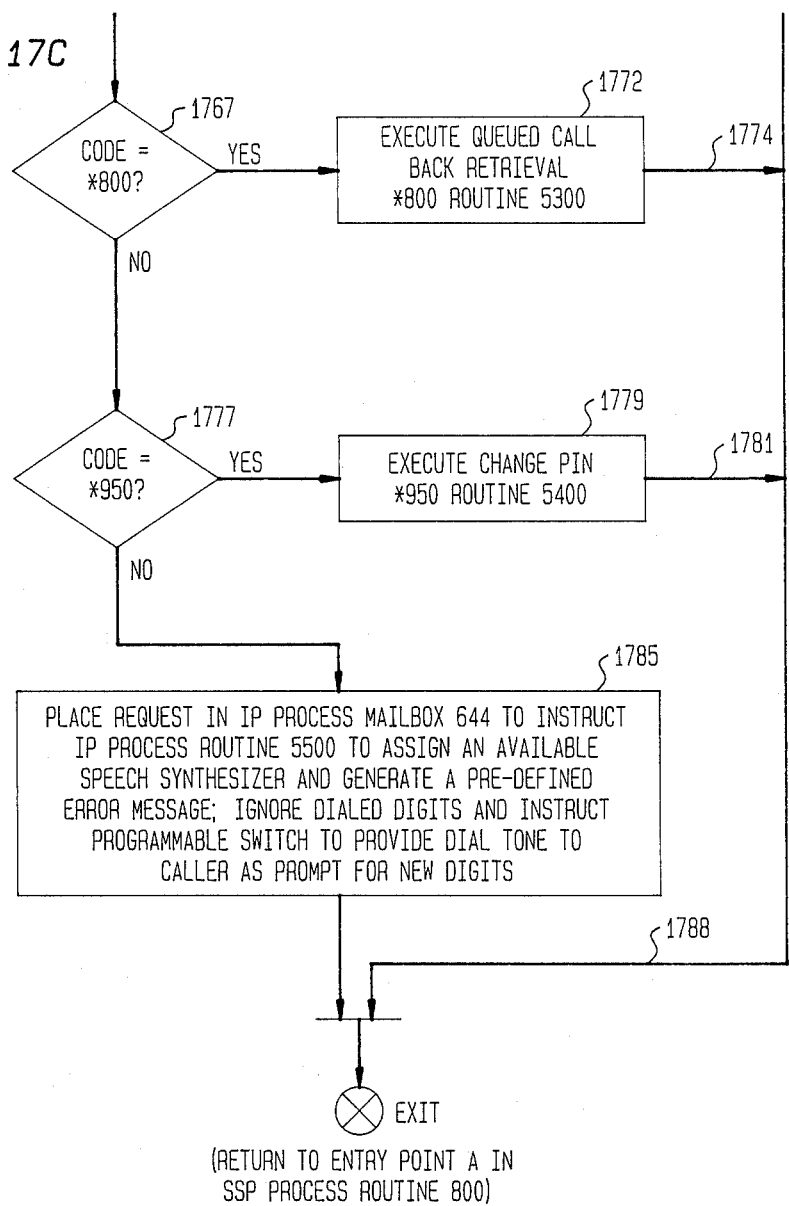

A flowchart of Digit Collection Routine 1700, that is also executed as part of SSP Process Routine 800 shown in FIGS. 8A–8C, is collectively depicted in FIGS. 17A–17C, for which the proper alignment of the drawing sheets for these figures is shown in FIG. 17. As noted above, routine 1700 obtains the value of a digit that has been detected by the programmable switch and entered by a caller by depression of a corresponding pushbutton on the keypad of his or her telephone, and, in response to the digit, invokes appropriate call processing.

Upon entry into routine 1700, execution first proceeds to block 1703. This block, when executed, translates the number of the DTMF receiver/transmitter as supplied by the programmable switch to the host processor, using a pre-defined look-up table, into the number of a corresponding line appearing on the switch. This table merely contains an entry for each DTMF receiver consisting of the number of that receiver, as would be reported by the switch, followed by the number of the line on the switch to which the receiver is physically connected. Once this translation operation is completed, execution passes to decision block 1706. This decision block determines, whether the current caller has established a special dialing plan, such as speed calling. A caller can establish and utilize such a plan either through his outgoing service script or through a personal communication service. If such a plan exists for the caller, then decision block 1706 routes execution, via YES path 1707, to decision block 1712. This latter decision block determines whether the caller has entered all the digits necessary to place a call using his special dialing plan. If more digits need to be entered, then decision block 1712 merely causes execution to exit from routine 1700, via NO path 1714, and appropriately return to entry point A in SSP Process routine 800 to wait for the caller to enter the next digit. If, however, the caller has entered all the digits required by his special dialing plan, then decision block 1712 routes execution, via YES path 1713, to block 1716. This latter block, when executed, places a message in SCP Process mailbox 646 that a result, in the form of the dialed digits, is being returned to SCP Process 700 for further processing. The SCP Process will then instruct the SSP Process to execute certain functional components based upon the values of these digits. After block 1716 has fully executed, execution exits from routine 1700 and appropriately returns to entry point A in SSP Process routine 800 (see FIGS. 8A–8C).

Now, in the event the caller does not have a special dialing plan, then decision block 1706 routes execution, via NO path 1709, to decision block 1718. This latter decision block determines if the caller has finished dialing, i.e. has entered a ten digit number or has entered a service code formed of "*" followed by three predefined numbers (specifically "*100", "*200", "*300", "*600", "*700", "*800" or "*950"). If the caller has not finished dialing, then execution exits from routine 1700, via NO path 1719 emanating from decision block 1718, and appropriately returns to entry point A in SSP Process routine 800 (see FIGS. 8A–8C) in order to wait for the caller to enter additional digits. If, however, decision block 1718 determines that the caller has entered all the needed digits, then execution proceeds, via YES path 1720 emanating from this decision block, to decision block 1721. This latter block checks the entered digits to determine if a service code was entered. If a service code was not entered, then an outgoing call is to be placed for the caller. In this case, decision block 1721 routes execution, via NO path 1723, to block 1725 which, when executed, instructs the programmable switch to seize an available outgoing (ASI) trunk. Once the host processor has been notified by the switch that such a trunk has been seized, execution proceeds to block 1728. This block, when executed, supplies the dialed digits to the programmable switch and instructs the switch to outpulse the digits on the seized trunk. Once the switch has been so instructed, execution proceeds from block 1728 to exit routine 1700 and then appropriately return to entry point A in SSP Process routine 800 (see FIGS. 8A-8C).

If, however, the caller has finished dialing a service code, then decision block 1721 routes execution, via YES path 1722, to a series of decision and execution blocks to provide the desired service (call re-direction, voice message retrieval, memory dialing, ring updating, voice announcement recording, retrieval of queued calls and changing of personal identification number) corresponding to the entered service code. Specifically, execution first proceeds to decision block 1730 which determines if the caller has entered the "*100" code. If this code has been entered, then decision block 1730 routes execution, via its YES path, to block 1734. This block, when executed, invokes Call Re-direction *100 routine 4200 (see FIGS. 42A-42C which will be discussed below) to permit the caller to re-direct his incoming calls to any other telephone number of his choice. Alternatively, if the "*100" code has not been entered, then decision block 1730 routes execution, via its NO path, to decision block 1736. This latter decision block determines if the caller has entered the "*200" code. If this code has been entered, then decision block 1736 routes execution, via its YES path, to block 1739. This block, when executed, invokes Voice Message Retrieval *200 routine 4300 (see FIGS. 43A-43D which will be discussed below) that enables the caller to retrieve any of all of his previously recorded voice messages that are stored within the MSN. Now, in the event that the "*200" code has not been entered, then decision block 1736 routes execution, via its NO path, to decision block 1742. This latter decision block determines if the caller has entered the "*300" code. If this code has been entered, then decision block 1742 routes execution, via its YES path, to block 1746. This block, when executed, invokes Memory Dialing *300 routine 4400 (see FIGS. 44A and 44B which will be discussed below) which permits the caller to add or delete memory (speed) dialing codes or to make a memory dialing call. In the event the "*300" code has not been entered, then decision block 1742 routes execution, via its NO path, to decision block 1751. This latter decision block determines if the caller has entered the "*600" code. If this code has been entered, then decision block 1751 routes execution, via its YES path, to block 1755. This block, when executed, invokes Ring Update *600 routine 4800 (see FIG. 48 which will be discussed below) which enables the caller to change the number of rings that must occur for an incoming call before his no-answer service script is invoked. Now, if the caller has not entered the "*600" code, then decision block 1751 routes execution, via its NO path, to decision block 1759. This latter decision block determines if the caller has entered the "*700" code. If this code has been entered, then decision block 1759 routes execution, via its YES path, to block 1763. This block, when executed, invokes Voice Announcement *700 routine 4900 (see FIGS. 49A-49C which will be discussed below) which permits the caller to record a personal, group or outgoing announcement. In the event the "700" code has not been entered, then decision block 1759 routes execution, via its NO path, to decision block 1767. This latter decision block determines if the caller has entered the "*800" code. If this code has been entered, then decision block 1767 routes execution, via its YES path, to block 1772. This block, when executed, invokes Queued Call Back Retrieval *800 routine 5300 (see FIGS. 53A and 53B which will be discussed below) which permits the caller to pre-defined voice messages regarding any queued calls. The last service code is "*950". In the event that the caller has not entered the "*800" code, then decision block 1767 routes execution, via its NO path, to decision block 1777. This latter decision block determines if the caller has entered the "*950" code. If this code has been entered, then decision block 1777 routes execution, via its YES path, to block 1779. This block, when executed, invokes Change PIN *950 routine 5400 (see FIGS. 54A-54D which will be discussed below) which permits the caller to change his existing four digit personal identification number to a different four digit number. Once either block 1734, 1739, 1746, 1755, 1763, 1772 or 1779 has executed, then execution proceeds, Via path 1735, 1740, 1748, 1757, 1765, 1774 or 1781, respectively, and path 1788 to exit from routine 1700 and appropriately return to entry point A in SSP Process routine 800 (see FIGS. 8A-8C).

Now, in the event, the caller has entered a code that is different from any of the pre-defined codes, then an erroneous entry has occurred and decision block 1777 routes execution, via its NO path, to block 1785. This latter block, when executed, places a request in IP Process mailbox 644 to instruct the IP Process to assign an available speech synthesizer and produce a pre-defined error message that requests the caller to re-enter the digits. This block instructs the host processor to simply ignore the digits (clear a corresponding memory location) that were just previously entered. Thereafter, once the synthesized voice message has been completed, this block instructs the programmable switch to provide dial tone to the caller as a prompt to enter the new digits. Once the instruction has been sent to the switch, then block 1785 has completely executed. At this point, execution exits from routine 1700 and appropriately returns to entry point A in SSP Process routine 800 (see FIGS. 8A-8C).

10. Functional Components

At this point the discussion will examine in detail specific functional components (FCs) that are executed by the SSP Process.

a. Answer FC Routine 1800

Figure 18:
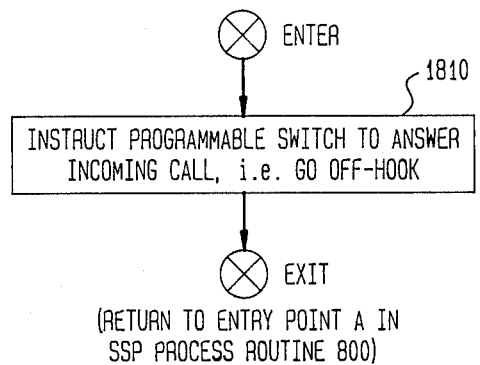
FIG. 18 depicts a flowchart of Answer Functional Component (FC) Routine 1800.

A flowchart of Answer Functional Component (FC) Routine 1800 is depicted in FIG. 18. The calling statement for this FC is basically "ANSWER" followed by no parameters. This routine, when executed, merely instructs the programmable switch, through execution of block 1810, to answer an incoming call appearing on a specific incoming trunk, i.e. take that trunk off-hook. This FC merely causes the caller to be connected to the programmable switch but not to the called party. Once block 1810 has executed, then execution exits from this routine and returns to entry point A in SSP Process routine 800 (see FIGS. 8A-8C).

b. Call Forward Routine 1900

Figure 19:
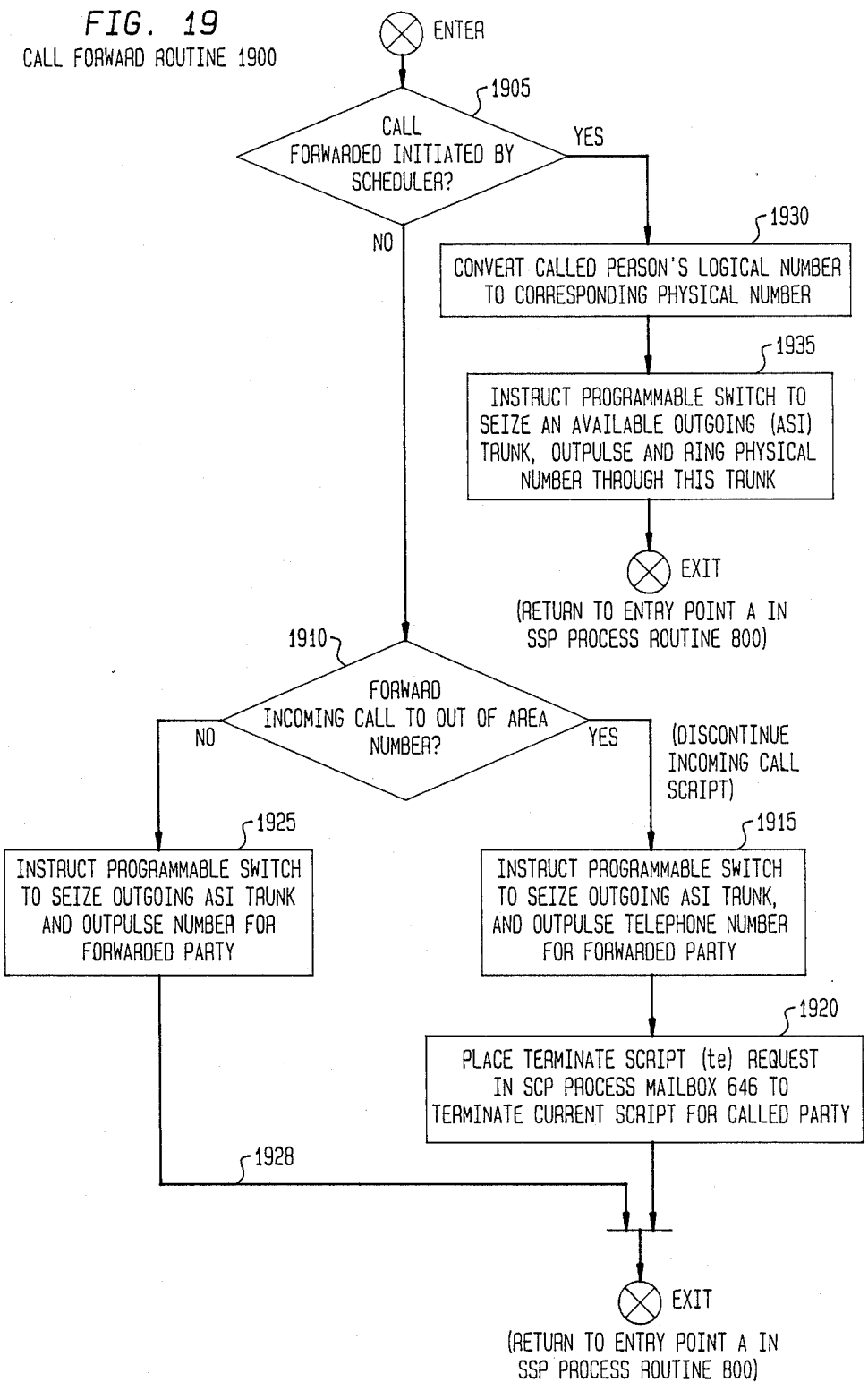
FIG. 19 depicts a flowchart of Call Forward FC Routine 1900.

A flowchart of Call Forward FC Routine 1900 is shown in FIG. 19. Execution of this FC causes a call from a calling party to be forwarded to another telephone number. "CALL_FORWARD" followed by a 4 digit centrex, 7 digit local or 10 digit long distance number to which a call is to be forwarded.

Upon entry into this FC, execution first proceeds to decision block 1905. This block determines whether the call is to be forwarded at the request of a scheduler for a specific subscriber, i.e. whether the subscriber's scheduler trigger has just been set. Each MSN subscriber has his or her own scheduler and, as described above, can set a trigger to occur at a specific date and time in order to cause execution of that person's time and date service script. This script can be used to place a call to any number at a specific time and date. Now, if decision block 1905 determines that a subscriber's scheduler invoked call forwarding, then execution is routed from this decision block, via its YES path, to block 1930. This latter block, when executed, performs a database look-up operation on the host processor to convert the logical number specified in the CALL_FORWARD statement into a corresponding physical number. Once this has occurred, execution proceeds to block 1935 which, when executed, instructs the programmable switch to seize an available outgoing ASI trunk, and then outpulse and ring this physical number. Once this call has been placed, execution exits from routine 1900 and appropriately returns to entry point A in SSP Process routine 800 (see FIGS. 8A-8C).

Now, in the event that call forwarding was not initiated by a subscriber's scheduler, then decision block 1905 routes execution, via its NO path, to decision block 1910. This latter decision block, when executed, determines from the forwarded number whether the incoming call is to be forwarded out of the service area being handled by the local switch. Inasmuch as the MSN is unable to receive any messages from a far end switch, then, if out of area forwarding is to occur, the incoming call script for the called party must be terminated once the out of area call has been placed, i.e. forwarded out of area. To provide this result for out of area forwarding, decision block 1910 routes execution, via its YES path, to block 1915. This latter block, when executed, instructs the programmable switch to seize an available outgoing ASI trunk and then outpulse the telephone number to which the present call is to be forwarded. Once these operations have occurred, execution proceeds to block 1920 which, when executed, places a terminate script ("te") request in SCP Process mailbox 646 which instructs the SCP Process, as discussed above, to terminate the incoming call script that is currently executing for the called party. After block 1920 has executed, execution exits from routine 1900 and suitably returns to entry point A in SSP Process routine 800 (see FIGS. 8A-8C).

If, however, the call is to be forwarded within the service area of the local switch, then decision block 1910 routes execution, via its NO path, to block 1925. This block, when executed, merely instructs the programmable switch to forward the call, i.e. seize an outgoing ASI trunk and then outpulse the call to the specified number. Since the party receiving the call is within the service area of the local switch, the MSN remains able to receive messages over the SMD datalink regarding the forwarded call. In this case, there is no need to terminate the incoming call service script for the called party. Consequently, once the call has been forwarded, execution proceeds from block 1925 to exit from routine 1900 and appropriately return to entry point A in SSP Process routine 800.

c. Check ANI FC Routine 2000

Figure 20:
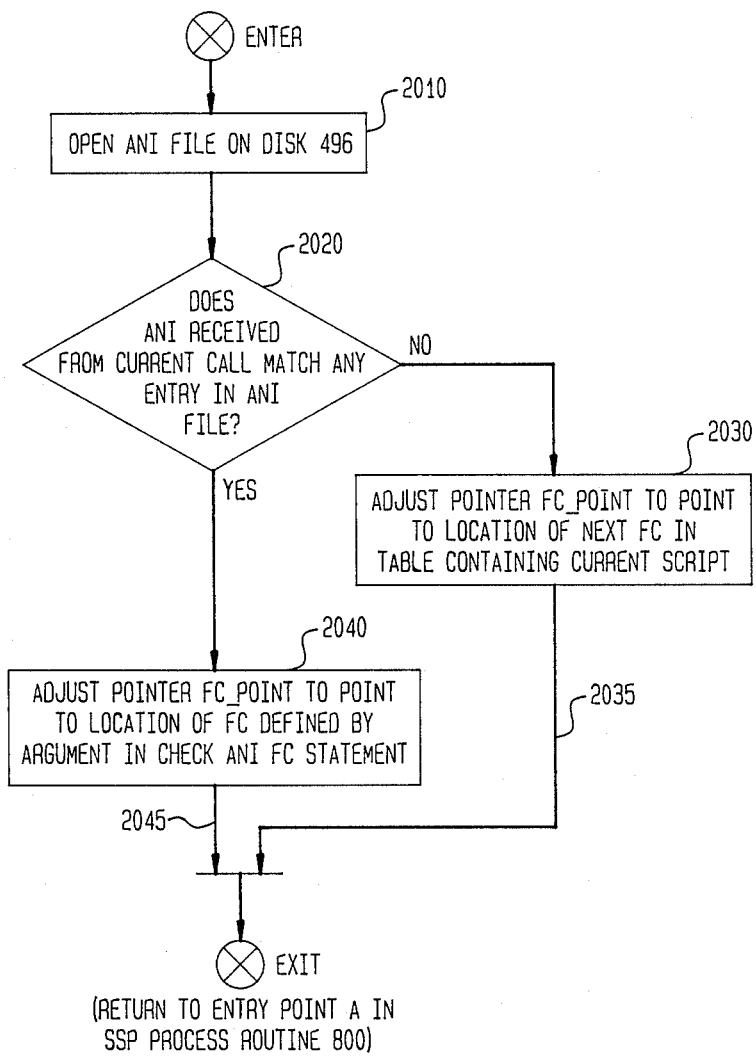
FIG. 20 depicts a flowchart of Check ANI FC Routine 2000.

A flowchart of Check ANI Routine 2000 is shown in FIG. 20. Execution of this FC checks the phone number of the caller (ANI—automatic number identification, which is provided by a local switch for a call originating within the service area of the switch) against a list of specified numbers in a file to find a match therebetween. The calling statement for this FC is basically "CHECK_ANI" followed by two arguments, $A_1$ and $A_2$, where $A_1$ is a label in of an FC in a script to which execution will branch in the event a match occurs and $A_2$ is a filename containing pre-defined ANI numbers for a subscriber. If the file contains an entry "NA" then a match will occur for any incoming out of area call.

Upon entry into routine 2000, execution proceeds to block 2010 which, when executed, opens a corresponding file, containing ANI information, which has a name specified by the argument $A_2$ and exists on disk 496 (see FIGS. 4A-4D). Thereafter, execution proceeds to decision block 2020. This decision block determines if a match occurs between the telephone number of the caller and any telephone number stored within this ANI file. If such a match does not occur, then execution is routed to block 2030 which sets the value of a pointer (FC_POINT) to point to the next sequential FC in the currently executing service script for the called party. Alternatively, in the event that a match does occur, then decision block 2020 routes execution, via its YES path, to block 2040. This latter block, when executed, sets the value of the pointer (FC_POINT) to point to the FC, occurring in the currently executing service script for the called party, that has a label specified by argument $A_1$. Once block 2030 or block 2040 has executed, execution exits from routine 2000, via respective path 2035 or path 2045, and appropriately returns to entry point A in SSP Process routine 800 (see FIGS. 8A-8C).

d. Check Message FC Routine 2100

Figure 21B:
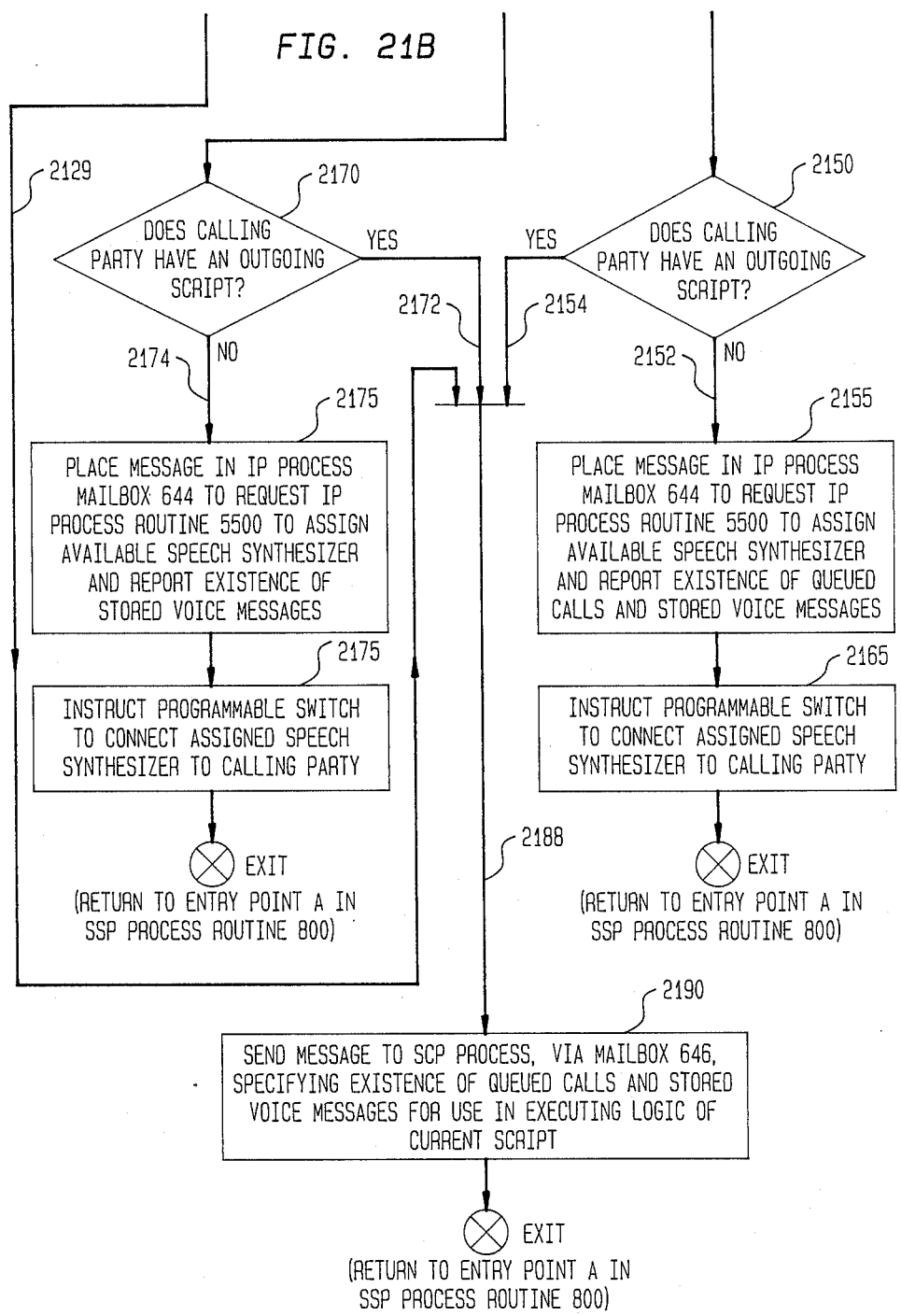

A flowchart of Check Message FC Routine 2100 is collectively depicted in FIGS. 21A and 21B, for which the proper alignment of the drawing sheets for these figures is shown in FIG. 21. This FC, when executed, determines whether a caller has any stored voice messages or queued telephone numbers in his queue and returns the following results: "0" if no voice messages and queued call back telephone numbers exists for the caller, "1" if only queued (call back) telephone numbers exist in the queue, "2" if only voice messages exist and "3" if queued telephone numbers and voice messages exist in the queue. The calling statement for this FC is basically "CHECK_MESSAGE" followed by one argument, $A_1$, where $A_1$ is a label of an FC in a script to which execution will branch once this FC has been completely executed. Inasmuch as this FC returns a result, this FC should be followed by at least one Return Result FC in order for a script to produce an appropriate response. This FC should also be followed by a Wait FC in order to ensure that an appropriate voice message, as discussed below, to the caller regarding the existence of stored voice messages and/or queued telephone numbers, has been completely generated before the next FC begins executing.

Now, upon entry into routine 2100 as shown in FIGS. 21A and 21B, execution proceeds to decision block 2105. This decision block determines whether any stored voice messages exist for the caller. If such messages exist, then this decision block routes execution, via NO path 2109, to decision block 2110. This latter decision block determines whether any queued (called back) telephone numbers exist for the caller. If no queued (call back) telephone numbers exist, then decision block 2110 routes execution, via NO path 2114, to decision block 2115. This latter decision block determines whether the caller has an outgoing service script. In the event no such script exists for the caller, then decision block 2115 routes execution, via NO path 2119, to block 2120. This latter block merely instructs the programmable switch to provide dial tone to the caller. Once this instruction has been sent to the programmable switch, execution exits from routine 2100 and appropriately returns to entry point A in SSP Process routine 800 (see FIGS. 8A-8C). Alternatively, if the calling party has an outgoing script but no queued calls and no stored voice messages, then decision block 2115 routes execution, via YES path 2117 and paths 2129 and 2188 to block 2190. This block merely places an appropriate message in SCP Process mailbox 646 specifying that the caller has no stored voice messages and no queued telephone numbers. Once block 2190 has executed, execution exits from routine 2100 and appropriately returns to entry point A in SSP Process routine 800 (see FIGS. 8A-8C).

Now, if the caller has no stored voice messages but has queued (call back) telephone numbers, then decision block 2110 routes execution, via YES path 2112, to decision block 2125. This latter decision block determines whether the caller has an outgoing service script. If such a script exists, then this script will govern how the caller wants to handle queued telephone numbers. Therefore, should such a script exist, then decision block 2125 will route execution, via YES path 2127 and paths 2129 and 2188 to block 2190. In this case, block 2190 places an appropriate message in SCP Process mailbox 646 specifying that the caller only has queued (call back) telephone numbers. If, however, the caller does not have an outgoing service script, then decision block 2125 routes execution, via its NO path, to block 2130. This block, when executed, places a message in IP Process mailbox 644 to instruct the IP Process (IP Process routine 5500—see FIG. 55 which will be discussed below) to first assign an available speech synthesizer and then provide a pre-defined synthesized voice message reporting the existence of queued (call back) telephone numbers to the caller. Thereafter, as shown in FIGS. 21A and 21B, execution proceeds to block 2140 which instructs the programmable switch to connect a voice path between the assigned speech synthesizer and the caller. Execution then exits from routine 2100 and appropriately returns to entry point A in SSP Process routine 800 (see FIGS. 8A-8C).

Alternatively, if stored voice messages exist for the caller, then decision block 2105 routes execution, via YES path 2107, to decision block 2145. This latter decision block determines whether any queued (call back) telephone numbers exist for the caller. If any such queued telephone numbers exist for the caller, then decision block 2145 routes execution, via its YES path, to decision block 2150. This latter decision block determines whether the caller has an outgoing service script. If such a script exists, then the script will specify the manner in which the caller wants his queued telephone numbers and/or voice messages to be handled. Consequently, decision block 2150 routes execution, via YES path 2154 and path 2188, to block 2190, which in turn, merely places an appropriate message in SCP Process mailbox 646 specifying that the caller has both stored voice messages and queued telephone numbers. However, if the caller does not have an outgoing service script, the decision block 2150 routes execution, via NO path 2152, to block 2155. This block, when executed, places a message in IP Process mailbox 644 to instruct the IP Process (IP Process routine 5500) to first assign an available speech synthesizer and then provide a pre-defined synthesized voice message reporting the existence of stored voice messages and queued telephone numbers to the caller. Thereafter, execution proceeds to block 2165 which instructs the programmable switch to connect a voice path between the assigned speech synthesizer and the caller. Execution then exits from routine 2100 and appropriately returns to entry point A in SSP Process routine 800 (see FIGS. 8A-8C).

Now, if only stored voice messages exist for the caller, then decision block 2145 routes execution, via its NO path, to decision block 2170. This latter decision block determines whether the caller has an outgoing service script. In the event such a script has been defined, then decision block 2170 routes execution, via YES path 2172 and path 2188, to block 2190. In this case, block 2190 places an appropriate message in SCP Process mailbox 646 specifying that the caller only has stored voice messages. Now, if the caller does not have an outgoing service script, then decision block 2170 routes execution, via NO path 2174, to block 2175. This block, when executed, places a message in IP Process mailbox 644 to instruct IP Process routine 5500 to first assign an available speech synthesizer and then provide a pre-defined synthesized voice message reporting the existence of only stored voice messages to the caller. Thereafter, execution proceeds to block 2185 which instructs the programmable switch to connect a voice path between the assigned speech synthesizer and the caller. Execution then exits from routine 2100 and appropriately returns to entry point A in SSP Process routine 800 (see FIGS. 8A-8C).

e. Collect Digits FC Routine 2200

FIG. 22 depicts a flowchart of Collect Digits FC Routine 2200. This FC sets various flags in order to collect the values of a series of one or more digits from either the caller or called party. Digit Collection routine 1700 (discussed above in connection with see FIGS. 17A-17C) is used to obtain the values of each digit and provide an appropriate response. The calling statement for this FC is basically "COLLECT_DIGIT" followed by six arguments, $A_1$, $A_2$, $A_3$, $A_4$, $A_5$ and $A_6$, wherein: $A_1$ is a label of the next FC in the script to which execution should branch; $A_2$ identifies the party from which the digit(s) is to be collected ("0"=caller, "1"=called party); $A_3$ specifies the number of digits to collect; $A_4$ specifies the terminating character of the digit string ("*", "#"; or, if no terminating digit is desired, then any alphanumeric character can appear); and $A_5$ and $A_6$ specify timeout values, in seconds, for inter-digit and first digit timers, respectively. Inasmuch as this FC returns a result, this FC should be followed by at least one Return Result FC in order for a script to produce an appropriate response.

Upon entry into routine 2200, as shown in FIG. 22, execution proceeds to decision block 2210. This decision block determines, from the value of argument $A_2$, whether a digit(s) is to be collected from the caller or called party. If the digit(s) is to originate with the called party, then decision block 2210 routes execution, via path 2213, to block 2220. This latter block, when executed, instructs the programmable switch to connect an available DTMF receiver to the called party. Alternatively, if the caller is to enter the digit(s), then decision block 2210 routes execution, via path 2216, to block 2230. This latter block, when executed, instructs the programmable switch to connect an available DTMF receiver to the caller. Once block 2220 or block 2230 has executed, then execution is routed, via respective paths 2225 or 2235, to block 2240. Block 2240, when executed, sets the value of a variable, associated with the terminating character, to the value specified by argument $A_4$. Thereafter, execution proceeds to block 2250 which sets a variable associated with the number of digits to be collected, to the value specified by the argument $A_3$. Once this has occurred, execution sequentially proceeds to blocks 2260 and 2270 which set the values of two software timers, an inter-digit software timer and a first digit software timer, to specified time periods. The inter-digit time period is a maximum allowable time interval, specified in seconds by the value of argument $A_5$, for a party to enter successive digits of a number. This timer may illustratively be set for 4 or 5 seconds. The first digit time period is a maximum allowable time interval, specified in seconds by the value of argument $A_6$, for a party to enter a first digit of a number. This timer may illustratively be set to 120 seconds. Once both of these timers have been set, execution then exits from routine 2200 and appropriately returns to entry point A in SSP Process routine 800 (see FIGS. 8A-8C).

f. Customer Answer FC Routine 2300

Figure 23:
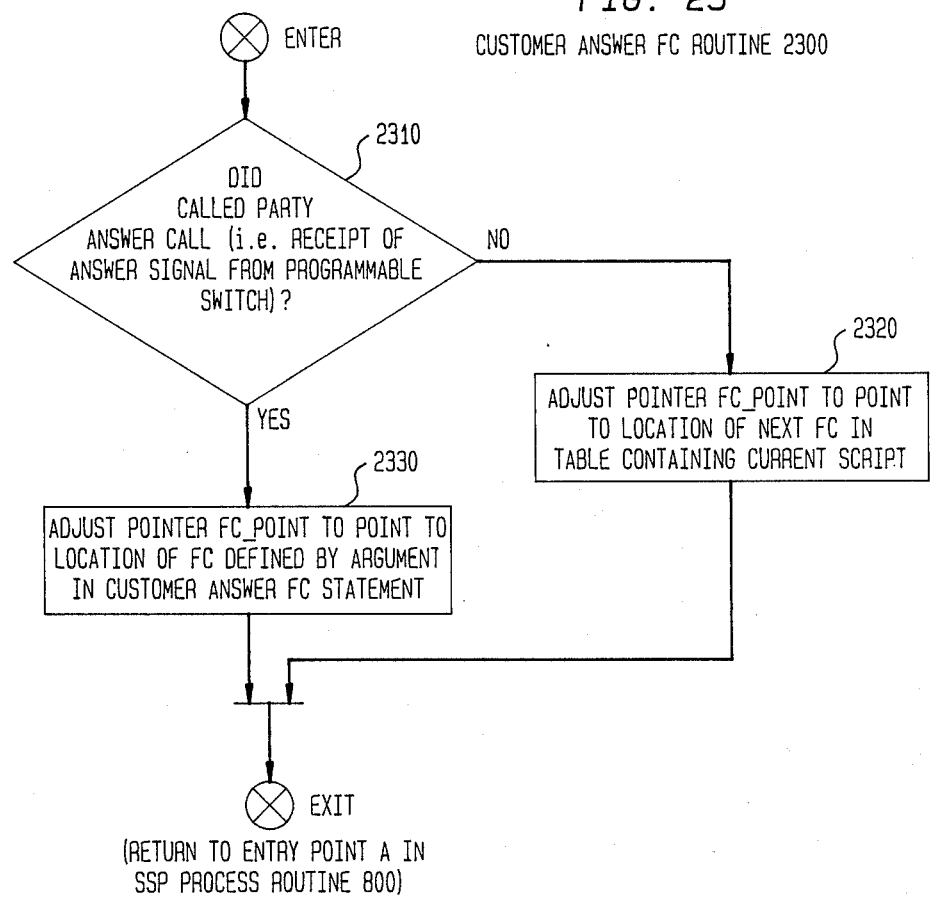
FIG. 23 depicts a flowchart of Customer Answer FC Routine 2300.

FIG. 23 depicts a flowchart of Customer Answer FC Routine 2300. This FC merely specifies where, in the current script, execution should branch in the event a called party answers his or her telephone. The calling statement for this FC is basically "CUSTOMER_ANSWER" followed by one argument, $A_1$, wherein $A_1$ is a label of the FC within the current script to where execution should branch.

Upon entry into routine 2300, execution proceeds to decision block 2310. This decision block, when executed, determines, through receipt of an answer signal provided by the programmable switch to the host processor, whether the called party did, in fact, answer a current call. If the called party did answer, then execution passes, via the YES path emanating from decision block 2310, to block 2330. This latter block adjusts the value of pointer FC_POINT to point to the FC in the current script having a label defined by argument $A_1$. Alternatively, if the called party did not answer his or her telephone, then decision block 2310 routes execution, via its NO path, to block 2320. This latter block adjusts the value of pointer FC_POINT to point to the location of the next successive FC in the current script. Once either block 2320 or block 2330 has executed, execution exits from routine 2300 and appropriately returns to entry point A in SSP Process routine 800 (see FIGS. 8A-8C).

g. Dialing FC Routine 2400

Figure 24:
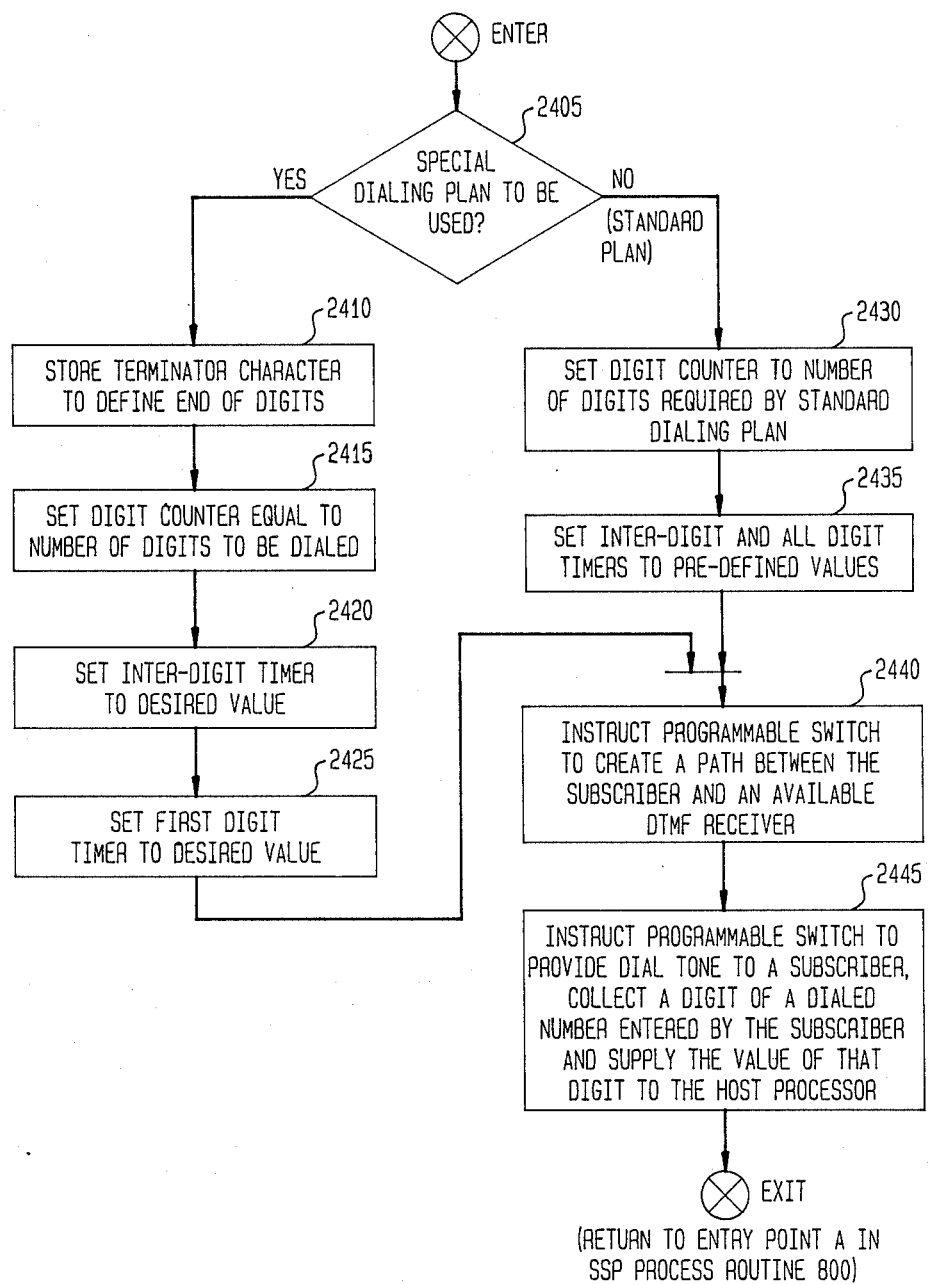
FIG. 24 depicts a flowchart of Dialing FC Routine 2400.

FIG. 24 depicts a flowchart of Dialing FC Routine 2400. This FC sets various timers and counters in order to allow a caller to establish a special dialing plan formed of a series of one or more digits or use a standard dialing plan. This FC also instructs the programmable switch to provide dial tone to a subscriber and then collect a digit from the subscriber that forms a telephone number of another party for use in, for example, placing an outgoing call or adding a party to a conference call. Now, once a digit has been entered by the subscriber, the programmable switch generates an appropriate event which, through subsequent execution of SSP Process Routine 800, invokes Digit Collection Routine 1700, as discussed above, to continue obtaining digits from the subscriber and, upon entry of an appropriate terminating character after the last digit of the telephone number, then place a call to this party. As such, the Dialing FC is often used as part of an outgoing service script. The calling statement for the Dialing FC is basically "DIALING" followed by six arguments, $A_1$, $A_2$, $A_3$, $A_4$, $A_5$ and $A_6$, wherein: $A_1$ is a label of the next FC within the current script to where execution should branch once the Dialing FC has been completely executed; $A_2$ specifies whether a special dialing plan is being established ("0"=no special access codes have been established, "1"=such codes exist); $A_3$ specifies the number of digits to collect; $A_4$ specifies the terminating character of the special dialing plan (usually a "#"); and $A_5$ and $A_6$ specify timeout values, in seconds, for the inter-digit and first digit timers.

Upon entry into routine 2400, as shown in FIG. 24, execution proceeds to decision block 2405. This block, when executed, determines, through the value of argument $A_2$, whether the caller is establishing a special dialing plan. If a special dialing plan is not being established (i.e. the plan used is whatever standard dialing plan has been programmed into the local switch, e.g. centrex, in which a "9" may need to be dialed first, or standard ten digit POTS), then decision block 2405 routes execution, via its NO path, to block 2430. This block sets a variable that stores the number of digits in the plan to the value required by the standard dialing plan (e.g. ten for standard POTS service). Execution then proceeds to block 2435 which, when executed, sets the values of the inter-digit and first digit software timers to pre-defined values. Once this has occurred, execution proceeds to block 2440.

Alternatively, if a special dialing plan is to be established, then decision block 2405 routes execution, via its YES path, to block 2410. This latter block, when executed, sets the value of a variable, associated with the terminating character, to the value specified by argument $A_4$. Thereafter, execution proceeds to block 2415 which sets a variable associated with the number of digits to be collected, to the value specified by argument $A_3$. Once this has occurred, execution sequentially proceeds to blocks 2420 and 2425 which set the values of the inter-digit software timer and a first digit software timer to time periods defined by the values of arguments $A_5$ and $A_6$, respectively. Once both of these timers have been set, execution then proceeds to block 2440.

Block 2440, when executed, instructs the programmable switch to create a path between the caller and an available DTMF receiver within DTMF receiver-/transmitters 423 (see FIGS. 4A–4D). Thereafter, execution proceeds to block 2445 which instructs the programmable switch to: provide dial tone to the subscriber, collect a digit that the subscriber will subsequently enter (which forms part of a telephone number) and supply the value of that digit to the host processor. Once block 2445 has completely executed, execution then exits from routine 2400 and appropriately returns to entry point A in SSP Process Routine 800 (see FIGS. 8A–8C).

h. Give Path FC Routine 2500

Figure 25A:
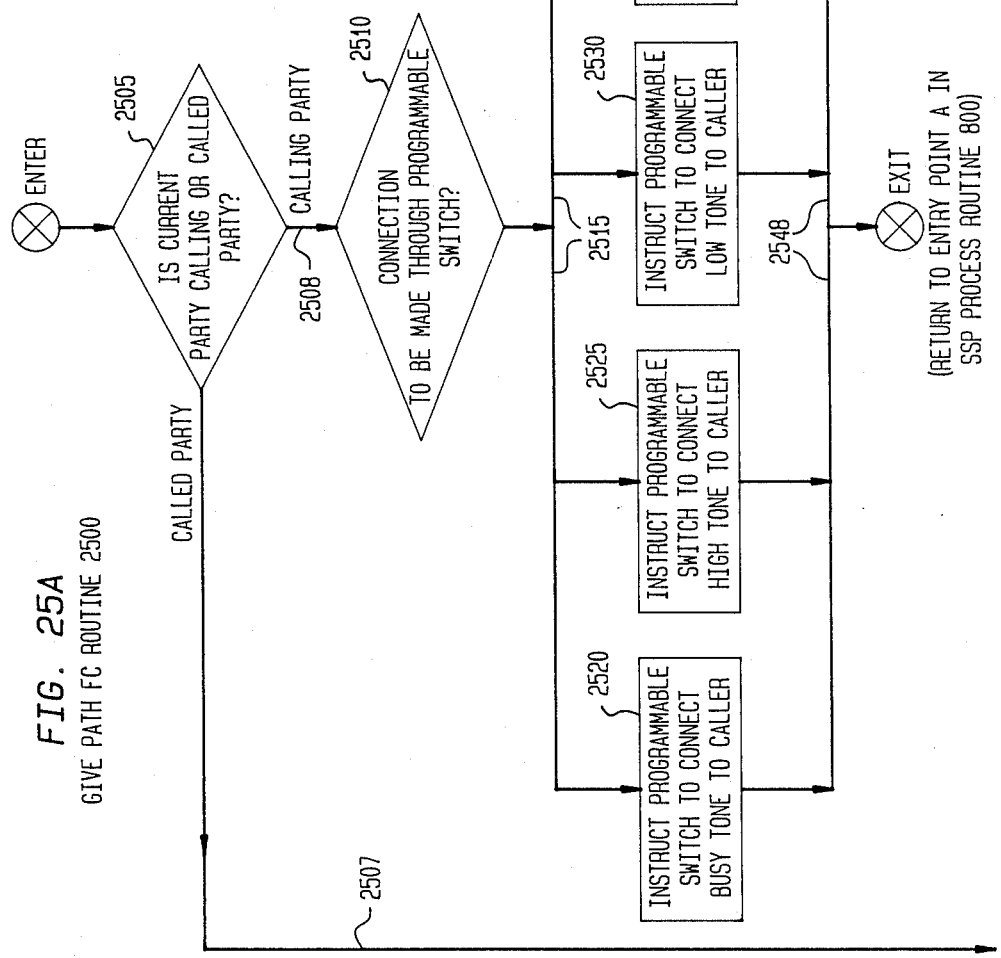

A flowchart of Give Path FC Routine 2500 is collectively depicted in FIGS. 25A and 25B, for which the correct alignment of the drawing sheets for these figures is shown in FIG. 25. This FC instructs the programmable switch to establish a real time voice connection between two different parties or between one party and a high or low pitched or ringback tone, a busy tone or music source. The calling statement for this FC is basically "GIVE PATH" followed by three arguments: $A_1$, $A_2$ and $A_3$. If the value of argument $A_2$ is "2", "3", "4" or "5", then the value of argument $A_1$ indicates who is connected to the busy tone or music: "0" for a new caller in a busy script, "1" for a called party, and "2" for a caller in situations other than in a busy script. If, however, the values of arguments $A_2$ and $A_3$ are both zero, then the caller and called parties are connected together. If the values of arguments $A_2$ and $A_3$ are zero and one, respectively, then the called party is connected to the original caller in a call waiting situation (occurring within a busy script). If the values of arguments $A_2$ and $A_3$ are both one, then the called party is connected to a new caller in a call waiting situation (occurring within a busy script). If a party is to be connected to music, then the value of argument $A_2$ is set to five and that of argument $A_3$ is set to zero. Alternatively, if a party is to be connected to a busy tone, then the value of argument $A_2$ is set to two, three or four and the value of argument $A_3$ specifies the duration of the busy tone in tenths of seconds. To facilitate understanding, the flowchart for this FC shows these different switching functions and, in simplified form, the associated instruction decoding operations.

Now, upon entry into this routine, execution proceeds to decision block 2505. This decision block determines, using the arguments given in the FC statement, whether the current party who is to be connected is the caller (calling) or called party. If the current party is the calling party, then decision block 2505 routes execution, via path 2508, to decision block 2510. This latter decision block, when executed, further decodes the arguments in the FC statement to appropriately instruct the programmable switch to set up the appropriate connection involving the caller. Specifically, based upon the values of these arguments, decision block 2510 routes execution, via path 2512, to one of five blocks 2520, 2525, 2530, 2535 or 2540, to instruct the programmable switch to connect the caller to a busy tone, a high pitched tone, a low pitched tone, a music source or to a ringback tone. Once any of these five blocks has executed, then execution proceeds, via path 2548, to exit from routine 2500 and appropriately return to SSP Process Routine 800 (see FIGS. 8A–8C).

Now, alternatively, if the current party to be connected is the called party, then decision block 2505 routes execution, via path 2507, to decision block 2550. This latter decision block, when executed, further decodes the arguments in the FC statement to instruct the programmable switch to set up the appropriate connection involving the called party. Specifically, based upon the values of these arguments, decision block 2550 routes execution, via path 2552, to one of seven blocks 2560, 2565, 2570, 2575, 2580, 2585 or 2590, to instruct the programmable switch to connect the called party to a first caller, a second caller in a call waiting situation, a busy tone, a high pitched tone, a low pitched tone, a music source or to a ringback tone. Once any of these seven blocks has executed, then execution proceeds, via path 2598, to exit from routine 2500 and appropriately return to SSP Process Routine 800 (see FIGS. 8A–8C).

i. Go To FC Routine 2600

FIG. 26 depicts a flowchart of Go To FC Routine 2600. This FC merely indicates the next FC in the current script that should be executed. The calling statement for this FC is basically "GO_TO" followed by one argument, $A_1$, wherein $A_1$ is a label of the FC within the current script to where execution should branch.

Specifically, upon entry into routine 2600, block 2610 is executed to adjust the value of pointer FC_POINT to the location corresponding to the label appearing in argument $A_1$. Once this occurs, execution returns from this routine to SCP Process routine 700 (see FIG. 7).

j. Hang-Up FC Routine 2700

FIG. 27 depicts a flowchart of Hang-Up FC Routine 2700. This FC merely indicates the next FC in the current script that should be executed in the event the calling party hangs up, i.e. goes on-hook. The calling statement for this FC is "HANG_UP" followed by one argument, $A_1$, wherein $A_1$ is a label of the FC within the current script to where execution should branch when the calling party goes on-hook.

Specifically, upon entry into routine 2700, block 2710 is executed to adjust the value of pointer FC_POINT to the location corresponding to the label appearing in argument $A_1$. Once this occurs, execution returns from this routine to SCP Process routine 700 (see FIG. 7).

h. Quit FC Routine 2800

FIG. 28 depicts a flowchart of Quit FC Routine 2800. This FC merely indicates that the current script should terminate. The calling statement for this FC is "QUIT" without any arguments.

Specifically, upon into routine 2800, block 2810 is executed to place a terminate script ("te") request into SCP Process mailbox 646 to instruct the SCP Process to terminate the current script, as described above. Once this occurs, execution returns from this routine to entry point A in SSP Process 800 (see FIGS. 8A–8C).

i Page FC Routine 2900

FIG. 29 depicts a flowchart of Page FC Routine 2900. This FC instructs the programmable switch to route a four digit serial code, over a pre-defined dedicated line, to a radio paging system located in a central office. The calling statement for this FC is "PAGE" followed by one argument, $A_1$, wherein $A_1$ is a four digit code number assigned to a desired pager.

Specifically, upon entry into routine 2900, execution proceeds to block 2905. This block, when executed, instructs the programmable switch to seize a predefined dedicated line (line 421 shown in FIGS. 4A-4D) that connects to the radio paging system. Once this has occurred, as shown in FIG. 29, block 2910 is executed. This block obtains the pager number (P_NUM) from argument $A_1$ in the calling statement of this FC and supplies the number to the programmable switch. Execution then proceeds to decision block 2915. This block, when executed, determines, in response to a seizure acknowledgement signal provided by the programmable switch to the host processor, whether line 421 has been seized. If this line has been seized, then decision block 2915 routes execution, via YES path 2917, to block 2920. This latter block, when executed, instructs the programmable switch to serially transmit the pager number (P_NUM) over seized line 421 to the radio paging system. Alternatively, if line 421 could not be seized (the line is down for example), then an error condition has occurred. In this case, decision block 2915 routes execution, via NO path 2919, to block 2925. This latter block, when executed, inserts an appropriate error message, "Paging Line Seizure Not Acknowledged", into an error file residing on host processor 490. After block 2920 or block 2925 has executed, then execution exits from routine 2900 and appropriately returns to entry point A in SSP Process Routine 800 (see FIGS. 8A-8C).

j. Play Voice Message FC Routine 3000

FIG. 30 depicts a flowchart of Play Voice Message FC Routine 3000. This FC instructs the IP Process to play a specified voice message (here an announcement) that has been recorded using one of the speech digitizers. The calling statement for this FC is basically "PLAY_ANNOUNCEMENT" followed by five arguments: $A_1$, $A_2$, $A_3$, $A_4$ and $A_5$, wherein: $A_1$ is a label of the next FC within the current script to where execution should branch once the Play Announcement FC has been completely executed; $A_2$ specifies who will hear the announcement (zero for caller and one for called party); $A_3$ is a name of a file containing the announcement to be produced; $A_4$ specifies whether music is to follow the announcement and $A_5$ specifies whether the script should execute the next FC immediately or wait until the digitize voice message (announcement) has been completely produced.

Specifically, upon entry into routine 3000, execution proceeds to decision block 3010. This decision block determines, using the value of argument $A_2$, who is to hear a digitized voice message. If the calling party is to hear the message, then decision block 3010 routes execution, via path 3013, to block 3020. This block, when executed, places a request in IP Process mailbox 644 to instruct the IP Process to assign an available speech digitizer and play an announcement stored within the file specified by the name given in argument $A_3$. Thereafter, execution proceeds to block 3030 which instructs the programmable switch to connect the assigned digitizer to the calling party (caller). If, however, the called party is to hear the message, then decision block 3010 routes execution, via path 3016, to block 3040. This block, when executed, places a request in IP Process mailbox 644 to instruct the IP Process to assign an available speech digitizer and play the announcement stored within the file specified by the name given in argument $A_3$. Thereafter, execution proceeds to block 3050 which instructs the programmable switch to connect the assigned digitizer to the called party. Now, once block 3030 or block 3050 has executed, then execution proceeds to decision block 3070. This block determined, based upon the value of argument $A_4$, whether the party hearing the announcement should hear music at the conclusion of the announcement. If music is to be heard, then decision block 3070 routes execution, via its YES path, to block 3080. This latter block, when executed, merely sets a music flag. Once this occurs, execution exits from routine 3000 and appropriately returns to SSP Process routine 800 (see FIGS. 8a-8C). The MUSIC flag is subsequently reset by the IP Process after it instructs the programmable switch to connect music to the party after the messages have been completely played by the assigned digitizer.

k. Play Digit FC Routine 3100

Figure 31B:
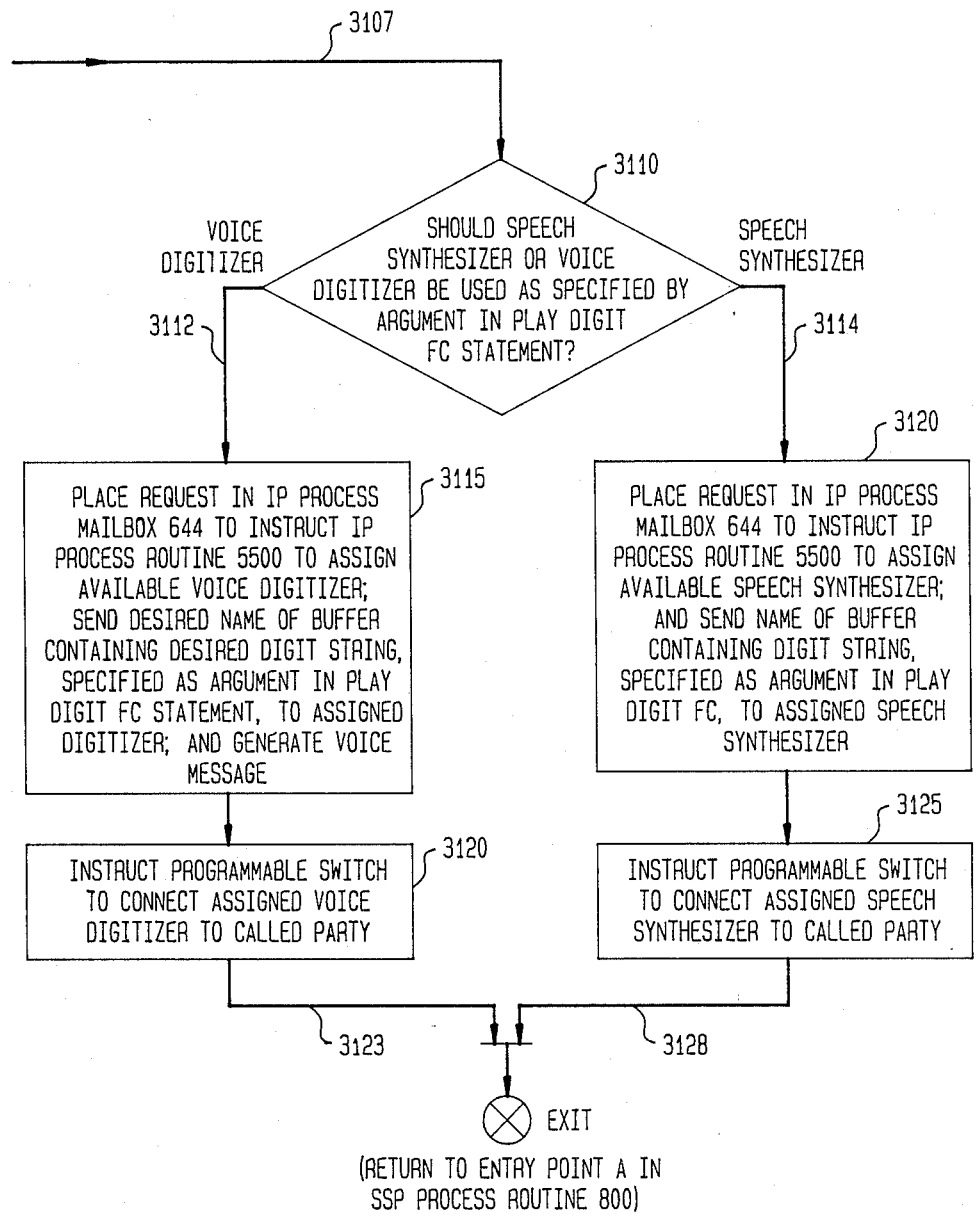

A flowchart of Play Digit FC Routine 3100 is collectively depicted in FIGS. 31A and 31B, for which the correct alignment of the drawing sheets for these figures is shown in FIG. 31. This FC instructs the IP Process to produce a string containing one or more spoken digits, either through a speech synthesizer or a voice digitizer, to the calling or called party. The calling statement for this FC is basically "PLAY_DIGIT" followed by three arguments: $A_1$, $A_2$, and $A_3$, wherein: the value of argument $A_1$ specifies who will hear the digit string (zero for caller and one for called party), the value of argument $A_2$ specifies whether the digit string will be spoken (argument $A_2$ is zero) using a pre-defined (digitized) voice announcement stored on the voice messaging system or be synthesized (argument $A_2$ is one) by an available speech synthesizer; and $A_3$ specifies the name of a buffer containing either the digit string to be spoken or a pre-recorded digitized voice message therefor.

Specifically, upon entry into routine 3100, execution proceeds to block 3105 which, when executed, determines, based upon the value of argument $A_1$, whether the calling (caller) or called party is to hear the digit string. In the event the caller is to hear the digit string, then decision block 3105 passes execution, via path 3109, to block 3130. This latter block, determines based upon the value of argument $A_2$, whether the speech synthesizer or voice digitizer is to produce the desired digit string. If a voice digitizer is to produce the digit string, then execution proceeds, via path 3134, to block 3150. This latter block, when executed, places a request in IP Process mailbox 644 to instruct the IP Process to assign an available voice digitizer, send the name of the buffer containing a pre-recorded digitized voice message for the pre-recorded digit string to the available voice digitizer, and then generate the digit string. Thereafter, execution proceeds to block 3155 to instruct the programmable switch to connect the assigned voice digitizer to the caller. Alternatively, if the digit string is to be produced by a speech synthesizer, then decision block 3130 routes execution, via path 3132, to block 3135. This latter block, when executed, places a request in IP Process mailbox 644 to instruct the IP Process to assign an available speech synthesizer, send the name of the buffer containing the digit string to the available speech synthesizer, and then generate the digit string. Thereafter, execution proceeds to block 3140 to instruct the programmable switch to connect the assigned speech synthesizer to the caller.

Now, if the called party is to hear the digit string, then execution block 3105 routes execution, via path 3107, to execution block 3110. This latter block, when executed, determines based upon the value of argument $A_2$, whether the speech synthesizer or voice digitizer is to produce the desired digit string. If a voice digitizer is to produce the digit string, then execution proceeds, via path 3112, to block 3115. This latter block, when executed, places a request in IP Process mailbox 644 to instruct the IP Process to assign an available voice digitizer, send the name of the buffer containing a pre-recorded digitized voice message for the pre-recorded digit string to the available voice digitizer, and then generate the digit string. Thereafter, execution proceeds to block 3120 to instruct the programmable switch to connect the assigned voice digitizer to the called party. Alternatively, if the digit string is to be synthesized by a speech synthesizer, then decision block 3110 routes execution, via path 3114, to block 3120. This latter block, when executed, places a request in IP Process mailbox 644 to instruct the IP Process to assign an available speech synthesizer, send the name of the buffer containing the digit string to the available speech synthesizer, and then generate the digit string. Thereafter, execution proceeds to block 3125 to instruct the programmable switch to connect the assigned speech synthesizer to the called party. Once block 3155, 3140, 3125 or 3120 has executed, execution then exits, via path 3158, 3148, 3128 or 3123, respectively, from routine 3100 to entry point A in SSP routine 800 (see FIGS. 8A-8C).

l. Record Message FC Routine 3200

FIG. 32 depicts a flowchart of Record Message FC Routine 3200. This FC instructs the IP Process to record a voice message (here an announcement) from either the caller or called party using a voice digitizer. The calling statement for this FC is basically "RECORD_ANNOUNCEMENT" followed by three arguments: $A_1$, $A_2$, and $A_3$, wherein: $A_1$ is a label of the next FC within the current script to where execution should branch once the Record Announcement FC has been completely executed; $A_2$ specifies who will hear the announcement (zero for caller and one for called party); and $A_3$ is the telephone number under which the recorded messages should be stored on disk 487 (see FIGS. 4A-4D) within the voice messaging system.

Specifically, upon entry into routine 3200, execution proceeds to block 3210 which creates a new entry in the voice message file stored within host computer 499 (see FIGS. 4A-4D) for the party specified by the telephone number in argument $A_3$. The host computer voice message files are indexed by telephone number and illustratively named f+tel no., e.g. f7581234. A party's host voice message file contains each file name, in a separate corresponding entry, of every voice message stored for that party within the voice messaging system. Now, once the new entry has been created, execution passes, as shown in FIG. 32, to block 3220. This block, when executed, instructs computer 489 (see FIGS. 4A-4D) located within voice messaging system 487 to establish a new voice message file corresponding to the new entry just created on the host for the party specified by the value of argument $A_2$, which is generally the called party. Thereafter, execution proceeds to block 3230 which places a request in IP Process mailbox 644 to instruct the IP Process to assign an available voice digitizer and record the digitized message in the new voice message file stored within the voice messaging system for the specified party. Thereafter, execution proceeds to block 3240 which, when executed, instructs the programmable switch to connect the assigned digitizer to the specified party. Once this has occurred, execution exits from routine 3200 and appropriately returns to entry point A in SSP Process routine 800 (see FIGS. 8A-8C).

m. Record Telephone FC Routine 3300

Figure 33:
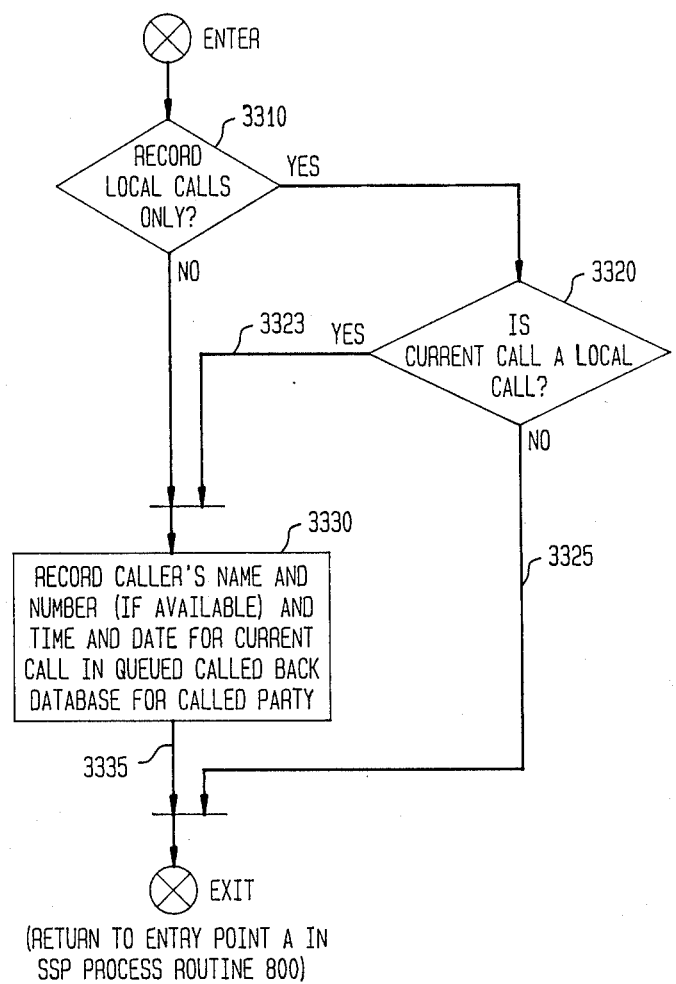
FIG. 33 depicts a flowchart of Record Telephone FC Routine 3300.

FIG. 33 depicts a flowchart of Record Telephone FC Routine 3300. This FC, when executed, records the caller's name and telephone number (if available), and the time and date of the current call in the queued call back file for the called party. The calling statement for this FC is basically "RECORD_TELEPHONE" followed by one argument, $A_1$, wherein $A_1$, if zero, specifies that only information regarding local calls (calls within the service area of the local switch) is to be recorded.

Specifically, upon entry into routine 3300, execution proceeds to decision block 3310. This decision block determines, based upon the value of argument $A_1$, whether information for only local calls is to be recorded. If information about all incoming calls is to be recorded, then decision block 3310 routes execution, via its NO path, to block 3330. This block, when executed, inserts an entry into a queued call back file for the called party. This entry contains the name and telephone number of the caller and the time and date of the call. If the call is an out of area call, then the entry will contain the phrase "out of area" along with the time and date. Once this has occurred, execution will proceed, via path 3335, to exit from routine 3300 and appropriately return to SSP Process Routine 800 (see FIGS. 8A-8C).

Alternatively, in the event information is to be recorded only for local calls, then decision block 3310 routes execution, via its YES path, to decision block 3320. This block, when executed, determines if the current incoming call is a local call. If this call is local, then decision block 3320 routes execution, via YES path 3323, to block 3330 to record information regarding this call. Alternatively, if the current call is not local and only local calls are to be recorded, then execution exits, via path 3325 emanating from decision block 3320, from routine 3300 and appropriately returns to SSP Process Routine 800 (see FIGS. 8A-8C).

n. Release Line FC Routine 3400

FIG. 34 depicts a flowchart of Release Line FC Routine 3400. This FC merely instructs the programmable switch to release a line. The calling statement for this FC is "RELEASE_LINE" followed by one argument, $A_1$, wherein the value of argument $A_1$ specifies which line is to be released (zero for caller, one for called party).

Specifically, upon entry into this routine, block 3410 is executed to instruct the programmable switch to release a line that is connected to either the caller or called party, depending upon the value of argument $A_1$. Thereafter, execution exits from routine 3400 and returns to entry point A in SSP Process routine 800 (see FIGS. 8A-8C).

o. Return Result FC Routine 3500

FIG. 35 depicts a simplified flowchart of Return Result FC Routine 3500. This FC specifies the label of the next FC to be executed in a current script if a match occurs between two results returned through execution of a prior FC and two pre-defined values. The calling statement for this FC is "RETURN_RESULT" followed by three arguments, $A_1$, $A_2$ and $A_3$, wherein the value of argument $A_1$ is a label of the next FC within the current script to where execution should branch in the event a match occurs, $A_2$ is a pre-defined digit string that is to be matched to a result produced by a prior FC; and $A_3$ specifies the number of digits to be matched. The pre-defined pattern to be matched may be a pre-defined string of digits, a certain number of unspecified digits or a time-out value. If only the number of digits is to be matched, then the value of argument $A_2$ is set to "X" (i.e. a don't care value). If a time-out value is to be matched, then $A_2$ is set to "TO" and $A_3$ is set to "X". Lastly, if a specific digit string is to be matched regardless of whether extra digits follow the string, then argument $A_3$ is set to "X".

Specifically, upon entry into routine 3500, execution proceeds to block 3510 which determines, based upon the value of argument $A_2$, whether the first value returned by a prior FC is to be matched. If the first value is to be matched, then decision block 3510 routes execution, via its NO path, to decision block 3515. This latter decision block determines whether, in fact, a match does occur between the first value and argument $A_2$. If a match does not occur, then decision block 3515 routes execution, via its NO path, to block 3520. This latter block, when executed, sets the contents of pointer FC_POINT to point to the location in a table of the next successive FC in the current script. Once this has occurred, execution exists from routine 3500 and appropriately returns to SSP Process routine 800 (see FIGS. 8A-8C).

Now, in the event the first value is to be ignored or a match occurs between the first value and argument $A_2$, then execution proceeds via the YES path emanating from decision block 3510 or 3515, respectively, to decision block 3525. Decision block 3525, when executed, determines whether the second result returned by a prior FC is to be matched. If this value is to be matched (the value of argument $A_3$ is not "X"), then decision block 3525 routes execution, via its NO path, to decision block 3530. This latter decision block determines whether, in fact, a match does occur between the second value and argument, $A_3$. If a match does not occur, then decision block 3530 routes execution, via NO path 3533, to block 3520 to set the contents of pointer FC_POINT to point to the location in a table of the next successive FC in the current script. Alternatively, if the second result is to be ignored or if a match does occur between the second result and argument $A_3$, then decision block 3525 or decision block 3530 routes execution, via YES path 3526 or 3531, respectively, to block 3540. Block 3540, when executed, adjusts the contents of pointer FC_POINT to specify the location in the current script, stored in the table, of the FC defined by the label given in argument $A_1$. Once this has occurred, execution exists from routine 3500 and appropriately returns to SSP Process routine 800 (see FIGS. 8A-8C).

p. Speech Synthesize FC Routine 3600

Figure 36B:
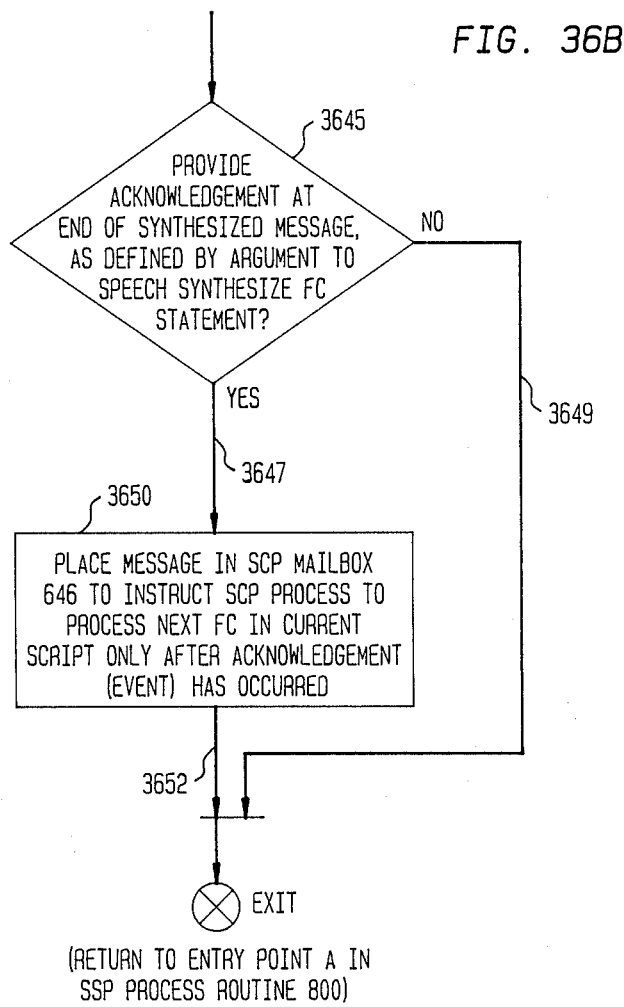

A flowchart of Speech Synthesize FC Routine 3600 is collectively depicted in FIGS. 36A and 36B, for which the correct alignment of the drawing sheets for these figures is shown in FIG. 36. This FC, when executed, instructs the IP Process to synthesize a message to either the caller or called party. The calling statement for this FC is "SPEECH_SYNTHER" followed by five arguments, A1, A2, A3, A4 and A5, wherein: argument A1 is a label of the next FC within the current script to where execution should branch once the Speech Synthesize FC has been completely executed; the value of argument A2 specifies who will hear the synthesized message (zero for caller and one for called party); argument A3, if one, specifies that the IP Process is to generate an event (specifically an acknowledgement) as soon as all the desired speech has been synthesized and, if zero, no such event is to be generated; argument A4 specifies, if one, that the name of the caller is to be synthesized or, if zero, that the text string specified in quotes as argument A5 should be synthesized. The event is used in processing a Wait statement that immediately follows a Speech Synthesize FC statement. Specifically, by virtue of the Wait FC statement, execution will not proceed to the next FC in a script that is currently executing until this event is generated, i.e. until the speech synthesizer finishes producing speech.

Specifically, upon entry into routine 3600, execution proceeds to decision block 3605 which determines, based upon the value of argument $A_2$, whether the caller or called party is to hear the synthesized speech. In the event the caller is to hear the speech, then execution proceeds, via path 3609 emanating from decision block 3605, to block 3620. This latter block, when executed, places a request in IP Process mailbox 644 to instruct the IP Process to assign an available speech synthesizer. Once this occurs, execution proceeds to block 3625 which, when executed, instructs the programmable switch to connect the assigned speech synthesizer to the caller. Execution then proceeds, via path 3628, to decision block 3630.

Alternatively, if the called party is to hear synthesized speech, then execution proceeds, via path 3607 emanating from decision block 3605, to block 3610. This latter block, when executed, places a request in IP Process mailbox 644 to instruct the IP Process to assign an available speech synthesizer. Once this occurs, execution proceeds to block 3615 which, when executed, instructs the programmable switch to connect the assigned speech synthesizer to the called party. Execution then proceeds, via path 3618, to decision block 3630.

Decision block 3630 determines, based upon the values of arguments $A_2$ and $A_4$, whether the calling party's name or a pre-defined text string is to be synthesized. In the event the name of the caller is to be synthesized, then decision block 3630 routes execution, via path 3634, to block 3635. This latter block, when executed, instructs the host processor to undertake a number to name translation (database look-up) in order to determine the calling party's name given his or her logical telephone number. Once the name is obtained from the host processor, then after a number to name translation event has occurred and has been processed as discussed above, block 3636 is executed which directs the name to the assigned speech synthesizer, via the IP Process, which, in turn, instructs the synthesizer to synthesize the name. Alternatively, if the values of arguments $A_2$ and $A_4$ specify that a pre-defined text string is to be synthesized, then decision block 3630 routes execution, via path 3632, to block 3640. This latter block, when executed, provides the text string specified in argument A5 to the assigned speech synthesizer, via the IP Process, which, in turn, instructs the synthesizer to announce the text string. Execution then proceeds, via path 3642, to decision block 3645. This decision block determines, in response to the value of argument $A_3$, whether the IP Process is to generate an event (specifically an acknowledgement) as soon as the speech synthesizer has completed its operation. If an acknowledgement is to be provided, i.e. such that execution of the current script will resume only after a current speech synthesis operation has been completed, then decision block 3645 routes execution, via YES path 3647, to block 3650. This latter block, when executed, places a message in SCP Process mailbox 646 to instruct the SCP Process to process the next FC in the current script only after an acknowledgment (event) has been generated by the speech synthesizer driver executing within the IP Process. Once block 3650 has executed, then execution exits, via path 3652, from routine 3600 and appropriately returns to entry point A in SSP Process routine 800 (see FIGS. 8A-8C). In the event the value of argument $A_5$ specifies that an acknowledgement is not to be provided, then execution proceeds, via NO path 3649 emanating from decision block 3645, to exit from routine 3600.

q. Speech Recognition System Training FC Routine 3700

FIG. 37 depicts a flowchart of Speech Recognition System Training FC Routine 3700. This FC merely requests the IP Process to invoke the training procedure on the speech recognition system. The calling statement for this FC is "SPEECH_REG_TRN" without any arguments.

Upon entry into this routine, execution proceeds to block 3710. This block, when executed, merely places a request into IP Process mailbox 644 to instruct the IP Process to assign speech recognition system 460 (see FIGS. 4A-4D) and commence voice training on incoming speech. Once block 3710 has executed, execution exits from routine 3700 and appropriately returns to entry point A in SSP Process routine 800 (see FIGS. 8A-8C).

r. Speech Recognize FC Routine 3800

FIG. 38 depicts a flowchart of Speech Recognize FC Routine 3800. This FC merely requests the IP Process to invoke the speech recognition procedure on the speech recognition system. The calling statement for this FC is "SPEECH_REG_RES" without any arguments.

Upon entry into this routine, execution proceeds to block 3810. This block, when executed, merely places a request into IP Process mailbox 644 to instruct the IP Process to assign speech recognition system 460 (see FIGS. 4A-4D) and commence recognition of incoming speech. Once block 3810 has executed, execution exits from routine 3800 and appropriately returns to entry point A in SSP Process routine 800 (see FIGS. 8A-8C).

s. Stop Peripheral FC Routine 3900

FIG. 39 depicts a flowchart of Stop Peripheral FC Routine 3900. This FC merely instructs the IP Process to stop all the peripherals from producing any further messages for the current party. The calling statement for this FC is "STOP_PERIPHERAL" without any arguments.

Specifically, upon into routine 3900, block 3910 is executed to place a terminate message in IP Process mailbox 644 to instruct the IP Process to terminate all messages that are presently being produced by any peripherals for the current party. Once this occurs, execution returns from routine 3900 to entry point A in SSP Process 800 (see FIGS. 8A-8C).

t. Time and Date FC Routine 4000

Figure 40B:
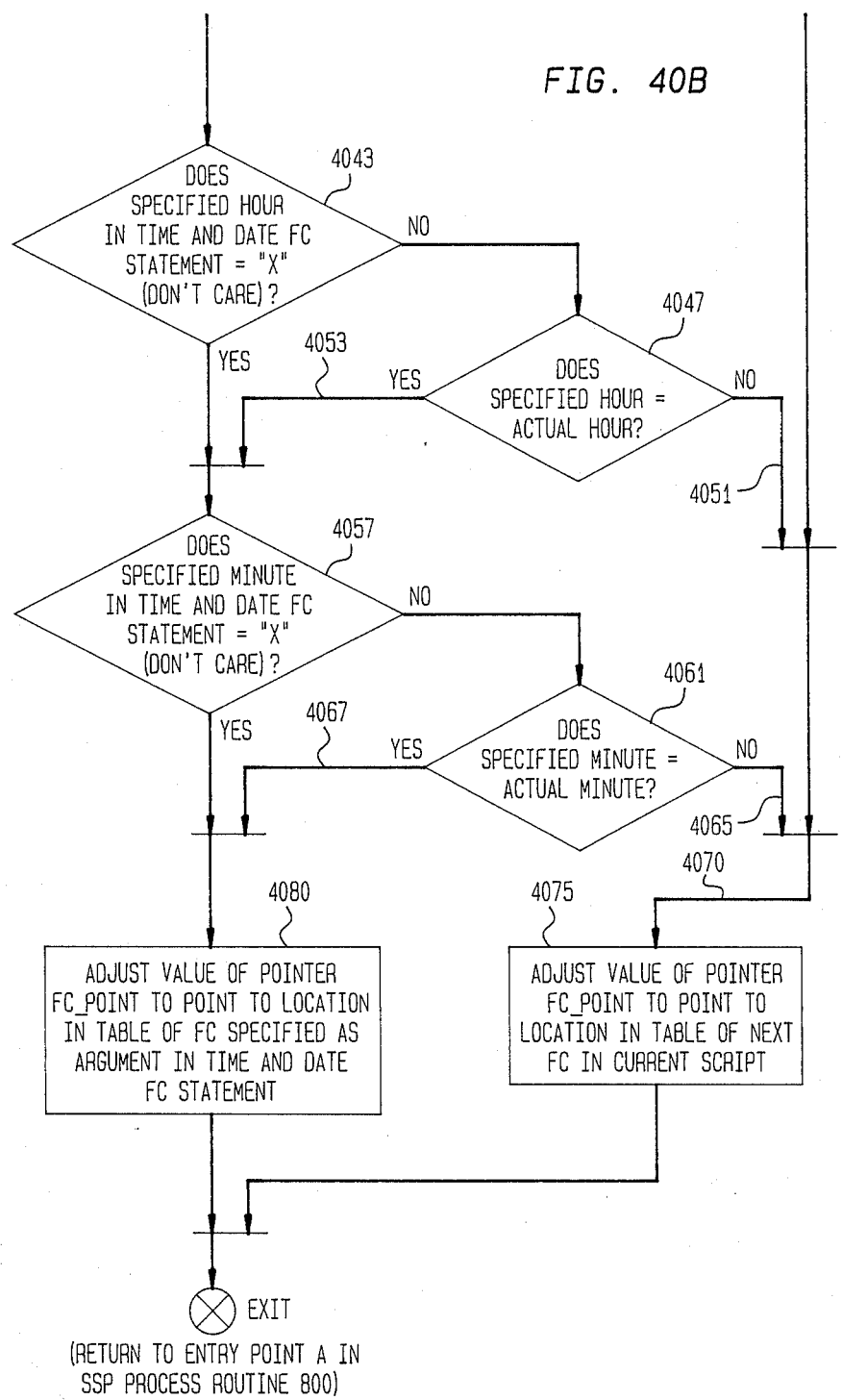

A flowchart of Time and Date FC Routine 4000 is collectively depicted in FIGS. 40A and 40B, for which the correct alignment of the drawing sheets for these figures is shown in FIG. 40. This FC, when executed, passes execution to a specified FC whenever the system date and time equals, is greater than or less than values specified in accompanying arguments. The calling statement for this FC is "TIME_&_DATE" followed by an operator ("=", ">" or "<") and then six arguments, $A_1$, $A_2$, $A_3$, $A_4$, $A_5$ and $A_6$, wherein the value of argument $A_1$ is a label of the next FC within the current script to where execution should branch in the event the desired operation is true; argument $A_2$ is a number between "00" and "06" representing the desired day of the week with Sunday being "00"; argument $A_3$ is a number between "01" and "12" representing the desired month; argument $A_4$ is a number between "01" and "31" representing the desired day of the month; argument $A_5$ is a number between "00" and "23" representing the desired hour; and argument $A_6$ is a number between "00" and "59" representing the desired minute. Any of the arguments $A_2$-$A_6$ can be set to the value "X" (i.e. a don't care condition) to ignore the corresponding actual value in determining a whether the desired operation is true. For the sake of simplicity, this routine will be explained in terms of the use of an equal (or matching) operation. If however, a greater than or less than operation is utilized, instead of an equality, the desired operator ($<$ or $>$) would be substituted in lieu of the equality seen in blocks 4012, 4023, 4035, 4047 and 4061 appearing in the flowchart for routine 4000 shown in FIGS. 40A and 40B and discussed below.

Specifically, upon entry into routine 4000, execution proceeds to block 4003. This block, when executed, reads the system time and date provided by the operating system. Thereafter, execution proceeds to decision block 4006 to determine whether the day of the week should be ignored. If the actual day is to be matched, i.e. not ignored, then execution proceeds from decision block 4006, via its NO path, to block 4012. This latter decision block determines whether the actual day of the week, as provided by the operating system, matches the value specified in argument $A_2$. If a match does not occur, then decision block 4012 routes execution, via paths 4015 and 4070, to block 4075. This latter block, when executed, adjusts the value of pointer FC_POINT to point to a location of the next FC in the current script stored in the table. Thereafter, execution exits from routine 4000 and appropriately returns to SSP Process Routine 800 (see FIGS. 8A-8C).

In the event the actual date matches the specified date, then decision block 4012 routes execution, via YES path 4017, to decision block 4019. Execution also reaches this latter decision block, via the YES path emanating from decision block 4006, in the event that the day of the week is to be ignored. Decision block 4019 determines whether the month should be ignored. If the month is to be matched, i.e. not ignored, then execution proceeds from decision block 4019, via its NO path, to block 4023. This latter decision block determines whether the actual month, as provided by the operating system, matches the value specified in argument $A_3$. If a match does not occur, then decision block 4023 routes execution, via paths 4025 and 4070, to block 4075.

Now, should the actual month match the specified month, then decision block 4023 routes execution, via path 4027, to decision block 4030. Execution also reaches this latter decision block, via the YES path emanating from decision block 4019, in the event that the month is to be ignored. Decision block 4030 determines whether the day of the month should be ignored. If the day of the month is to be matched, i.e. not ignored, then execution proceeds from decision block 4030, via its NO path, to decision block 4035. This latter decision block determines whether the actual day of the month, as provided by the operating system, matches the value specified in argument $A_4$. If a match does not occur, then decision block 4035 routes execution, via paths 4037 and 4070, to block 4075. However, in the event the actual day of the month matches the specified day, then decision block 4035 routes execution, via YES path 4039, to decision block 4043. Execution also reaches decision block 4043, via the YES path emanating from decision block 4030, if the day of the month is to be ignored. Decision block 4043 determines whether the hour should be ignored. If the hour is to be matched, i.e. not ignored, then execution proceeds from decision block 4043, via its NO path, to block 4047. This latter decision block determines whether the actual hour, as provided by the operating system, matches the value specified in argument $A_5$. If a match does not occur, then decision block 4047 routes execution, via paths 4051 and 4070, to block 4075.

Lastly, should the actual hour match the specified hour, then decision block 4047 routes execution, via YES path 4053, to decision block 4057. Execution also reaches this latter decision block via the YES path emanating from decision block 4043. Decision block 4057 determines whether the minute should be ignored. If the minute is to be matched, i.e. not ignored, then execution proceeds from decision block 4057, via its NO path, to decision block 4061. This latter block determines whether the actual minute, as provided by the operating system, matches the value specified in argument $A_6$. If a match does not occur, then decision block 4061 routes execution, via paths 4065 and 4070, to block 4075. Otherwise, should a match occur between the actual minute and the specified minute, then decision block 4061 routes execution, via YES path 4067, to block 4080.

Execution also reaches block 4080, via the YES path emanating from decision block 4057, in the event the actual minute is to be ignored. At this point, the system date and time matches the date and time defined by arguments $A_2$-$A_6$. Accordingly, block 4080, when executed, adjusts the value of pointer FC_POINT to specify the location in the current script, stored in the table, of the FC defined by the label given in argument $A_1$.

u. Wait FC Routine 4100

FIG. 41 depicts a flowchart of Wait FC Routine 4100. This FC merely instructs the SCP Process to stop sending functional components to the SSP Process until the occurrence of the next event, e.g. a trigger, software or switch event. This FC can be used to temporarily halt execution of a script until a peripheral, e.g. a speech synthesizer or digitizer, has finished producing a voice message. The calling statement for this FC is "WAIT" without any arguments.

Specifically, upon entry into routine 4100, block 4110 is executed to instruct the SCP Process to temporarily stop sending functional components to the SSP Process. Inasmuch as the state of the script is always stored, the SCP Process will not send the next successive FC within the current script to the SSP Process for execution until after the next input event has occurred. After block 4110 has be executed, execution returns from routine 4100 to SCP Process routine 700 (see FIG. 7).

v. Reserve Conference FC Routine 5900

FIG. 59 depicts a flowchart of Reserve Conference FC Routine 5900. This FC determines whether any one of several well-known conference bridges (not shown) located within programmable switch 440 (see FIGS. 4A-4D) is available. If any such bridge is available, it is then allocated for use in setting up a current conference call. The calling statement for this FC is "RESERVE_CONFERENCE" without any arguments. This FC typically finds use in establishing a conference call as part of a pound sign service script, for which an illustrative example has been discussed above.

There are illustratively two conference bridges located within programmable switch 440 (see FIGS. 4A-4D). Each bridge has a corresponding data structure stored within host processor 499. This data structure contains a user table of all the subscribers (listed in terms of the corresponding line numbers on programmable switch 440) that are currently connected to each bridge and a status flag that specifies whether that bridge is currently in use.

Now, upon entry into routine 5900 as shown in FIG. 59, execution proceeds to decision block 5910. This block, when executed, checks the software status flag that forms part of the data structure for each bridge. In the event both status flags are set, indicating that both conference bridges are currently in use, then execution is routed by decision block 5910 via NO path 5915, to block 5920. This latter block, when executed, places a value of "−1" into SCP Process mailbox 642 to indicate that a conference call can not be set up at this time. Alternatively, if a conference bridge is available, then decision block 5910 routes execution, via YES path 5925, to block 5930. This latter block, when executed sets the status flag associated with the available bridge to indicate that this bridge is now being used and records the current subscriber's telephone number and line number in the user table located within the data structure for this bridge. After either block 5920 or 5930 completely executes, then execution exits from routine 5900 and appropriately returns to entry point A in SSP Process Routine 800 (see FIGS. 8A-8C).

w. Add A Party FC Routine 6000

FIG. 60 depicts a flowchart of Add A Party FC Routine 6000. This FC allows a subscriber to add another party to a current conference call, i.e. instruct the programmable switch to connect that party to the conference bridge that is handling this call. The calling statement for this FC is "ADD_A_PARTY" followed by two arguments: $A_1$ and $A_2$, wherein: $A_1$ is a label of the next FC located within the current script to where execution should branch once the Add A Party FC has completely executed, and the value of argument $A_2$ specifies which party is to be added to the conference (zero for the original caller, one for the first called party and two for each successive subsequently called party). This FC is also typically used within a pound sign service script.

Specifically, upon entry into routine 6000, execution proceeds to decision block 6010. This block, when executed, determines whether the conference bridge in use by the current subscriber is full, i.e. whether that bridge can accommodate another party. Host processor 499 (see FIGS. 4A-4D) accomplishes this by examining the number of subscribers that are stored within the user table that forms part of the data structure for this conference bridge. In the event this bridge is full, then another party can not be added to the current conference. In this case, as shown in FIG. 60, decision block 6010 routes execution, via YES path 6055, to block 6060. This latter block, when executed, places a value of "−1" into SCP Process mailbox 642 to indicate that another party can not added to the current conference. Alternatively, in the event that the bridge is not full and hence can accommodate another party, then decision block 601? routes execution, via NO path 6015, to block 6020. This latter block, when executed, examines the value of the argument in the "ADD_A_PARTY" calling statement to determine the corresponding current line number on the programmable switch of the new party that is to be added to the conference. Once this occurs, execution proceeds to block 6030 which, when executed, inserts an entry containing the line number of this new party into the user table located within the data structure for this conference bridge. Thereafter, block 6040 is executed to appropriately instruct programmable switch 440 (see FIGS. 4A-4D) to connect the line number associated with this new party to the conference bridge. After either block 6040 or 6060 completely executes, then execution exits from routine 6000 and appropriately returns to entry point A in SSP Process Routine 800 (see FIGS. 8A-8C).

x. Delete A Party FC Routine 6100

FIG. 61 depicts a flowchart of Delete A Party FC Routine 6100. This FC allows a subscriber to delete any party from a current conference call, i.e. instruct the programmable switch to disconnect that party from the conference bridge that is handling this call. The calling statement for this FC is "DELETE_A_PARTY" followed by one argument $A_1$, wherein the value of this argument specifies which party is to be deleted from the conference (zero for the first called party and one for each successive subsequently called party). This FC is also typically used within a pound sign service script.

Specifically, upon entry into routine 6100, execution proceeds to decision block 6110 which determines whether the party specified in the "DELETE_A_PARTY" calling statement can be deleted from the current conference, i.e. whether an entry exists for this party within the user table situated within the data structure for the conference bridge used in this conference. If an entry for this party exists within the user table, then decision block 6110 routes execution, via YES path 6115, to block 6120. This latter block, when executed, deletes the entry for this party from the user table for this conference bridge. Thereafter, execution proceeds to block 6130 which, when executed, instructs programmable switch 440 (see FIGS. 4A-4D) to disconnect the line number associated with the deleted party from this conference bridge. Once this occurs, then execution proceeds to decision block 6140. Execution also proceeds to this decision block, via NO path 6135 emanating from decision block 6110, in the event that the party to be deleted is not part of the current conference.

Decision block 6140 determines, by examining the user table for this conference bridge, if the entry that was just deleted from the conference was for the last remaining party in the conference. In the event this entry was for the last party, then this decision block routes execution, via YES path 6145, to block 6150 which, when executed, resets the status flag for this conference bridge. This action frees the bridge for subsequent use in establishing another conference. Once this has occurred, execution exits from routine 6100 and appropriately returns to entry point A in SSP Process Routine 800 (see FIGS. 8A-8C). Alternatively, in the event that another party remains connected to the conference bridge, i.e. an entry still remains in the user table, then, as shown in FIG. 61, execution merely exits from routine 6100, via NO path 6155 emanating from decision block 6140 and then returns to entry point A in SSP Process Routine 800 (see FIGS. 8A-8C).

11. Personal Communication Services

As discussed above, each personal communication service can be invoked by a single corresponding functional component. This enables each personal communication service to be efficiently and easily invoked from within a service script. The calling statements for these functional components and the corresponding personal communication services are: REMOTE_CALLFWD for call re-direction, RETRIEVE_MESSAGE for reviewing stored voice messages, MEM_DIALING for memory dialing, UPDATE_RING for updating the number of rings, PERSONAL_MESSAGE for recording outgoing, personal or group announcements, QUEUED_CALL_BACK to access queued calls, and CHANGE_PIN to change a caller's personal identification number (PIN). Each of these calling statements contains three arguments. One argument specifies a label of the next FC in the script where execution should branch (only applies in the case of a remote script, otherwise this label is ignored) once the service has been fully executed. Another argument specifies whether the service is to be part of an outgoing or remote script. The last argument specifies the telephone number of the party that will utilize the service. This party is typically the caller with his number previously obtained and stored in a variable named "ANI".

The operation of each of the personal communication services will now be discussed.

a. Call Re-direction *100 Service Routine 4200

Figure 42B:
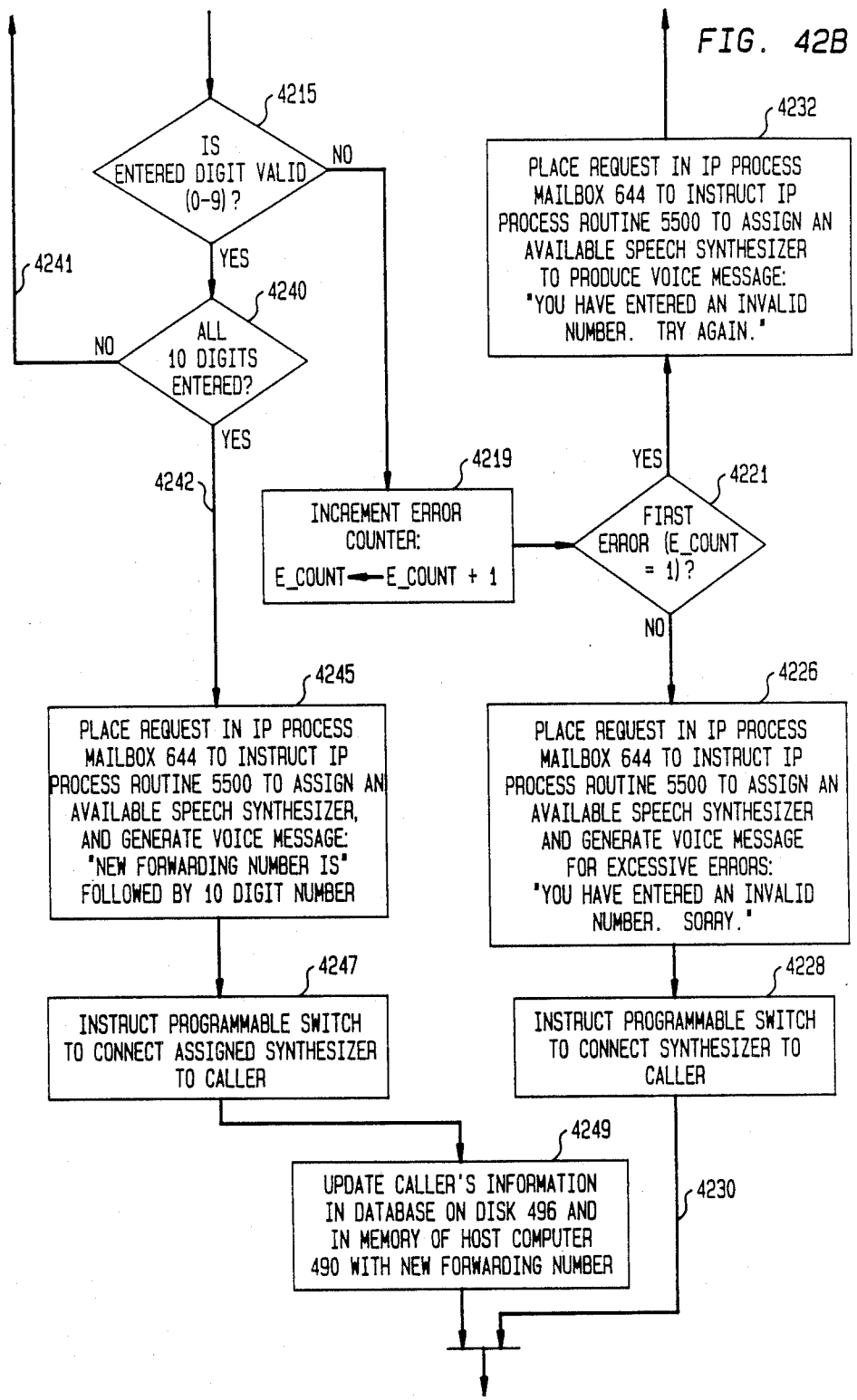
Figure 42C:
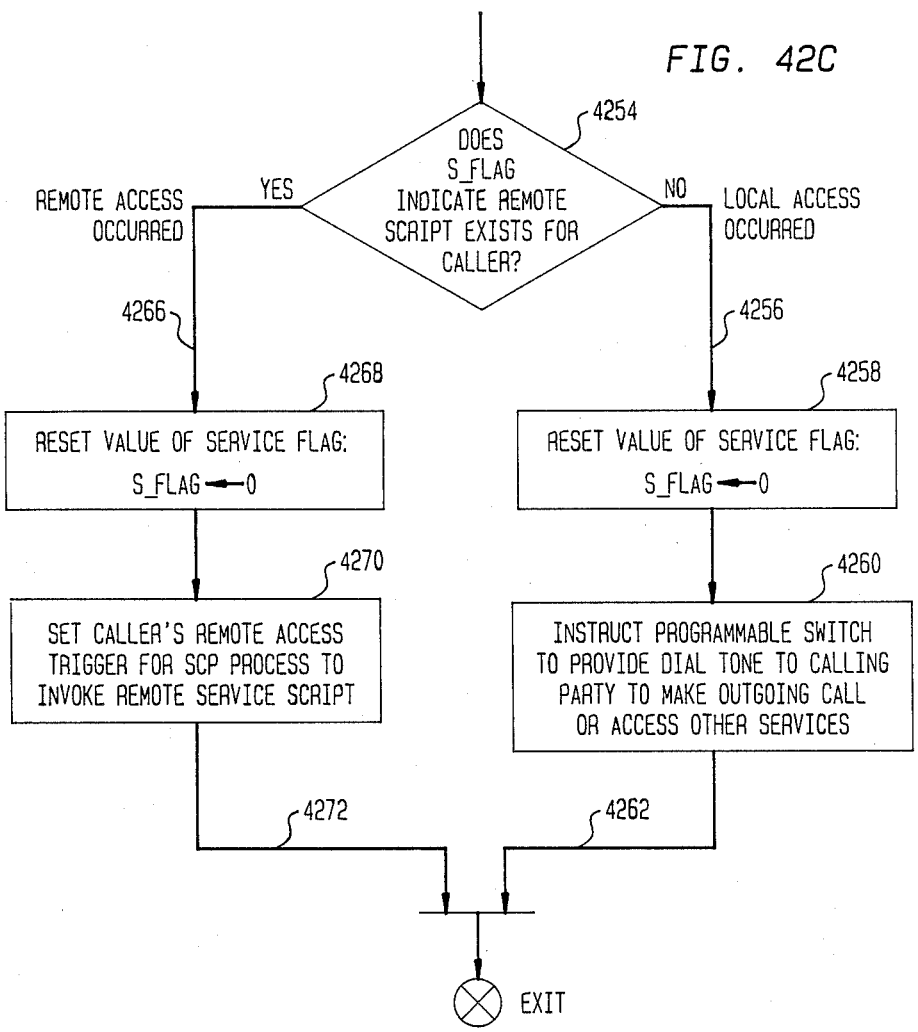

A flowchart of Call Re-direction *100 Service Routine is collectively depicted in FIGS. 42A-42C; for which the correct alignment of the drawing sheets for these figures is shown in FIG. 42. As noted above, this personal communication service provides a subscriber with the ability to re-direct incoming calls to a different number.

Specifically, upon entry into routine 4200, execution proceeds to block 4203. This block, when executed, sets the value of a flag (service flag illustratively named S_FLAG) to one of two pre-defined values for the *100 service depending upon whether the current caller (here a subscriber) has a remote script or not. Such a flag exists for each calling subscriber and will be used to appropriately invoke a remote script immediately prior to the end of routine 4200. After this flag has been appropriately set, execution proceeds to block 4205 to initialize the values of two counters, digit counter D_COUNT and error counter E_COUNT, to zero.

Thereafter, execution proceeds to block 4207. This block, when executed, places a request in IP Process mailbox 644 to instruct the IP Process too assign an available speech synthesizer and synthesize a voice message requesting the current caller to enter a ten digit telephone number to which his or her incoming telephone calls are to be forwarded. Once this has occurred, execution proceeds to block 4209 which instructs the programmable switch to connect the assigned synthesizer to the caller.

At this point, execution proceeds to block 4212 which invokes Digit Collection routine 1700 (discussed above in connection with FIGS. 17A-17C) to obtain the value of a digit that will be entered by the caller. Once this routine completely executes, execution proceeds, as shown in FIGS. 42A-42C, from block 4212 to block 4213. This latter block, when executed, increments the value of the digit counter by one. Thereafter, execution proceeds to decision block 42!5 which determines whether the entered digit is valid, i.e. lies within the range of one to nine. If the entered digit is not valid, i.e. other than a numeric value, then decision block 4215 routes execution, via its NO path, to block 4219. This latter block, when executed, increments the value of the error counter by one. In general, whenever an erroneous digit has been entered for the first time, the caller is given one additional opportunity to enter a correct digit. If another incorrect digit is entered, then the currently executing service terminates. Specifically, once the error counter has been incremented by block 4219, execution passes to decision block 4221. This block determines, based upon whether the value of the error counter equals one, whether a first erroneous digit has been entered. If the first error has just occurred, then decision block 4221 routes execution, via its YES path, to block 4232. This latter block, when executed, places a request in IP Process mailbox 644 to instruct the IP Process to assign an available speech synthesizer and instruct the synthesizer to synthesize a message stating that an erroneous digit has been entered and prompting the caller to re-enter the digit. Once this has occurred, execution proceeds to block 4234 which instructs the programmable switch to connect the assigned synthesizer to the caller. Next, block 4326 executes to reset the contents of the digit counter to zero. Thereafter, execution proceeds from block 4236, via path 4238, to block 4212 to obtain a value of the re-entered digit. Now, if the caller enters a second successive erroneous digit, then decision block 4221 routes execution, via its NO path, to block 4226. This block, when executed, places a request in IP Process mailbox 644 to instruct IP Process 5500 to assign an available speech synthesizer and instruct the synthesizer to synthesize an appropriate error message for the erroneous entries. Once this has occurred, execution proceeds to block 4228 which instructs the programmable switch to connect the assigned synthesizer to the caller. Thereafter, execution proceeds, via path 4230, to decision block 4254 which will be discussed shortly.

Alternatively, if a numeric digit has been entered, then decision block 4215 routes execution, via YES path 4242, to decision block 4240. This latter block determines, based upon whether the current value of the digit counter equals ten, if all ten digits of a forwarding telephone number have been entered. If any remaining digits need to be entered, then decision block 4240 routes execution, via NO path 4241, back to block 4212 to obtain a value for the next successive digit. Alternatively, if all ten digits have been entered, then decision block 4240 routes execution, via YES path 4242, to block 4245. This block, when executed, places a request in IP Process mailbox 644 to instruct the IP Process (specifically IP Process routine 5500—see FIG. 55) to assign an available speech synthesizer and instruct the synthesizer to synthesize an appropriate verbal header for acknowledging the new forwarding number to the caller and then synthesize the forwarding number. The resulting synthesized message will be illustratively "Your new forwarding number is" followed by a verbalization, on a digit-by-digit basis, of the newly entered forwarding number. Once this has occurred, execution proceeds to block 4247 which instructs the programmable switch to connect the assigned synthesizer to the caller. Thereafter, execution proceeds to block 4249 which, when executed, updates the forwarding number entry, located within an appropriate database stored on disk 496 and also in the memory of host processor 490, for the caller. Thereafter, execution proceeds, via path 4251, to decision block 4254.

Decision block 4254 determines, in response to the value of the service flag, S_FLAG, whether the caller has a remote script. If a remote script exists for the caller, the decision block 4254 routes execution, via YES path 4266, to block 4268. This latter block, when executed, resets the value of the service flag to zero to indicate that no service is executing for this caller. Thereafter, execution proceeds to block 4270 which sets the remote access trigger for the caller in order to invoke processing of his or her remote service script. Once this has occurred, execution exits, via path 4272, from routine 4200. Alternatively, in the event the value of the service flag indicates that the caller does not have a remote service script, then decision block 4254 routes execution, via NO path 4256, to block 4258. This latter block, when executed, also resets the value of the service flag to zero. Thereafter, execution proceeds to block 4260 which instructs the programmable switch to provide dial tone to the caller in order to permit the caller to place an outgoing call or access other services. Once this has occurred, execution exits, via path 4262, from routine 4200.

b. Review Voice Messages *200 Service Routine 4300

Figure 43C:
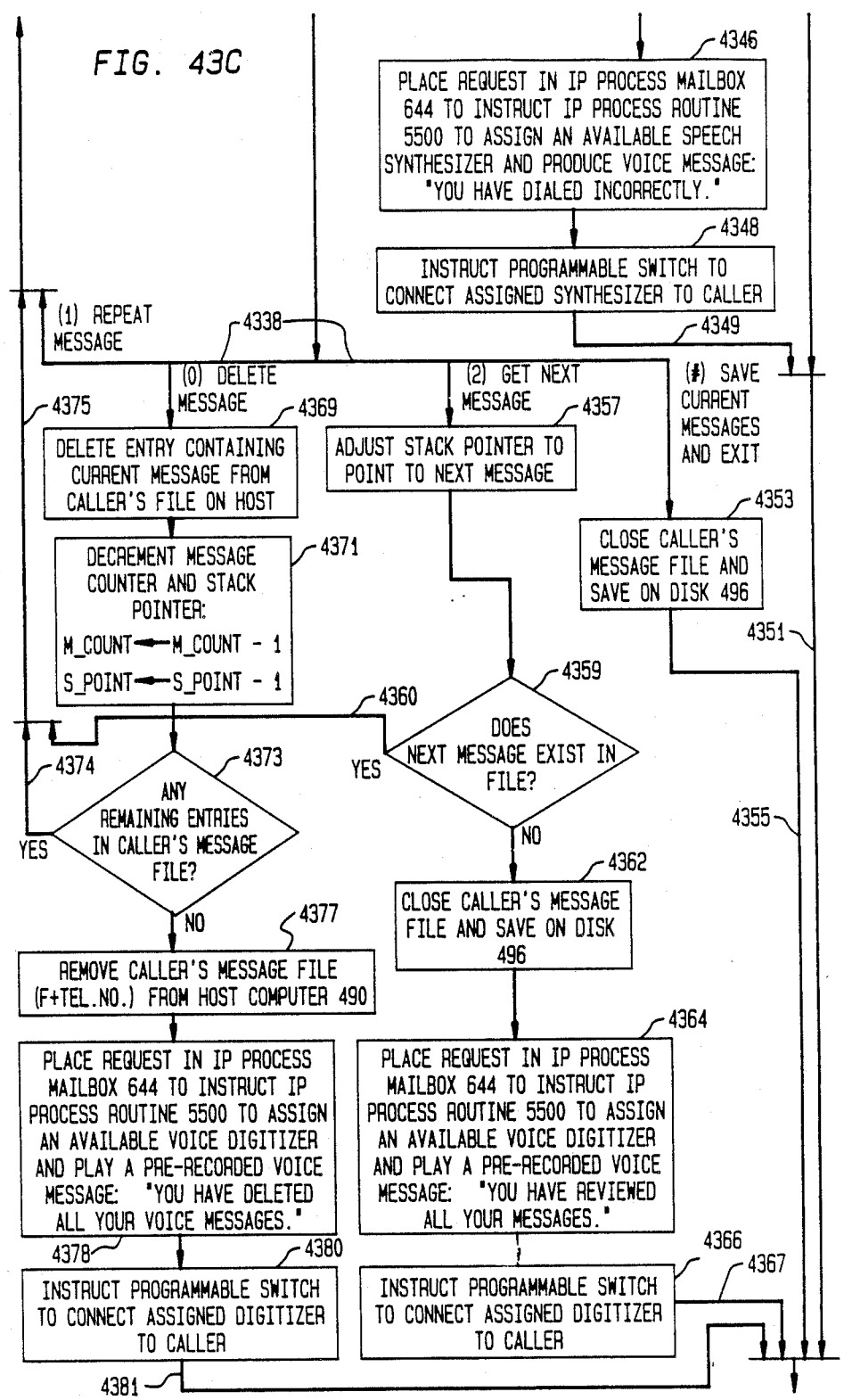
Figure 43D:
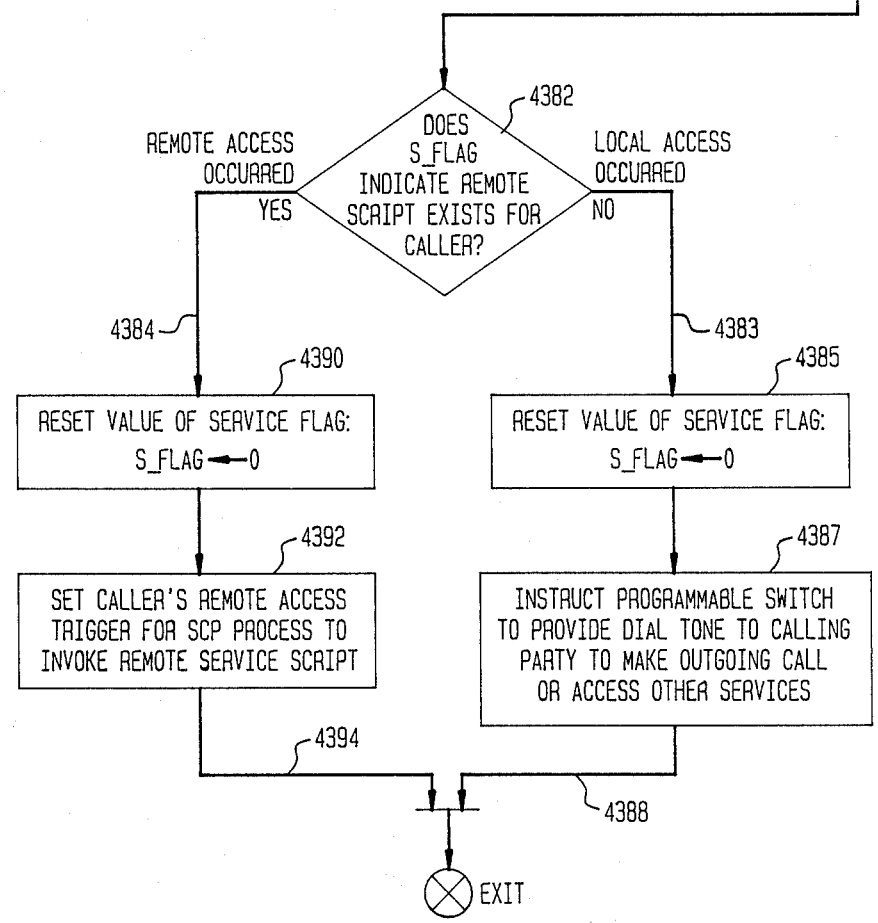

A flowchart of Review Voice Messages *200 Service Routine 4300 is collectively depicted in FIGS. 43A-43D; for which the correct alignment of the drawing sheets for these figures is shown in FIG. 43. As noted above, this personal communication service permits a caller to review his or her voice messages. Specifically, the caller can play a voice message, delete a voice message and/or save all his or her current voice messages for later playback.

Specifically, upon entry into routine 4300, execution proceeds to block 4301. This block, when executed, sets the value of a flag (service flag illustratively named S_FLAG) to one of two pre-defined values for the *200 service depending upon whether the caller has a remote script or not. Once this occurs, block 4303 is executed to initialize the contents of an error counter, E_COUNT, to zero. Thereafter, execution passes to block 4305 which attempts to open a message file on disk 496 (see FIGS. 4A-4D) for the caller. This message file is named "f" followed by the telephone number of the caller, illustratively "f7581234." Thereafter, execution proceeds, as shown in FIGS. 43A-43D, to decision block 4307 which, when executed, determines whether the host processor was able to find a message file for the caller. If the file could not be opened, then the file does not exist. Therefore, the caller has no stored voice messages. In this case, decision block 4307 routes execution, via its NO path, to block 4312. This block, when executed, places a request in IP Process mailbox 644 to instruct the IP Process to assign an available speech synthesizer and instruct the synthesizer to synthesize an appropriate verbal message stating that no stored voice messages exist. Once this has occurred, execution proceeds to block 4314 which instructs the programmable switch to connect the assigned synthesizer to the caller. Once this has occurred, execution proceeds from block 4314, via path 4315, to decision block 4382.

Now, in the event the message file exists for the caller, then decision block 4307 routes execution, via its YES path, to block 4317. This latter block, when executed, reads the contents of this message file into memory within host processor 490. Thereafter, execution proceeds to block 4318 which, when executed, sets a stack pointer (illustratively named S_POINT) to the location of the last entry in the message file. This block also sets the contents of a message counter (illustratively named M_COUNT) equal to the number of entries existing in this file. Each entry contains the name of a file stored on disk 487, located within the voice messaging system (see FIGS. 4A-4D), which contains a previously recorded voice message for the caller. Once all these entries have been read, then execution proceeds to block 4320.

Block 4320, when executed as shown in FIGS. 43A-43D, obtains the file name stored within the most recent entry in the caller's message file, i.e. the file name of the most recent message stored on the voice messaging system for the caller. Once this has occurred, execution proceeds to block 4322 to instruct IP Process 5500 to assign an available voice digitizer and instruct that digitizer to play the most recent stored voice message to the caller. Once this has occurred, execution proceeds to block 4324 which instructs the programmable switch to connect the assigned digitizer to the caller. Thereafter, execution proceeds to block 4326 to read the stored time and date values associated with the stored voice message. Once this has occurred, execution proceeds to block 4328 which, when executed, places a message in IP Process mailbox 644 to instruct the IP Process to assign an available speech synthesizer and instruct the synthesizer to synthesize an appropriate verbal message giving the date and time at which the voice message was recorded. Once this has occurred, execution proceeds to block 4330 which instructs the programmable switch to connect the assigned synthesizer to the caller. Execution now proceeds, via path 4331 to block 4333.

At this point, blocks 4333-4380 are executed to permit the caller to instruct the voice messaging system re-play the most recent voice message, delete a voice message and/or save all his or her current voice messages for later playback. Specifically, block 4333, when executed, places a message in IP Process mailbox 644 to instruct the IP Process to assign an available speech synthesizer and instruct the synthesizer to produce an appropriate verbal message instructing the caller to enter a digit, by depressing an appropriate pushbutton on the keypad of his or her telephone, corresponding to a desired voice messaging operation. Once this has occurred, execution proceeds to block 4334 which instructs the programmable switch to connect the assigned synthesizer to the caller. Thereafter, execution proceeds to block 4335 to invoke Digit Collection routine 1700 (discussed above in connection with see FIGS. 17A-17C) to obtain the value of a digit that will be entered by the caller. After this routine has fully executed, execution proceeds, as shown in FIGS. 43A-43D, to decision block 4337 to provide the desired voice messaging operation based upon the value of the digit.

If the entered digit is a one, then the current voice message that was just played is to be repeated. In this case, decision block 4337 routes execution, via paths 4338 and 4319, back to block 4320 to obtain the file name for this message. This message will then be played during execution of block 4322.

Alternatively, if the entered digit is a zero, then the current message that was just played is to be deleted. In this case, decision block 4337 routes execution, via path 4338, to block 4369. This block, when executed, deletes the entry containing the current message from the message file that is stored on the host for the caller. Execution then proceeds to block 4371 which, when executed, decrements both the message counter and stack pointer to account for the deleted message. Thereafter, decision block 4373 is executed to determine if any remaining entries exist in the caller's message file on the host computer (specifically disk 496—see FIGS. 4A-4D), i.e. whether the caller has any more stored voice messages. If such entries exist, then decision block 4373, as shown in FIGS. 43A-43D, routes execution, via YES path 4374 and paths 4375 and 4319, to play the message associated with the next successive entry in the message file for the caller. If, however, the message file for the caller is empty indicating that no messages now exist for the caller, then decision block 4373 routes execution, via its NO path, to block 4377. This latter block, when executed, removes the message file for the caller from disk 496 (see FIGS. 4A-4D). Once this occurs, execution proceeds, as shown in FIGS. 43A-43D, to block 4378. This block, when executed, places a message in IP Process mailbox 644 to instruct the IP Process (specifically IP Process routine 5500) to assign an available voice digitizer and instruct the digitizer to produce an appropriate pre-recorded voice message informing the caller that he or she has deleted all the stored voice messages. Once this has occurred, execution proceeds to block 4380 which instructs the programmable switch to connect the assigned digitizer to the caller. At this point, execution proceeds, via path 4381, to decision block 4382, which will be discussed shortly.

Now, if the entered digit is a two, then the next message in the message file for the caller is to be played. In this case, decision block 4337 routes execution, via path 4338, to block 4357. This latter block, when executed, adjusts the stack pointer to point to the next successive message in the message file that is stored on the host computer for the caller. Once this has occurred, execution proceeds to decision block 4359 which determines whether any such message exists in the message file. If another message exists, then decision block 4359 routes execution, via YES path 4360 and paths 4375 and 4319, back to block 4320 to access and subsequently play this voice message. If, on the other hand, no additional messages exist in the message file for the caller, then decision block 4359 routes execution, via its NO path, to block 4362. This latter block, when executed, closes the message file for the caller and saves the file on disk 496 (see FIGS. 4A-4D). Next, execution proceeds, as shown in FIGS. 43A-43D, to block 4364. This block, when executed, places a message in IP Process mailbox 644 to instruct the IP Process to assign an available voice digitizer and instruct the digitizer to produce an appropriate pre-recorded voice message informing the caller that he or she has reviewed all his or her stored voice messages. Once this has occurred, execution proceeds to block 4366 which instructs the programmable switch to connect the assigned digitizer to the caller. At this point, execution proceeds, via path 4367, to decision block 4382, which will be discussed shortly.

If the caller has entered a pound sign ("#"), then all his or her remaining stored messages are to be saved. In this case, decision block 4337 routes execution, via path 4338, to block 4353. This latter block, when executed, closes the message file for the caller and saves the file on disk 496 (see FIGS. 4A-4D). Thereafter, execution proceeds, via path 4355, to decision block 4382, which will be discussed shortly.

In the event the caller has entered a digit different from zero, one, two or a pound sign, then this digit is erroneous. If this is the first such error, then the caller is given an opportunity to enter a correct digit. If, however, the caller has entered a second successive erroneous digit, then the service essentially terminates with execution being routed to decision block 4382. Specifically, if an erroneous digit has been entered, then decision block 4337 routes execution, via path 4339, to decision block 4341. This latter decision block determines, based upon the contents of the error counter, whether a first erroneous digit has been entered. If the first error has occurred, then decision block 4341 routes execution, via its YES path, to block 4343. This block increments the contents of the error counter, E_COUNT, by one. Thereafter, execution proceeds, via path 4344, to block 4333 to again prompt the user to enter a digit. Now, if the caller enters a second successive erroneous digit, then decision block 4341 routes execution, via its NO path, to block 4346. This block, when executed, places a request in IP Process mailbox 644 to instruct the IP Process to assign an available speech synthesizer and instruct the synthesizer to synthesize an appropriate error message informing the caller of the erroneous entries. Once this has occurred, execution proceeds to block 4348 which instructs the programmable switch to connect the assigned synthesizer to the caller. At this point, execution proceeds, via paths 4349 and 4351, to decision block 4382.

Decision block 4382 determines, in response to the value of the service flag, S_FLAG, whether the caller has a remote script. If a remote script exists for the caller, the decision block 4382 routes execution, via YES path 4384, to block 4390. This latter block, when executed, resets the value of the service flag to zero to indicate that no service is executing for this caller. Thereafter, execution proceeds to block 4392 which sets the remote access trigger for the caller in order to invoke processing of his or her remote service script. Once this has occurred, execution exits, via path 4394, from routine 4300. Alternatively, in the event the value of the service flag indicates that the caller does not have a remote service script, then decision block 4382 routes execution, via NO path 4383, to block 4385. This latter block, when executed, also resets the value of the service flag to zero. Thereafter, execution proceeds to block 4387 which instructs the programmable switch to provide dial tone to the caller in order to permit the caller to place an outgoing call or access other services. Once this has occurred, execution exits, via path 4388, from routine 4300.

c. Memory Dialing *300 Service Routine 4400

Figure 44B:
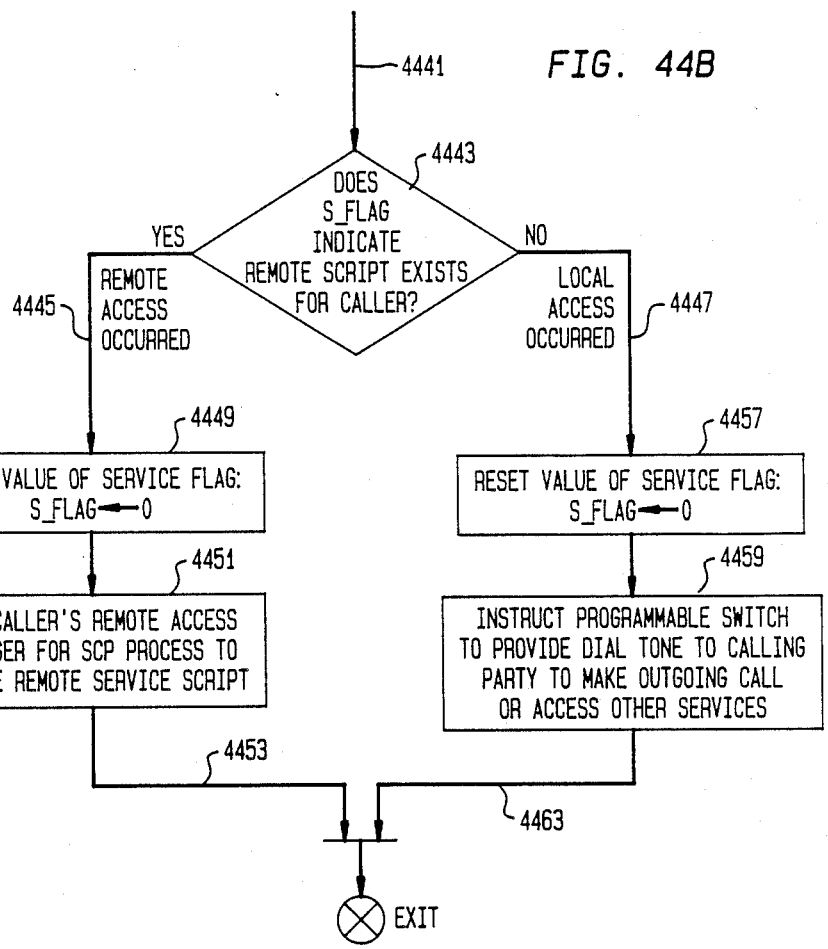

A flowchart of Memory Dialing *300 Service Routine is collectively depicted in FIGS. 44A and 44B; for which the correct alignment of the drawing sheets for these figures is shown in FIG. 44. As noted above, this personal communication service permits the caller to utilize memory dialing. Specifically, the caller can place a call by entering a pre-stored memory dialing (speed dialing) code, create a new memory dialing code and/or delete an existing memory dialing code.

Specifically, upon entry into routine 4400, execution proceeds to block 4405. This block, when executed, sets the value of a flag (service flag illustratively named S_FLAG) to one of two pre-defined values for the *300 memory dialing service upon whether the caller has a remote script or not. Once this occurs, execution proceeds to block 4407 which, when executed, places a request in IP Process mailbox 644 to instruct the IP Process to assign an available speech synthesizer and instruct the synthesizer to synthesize an appropriate message informing the caller of the available options (place a memory dialing call, create a memory dialing code, delete a memory dialing code, exit) and prompting for a digit entry to invoke a desired option. Once this has occurred, execution proceeds to block 4409 which instructs the programmable switch to connect the assigned synthesizer to the caller. Once this has occurred, block 4411 is executed to invoke Digit Collection routine 1700 (discussed above in connection with FIGS. 17A-17C) to obtain the value of the digit that will be entered. Once routine 1700 has fully executed, then execution will proceed, as shown in FIGS. 44A and 44B, from block 4411 to decision block 4413. This decision block will route execution based upon the value of entered digit (one, two, three or pound sign) to invoke the desired action (place a memory dialing call, create a memory dialing code, delete such a code or exit, respectively).

In the event the entered digit is a one, then a memory dialing call is to be made. In this case, decision block 4413 routes execution, via path 4415, to block 4420. This block resets the value of a flag (service flag illustratively named S_FLAG) to one of two pre-defined values for a memory dialing call depending upon whether the caller has a remote script or not. Thereafter, block 4422 is executed to invoke Memory Dialing Call routine 4500 (see FIGS. 45A and 45B which will be discussed below shortly) to prompt the caller to enter a memory dialing code and then accordingly place a call to a corresponding stored telephone number. Once this has occurred, execution proceeds, via paths 4424 and 4441, to decision block 4443, which will be discussed below.

Now, if the entered digit is a two, then the caller desires to create a new memory dialing code. In this case, decision block 4413 routes execution, via path 4415, to block 4427. This block resets the value of a flag (service flag illustratively named S_FLAG) to one of two pre-defined values for memory dialing code creation depending upon whether the caller has a remote script or not. Thereafter, block 4429 is executed to invoke Memory Dialing Code Creation routine 4600 (see FIGS. 46A-46E which will be discussed below shortly) to prompt the caller for the desired memory dialing code and corresponding ten digit telephone number. Once this has occurred, execution proceeds, via paths 4431 and 4441, to decision block 4443, which will be discussed below.

Alternatively, if the entered digit is a three, then the caller desires to delete a memory dialing code. In this case, decision block 4413 routes execution, via path 4415, to block 4435. This block resets the value of a flag (service flag illustratively named S_FLAG) to one of two pre-defined values for memory dialing code deletion depending upon whether the caller has a remote script or not. Thereafter, block 4437 is executed to invoke Memory Dialing Code Deletion routine 4700 (see FIGS. 47A-47C which will be discussed below shortly) to prompt the caller for the desired memory dialing code to be deleted. Once this has occurred, execution proceeds, via paths 4439 and 4441, to decision block 4443.

Lastly, if the caller has entered a pound sign, then the caller desires to exit from the memory dialing service. In this case, decision block 4413 routes execution, via paths 4415, 4419 and 4441, directly to decision block 4443. 25 Decision block 4443 determines, in response to the value of the service flag, S_FLAG, whether the caller has a remote script. If a remote script exists for the caller, the decision block 4443 routes execution, via YES path 4445, to block 4449. This latter block, when executed, resets the value of the service flag to zero to indicate that no service is executing for this caller. Thereafter, execution proceeds to block 4451 which sets the remote access trigger for the caller in order to invoke processing of his or her remote service script. Once this has occurred, execution exits, via path 4453, from routine 4400. Alternatively, in the event the value of the service flag indicates that the caller does not have a remote service script, then decision block 4443 routes execution, via NO path 4447, to block 4457. This latter block, when executed, also resets the value of the service flag to zero. Thereafter, execution proceeds to block 4459 which instructs the programmable switch to provide dial tone to the caller in order to permit the caller to place an outgoing call or access other services. Once this has occurred, execution exits, via path 4463, from routine 4400.

i. Memory Dialing Call Routine 4500

Figure 45B:
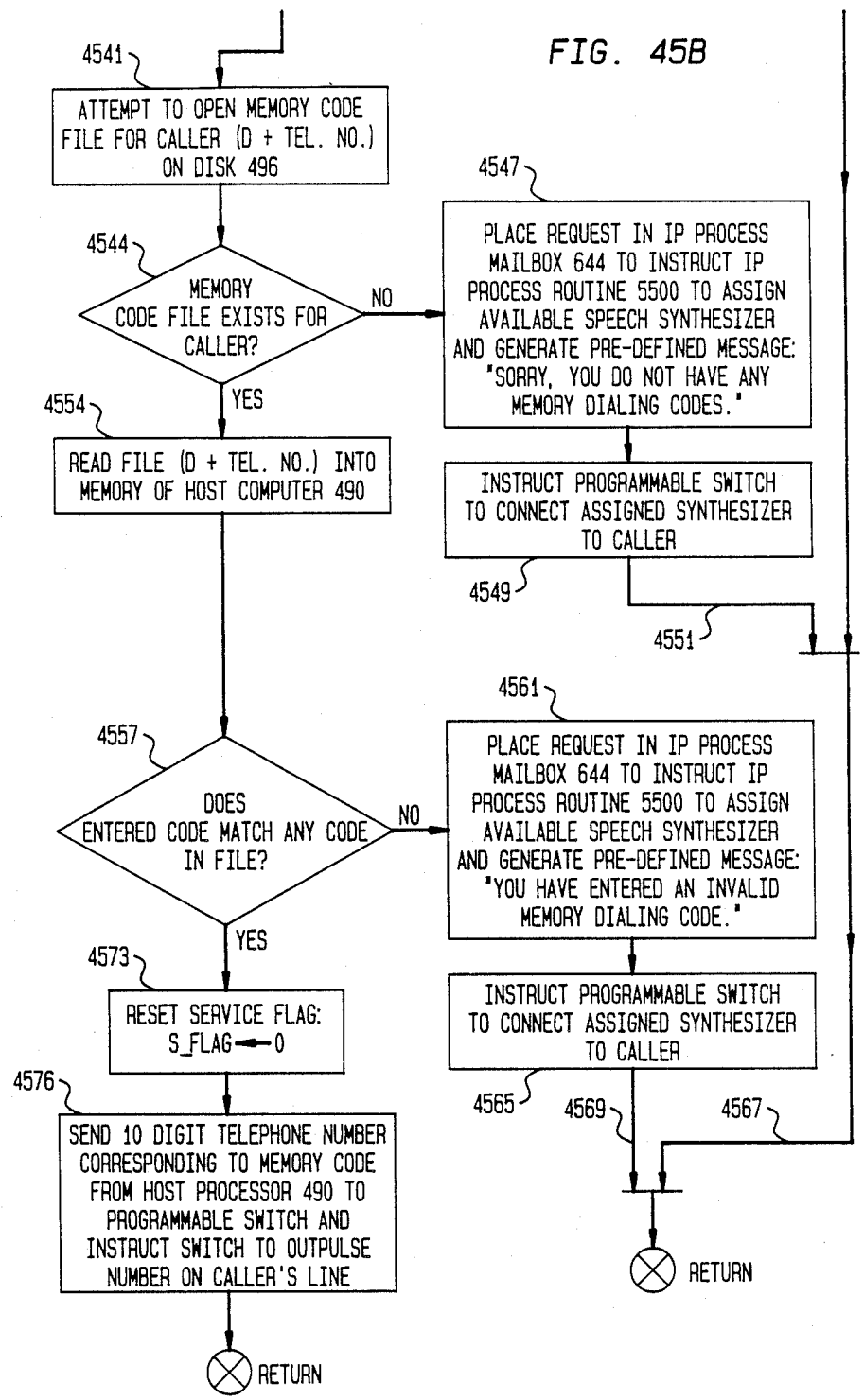
Figure 46B:
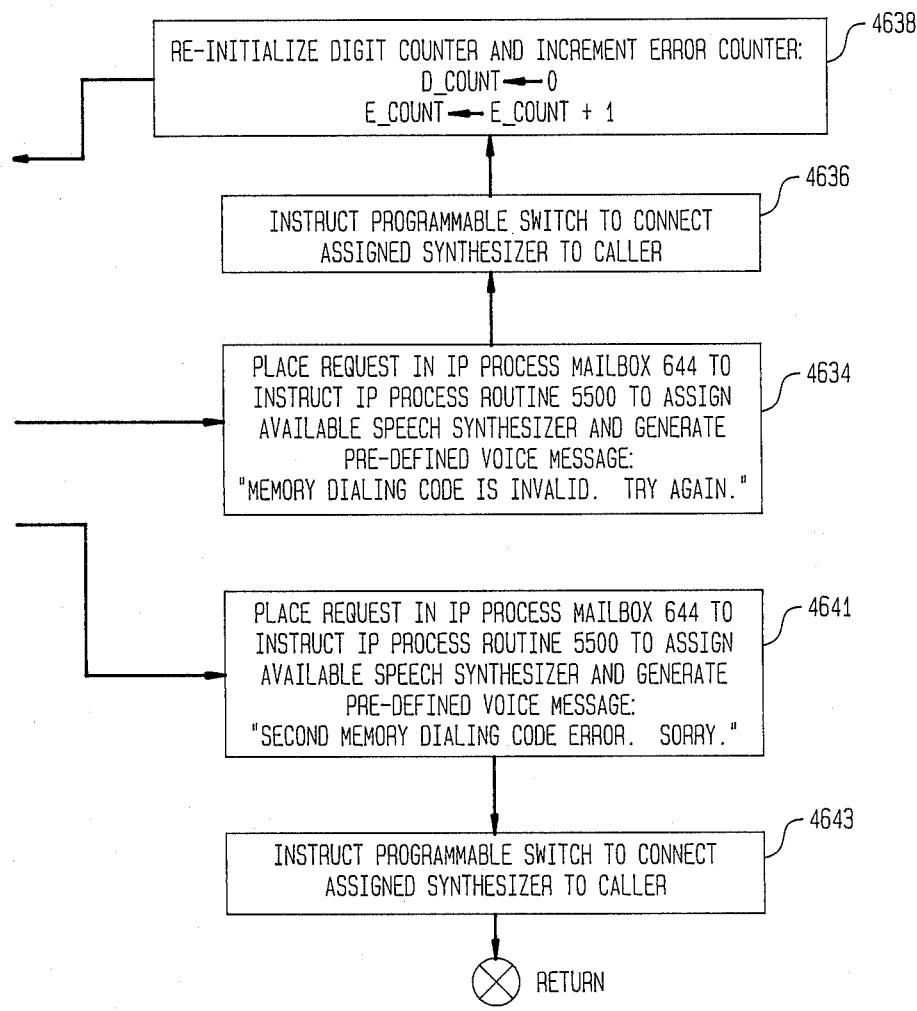
Figure 46C:
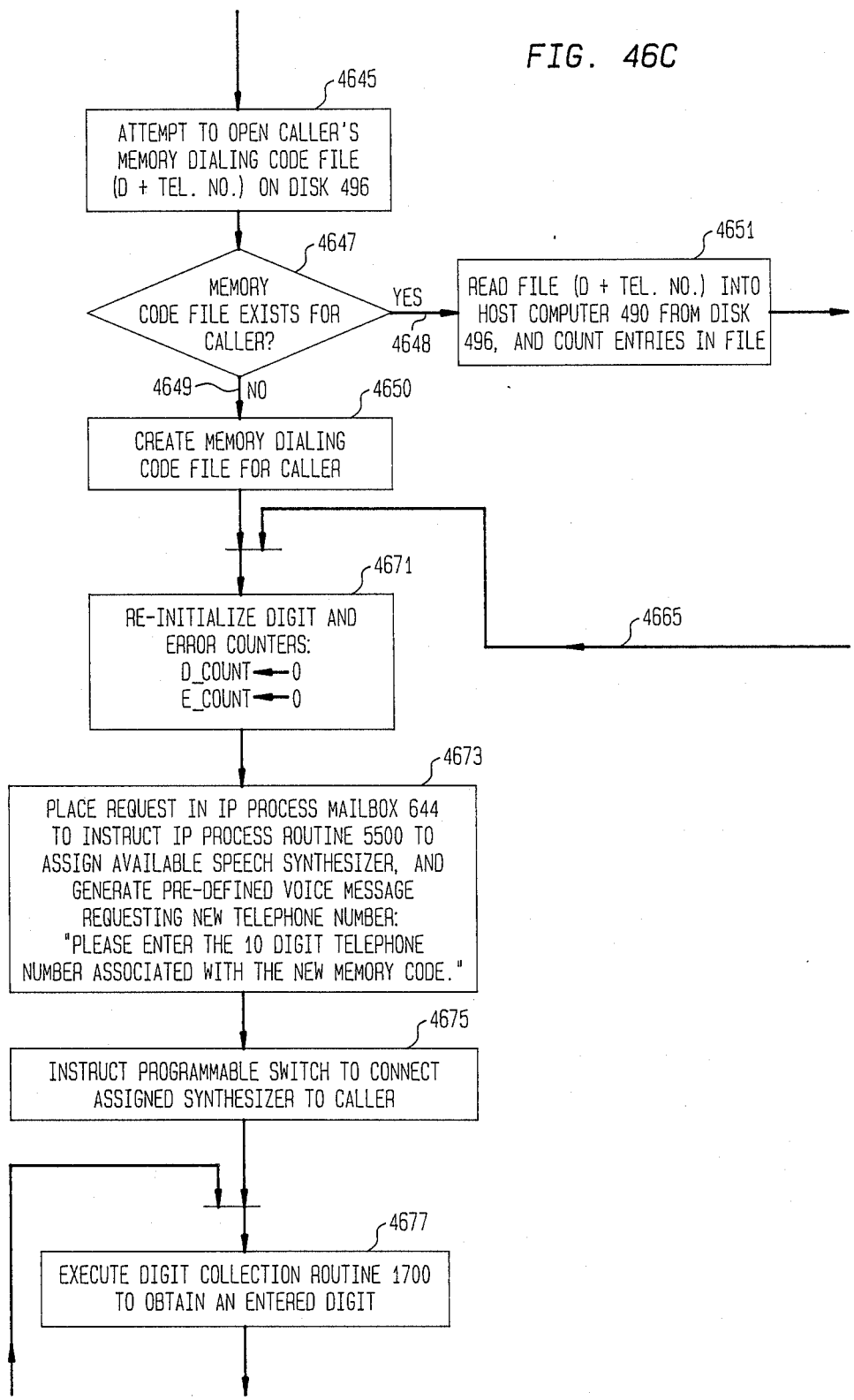
Figure 46D:
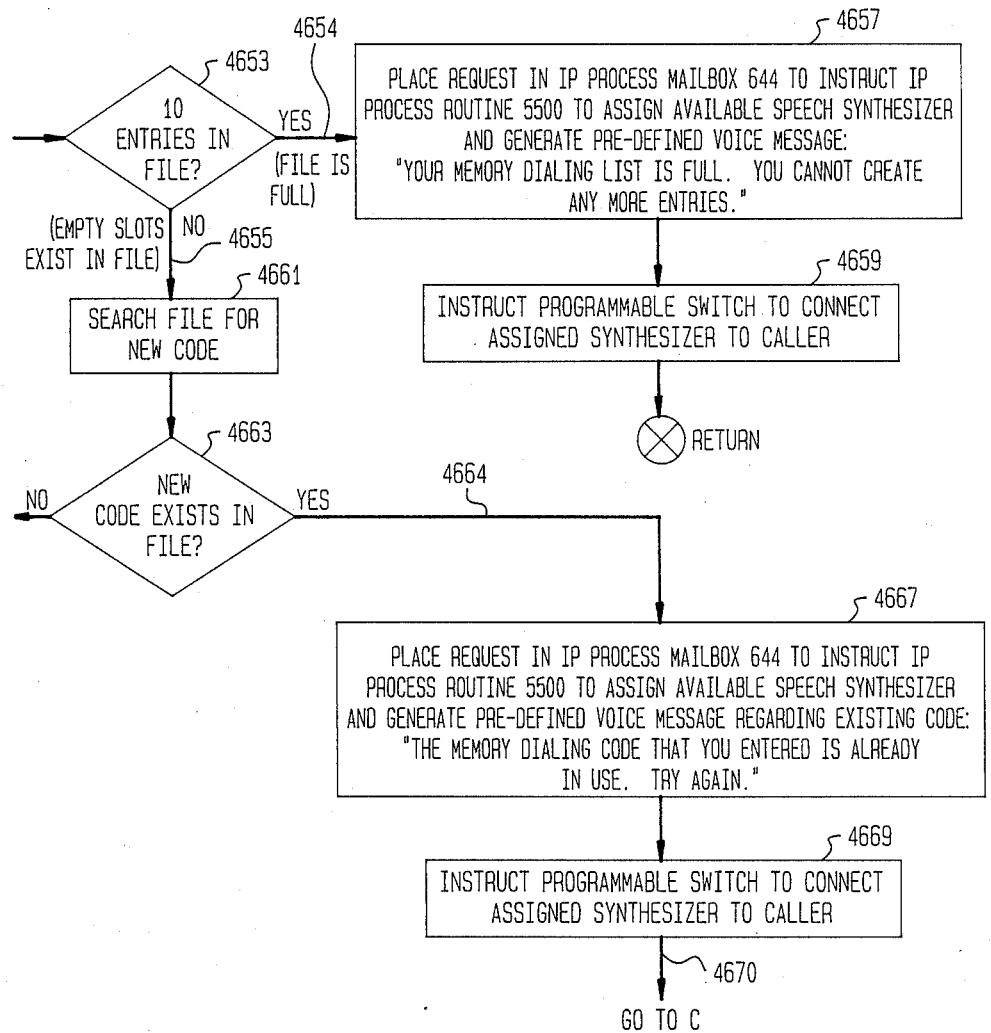
Figure 46E:
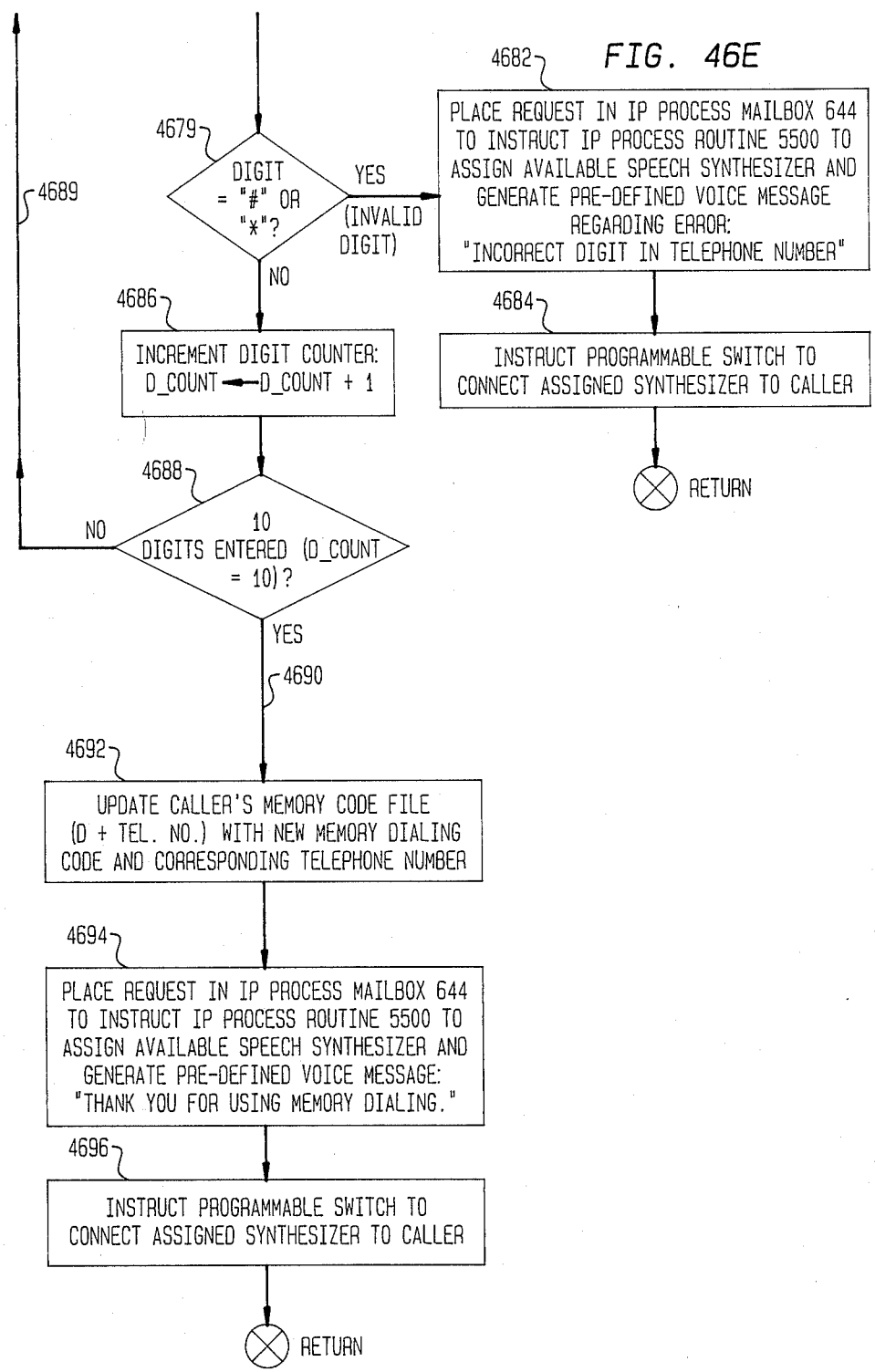

FIGS. 45A and 45B collectively depict a flowchart of Memory Dialing Call Routine 4500 that is executed as part of Memory Dialing *300 Service Routine 4400. The correct alignment of the drawing sheets for FIGS. 45A and 45B is shown in FIG. 45. This routine is used to place a memory dialing call.

Specifically, upon entry into routine 4500, execution proceeds to block 4505 to initialize the contents of the digit counter, D_COUNT. Thereafter, block 4508 is executed. This block places a request in IP Process mailbox 644 to instruct the IP Process (specifically IP Process routine 5500) to assign an available speech synthesizer and instruct the synthesizer to synthesize an appropriate message prompting the caller to enter a memory dialing code followed by a pound sign. Once this has occurred, execution proceeds to block 4511 which instructs the programmable switch to connect the assigned synthesizer to the caller. Once this has occurred, block 4514 is executed to invoke Digit Collection routine 1700 (discussed above in connection with FIGS. 17A-17C) to obtain the value of the digit that will be entered. Once routine 1700 has fully executed, then execution will proceed, as shown in FIGS. 45A and 45B, from block 4514 to block 4517. This latter block, when executed, increments the value of the digit counter by one. Thereafter, execution proceeds to decision block 4520 to determine, based upon the current value of the digit counter, if more than ten digits have been entered. Since a memory dialing code has fewer than eleven (ten or less) digits, any code having eleven or more digits represents an erroneous code. Therefore, should the caller enter an eleventh digit, then decision block 4520 will route execution, via its NO path, to block 4525. This latter block, when executed, places a request in IP Process mailbox 644 to instruct the IP Process to assign an available speech synthesizer and instruct the synthesizer to synthesize an appropriate message stating that the entered code is erroneous. Once this has occurred, execution proceeds to block 4528 which instructs the programmable switch to connect the assigned synthesizer to the caller. Thereafter, execution returns, via paths 4531 and 4567, from routine 4500. Alternatively, in the event that the user has not entered an eleventh digit, then decision block 4520 routes execution, via its NO path, to decision block 4534. This latter decision block tests whether the last digit entered is a pound sign. If the digit is not a pound sign, then the entire memory dialing code has not yet been completely entered. In this case, decision block 4534 routes execution, via NO path 4536, back to block 4514 to invoke Digit Collection routine 1700 to obtain the value of the next digit. If, however, the caller has just entered a pound sign indicating that the entire memory dialing code has just been entered, then decision block 4534 routes execution, via YES path 4538, to block 4541.

Block 4541, when executed, attempts to open a memory dialing code file, stored on disk 496 (see FIGS. 4A-4D), for the caller. This file, if it exists, is illustratively named "d" followed by the telephone number of the caller, e.g. d7581234. Thereafter, as shown in FIGS. 45A and 45B, execution proceeds to decision block 4544 which determines whether the host processor was able to find a memory dialing code file for the caller. If this file can not be opened, then the file does not exist. Therefore, the caller has no stored memory dialing codes. In this case, decision block 4544 routes execution, via its NO path, to block 4547. This latter block, when executed, places a message in IP Process mailbox 644 to instruct the IP Process to assign an available speech synthesizer and instruct the synthesizer to synthesize an appropriate verbal message stating that the caller has no memory dialing codes. Once this has occurred, execution proceeds to block 4549 which instructs the programmable switch to connect the assigned synthesizer to the caller. Once., this has occurred, execution returns, via paths 4551 and 4567, from routine 4500.

Now, alternatively, if the memory dialing code file can be opened, i.e. meaning that the caller has already established a memory dialing code(s), then decision block 4544 routes execution, via its YES path, to block 4554. This latter block, when executed, reads the memory dialing code file for the caller from disk 496 into the memory located within host processor 490 (see FIGS. 4A-4D). Next, as shown in FIGS. 45A and 45B, execution proceeds to decision block 4557. This decision block determines whether the entered memory dialing code matches any code stored in the memory dialing code file for the caller. If a match does not exist, then decision block 4557 routes execution, via its NO path, to block 4561. This block, when executed, places a message in IP Process mailbox 644 to instruct the IP Process to assign an available speech synthesizer and instruct the synthesizer to synthesize an appropriate verbal message stating that the caller has entered an invalid memory dialing code. Once this has occurred, execution proceeds to block 4565 which instructs the programmable switch to connect the assigned synthesizer to the caller. Once this has occurred, execution returns, via path 4569, from routine 4500.

Alternatively, if a match is found between the entered memory dialing code and an entry in the memory dialing code file for the caller, then decision block 4557 routes execution, via its YES path, to block 4573. This latter block, when executed, resets the service flag to zero thereby indicating that no service is currently executing for this caller. Thereafter, execution proceeds to block 4576 which accesses the ten digit telephone number corresponding to the entered memory dialing code from the memory dialing code file for the caller. Once this number has been accessed, host processor 490 supplies this number to the programmable switch and instructs the programmable switch to outpulse this number on an available outgoing ASI trunk and, by doing so, place a desired call. Once the switch has been so instructed, then execution returns from routine 4500.

ii. Memory Dialing Code Creation Routine 4600

FIGS. 46A–46E collectively depict a flowchart of Memory Dialing Code Creation Routine 4600 that is executed as part of Memory Dialing *300 Service Routine 4400. The correct alignment of the drawing sheets for FIGS. 46A–46E is shown in FIG. 46. This routine permits a caller to create a memory dialing code.

Specifically, upon entry into routine 4600, execution proceeds to block 4602. This block, when executed, initializes the contents of the digit and error counters, D_COUNT and E_COUNT, to zero. Thereafter, block 4604 is executed to place a request in IP Process 644 mailbox in order to instruct the IP Process (specifically IP Process routine 5500) to assign an available speech synthesizer and instruct the synthesizer to synthesize an appropriate message prompting the caller to enter a new memory dialing code followed by a pound sign. Once this has occurred, execution proceeds to block 4606 which instructs the programmable switch to connect the assigned synthesizer to the caller. Once this has occurred, execution is directed, along path 4607, to block 4610. This block, when executed, invokes Digit Collection routine 1700 (discussed above in connection with FIGS. 17A–17C) to obtain the value of the digit that will be entered. Once routine 1700 has fully executed, then execution will proceed, as shown in FIGS. 46A–46E, from block 4610 to decision block 4612.

Decision block 4612 determines whether the entered digit is a star, "*". Since a star can not be part of a memory code, any entry of such a character is erroneous. Consequently, if a star was entered, then decision block 4612 routes execution, via YES path 4613, to decision block 4630. This latter decision block determines, based upon contents of the error counter, whether a first erroneous memory dialing code has been entered. If the first error has occurred, then decision block 4630 routes execution, via YES path 4631, to block 4634. This latter block places a message in IP Process mailbox 644 to instruct the IP Process to assign an available speech synthesizer and instruct the synthesizer to synthesize an appropriate verbal message stating that the memory dialing code that was just entered is invalid and prompting the caller to enter a new memory dialing code that he or she wishes to create. Once this has occurred, execution proceeds to block 4636 which instructs the programmable switch to connect the assigned synthesizer to the caller. Thereafter, execution proceeds to block 4638 to initialize the contents of the digit counter, D_COUNT, to zero and increment the contents of the error counter, E_COUNT, by one. Once this has occurred, execution proceeds, via path 4639, back to block 4610 to obtain the first digit of the new memory dialing code from the caller. Now, if the caller has just entered a second successive erroneous memory dialing code, then decision block 4630 will route execution, via NO path 4632, to block 4641. This block, when executed, places a message in IP Process mailbox 644 to instruct the IP Process to assign an available speech synthesizer and instruct the synthesizer to synthesize an appropriate verbal message stating that the second memory dialing code that was just entered is also invalid. Once this has occurred, execution proceeds to block 4643 which instructs the programmable switch to connect the assigned synthesizer to the caller. Thereafter, execution returns from routine 4600.

Alternatively, if the current digit entry was not a star, then decision block 4612 routes execution, via NO path 4614, to block 4616. This latter block, when executed, increments the value of the digit counter by one. Thereafter, execution proceeds to decision block 4618 to determine whether the current digit is a pound sign which indicates the end of the memory dialing code. If the current digit is not a pound sign, then execution proceeds from decision block 4618, via NO path 4619, to decision block 4622. This latter decision block determines, based upon the current value of the digit counter, if more than ten digits have been entered. If fewer than eleven digits have been entered, then decision block 4622 routes execution, via NO path 4624, to block 4610 to obtain the value of the next digit in the memory dialing code. Since a memory dialing code has fewer than eleven (ten or less) digits, any code having eleven or more digits represents an erroneous code. Therefore, should the caller enter an eleventh digit, then decision block 4622 will route execution, via YES path 4623, to decision block 4630 which has been discussed above. Now, if the current digit is a pound sign, thereby signifying the end of the memory dialing code, then decision block 4618 routes execution, via YES path 4620, to decision block 4626. This latter decision block determines, by testing the contents of the digit counter, whether only one digit, namely a pound sign has been entered. A memory dialing code can not consist of the pound sign alone. Consequently, if only the pound sign has been entered without any preceding numeric digits, then this entry is invalid. In this case, decision block 4626 routes execution, via YES path 4627, to decision block 4630 to test whether this is the first erroneous memory dialing code entry. If so, the user is subsequently prompted to enter another code. If not, the user is instructed as to the second erroneous entry and execution returns from routine 4700.

Now, if the length of the entered memory dialing code exceeds one, indicative of a presumably valid memory dialing code, then decision block 4626 routes execution, via NO path 4628, to block 4645. This latter block, when executed attempts to open the memory dialing code file stored on disk 496 (see FIGS, 4A–4D)

for the caller. Once this has occurred, execution proceeds, as shown in FIGS. 46A–46E, to decision block 4647 which, when executed, determines whether the host computer was able to find a memory dialing code file for the caller. Now, in the event that the file can not be opened, then the memory dialing code file for the caller does not exist. In this case, decision block 4647 routes execution, via its NO path, to block 4650 which, when executed, creates a memory dialing code file for the caller on disk 496 and in the memory of host processor 490. Execution then proceeds to block 4761, which will be discussed shortly. Alternatively, if a memory dialing code file exists for the caller, then decision block 4647 routes execution, via YES path 4648, to block 4651. This latter block reads the contents of this file from disk 496 into the memory of host processor 490. Thereafter, execution proceeds to decision block 4653 to determine the number of entries in this file. At present, a caller is limited to having no more than ten stored memory dialing codes. This limit is entirely arbitrary. Consequently, if ten entries exist in the memory dialing code file for the caller, then this file is full. Hence, if ten entries exist in the file, decision block 4653 routes execution, via YES path 4654, to block 4657. This block, when executed, places a message in IP Process mailbox 644 to instruct the IP Process to assign an available speech synthesizer and instruct the synthesizer to synthesize an appropriate verbal message stating that the memory dialing code file for the caller is full and hence the caller can not create any more memory dialing codes now. Once this has occurred, execution proceeds to block 4659 which instructs the programmable switch to connect the assigned synthesizer to the caller. Thereafter, execution returns from routine 4600. If, however, less than ten entries exist in the memory dialing code file for the caller, then space exists in the file to store another memory dialing code. In this case, execution proceeds, via NO path 4655, from decision block 4653 to block 4661. This latter block searches the file for the memory dialing code that the caller has just entered. Thereafter, execution proceeds to decision block 4663 which determines whether that memory dialing code was found in the memory dialing code file for the caller. In the event this code already exists in the file, then decision block 4663 routes execution, via YES path 4664, to block 4667. This latter block, when executed, places a message in IP Process mailbox 644 to instruct the IP Process to assign an available speech synthesizer and instruct the synthesizer to synthesize an appropriate verbal message stating that the memory dialing code that was just entered already exists and that the caller should enter another memory dialing code. Once this has occurred, execution proceeds to block 4669 which instructs the programmable switch to connect the assigned synthesizer to the caller. Once this has occurred, execution loops back, via path 4670, to block 4610, which invokes Digit Collection routine 1700 (see FIGS. 17A–17C), to subsequently collect the values of the digits that form the next memory dialing code.

Now, should execution reach block 4671, then the memory dialing code file exists for the caller and a new entry, formed of the new memory dialing code along with its accompanying telephone number, must be entered into this file. Specifically, block 4671, when executed, re-initializes the contents of the digit and error counters, D_COUNT and E_COUNT, respectively, to zero. Thereafter, execution proceeds to block 4673 which, when executed, places a message in IP Process mailbox 644 to instruct the IP Process to assign an available speech synthesizer and instruct the synthesizer to synthesize an appropriate verbal message requesting that the caller enter the ten digit forwarding telephone number that is to be associated with the new memory dialing code. Once this has occurred, as shown in FIGS. 46A–46E, execution proceeds to block 4675 which instructs the programmable switch to connect the assigned synthesizer to the caller. Thereafter, execution is directed to block 4677 which invokes Digit Collection routine 1700 (discussed above in connection with FIGS. 17A–17C) in order to obtain the value of the next digit that will be entered. Once routine 1700 has fully executed, then execution will proceed, as shown in FIGS. 46A–46E, from block 4677 to decision block 4679. This latter block, when executed, tests whether the entered digit is a pound sign or a star. Since a telephone number can not contain either a pound sign or a star, these entries are erroneous. Should such an erroneous entry occur, then decision block 4679 routes execution, via its YES path, to block 4682. This block, when executed, places a message in IP Process mailbox 644 to instruct the IP Process to assign an available speech synthesizer and instruct the synthesizer to synthesize an appropriate verbal message stating that an incorrect digit in the telephone number has been entered. Once this has occurred, execution proceeds, as shown in FIGS. 46A–46E, to block 4684 which instructs the programmable switch to connect the assigned synthesizer to the caller. Thereafter, execution returns from routine 4600. Alternatively, if the entered digit is not a pound sign or a star, then decision block 4679 routes execution, via its NO path, to block 4686. This latter block, when executed, increments the contents of the digit counter by one. Execution then proceeds to decision block 4688 which, based upon the contents of the digit counter, determines whether ten digits have been entered for the forwarding telephone number. If ten digits have not yet been entered, then this decision block loops execution, via NO path 4689, back to block 4677 to obtain the value of the next digit.

If, however, all ten digits have been entered then decision block 4688 routes execution, via YES path 4690, to block 4692. This latter block, when executed, updates the memory dialing code file for the caller by creating a new entry containing both the new memory dialing code and the associated ten digit telephone number that the caller has just entered. Thereafter, execution proceeds to block 4694 which places a message in IP Process mailbox 644 to instruct the IP Process to assign an available speech synthesizer and instruct the synthesizer to synthesize an appropriate verbal acknowledgment message, which typically thanks the caller for using the memory dialing service. Once this has occurred, execution proceeds, as shown in FIGS. 46A–46E, to block 4696 which instructs the programmable switch to connect the assigned synthesizer to the caller. Thereafter, execution returns from routine 4600.

iii. Memory Dialing Code Deletion Routine 4700

Figure 47B:
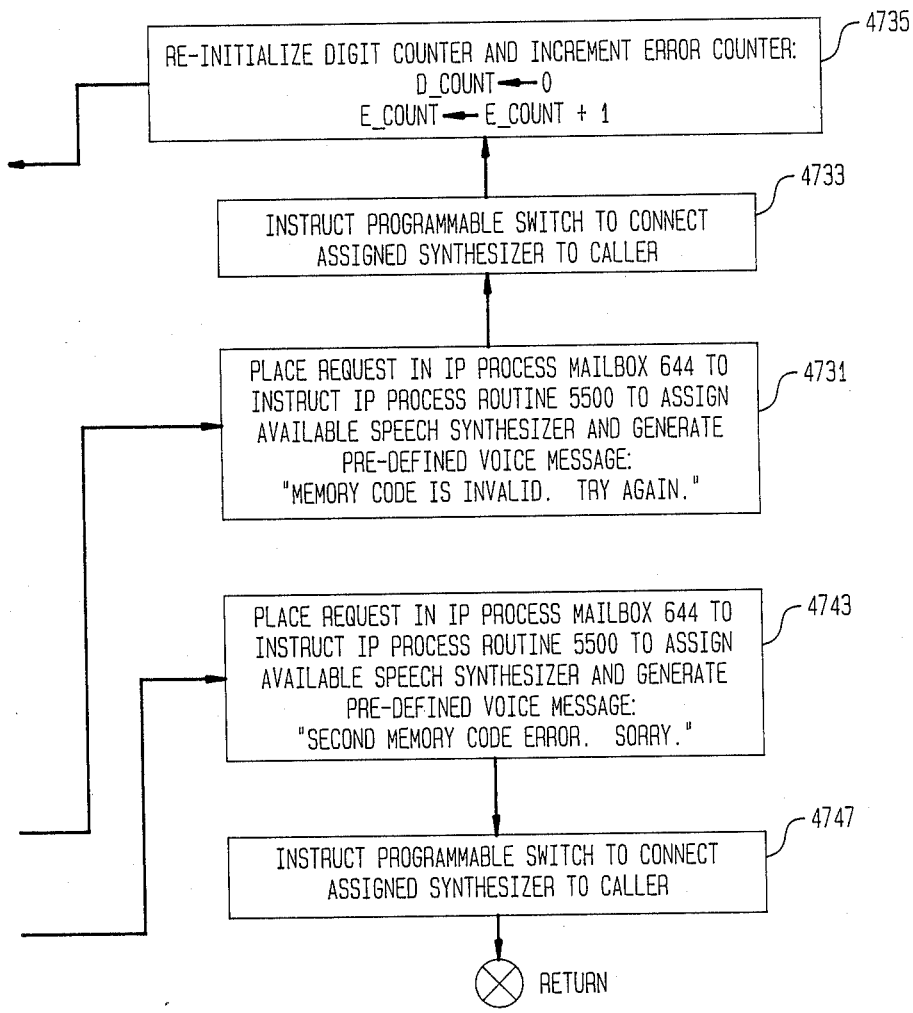
Figure 47C:
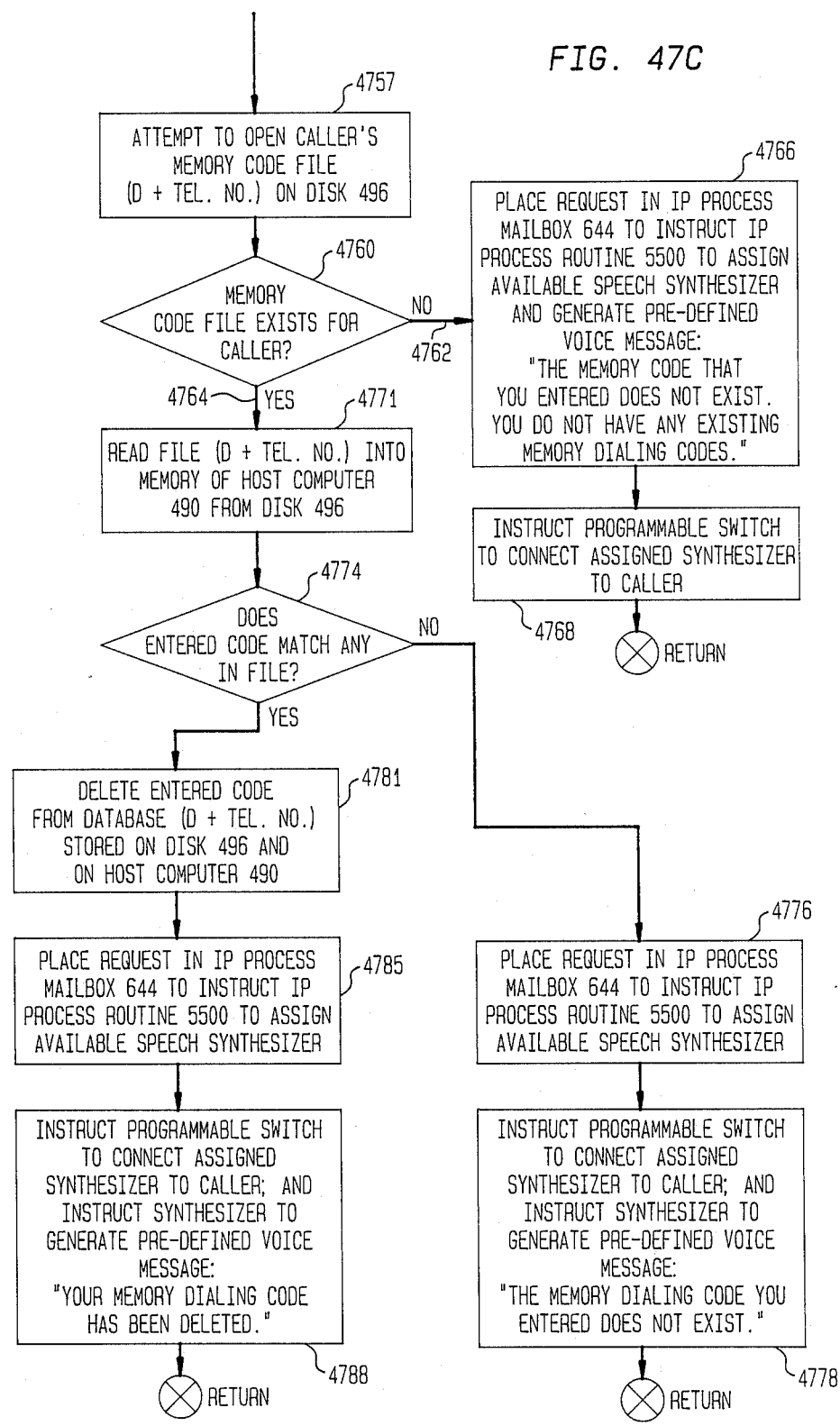

FIGS. 47A–47C collectively depict a flowchart of Memory Dialing Code Deletion Routine 4700 that is executed as part of Memory Dialing *300 Service Routine 4400. The correct alignment of the drawing sheets for FIGS. 47A–47C is shown in FIG. 47. This routine is used to delete a specific memory dialing code from the memory dialing code file for a caller.

Specifically, upon entry into routine 4700, execution proceeds to block 4703 which initializes the contents of the digit and error counters, D_COUNT and E_COUNT, to zero. Thereafter, execution proceeds to block 4705 which, when executed, places a message in IP Process mailbox 644 to instruct the IP Process (specifically IP Process routine 5500) to assign an available speech synthesizer and instruct the synthesizer to synthesize an appropriate verbal message prompting the caller for the memory dialing code he or she wishes to delete. Once this has occurred, execution proceeds to block 4707 which instructs the programmable switch to connect the assigned synthesizer to the caller.

Thereafter, execution proceeds, via paths 4709 and 4711, to block 4713. This latter block is executed to invoke Digit Collection routine 1700 (discussed above in connection with FIGS. 17A–17C) to obtain the value of the digit that will be entered. Once routine 1700 has fully executed, then execution will proceed, as shown in FIGS. 47A–47C, from block 4713 to block 4715. This latter block, when executed, increments the value of the digit counter by one. Thereafter, execution proceeds to decision block 4717 to determine whether the current digit is a pound sign which indicates the end of the memory dialing code. If the current digit is not a pound sign, then execution proceeds from decision block 4717, via its NO path, to decision block 4719. This latter decision block determines, based upon the current value of the digit counter, if more than ten digits have been entered. If fewer than eleven digits have been entered, then decision block 4719 routes execution, via NO path 4721, to block 4713 to obtain the value of the next digit in the memory dialing code. Since a memory dialing code has fewer than eleven (ten or less) digits, any code having eleven or more digits represents an erroneous code. Therefore, should the caller enter an eleventh digit, then decision block 4719 will route execution, via YES path 4723, to decision block 4725. This latter decision block determines, based upon contents of the error counter, whether a first erroneous memory dialing code has been entered. If the first error has occurred, then decision block 4725 routes execution, via YES path 4727, to block 4731. This latter block places a message in IP Process mailbox 644 to instruct the IP Process to assign an available speech synthesizer and instruct the synthesizer to synthesize an appropriate verbal message stating that the memory dialing code that was just entered is invalid and prompting the caller to enter a new memory dialing code that he or she wishes to delete. Once this has occurred, execution proceeds to block 4733 which instructs the programmable switch to connect the assigned synthesizer to the caller. Thereafter, execution proceeds to block 4735 to initialize the contents of the digit counter, D_COUNT, to zero and increment the contents of the error counter, E_COUNT, by one. Once this has occurred, execution proceeds, via path 4738, back to block 4713 to obtain the first digit of the new memory dialing code from the caller. Now, if the caller has just entered a second successive erroneous memory dialing code, then decision block 4725 will route execution, via NO path 4729, to block 4743. This block, when executed, places a message in IP Process mailbox 644 to instruct the IP Process to assign an available speech synthesizer and instruct the synthesizer to synthesize an appropriate verbal message stating that the second memory dialing code that was just entered is also invalid. Once this has occurred, execution proceeds to block 4747 which instructs the programmable switch to connect the assigned synthesizer to the caller. Thereafter, execution returns from routine 4700.

Alternatively, if the current digit is a pound sign, thereby signifying the end of the memory dialing code, then decision block 4717 routes execution, via its YES path, to decision block 4750. This latter decision block determines, by testing the contents of the digit counter, whether only one digit, namely a pound sign has been entered. A memory dialing code can not consist of the pound sign alone. Consequently, if only the pound sign has been entered without any preceding numeric digits, then this entry is invalid. In this case, decision block 4750 routes execution, via YES path 4752, to decision block 4725 to test whether this is the first erroneous memory dialing code entry. If so, the user is subsequently prompted to enter another code. If not, the user is instructed as to the second erroneous entry and execution returns from routine 4700.

Now, if the length of the entered memory dialing code exceeds one, indicative of a presumably valid memory dialing code, then decision block 4750 routes execution, via NO path 4754, to block 4757. This latter block, when executed attempts to open the memory dialing code file on disk 496 (see FIGS. 4A–4D) for the caller. Once this has occurred, execution proceeds, as shown in FIGS. 47A–47C, to decision block 4760 which, when executed, determines whether the host processor was able to find a memory dialing code file for the caller. If the file can not be opened, then the file does not exist. Therefore, the caller has no stored memory dialing codes. In this case, decision block 4760 routes execution, via NO path 4762, to block 4766. This block, when executed, places a request in IP Process mailbox 644 to instruct IP Process 5500 to assign an available speech synthesizer and instruct the synthesizer to synthesize an appropriate verbal message stating that not only does the memory dialing code that has been entered not exist but also that no memory dialing codes at all exist. Once this has occurred, execution proceeds to block 4768 which instructs the programmable switch to connect the assigned synthesizer to the caller. Thereafter, execution returns from routine 4700.

If the memory dialing code file exists on disk 496, then execution proceeds, via YES path 4764 emanating from decision block 4760, to block 4771. This latter block, when executed, reads this file from the disk into memory located within host processor 490 (see FIGS. 4A–4D). Thereafter, as shown in FIGS. 47A–47C, execution proceeds to decision block 4774. This block, when executed, determines whether the memory dialing code that the caller has just entered for deletion matches any code stored in the memory dialing code file for the caller. In the event no match is found, then decision block 4774 routes execution, via its NO path, to block 4776. This latter block, when executed, places a request in IP Process mailbox 644 to instruct the IP Process to assign an available speech synthesizer. Once this has occurred, execution proceeds to block 4778 which instructs the programmable switch to connect the assigned synthesizer to the caller and then instructs the synthesizer to synthesize an appropriate verbal message stating that the memory dialing code that has been entered does not exist. Thereafter, execution returns from routine 4700. Alternatively, if a match is found between the entered memory dialing code and one in the file, then decision block 4774 routes execution, via its YES path, to block 4781. This latter block, when executed, deletes the memory dialing code that the caller entered from the memory dialing code file for the caller stored on both host processor 490 and disk 496, both of which are contained within host computer 499 (see FIGS. 4A–4D). Thereafter, as shown in FIGS. 47A–47C, execution passes to block 4785 which, when executed, places a request in IP Process mailbox 644 to instruct the IP Process to assign an available speech synthesizer. Once this occurs, execution proceeds to block 4788 which instructs the programmable switch to connect the assigned synthesizer to the caller and then instructs the synthesizer to synthesize an appropriate verbal message stating that the memory dialing code that has been entered has just been deleted. Thereafter, execution returns from routine 4700.

d. Ring Update *600 Service Routine 4800

FIG. 48 depicts a flowchart of Ring Update *600 Service Routine 4800. As noted above, this personal communication service can be used to update the number of rings for a subscriber, typically a caller.

Upon entry into this routine, execution proceeds to block 4805. This block, when executed, sets the value of the service flag (S_FLAG) to one of two values assigned to the *600 service depending upon whether the caller has a remote script or not. Thereafter, execution proceeds to block 4810 which, when executed, places a request in IP Process mailbox 644 to instruct IP Process routine 5500 to assign an available speech synthesizer and generate a message requesting the caller to enter a digit for the desired number of rings. Once this occurs, execution passes to block 4815 which instructs the programmable switch to connect the assigned synthesizer to the caller. Thereafter, block 4823 executes to invoke Digit Collection routine 1700 (see FIGS. 17A–17C) to collect the value of a digit that will be entered by the caller. Thereafter, execution proceeds to block 4825. This block, when executed, updates the ring information for the subscriber (typically the caller) specified in the calling statement for this service. This information is updated in both the TELfor.d file stored on disk 496 (see FIGS. 4A–4D) and within the appropriate file loaded into the memory of the host processor as well. Once this updating has occurred, then execution proceeds to decision block 4830. This decision block determines, in response to the value of the service flag, S_FLAG, whether the subscriber has a remote script. If a remote script exists for this subscriber, the decision block 4830 routes execution, via YES path 4855, to block 4860. This latter block, when executed, resets the value of the service flag to zero to indicate that no service is executing for this subscriber. Thereafter, execution proceeds to block 4865 which sets the remote access trigger for the subscriber in order to invoke processing of the remote service script for the caller. Once this has occurred, execution exits, via path 4870, from routine 4800. Alternatively, in the event the value of the service flag indicates that the caller does not have a remote service script, then decision block 4830 routes execution, via NO path 4835, to block 4840. This latter block, when executed, also resets the value of the service flag to zero. Thereafter, execution proceeds to block 4845 which instructs the programmable switch to provide dial tone to the caller in order to permit the caller to place an outgoing call or access other services. Once this has occurred, execution exits, via path 4850, from routine 4800.

e. Voice Announcement Recording *700 Service Routine 4900

Figures 49, 49A:
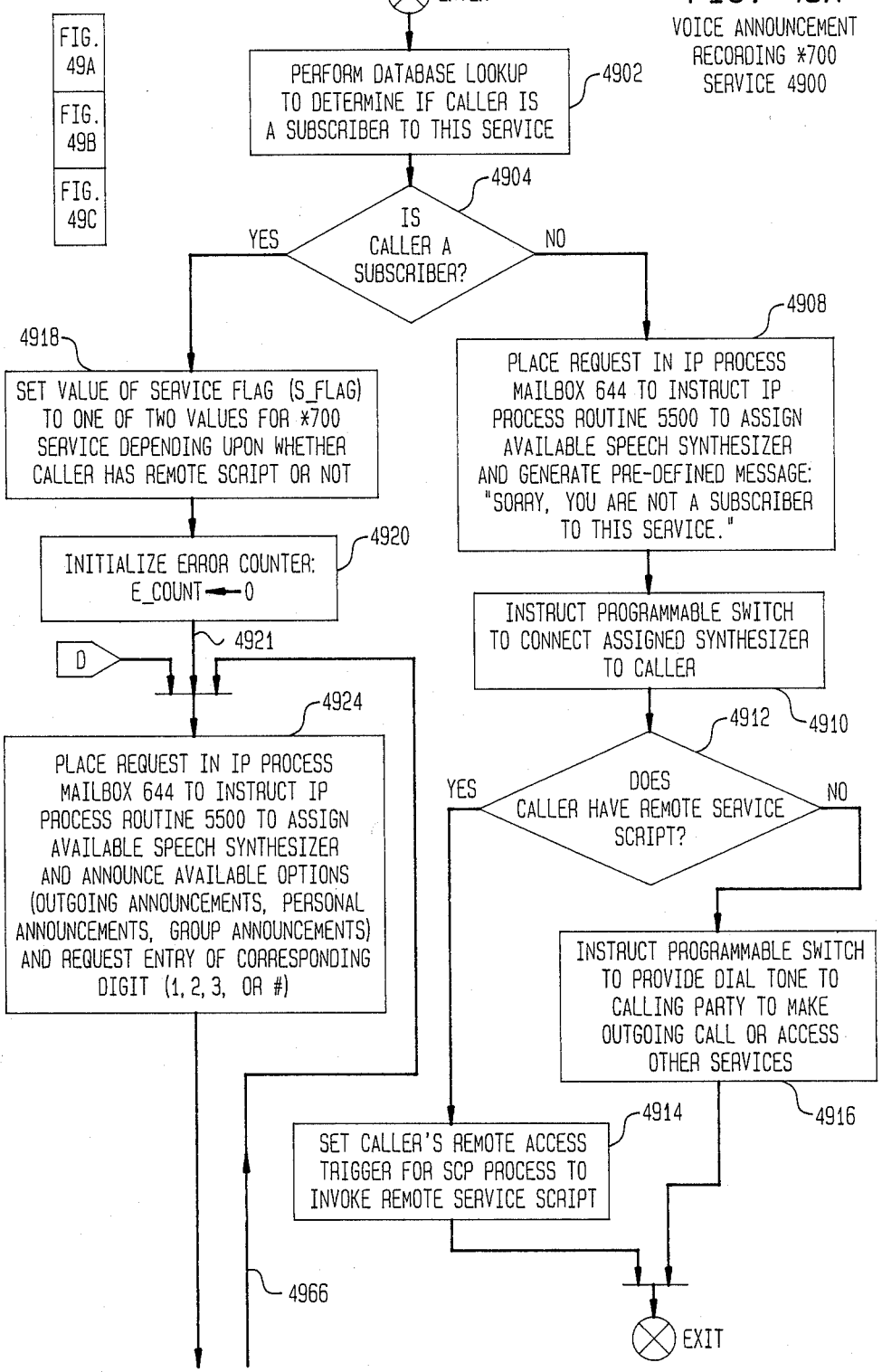
FIG. 49 shows the proper alignment of the drawing sheets for FIGS. 49A–49C.
FIGS. 49A–49C collectively depict a flowchart of Voice Announcement Recording *700 Service Routine 4900 that is executed within Digit Collection Routine 1700 shown in FIGS. 17A–17C.
Figure 49B:
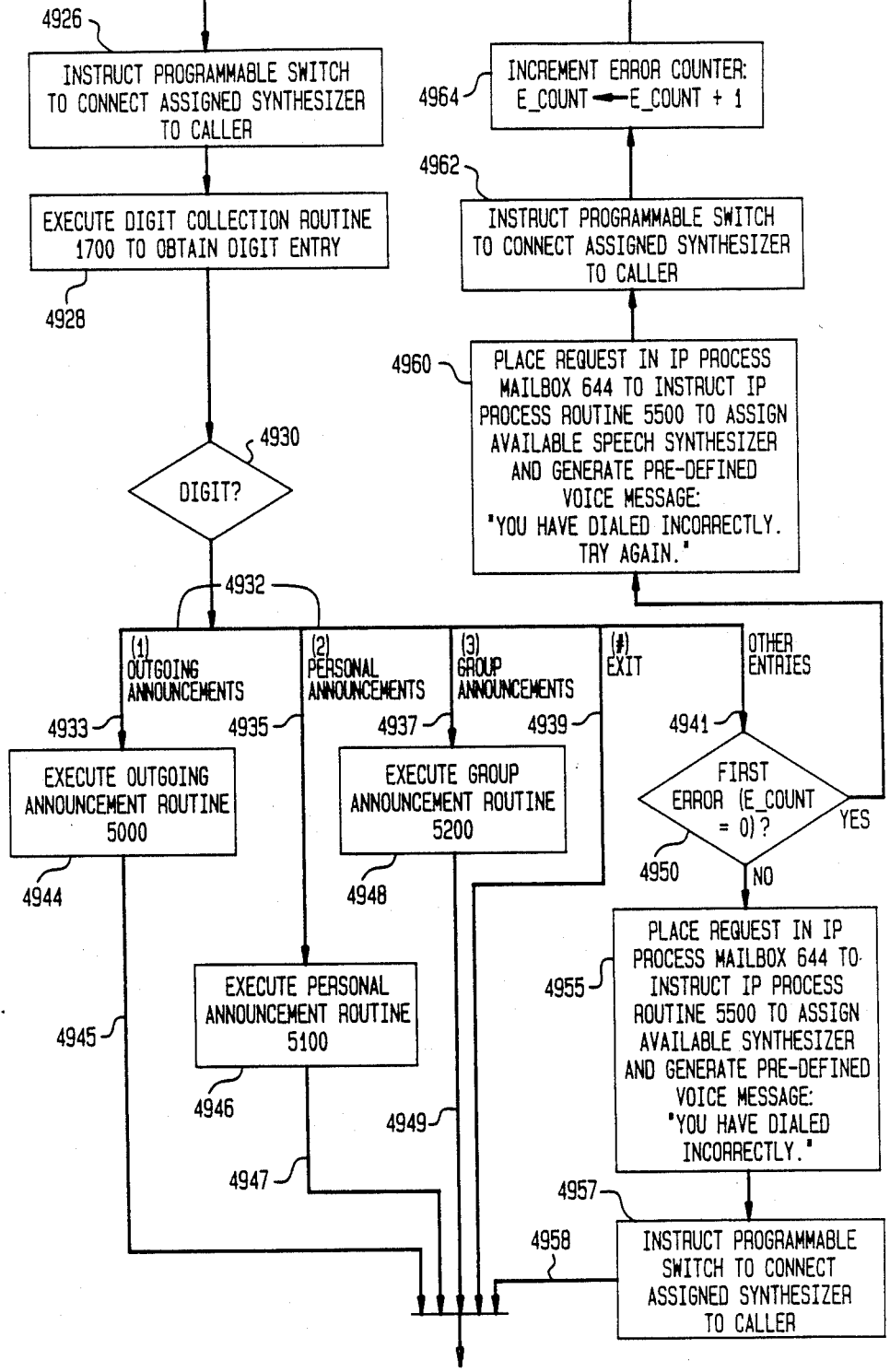
Figure 49C:
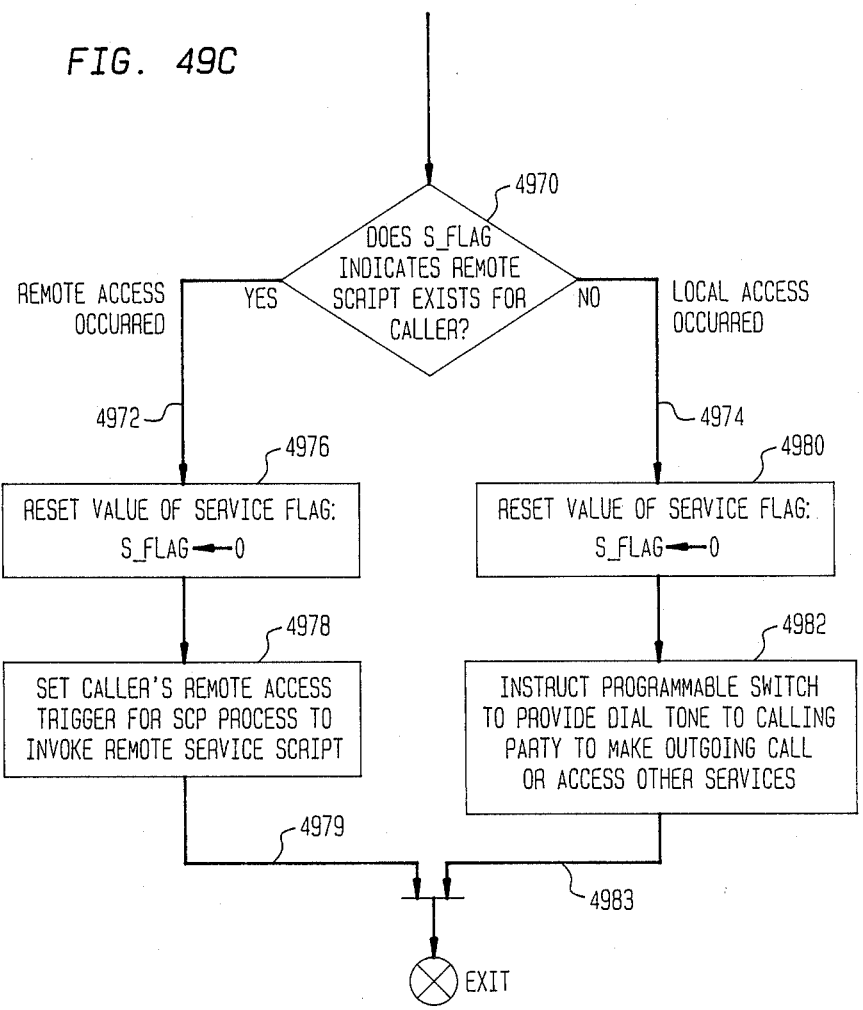
Figure 50B:
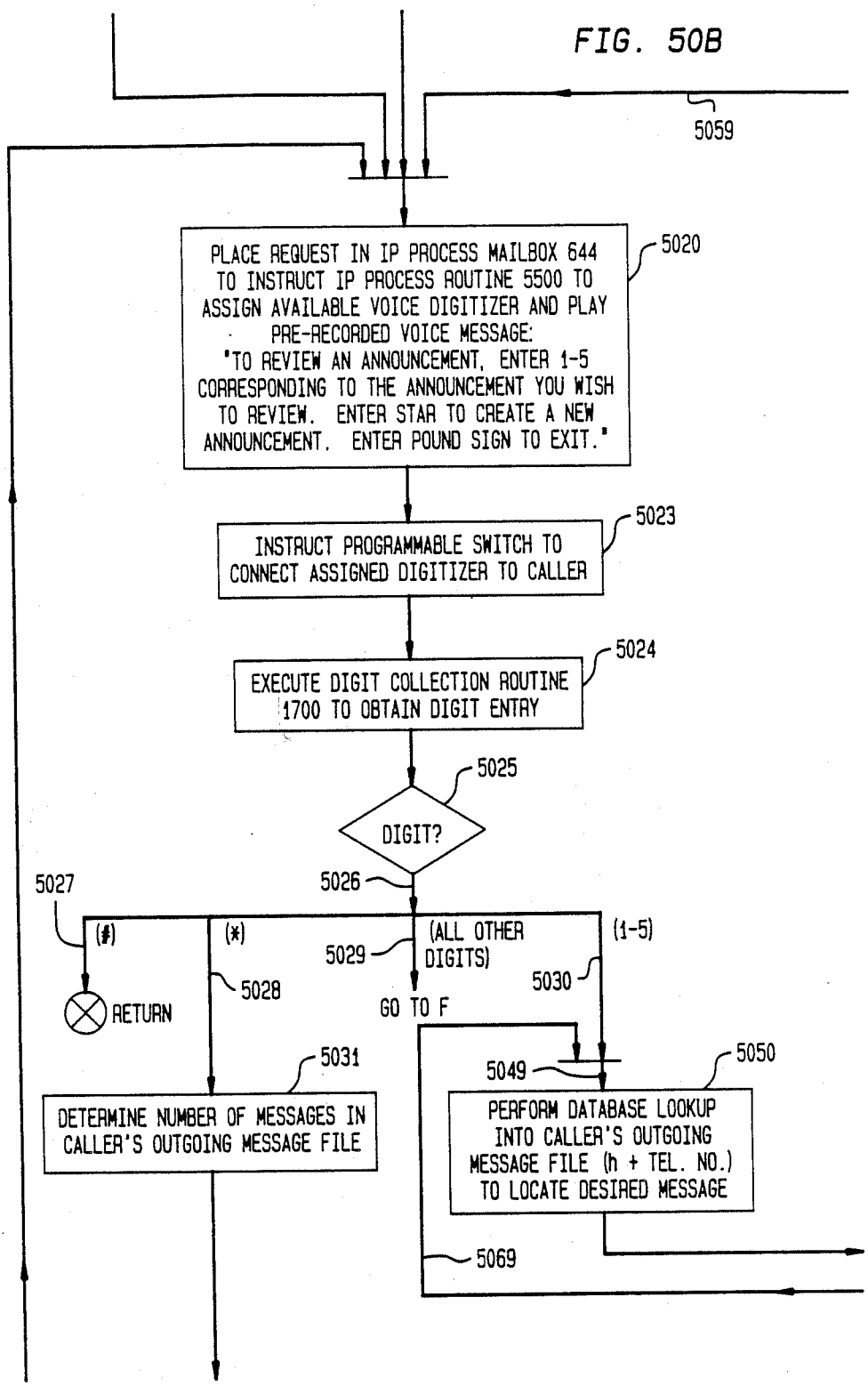
Figure 50C:
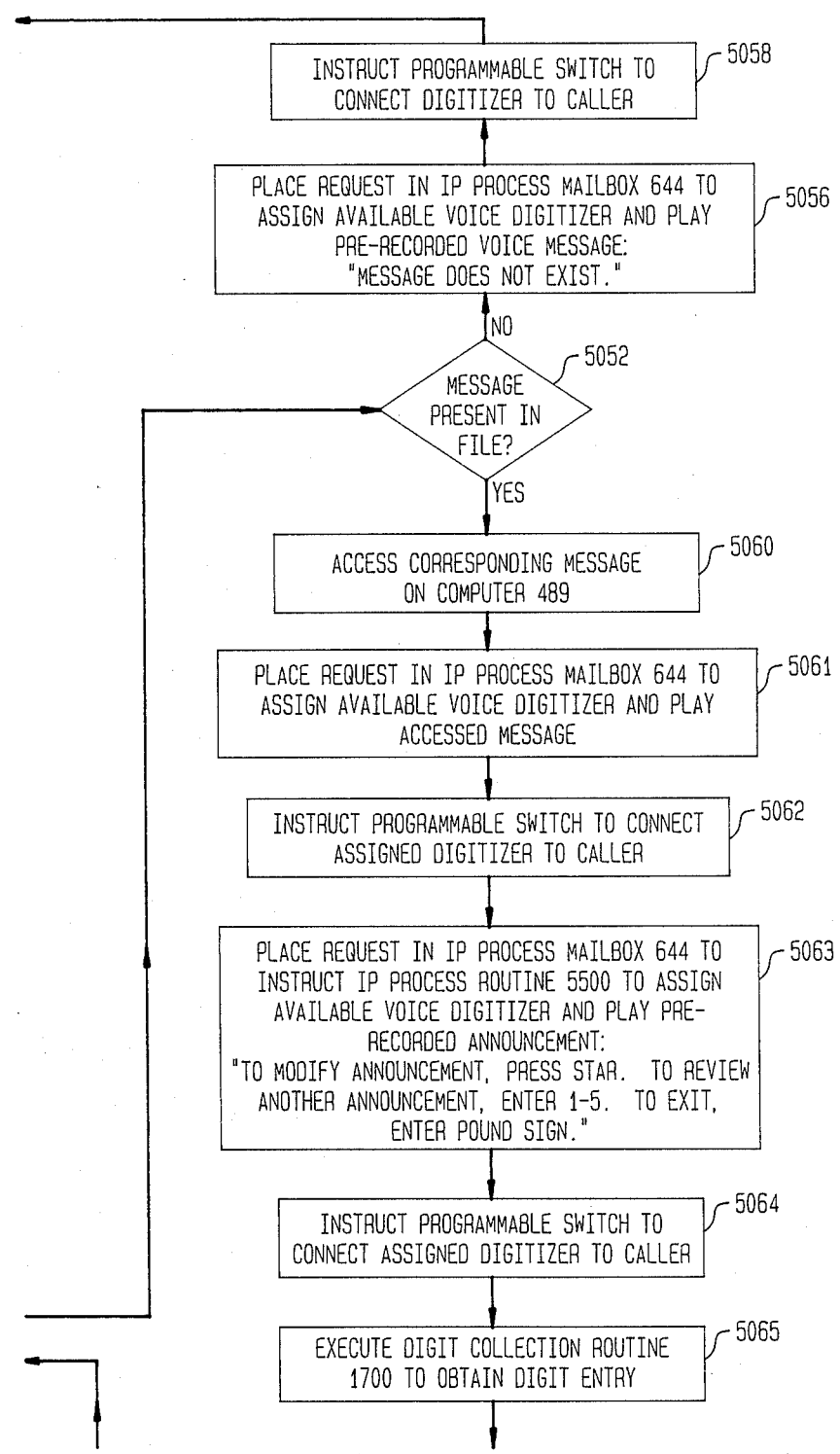
Figure 50D:
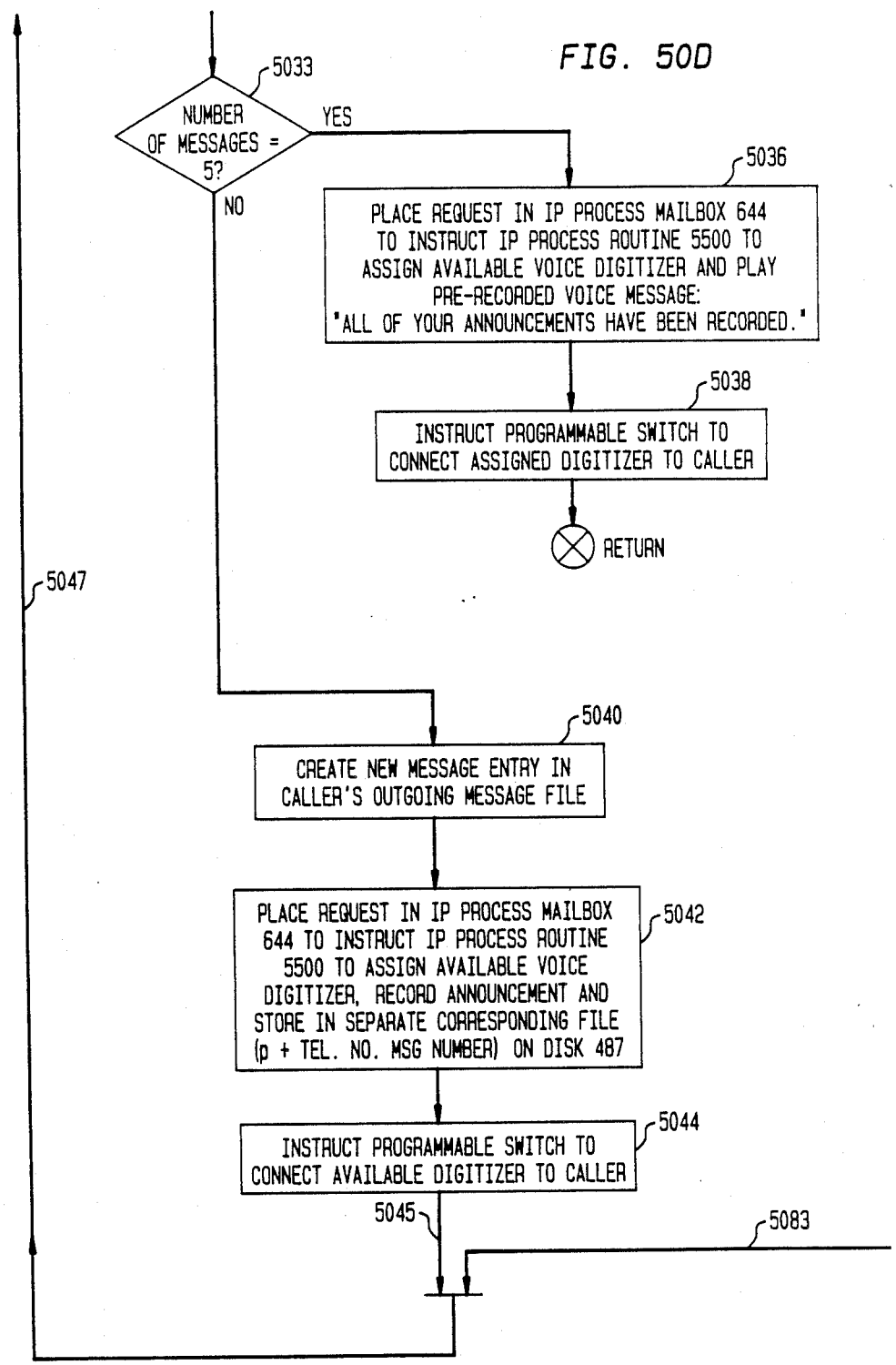
Figure 50E:
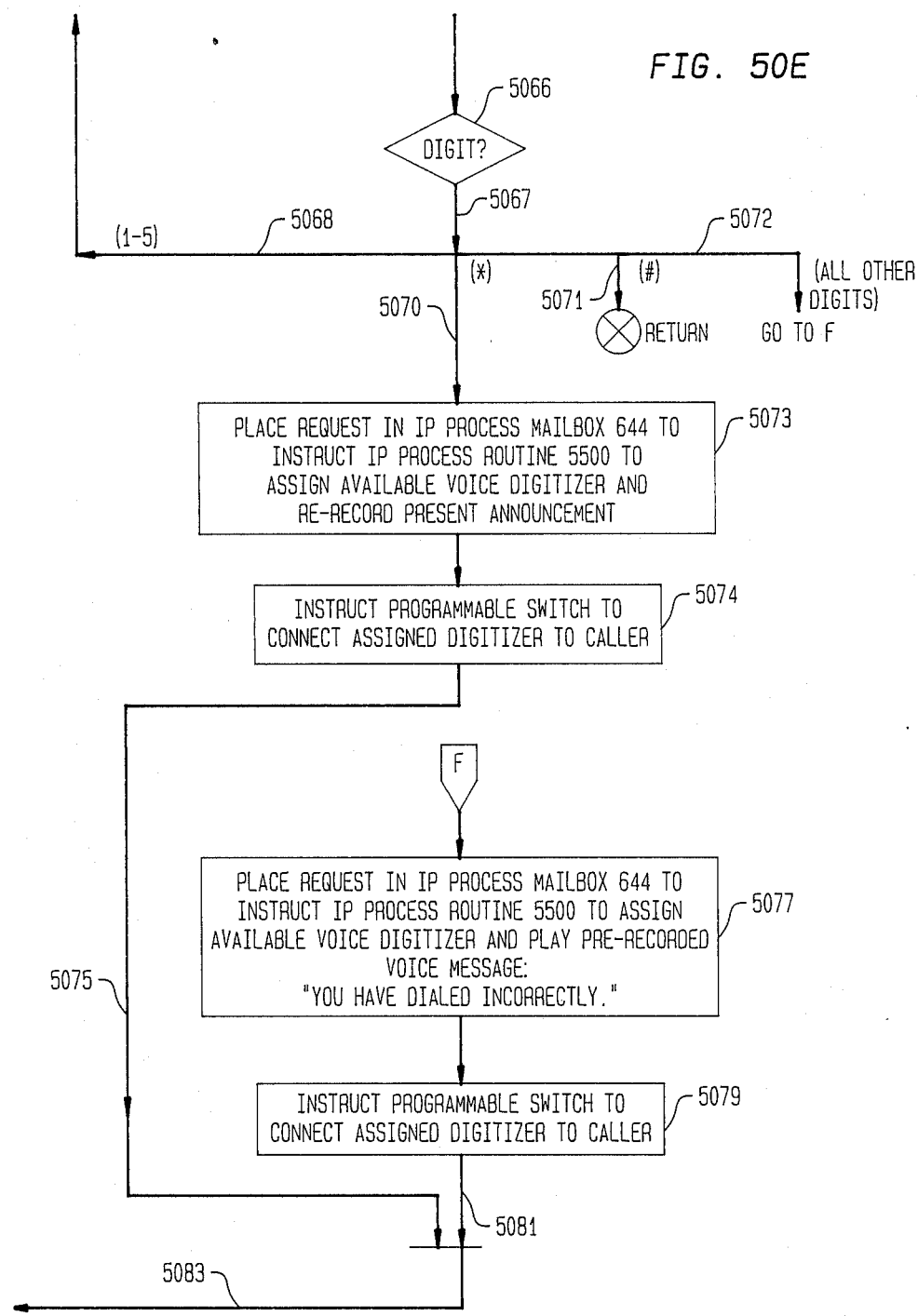

A flowchart of Voice Announcement *700 Service Routine is collectively depicted in FIGS. 49A–49C; for which the correct alignment of the drawing sheets for these figures is shown in FIG. 49. As noted above, this personal communication service permits the caller to record outgoing, personal or group announcements. An outgoing announcement is a voice message that can be recorded by a subscriber for subsequent playback to a caller whenever the subscriber does not answer his or her telephone. A personal announcement is a voice message that can be recorded by a subscriber for subsequent playback to a particular party. Lastly, a group announcement is a voice message that is recorded by a subscriber for subsequent playback to every member of a pre-defined group of called parties.

Specifically, upon entry into routine 4900, execution proceeds to block 4902. This block, when executed, performs a database look-up operation into an appropriate database stored within disk 496 (see FIGS. 4A–4D) to obtain information regarding whether the current caller is a subscriber to voice messaging service. Execution then passes, as shown in FIGS. 49A–49C, to decision block 4904 which tests this information to determine if the caller is such a subscriber. In the event the caller does not subscribe to this service, then an appropriate message will be generated to the caller and execution will appropriately exit from this routine. In particular, if the caller is not a subscriber, then decision block 4904 routes execution, via its NO path, to block 4908. This block, when executed, places a request in IP Process mailbox 644 to instruct IP Process routine 5500 to assign an available speech synthesizer and generate a message stating the caller is not a subscriber to this service. Once this occurs, execution passes to block 4910 which instructs the programmable switch to connect the assigned synthesizer to the caller. Thereafter, execution proceeds to decision block 4912 which determines whether the caller has a remote service script. If a remote script exists for this subscriber, than decision block 4912 routes execution, via its YES path, to block 4914. This latter block sets the remote access trigger for the subscriber in order to invoke processing of the remote service script for the caller. Alternatively, in the event the caller does not have a remote service script, then decision block 4912 routes execution, via its NO path, to block 4916. This latter block, when executed, instructs the programmable switch to provide dial tone to the caller in order to permit the caller to place an outgoing call or access other services. Once block 4914 or block 4916 has executed, then execution exits from routine 4900.

Now, if the caller is a subscriber to voice messaging service, then decision block 4904 routes execution, via its YES path, to block 4918. This latter block, when executed, sets the value of the service flag (S_FLAG) to one of two values assigned to the *700 service depending upon whether the caller has a remote service script or not. Thereafter, execution proceeds to block 4920 to initialize the contents of the error counter, E_COUNT. Once this has occurred, execution is directed along path 4921 to block 4924. This latter block, when executed, places a request in IP Process mailbox 644 to instruct IP Process routine 5500 (see FIG. 55 which will be discussed below) to assign an available speech synthesizer and generate a message announcing the available options (recording a outgoing, personal or group announcement; and exit) and requesting an entry of a digit (one, two, three or pound sign) to invoke a desired option. Once this occurs, execution passes, as shown in FIGS, 49A-49C, to block 4926 which instructs the programmable switch to connect the assigned synthesizer to the caller.

At this point, execution proceeds to block 4928 to invoke Digit Collection routine 1700 (discussed above in connection with see FIGS. 17A-17C) to obtain the value of the digit that the caller will now enter. Once this routine has fully executed, then execution proceeds, as shown in FIGS. 49A-49C, to decision block 4930 which decodes the entered digit and routes execution accordingly. Specifically, in the event the entered digit is a one which specifies that the caller desires to record an outgoing announcement, then decision block 4930 routes execution, via paths 4932 and 4933, to block 4944. This latter block, when executed, invokes Outgoing Announcement routine 5011 to record an outgoing announcement. Alternatively, in the event the entered digit is a two which signifies that the caller desires to record a personal announcement, then decision block 4930 routes execution, via paths 4932 and 4935, to block 4946. This latter block invokes Personal Announcement routine 5100 to record a personal announcement. Now, if the caller has entered a three which indicates that the caller desires to record a group announcement, then decision block 4930 routes execution, via paths 4932 and 4937, to block 4948. This latter block, when executed, invokes Group Announcement routine 5200 to record a group announcement. Once block 4944, block 4946 or block 4948 completely executes, then execution proceeds along path 4945, 4947 or 4949, respectively, to decision block 4970, which will be discussed shortly. In the event the caller enters a pound sign indicating that he or she desires to exit from the voice messaging service, then decision block 4930 routes execution, via paths 4932 and 4939, directly to decision block 4970.

Now, should the caller enter any other digit, then this entry is erroneous. If this is the first erroneous entry for this digit, then the caller is given a second opportunity to enter a correct digit. In the event a second erroneous digit is entered, then no further voice messaging services are provided to the caller at this time. Specifically, if an erroneous digit is entered, then decision block 4930 routes execution, via paths 4932 and 4941, to decision block 4950. This latter decision block, when executed, determines, based upon the contents of the error counter, whether this is the first erroneous entry for this digit. In the event this is the first error, then decision block 4950 routes execution, via its YES path, to block 4960. This block, when executed, places a request in IP Process mailbox 644 to instruct the IP Process to assign an available speech synthesizer and generate a message stating that an erroneous digit has been entered and requesting that a new digit should now be entered. Once this occurs, execution passes to block 4962 which instructs the programmable switch to connect the assigned synthesizer to the caller. Thereafter, execution proceeds to block 4964 which, when executed, increments the contents of the error counter by one. Execution then proceeds, via path 4966, back to block 4924 to prompt the user for the new digit. If, however, the user has just made a second erroneous entry for this digit, then decision block 4950 routes execution, via its NO path, to block 4955. This latter block places a request in IP Process mailbox 644 to instruct the IP Process to assign an available speech synthesizer and generate a message stating that incorrect dialing has occurred. Once this occurs, execution passes to block 4957 which, when executed, instructs the programmable switch to connect the assigned synthesizer to the caller. Thereafter, execution proceeds, via path 4958, to decision block 4970.

Decision block 4970 determines, in response to the value of the service flag, S_FLAG, whether the caller has a remote script. If a remote script exists for the present caller, the decision block 4970 routes execution, via YES path 4972, to block 4976. This latter block, when executed, resets the value of the service flag to zero to indicate that no service is executing for this subscriber. Thereafter, execution proceeds to block 4978 which sets the remote access trigger for the subscriber in order to invoke processing of the remote service script for the caller. Once this has occurred, execution exits, via path 4979, from routine 4900. Alternatively, in the event the value of the service flag indicates that the caller does not have a remote service script, then decision block 4970 routes execution, via NO path 4974, to block 4980. This latter block, when executed, also resets the value of the service flag to zero. Thereafter, execution proceeds to block 4982 which instructs the programmable switch to provide dial tone to the caller in order to permit the caller to place an outgoing call or access other services. Once this has occurred, execution then exits from routine 4900, via path 4983.

i. Outgoing Announcement Routine 5000 FIGS. 50A-50E collectively depict a flowchart of Outgoing Announcement Routine 5000 that is executed as part of Voice Announcement *700 Service Routine 4900. The correct alignment of the drawing sheets for FIGS. 50A-50E is shown in FIG. 50. This routine, as noted above, permits a subscriber to record (and play) an outgoing announcement. As discussed above, such an announcement is a voice message that can be recorded, by a subscriber, for subsequent playback to a caller whenever the subscriber does not answer his or her telephone.

Specifically, upon entry into routine 5000, execution proceeds to block 5001. This block, when executed, attempts to open an outgoing announcement file on disk 496 within host computer 499 (see FIGS. 4A-4D) for the caller. This file is illustratively named "h" followed by the telephone number of the caller, e.g. "h7581234". Once this occurs, execution proceeds, as shown in FIGS. 50A-50E, to decision block 5003 to determine whether this file exists. If this file could not be opened, then the caller has not recorded any outgoing announcements. In this case, decision block 5003 routes execution, via NO path 5005, to block 5006. This block, when executed, places a request in IP Process mailbox 644 to instruct the IP Process (specifically IP Process routine 5500) to assign an available voice digitizer and play a previously recorded message requesting the caller to enter a star to record a new announcement or a pound sign to exit. Once this occurs, execution passes to block 5008 which, when executed, instructs the programmable switch to connect the assigned digitizer to the caller. Thereafter, execution proceeds to block 5009 which invokes Digit Collection routine 1700 (discussed above in connection with see FIGS. 17A-17C) to obtain the value of the digit that will now be entered by the caller. Once this routine has completely executed, execution proceeds, as shown in FIGS. 50A-50E, from block 5009 to decision block 5010. This decision block, when executed, decodes the value of the entered digit and directs execution accordingly. In the event a pound sign was entered, then execution exits from routine 5000, via path 5011 emanating from decision block 5010. Alternatively, if a star was entered, then decision block 5010 directs execution, via path 5012, to block 5014. This latter block, when executed, creates an outgoing message file for the caller both on disk 496 and within the memory of host processor 490 (see FIGS. 4A-4D). This file is illustratively named "h" followed by the telephone number of the caller, e.g. "h7581234". In addition, block 5014 also creates an entry in this file. This entry specifies the name of the corresponding file stored within the voice messaging system that will contain the new announcement. The file stored within the voice messaging system is illustratively named "p" followed by the telephone number of the caller then followed by a number of the current announcement for this caller that is being recorded, e.g. "p7581234.1" for the first outgoing announcement for telephone number 758-1234. Once this occurs, then execution proceeds, as shown in FIGS. 50A-50E, to block 5016 which, when executed, places a request in IP Process mailbox 644 to instruct the IP Process routine to assign an available voice digitizer to play a previously recorded message requesting the caller to enter his or her spoken outgoing announcement and then record that announcement in the corresponding voice message file for that caller and stored within disk 487 located within the voice messaging system. Once this occurs, execution passes, as shown in FIGS. 50A-50E, to block 5018 which, when executed, instructs the programmable switch to connect the assigned digitizer to the caller. Once these operations have occurred, execution proceeds to block 5020. Now, in the event an outgoing message file already exists for the caller, then decision block 5003 simply routes execution, via YES path 5004, to block 5020.

At this point, the caller can record, review or modify (i.e. re-record) an existing outgoing announcement. Specifically, block 5020 when executed, places a request in IP Process mailbox 644 to instruct the IP Process to assign an available voice digitizer and play a previously recorded voice message requesting the caller to enter a digit, between one and five, corresponding to the particular outgoing announcement that the caller wants to review, a star to create a new outgoing announcement or a pound sign to exit. Once this occurs, execution passes, as shown in FIGS. 50A-50E, to block 5023 which, when executed, instructs the programmable switch to connect the assigned digitizer to the caller. Thereafter, execution proceeds to block 5024 which invokes Digit Collection routine 1700 (discussed above in connection with see FIGS. 17A-17C) to obtain the value of the digit that will now be entered by the caller. Once routine 1700 has completely executed, execution proceeds, as shown in FIGS. 50A-50E, from block 5024 to decision block 5025. This decision block, when executed, decodes the value of the entered digit and directs execution accordingly. Now, in the event, the caller entered a pound sign, then execution merely returns from routine 5000, via paths 5026 and 5027 emanating from decision block 5025. Alternatively, if the caller has entered a star to create a new outgoing announcement, then decision block 5025 routes execution, via paths 5026 and 5028, to block 5031. This latter block, when executed, determines the number of outgoing announcements in the caller's outgoing announcement file. At present, a caller can only record a maximum of five different outgoing announcements. This limit is arbitrary. In the event the caller already has five recorded outgoing announcements in his file, then he or she can not create any more such announcements. If five announcements exist in this file, then decision block 5033 routes execution, via its YES path, to block 5036. This block, when executed, places a request in IP Process mailbox 644 to instruct the IP Process to assign an available voice digitizer and play a previously recorded message stating that the caller has already recorded the maximum number of announcements. Once this occurs, execution passes to block 5038 which, when executed, instructs the programmable switch to connect the assigned digitizer to the caller. Thereafter, execution returns from routine 5000.

If, however, the caller has not recorded five different outgoing announcements, then decision block 5033 routes execution, via its NO path, to block 5040. This block, when executed, creates a new entry in the caller's outgoing message file stored within the memory of host processor 490 and within disk 496 (see FIGS. 4A-4D). This entry contains a corresponding file name for a new outgoing announcement for the caller. Once this has occurred, execution proceeds, as shown in FIGS. 50A-50E, to block 5042 which, when executed, places a request in IP Process mailbox 644 to instruct the IP Process routine to assign an available voice digitizer to play a previously recorded message requesting the caller to enter his or her spoken outgoing announcement and record that announcement in the corresponding voice message file for that caller and stored within disk 487 located within the voice messaging system. Once this occurs, execution proceeds to block 5044 which, when executed, instructs the programmable switch to connect the assigned digitizer to the caller. Once these operations have occurred, execution loops back, via paths 5045 and 5047, to block 5020 to again allow the caller to review, play or modify his outgoing announcements or simply exit from this service.

Now, if the event the caller has entered a digit other than a pound sign, a numeric digit between one and five or a star, then such an entry is erroneous. If this happens, then the user is simply prompted to re-enter the digit. Specifically, if an erroneous digit is entered, then decision block 5025 routes execution, via path 5029, to block 5077. This block, when executed, places a request in IP Process mailbox 644 to instruct the IP Process routine 5500 to assign an available voice digitizer to play a previously recorded message stating that the caller has entered an incorrect digit. Once this occurs, execution proceeds to block 5079 which, when executed, instructs the programmable switch to connect the assigned digitizer to the caller. Once these operations have occurred, execution loops back, via paths 5081, 5083 and 5047, to block 5020 to again allow the caller to review, play or modify his outgoing announcements or simply exit from this service.

Alternatively, should the caller enter a digit having a value between one and five, then decision block 5025 routes execution, via paths 5030 and 5049, to block 5050. This latter block, when executed, performs a database look-up operation into the caller's outgoing announcement file stored on the host computer in order to locate the entry corresponding to the outgoing announcement that the caller wishes to review. Execution then proceeds to decision block 5052. This decision block, when executed, determines whether an outgoing announcement exists that corresponds to the digit entered by the caller, e.g. whether, if the caller entered the digit five, that a corresponding outgoing announcement number five exists. If such an announcement does not exist, then decision block 5052 routes execution, via its NO path, to block 5056. This block, when executed, places a request in IP Process mailbox 644 to instruct the IP Process to assign an available voice digitizer to play a previously recorded message stating that the selected outgoing announcement does not exist. Once this occurs, execution proceeds to block 5058 which, when executed, instructs the programmable switch to connect the assigned digitizer to the caller. Once these operations have occurred, execution loops back, via path 5059, to block 5020 to again allow the caller to review, play or modify any of his or her outgoing announcements or simply exit from this service.

Should an outgoing announcement corresponding to the entered digit exist, then decision block 5052 routes execution, via its YES path, to block 5060. This block, when executed, accesses the file name of a corresponding voice message, in this case an outgoing announcement, stored on disk 489 within the voice messaging system. Thereafter, execution proceeds to block 5061 which, when executed, places a request in IP Process mailbox 644 to instruct the IP Process routine to assign an available voice digitizer to play the corresponding outgoing announcement. Once this occurs, execution proceeds to block 5062 which, when executed, instructs the programmable switch to connect the assigned digitizer to the caller. Thereafter, execution proceeds to block 5063 which, when executed, places a request in IP Process mailbox 644 to instruct IP Process routine 5500 to assign an available voice digitizer to play a previously recorded voice message instructing the caller to enter a star if he or she desires to modify (re-record) an announcement, a digit between one and five corresponding to the announcement the caller desires to review, or a pound sign to exit. Once this occurs, execution passes to block 5064 which, when executed, instructs the programmable switch to connect the latest assigned digitizer to the caller. Thereafter, execution proceeds to block 5065 which invokes Digit Collection routine 1700 (discussed above in connection with see FIGS. 17A-17C) to obtain the value of the digit that will now be entered by the caller. Once routine 1700 has completely executed, execution proceeds, as shown in FIGS. 50A-50E, from block 5065 to decision block 5066. This decision block, when executed, decodes the value of the entered digit and directs execution accordingly. Now, if the caller has entered a digit having a value between one and five, then decision block 5066 routes execution, via paths 5067, 5068 and 5069, back to block 5050 to access a corresponding outgoing announcement. Alternatively, if the caller has entered a star, then decision block 5066 routes execution, via paths 5067 and 5070, to block 5073. This block, when executed, places a request in IP Process mailbox 644 to instruct the IP process to assign an available voice digitizer to play a previously recorded message requesting the caller to enter his or her spoken outgoing announcement and record that announcement in the corresponding voice message file for that caller stored within disk 487 located within the voice messaging system. Once this occurs, execution proceeds to block 5074 which, when executed, instructs the programmable switch to connect the assigned digitizer to the caller. Once these operations have occurred, execution loops back, via paths 5075, 5083 and 5047, to block 5020 to again allow the caller to review, play or modify any of his or her outgoing announcements or simply exit from this service. Alternatively, if the caller entered a pound sign, then execution merely returns from routine 5000, via path 5071 emanating from decision block 5066. Lastly, if the caller has entered any digit other than a number between one and five, a star or a pound sign, then such an entry is erroneous. In this case, decision block 5066 routes execution, via path 5072, to block 5077, as discussed above, which, in conjunction with block 5079, appropriately informs the caller of this erroneous entry. Execution then loops back to block 5020 to again allow the caller to review, play or modify any of his or her outgoing announcements or simply exit from this service.

ii. Personal Announcement Routine 5100

Figure 51B:
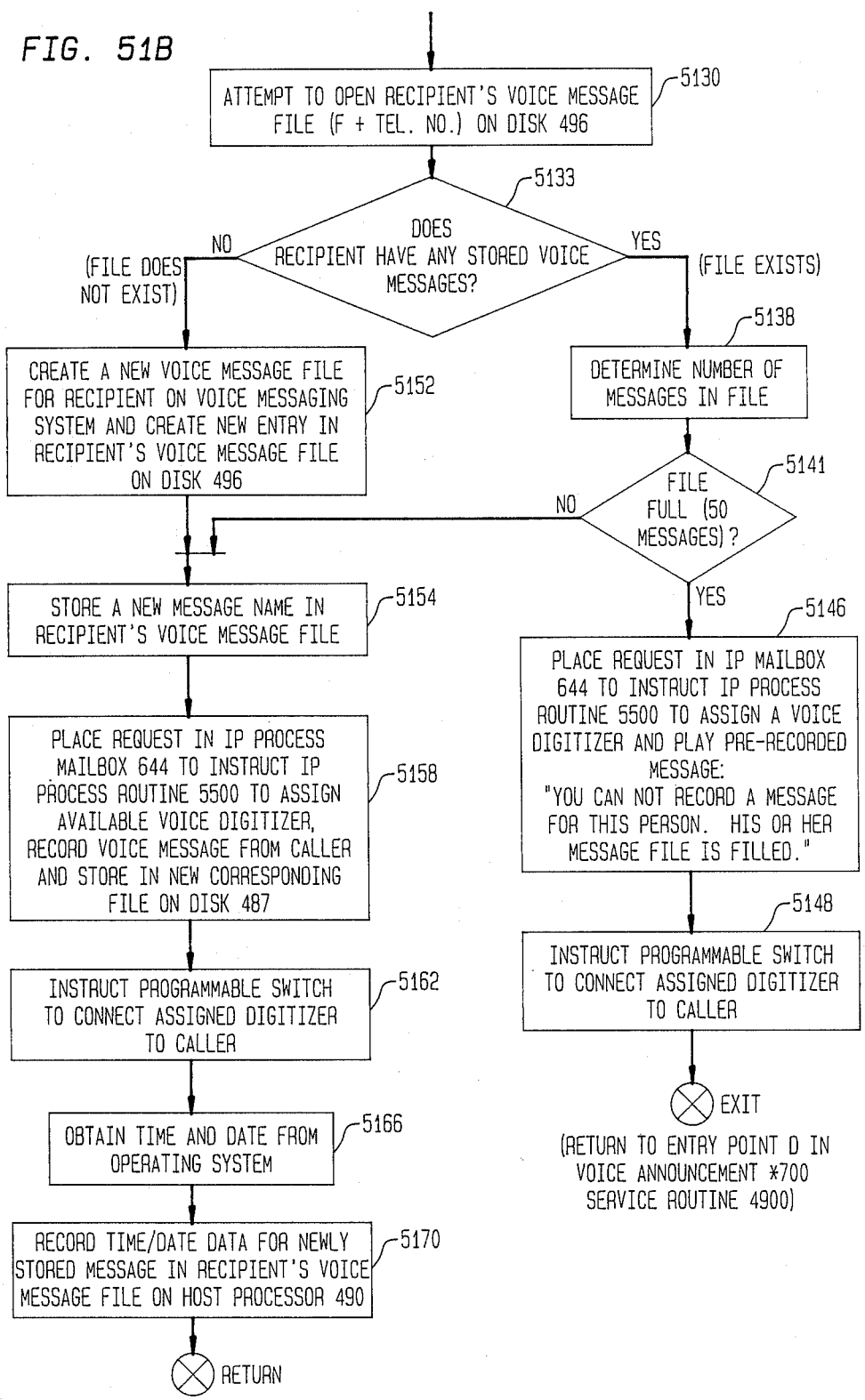

FIGS. 51A and 51B collectively depict a flowchart of Personal Announcement Routine 5100 that is executed as part of Voice Announcement *700 Service Routine 4900. The correct alignment of the drawing sheets for FIGS. 51A and 51B is shown in FIG. 51. As noted above, this routine permits a subscriber to record a personal (voice message) announcement for later playback to another party (a recipient). This other party must be an MSN service subscriber and hence can only exist within the area served by the local switch.

Specifically, upon entry into routine 5100, execution proceeds to block 5102. This block, when executed, places a request in IP Process mailbox 644 to instruct the IP Process to assign an available voice digitizer to play a previously recorded message requesting the caller to enter a seven digit local telephone number of the particular party (the recipient) for whom a personal message is to be recorded. Once this occurs, execution passes to block 5105 which, when executed, instructs the programmable switch to connect the assigned digitizer to the caller. Thereafter, block 5108 is executed to initialize the contents of the digit counter, D_COUNT, to zero.

At this point, execution proceeds to block 5111 which, when executed, invokes Digit Collection routine 1700 (discussed above in connection with FIGS. 17A-17C) to obtain the value of the digit that will now be entered by the caller. Once routine 1700 has fully executed, as shown in FIGS. 51A and 51B, then execution proceeds to block 5114 which increments the contents of the digit counter by one. Once this occurs, execution proceeds to decision block 5117 which determines, based upon the contents of the digit counter, whether seven digits have been entered. If additional digits remain to be entered, then decision block 5117 routes execution, via NO path 5119, back to block 5111 to obtain the value of the next successive digit in the local telephone number being entered. Alternatively, in the event all seven digits of the telephone number of the recipient have been collected, then decision block 5117 routes execution, via YES path 5121, to block 5124. This latter block, when executed, performs a database look-up operation in the TELfor.d database (which is stored on disk 496 and has been downloaded into host processor 490, as discussed above) to locate the recipient's telephone number. After this has occurred, execution proceeds to decision block 5125 which determines, based upon the results of the database look-up operation, whether this entered number exists, i.e. whether the recipient is an MSN service subscriber. If this number does not exist, then no message can be left for the recipient. In this case, execution exits from routine 5100, via the NO path emanating from decision block 5125, and returns to entry point D in Voice Announcement Recording *700 routine 4900 (which has been discussed in connection with FIGS. 49A-49C) in order to permit the caller to invoke any of the voice announcement services (outgoing, personal and/or group).

Now, if the entered telephone number for the recipient exists within the TELford database, then decision block 5125 routes execution, via its YES path, to block 5130. This latter block, when executed, attempts to open the recipient's voice message file stored on the host computer. As discussed above, this file is named "f" followed by the recipient's telephone number, e.g. "f7581234". This file will contain an entry for each stored voice message. The entry will be the file name of the file, stored on the voice messaging system, that contains the digitized voice message for the recipient. If there are no stored voice messages for the recipient, then this file will not exist. After this attempt has been made, execution proceeds to decision block 5133 which determines, based upon the results of this attempt, whether a voice message file exists, i.e. voice messages have been stored for the recipient. In the event this file does not exist, then decision block 5133 routes execution, via its NO path, to block 5152 which, when executed, creates a voice message file on both disk 496 and within the memory of host processor 490 (see FIGS. 4A-4D) for the recipient. Execution then proceeds, as shown in FIGS. 51A and 51B, to block 5154, which will be discussed below. Alternatively, if a voice message file exists for the recipient, i.e. the recipient has stored voice messages, then decision block 5133 routes execution, via its YES path, to block 5138. This latter block determines, simply by counting, the number of entries for voice messages that exist within the recipient's voice message file. At present, a party can only have a maximum of fifty stored voice messages at any one time. This maximum amount has been arbitrarily chosen and can be changed to another limit, if desired. At this point, execution proceeds to decision block 5141 which determines whether the recipient's voice message file contains fifty entries which correspond to fifty stored voice messages. If so, then the caller can not store a message within this file and hence can not leave a personal message for the recipient. Therefore, if the recipient's stored voice message file already contains fifty entries for stored voice messages, then decision block 5141 routes execution, via its YES path, to block 5146. This latter block, when executed, places a request in IP Process mailbox 644 to instruct the IP Process to assign an available voice digitizer to play a previously recorded message stating that the recipient's voice message file is full and that hence a voice message can not be left for the recipient. Once this occurs, execution proceeds to block 5148 which, when executed, instructs the programmable switch to connect the assigned digitizer to the caller. Once this has occurred, execution exits from routine 5100 and appropriately returns to entry point D in Voice Announcement *700 Service routine 4900 (which has been discussed in connection with FIGS. 49A-49C) in order to permit the caller to invoke any of the voice announcement services (outgoing, personal and/or group). Alternatively, in the event, the recipient's voice message file contains entries for less than fifty stored voice messages, then decision block 5141 routes execution, via its NO path, to block 5154.

Block 5154, when executed, creates an new voice message file within the voice messaging system and stores the name of that file as a new entry in the recipient's voice message file located on both disk 496 and within the memory of host processor 490 (see FIGS. 4A-4D). Thereafter, execution proceeds, as shown in FIGS. 51A and 51B, to block 5158 which, when executed, places a request in IP Process mailbox 644 to instruct the IP Process routine to assign an available voice digitizer to record a voice message (personal announcement) from the caller and store the resulting digitized message in the newly created file located on disk 487 situated within the voice messaging system (see FIGS. 4A-4D). Once this occurs, execution passes, as shown in FIGS. 51A and 51B, to block 5162 which, when executed, instructs the programmable switch to connect the assigned digitizer to the caller. Thereafter, execution proceeds to block 5166 which obtains, from the operating system, the time and date at which the voice message was just recorded. After this occurs, block 5170 is executed to record the time and date for this voice message within the recipient's voice message file stored on disk 496 and on host processor 490. At this point, execution returns from routine 5100.

iii. Group Announcement Routine 5200

Figures 52, 52A:
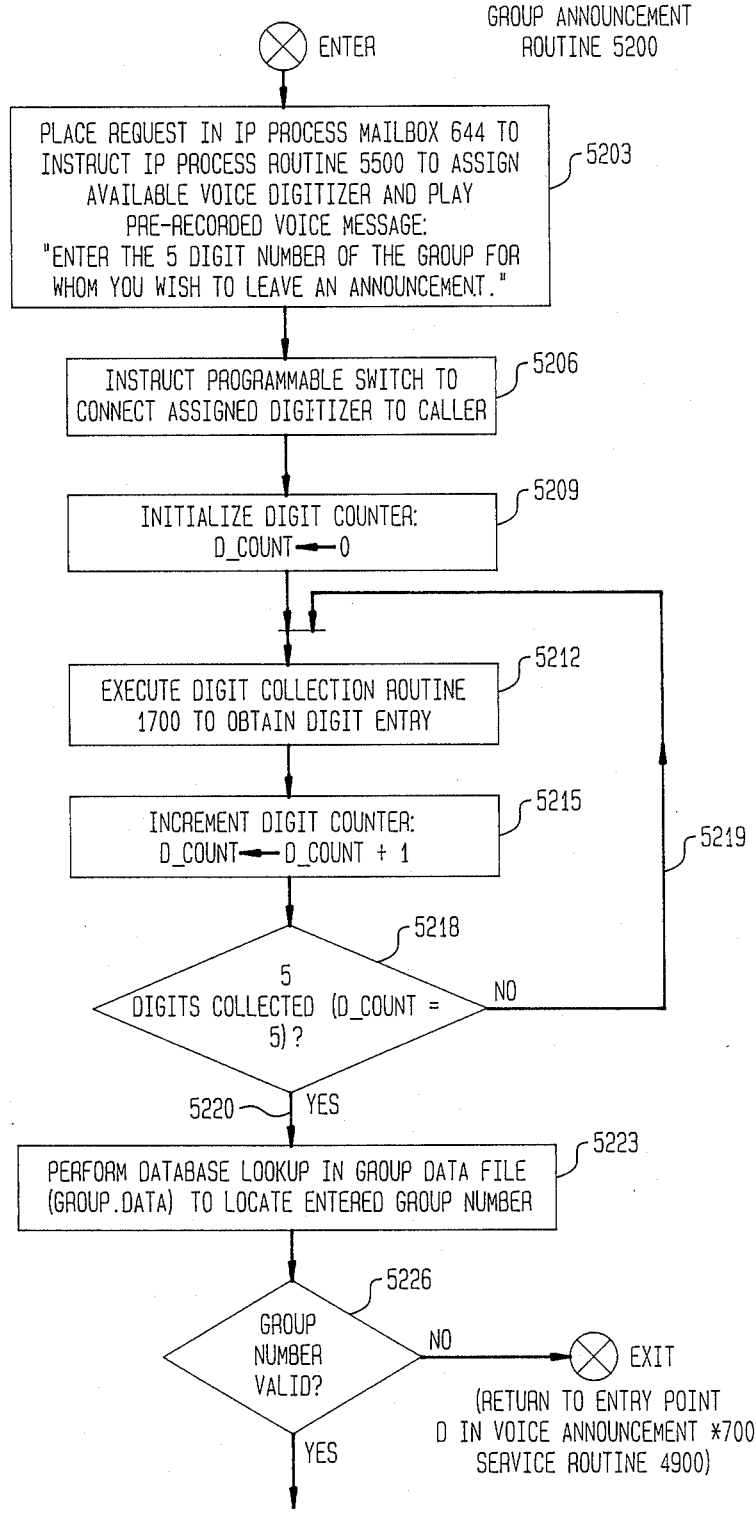
FIG. 52 shows the proper alignment of the drawing sheets for FIGS. 52A–52C.
FIGS. 52A–52C collectively depict a flowchart of Group Announcement Routine 5200 that is executed as part of Voice Announcement Recording *700 Service Routine 4900 shown in FIGS. 49A–49C.
Figure 52B:
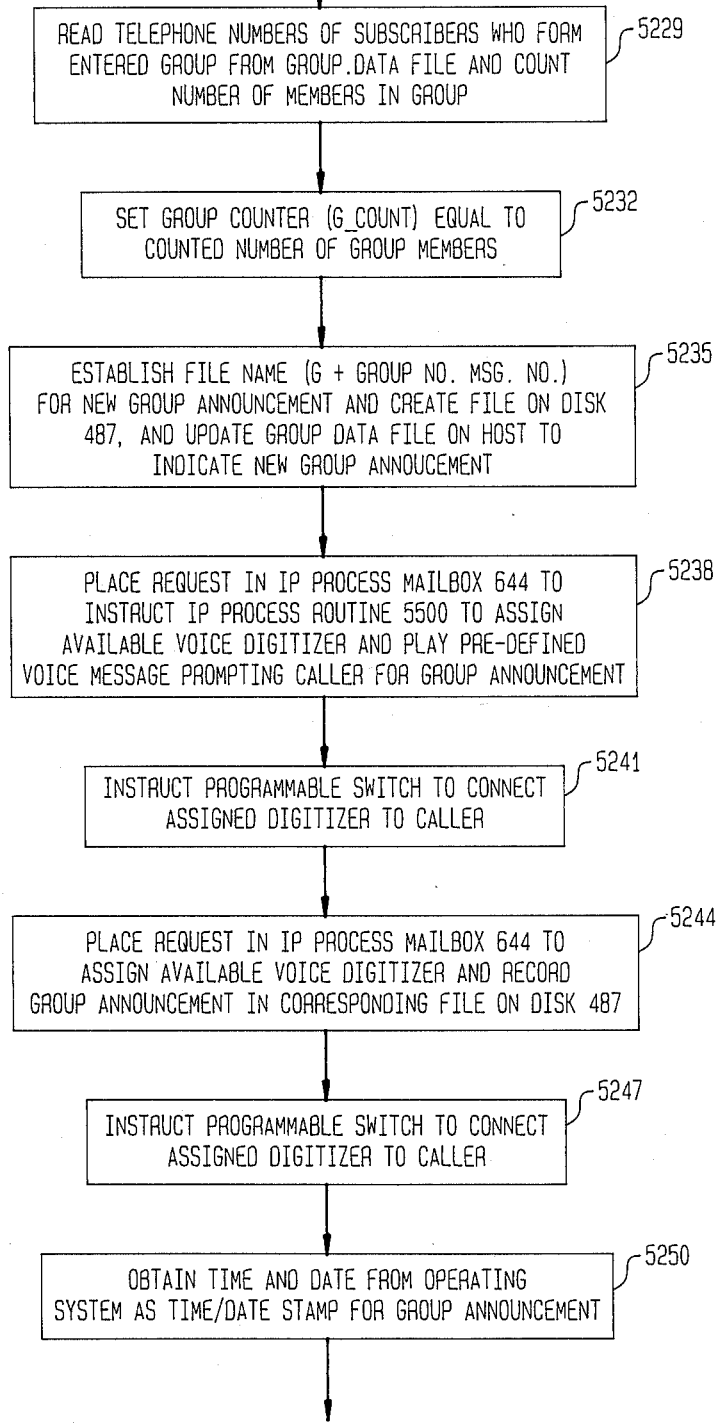
Figure 52C:
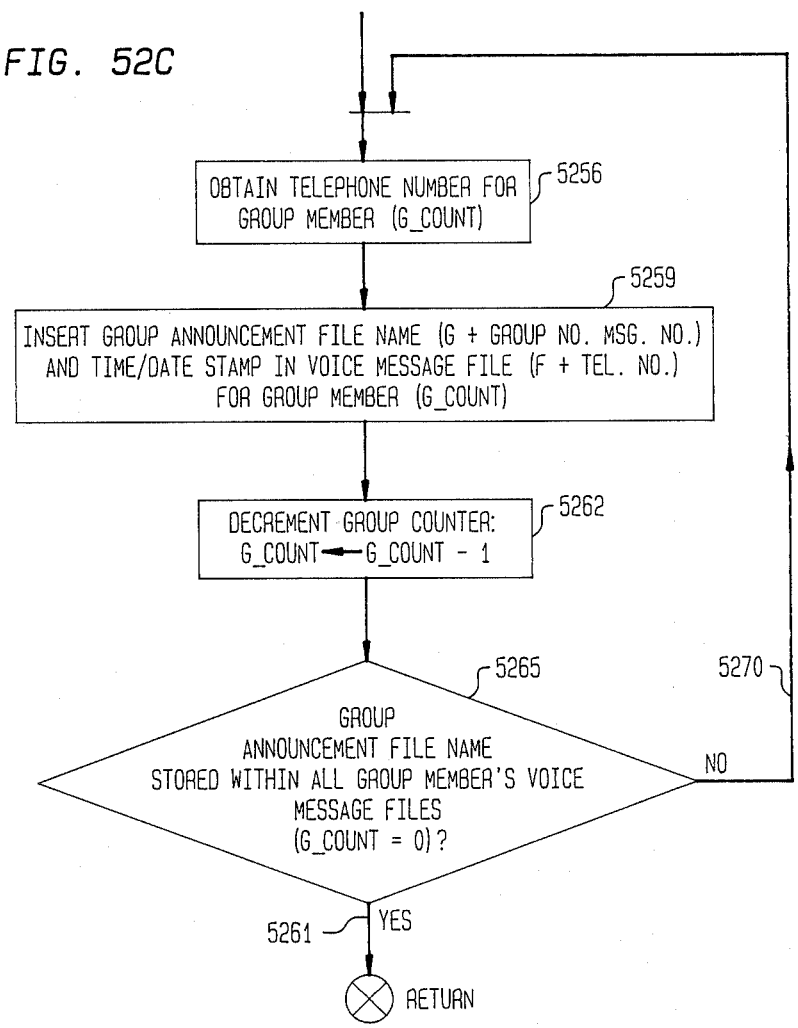

FIGS. 52A-52C collectively depict a flowchart of Group Announcement Routine 5200 that is executed as part of Voice Announcement *700 Service Routine 4900. The correct alignment of the drawing sheets for FIGS. 52A-52C is shown in FIG. 52. As noted above, this routine permits a subscriber to record a voice message (here an announcement) for subsequent playback to every member of a pre-defined group of called parties.

Specifically, upon entry into routine 5200, execution proceeds to block 5203. This block, when executed, places a request in IP Process mailbox 644 to instruct the IP Process routine 5500 to assign an available voice digitizer to play a previously recorded message requesting that the caller enter a desired group number having illustratively five digits. To simplify the handling of group messages, groups of recipients can be pre-defined and stored in a database situated on disk 496 (see FIGS. 4A-4D). Each specific group can be identified by a specific number. In this manner, the organizational layout of an organization can be stored into this database with each group being a different pre-defined section of that organization. An announcement can be sent to individuals situated within any one section by entering the group number associated with that section. Now, once block 5203 has fully executed, execution passes, as shown in FIGS. 52A-52C, to block 5206 which, when executed, instructs the programmable switch to connect the assigned digitizer to the caller. Thereafter, execution proceeds to block 5209 which, when executed, initializes the contents of the digit counter, D_COUNT, to zero. Execution then proceeds to block 5212 to invoke Digit Collection routine 1700 (as discussed above in connection with FIGS. 17A-17C) to obtain the value of the next digit that the caller will now enter. Once this routine has fully executed, execution proceeds from block 5212 to block 5215. This latter block, when executed, increments the contents of the digit counter by one. Thereafter, decision block 5218 executes to determine, based upon the contents of the digit counter, whether the values of all five digits of the group number have been obtained. In the event additional digits remain to be collected from the caller, then decision block 5218 routes execution, via NO path 5219, back to block 5212 to obtain a value for the next successive digit. If, however, values for all five digits have been collected, then decision block 5218 routes execution, via YES path 5220, to block 5223.

Block 5223, when executed, performs a database look-up operation in a file, illustratively named group.-data, situated on disk 496 (see FIGS. 4A-4D) in an attempt to locate the group number that the caller has just entered. Once this attempt has occurred, execution passes to decision block 5226. This decision block determines, based upon the results of the database look-up attempt, whether the entered group number is valid. If the group number is not in the database, then an invalid group number, i.e. a number for which there is no group, was entered. As a result, no message can be left for this group. In this case, execution exits from routine 5200, via the NO path emanating from decision block 5226, and appropriately returns to entry point D in Voice Announcement *700 Service routine 4900 (which has been discussed in connection with FIGS. 49A-49C) in order to permit the caller to invoke any of the voice announcement services (outgoing, personal and/or group). Alternatively, in the event the group number is valid, then decision block 5226 routes execution, via its YES path, to block 5229.

When executed, block 5229 reads the telephone number of each member of the desired group from the group.data file and simultaneously counts the number of members in this group. Execution then proceeds to block 5232 which sets the contents of a group counter, $G_{13}$ COUNT, equal to the resulting count. Thereafter, block 5235 is executed to establish a file name for a new group announcement. This file name, stored within a database on disk 496, is the name of a file, stored on disk 487 within the voice messaging system, that contains the actual digitized group announcement. In particular, this file name illustratively consists of "g" followed by the group number followed by a group announcement number, e.g. "g78309.1" for the first group announcement for all members of organization "78309". If the new group announcement is the second announcement for this group then the group announcement number would be set to two and so on for subsequent group messages, e.g."g78309.2". A group announcement number counter is associated with each group and is located within the group.data database. During execution of block 5235, the group announcement counter for the present group is incremented by one to reflect the additional announcement for all members of this group. The contents of this counter are used in establishing file names for subsequent announcements to this group. Once block 5235 has fully executed, execution proceeds to block 5238 which, when executed, places a request in IP Process mailbox 644 to instruct the IP Process to assign an available voice digitizer to play a previously recorded message prompting the caller to recite the desired group announcement for the group. Now, once block 5241 has fully executed, execution proceeds to block 5206 which, when executed, instructs the programmable switch to connect the assigned digitizer to the caller. Thereafter, block 5244 executes which places a request in IP Process mailbox 644 to instruct the IP Process to assign an available voice digitizer to record the group announcement recited by the caller and store that announcement in the corresponding file on disk 487 situated within the voice messaging system. Now, once block 5244 has fully executed, execution passes to block 5247 which, when executed, instructs the programmable switch to connect the assigned digitizer to the caller. Execution then proceeds to block 5250 which, when executed, reads the time and date at which the announcement was recorded, from the UNIX operating system, to form a time/date stamp for this announcement.

At this point, execution proceeds to block 5256 which, when executed, obtains the telephone number for each successive member of the group, starting with the first member. Once this number is obtained, block 5259 is executed to store the group announcement file name (i.e. "g" followed by the organization number followed by the group announcement number) and the accompanying time/date stamp as a voice message into the voice message file (i.e. if followed by the telephone number) stored on disk 496 (see FIGS. 4A-4D) for that member in the group. Execution then proceeds, as shown in FIGS. 52A-52C, to block 5262 to decrement the contents of the group counter, G_COUNT, by one. Once this occurs, then decision block 5265 is executed to determine, based upon the contents of the group counter, whether the group announcement was stored within the voice message file for each member of the group. If remaining group members exist, then decision block 5265 loops execution, via path 5270, back to block 5256 to obtain the telephone number of the next successive member of the group. Alternatively, if the group announcement has been stored in the voice message file of every group member, then execution returns from routine 5200, via YES path 5261 emanating from decision block 5265.

f. Queued Call Back *800 Service Routine 5300

Figure 53B:
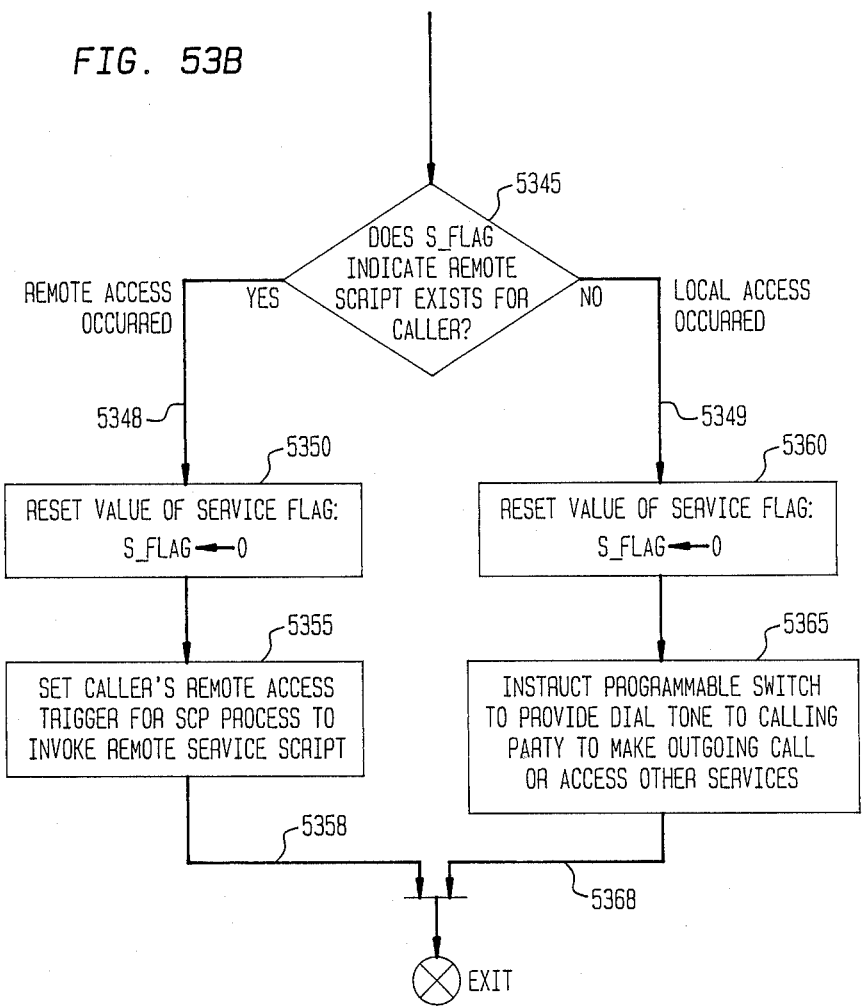

A flowchart of Queued Call Back *800 Service Routine is collectively depicted in FIGS. 53A and 53B; for which the correct alignment of the drawing sheets for these figures is shown in FIG. 53. As noted above, this personal communication service permits a subscriber to access his or her queued telephone calls. Through this service, the subscriber receives a synthesized message providing the telephone number and name, if available, of prior callers along with the time and date of each corresponding call.

Specifically, upon entry into routine 5300, execution proceeds to block 5305 which, when executed, sets the value of the service flag (S_FLAG) to one of two values assigned to the *800 service depending upon whether the caller has a remote script or not. Thereafter, execution proceeds to block 5310 which, when executed, reads the queued call back file existing on disk 496 into the memory within host processor 490 (see FIGS. 4A-4D). Thereafter, as shown in FIGS. 53A and 53B, decision block 5315 is executed to determine whether any queued telephone numbers (queued calls) exist in this file. If no such queued numbers exist, then decision block 5315 routes execution, via its NO path, to block 5320. This block, when executed, places a request in IP Process mailbox 644 to instruct the IP Process to assign an available speech synthesizer to synthesize a pre-defined message stating that the caller has no queued calls. Once this occurs, execution proceeds to block 5325 which, when executed, instructs the programmable switch to connect the assigned synthesizer to the caller. After these operations have occurred, execution exits from routine 5300.

Now, in the event the caller has queued telephone numbers in his or her queued call back file, then decision block 5315 routes execution, via its YES path, to block 5330. This block, when executed, reads a next successive entry existing in this file. For the first time block 5330 is executed for the present caller, the entry that is read is that associated with the latest queued telephone number in the file. The information read from each entry includes the caller's telephone number and name, if available, along with information specifying the time and date at which the call occurred. If the number and name are not available, such as in an out of area call, then this is replaced with a notation indicating that the corresponding call was out of area. Thereafter, execution proceeds to block 5333 which, when executed, places a request in IP Process mailbox 644 to instruct the IP Process to assign an available speech synthesizer to synthesize a message regarding the queued call that was just read from the file. This message includes the caller's telephone number and name, if available, (or out of area, if not available) along with the time and date of the call. Once this occurs, execution proceeds to block 5335 which, when executed, instructs the programmable switch to connect the assigned synthesizer to the caller. Execution then proceeds to decision block 5340. This decision block determines whether the end of the caller's queued call back file has been reached, i.e. whether information regarding the last call in this file was provided to the caller. In the event additional calls exist in this file, then decision block 5340 loops execution, via NO path 5342, back to block 5330 to access the next successive entry in this file. If, however, the end of this file has been reached, then decision block 5340 routes execution, via YES path 5344, to decision block 5345.

Decision block 5345 determines, in response to the value of the service flag, S_FLAG, whether the subscriber has a remote script. If a remote script exists for this subscriber, the decision block 5345 routes execution, via YES path 5348, to block 5350. This latter block, when executed, resets the value of the service flag to zero to indicate that no service is executing for this subscriber. Thereafter, execution proceeds to block 5355 which sets the remote access trigger for the subscriber in order to invoke processing of the remote service script for the caller. Once this has occurred, execution exits, via path 5358, from routine 5300. Alternatively, in the event the value of the service flag indicates that the caller does not have a remote service script, then decision block 5345 routes execution, via NO path 5349, to block 5360. This latter block, when executed, also resets the value of the service flag to zero. Thereafter, execution proceeds to block 5365 which instructs the programmable switch to provide dial tone to the caller in order to permit the caller to place an outgoing call or access other services. Once this has occurred, execution exits, via path 5368, from routine 5300.

g. Change PIN *950 Service Routine 5400

The personal identification number (PIN) is essentially used as a variable against which a comparison can be made within a service script, such as an outgoing or remote access script, in order to impart an added degree of security and/or privacy before allowing a caller to access a personal communication service, such as receiving his or her stored voice messages through the *200 service or receiving his or her queued calls through the *800 service. Illustratively, when a script begins to execute, a caller can be prompted, to enter his or her four digit PIN through execution of a SPEECH_SYNTHER FC located within the script. Thereafter, a PIN can be collected from the caller using a COLLECT_DIGIT FC as the next functional component located in the script. Then, the entered PIN can then be compared, through a RETURN_RESULT FC located as the next functional component in the script, against the caller's current PIN stored within the host computer. If a match does not occur, then the RETURN_RESULT FC will essentially direct execution to a point within the script that terminates the service. For convenience, the matching operation is also available through a CHECK_ID functional component that contains three arguments: the entered PIN (typically furnished through a COLLECT_DIGIT) FC, a telephone number of a subscriber (typically the caller's) for which the host processor will retrieve the existing PIN, and a label to where execution should branch if entered PIN matches the subscriber's existing PIN.

Figure 54B:
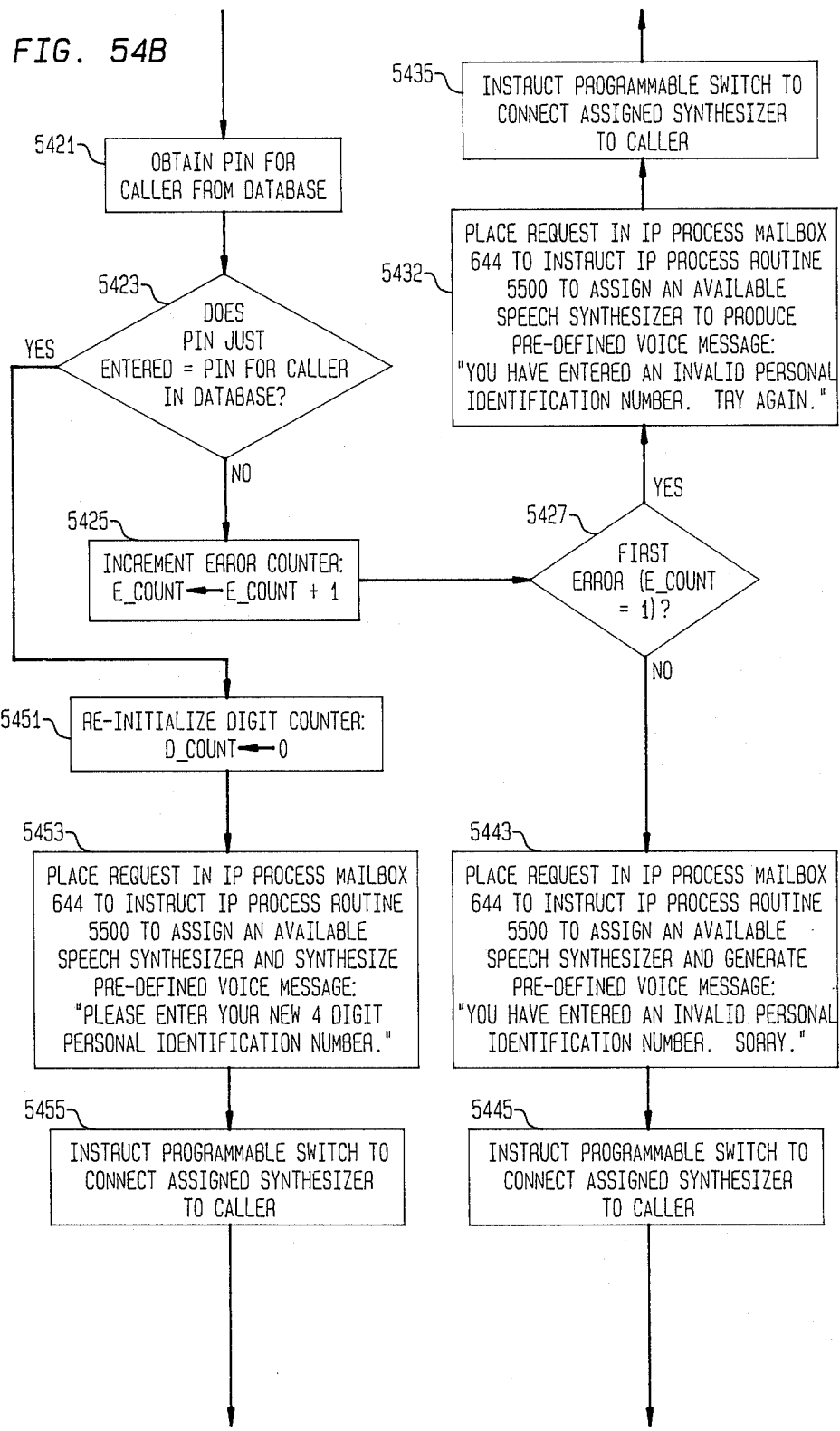
Figure 54D:
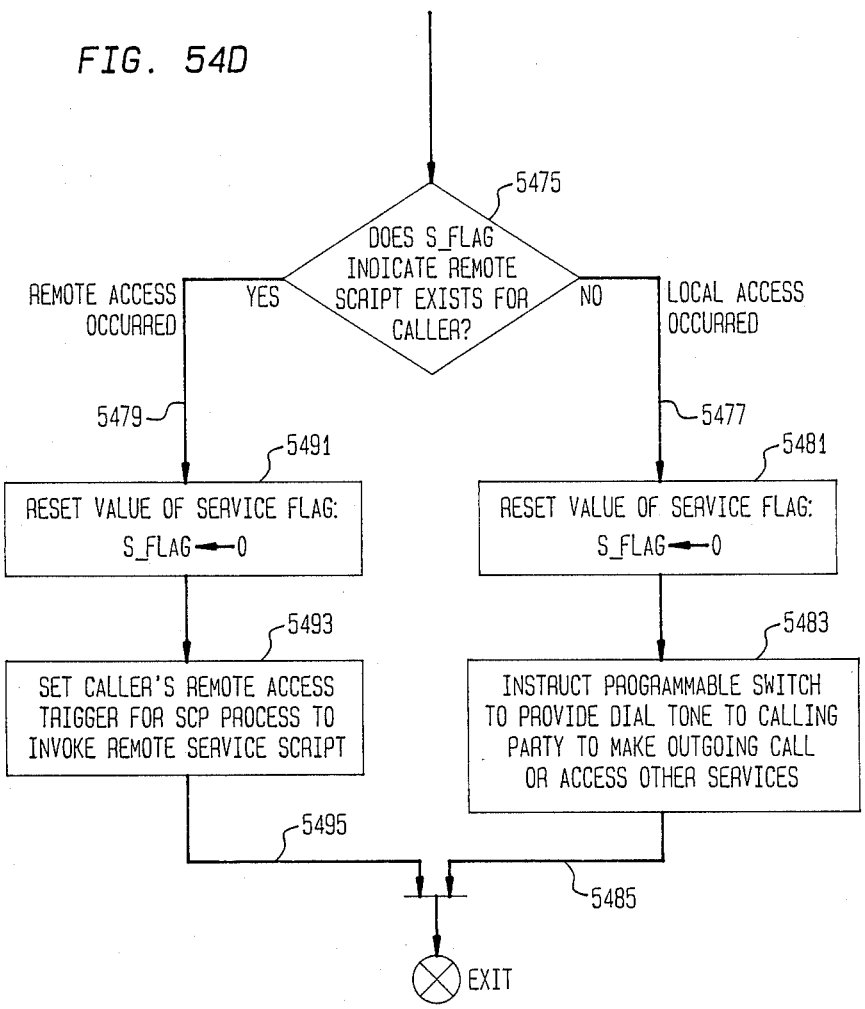

A flowchart of Change PIN *950 Service Routine is collectively depicted in FIGS. 54A–54D; for which the correct alignment of the drawing sheets for these figures is shown in FIG. 54. As noted above, this personal communication service permits a caller to change his or her existing four digit PIN to any desired new four digit entry.

Specifically, upon entry into routine 5400, execution proceeds to block 5403. This block, when executed, sets the value of the service flag (S_FLAG) to one of two values assigned to the *950 service depending upon whether the caller has a remote script or not. Thereafter, block 5405 is executed to initialize the contents of both the digit and error counters, D_COUNT and E_COUNT, respectively, to zero. After this has occurred, block 5407 is executed to place a request in IP Process mailbox 644 to instruct the IP Process routine to assign an available speech synthesizer to synthesize a pre-defined message requesting the caller to enter his or her current four digit personal identification number. Once this occurs, execution proceeds to block 5409 which, when executed, instructs the programmable switch to connect the assigned synthesizer to the caller. Execution then proceeds, via paths 5410 and 5412, to block 5413.

Block 5413 invokes Digit Collection routine 1700 (which has been discussed above in connection with see FIGS. 17A–17C) to obtain a value of a digit that will now be entered by the caller as part of his or her existing personal identification number. Once this routine has fully executed, execution proceeds, as shown in FIGS. 54A–54D, to block 5415 to increment the contents of the digit counter by one. Thereafter, execution proceeds to decision block 5417 which determines, based upon the contents of the digit counter, whether values for all four digits have been entered. In the event one or more digits remain to be entered by the caller, then decision block 5417 routes execution, via NO path 5419, back to block 5413 to obtain a value of the next successive digit in the PIN. Alternatively, if the caller has entered four digits, then decision block 5417 routes execution, via YES path 5410, to block 5421. This latter block, when executed, performs a database look-up operation to obtain the caller's present PIN from the appropriate database existing within the memory of host processor 490 (see FIGS. 4A–4D). Once the value of the caller's present PIN has been obtained, execution then proceeds, as shown in FIGS. 54A–54D, from block 5421 to decision block 5423.

Decision block 5423 compares the caller's present PIN against the PIN which the caller just entered. If a match does not occur, then this decision block routes execution, via its NO path, to block 5425. As with most entries, the caller is given a second opportunity to enter a correct PIN. If the caller again enters an incorrect PIN, then execution essentially exits from this routine. As a result, the caller must then re-invoke the *950 service to change his or her PIN. Specifically, block 5425, when executed, increments the contents of the error counter by one. Execution then proceeds to decision block 5427 to determine whether the current error is the first in succession. In the event the current error is the first, as specified by the contents of the error counter, then decision block 5427 routes execution, via its YES path, to block 5432. This block, when executed, places a request in IP Process mailbox 644 to instruct the IP Process routine 5500 to assign an available speech synthesizer to synthesize a pre-defined message stating the caller has entered an incorrect personal identification number and requesting the caller to re-enter his or her current four digit PIN. Once this occurs, execution proceeds to block 5435 to instruct the programmable switch to connect the assigned synthesizer to the caller. Thereafter, block 5437 is executed to re-initialize the contents of the digit counter to zero. Once this occurs, execution then proceeds, via paths 5439 and 5412, back to block 5413 to obtain the first digit of the re-entered PIN. If, however, the caller has just entered his PIN incorrectly for the second successive time, then decision block 5427 routes execution, via its NO path, to block 5443. This block, when executed, places a request in IP Process mailbox 644 to instruct the IP Process to assign an available speech synthesizer to synthesize a predefined message stating the caller has entered an invalid personal identification number. Once this occurs, execution proceeds to block 5445 to instruct the programmable switch to connect the assigned synthesizer to the caller. Thereafter, execution is directed along path 5447 to decision block 5475 which will be discussed shortly.

Now, in the event the caller has correctly entered his current PIN, then the caller will be prompted to enter a new four digit value for his or her PIN after which the new value will be verbally confirmed to the caller and the appropriate databases will be suitably updated. Specifically, should a match occur between the caller's present PIN and the value just entered, then decision block 5423 routes execution, via its YES path, to block 5451. This latter block, when executed, re-initializes the contents of the digit counter to zero. Thereafter, execution proceeds to block 5453 which, when executed, places a request in IP Process mailbox 644 to instruct the IP Process to assign an available speech synthesizer to synthesize a pre-defined message prompting the caller to enter a new four digit value for his or her PIN. Once this occurs, execution proceeds to block 5455 to instruct the programmable switch to connect the assigned synthesizer to the caller. Thereafter, block 5457 is executed to invoke Digit Collection routine 1700 (which has been discussed above in connection with see FIGs. 17A–17C) to obtain a value of a digit that will now be entered by the caller as part of his or her new personal identification number. Once this routine has fully executed, execution proceeds to block 5459 to increment the contents of the digit counter by one. Thereafter, execution proceeds to decision block 5461 which determines, based upon the contents of the digit counter, whether values for all four digits have been entered. In the event one or more digits remain to be entered, then decision block 5461 routes execution, via NO path 5463, back to block 5457 to obtain a value of the next successive digit in the new PIN. Alternatively, if four digits have been entered by the caller, then decision block 5461 routes execution, via YES path 5462, to block 5465. This latter block, when executed, places a request in IP Process mailbox 644 to instruct the IP Process to assign an available speech synthesizer to synthesize a pre-defined confirming header message, such as "Your new PIN is", followed by a verbalization on a digit-by-digit basis of the new PIN. Once this occurs, execution proceeds to block 5467 to instruct the programmable switch to connect the assigned synthesizer to the caller. Thereafter, block 5469 is executed to update the PIN file, which as discussed is named "pid.d", resident on disk 496 and the corresponding counterpart of this file which has been downloaded into a memory of host processor 490 (see FIGS. 4A–4D). After this updating has been completed, execution then proceeds, via paths 5471 and 5473, to decision block 5475.

Decision block 5475 determines, in response to the values of the service flag, S_FLAG, whether the subscriber has a remote script. If a remote script exists for this subscriber, the decision block 5475 routes execution, via YES path 5479, to block 5491. This latter block, when executed, resets the value of the service flag to zero to indicate that no service is executing for this subscriber. Thereafter, execution proceeds to block 5493 which sets the remote access trigger for the subscriber in order to invoke processing of the remote service script for the caller. Once this has occurred, execution exits, via path 5495, from routine 5400. Alternatively, in the event the value of the service flag indicates that the caller does not have a remote service script, then decision block 5475 routes execution, via NO path 5477, to block 5481. This latter block, when executed, also resets the value of the service flag to zero. Thereafter, execution proceeds to block 5483 which instructs the programmable switch to provide dial tone to the caller in order to permit the caller to place an outgoing call or access other services. Once this has occurred, execution exits, via path 5485, from routine 5400.

D. Intelligent Peripheral (IP) Process Routine 5500

A flowchart of IP Process Routine 5500 is shown in FIG. 55. As noted above, this process assigns (allocates) requested peripherals to different tasks. As explained below, the IP Process maintains a table of available resources (peripherals) which is constantly updated to indicate the busy and free status of each peripheral. Through this table, the IP Process co-ordinates the operation of all the peripherals in order to prevent conflicts therebetween.

Specifically, a flowchart of IP Process Routine 5500 is shown in FIG. 55. Upon entry into the IP Process for the first time, such as a power on or a "re-boot" of the operating system, execution proceeds to block 5510. This block, when executed, initializes a resource table, illustratively named R_TABLE. Each location within this table is allocated to a currently active party (user), specified by his or her telephone number, that is connected to the programmable switch. Each entry in the location indicates which resource (peripheral) is currently being used by that user. This table is initialized by first setting all the entries in each location, that are used to show peripheral usage, to indicate an "unused" status and then setting all the entries in the locations that store user numbers to a "free" value. As a result, all users that can be connected to all the peripherals at any given time will be seen as being free, and all the peripherals themselves will be seen as being available for assignment.

Now, once the table has been initialized, execution process to block 5520. This block, when executed, reads the current message existing within IP mailbox 644. Thereafter, execution proceeds to block 5530 which, when executed, obtains an instruction (op code) from the current message. Once this has occurred, execution proceeds to decision block 5540 which decodes the instruction. Based upon the specific instruction, execution will proceed to one of three blocks. If a request for peripheral assignment and operation is made, then execution proceeds, via paths 5542 and 5544, to block 5550. This block, when executed, invokes IP Request Routine 5600 to assign an available peripheral and invoke the desired operation involving that peripheral. Now, if a request is made for an acknowledgement from an IP operation, then execution proceeds, via paths 5542 and 5546, to block 5560. This block, when executed, invokes IP Ready Message Routine 5700 which provides a suitable acknowledgement message in SSP mailbox 642 after the desired peripheral has finished operating. Lastly, if a special case instruction to the IP Process (such as delete an IP request, process a digit detection interrupt originating from either the voice digitizer or programmable switch, or release a user from the IP Process because he or she went on-hook), then execution proceeds, via paths 5542 and 5548, to block 5570. This block, when executed, invokes IP Special Case Instruction Routine 5800 to process that instruction. After block 5550, 5560 or 5570 has executed, execution loops back, via path 5555, 5565 or 5575, respectively, and path 5580, to block 5520 to process the next incoming IP Process request.

1. IP Request Routine 5600

Figure 56:
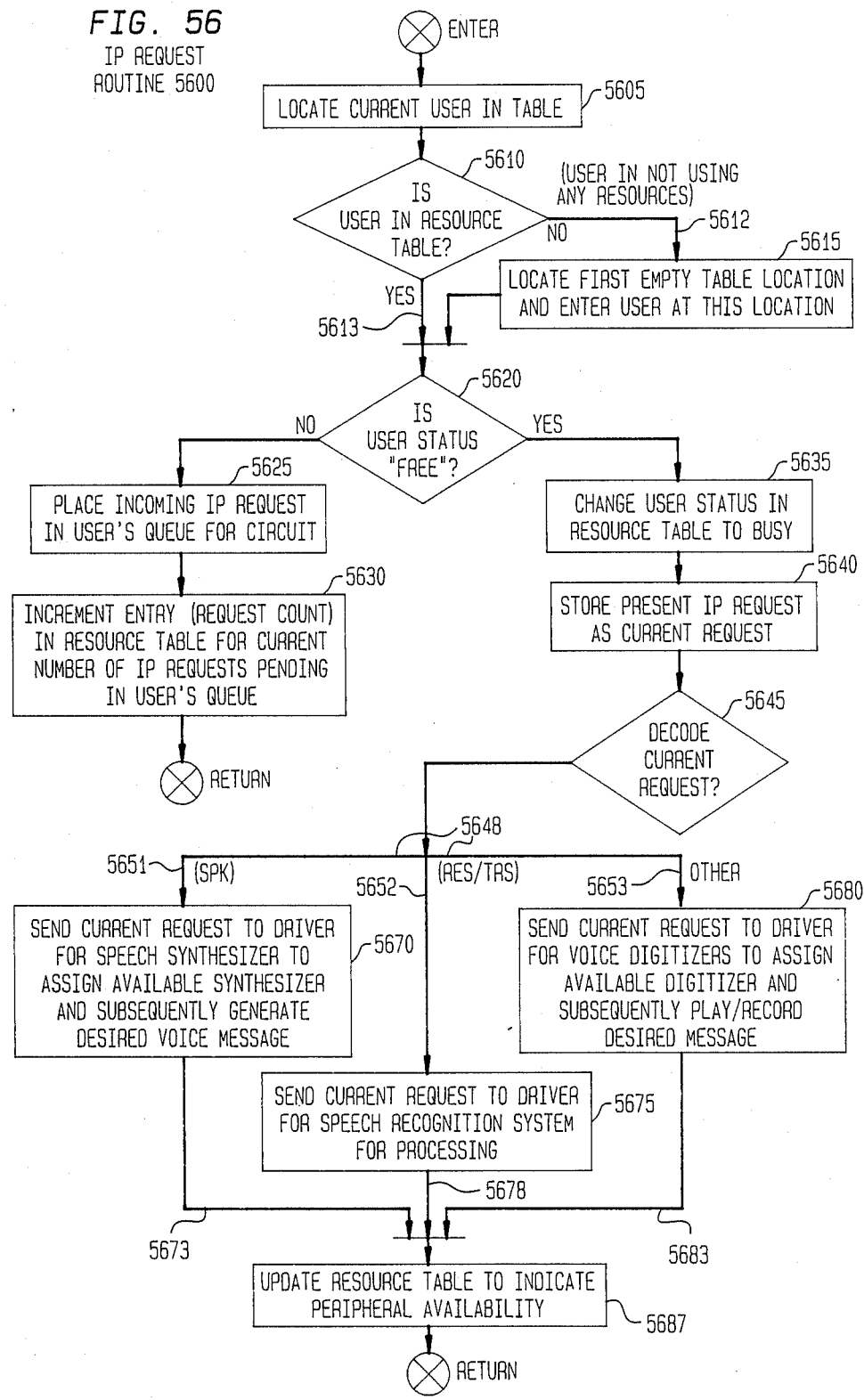
FIG. 56 depicts a flowchart of IP Request Routine 5600 that is executed as part of IP Process Routine 5500 shown in FIG. 55.

A flowchart of IP Request Routine 5600 is shown in FIG. 56. As noted above, this routine assigns an available peripheral and invokes a desired operation involving that peripheral. Once this operation is concluded, the peripheral is released and ready for re-assignment.

Specifically, upon entry into routine 5600, execution proceeds to block 5605. This block, when executed, attempts to locate the current user (telephone number) in the resource table. Execution then proceeds to decision block 5610 which determines whether the user exists in the table at all. If the user does not exist, then it means that user is not employing any of the available IP resources (peripherals). In this case, execution proceeds from decision block 5610, via NO path 5612, to block 5615. This block locates the first empty table location for a user and enters the telephone number of that user at that free location. Execution then proceeds to decision block 5620. Execution also reaches this decision block, via YES path 5613 emanating from decision block 5610, in the event the user already exists in the resource table. Decision block 5620 reads an appropriate entry in the table to determine whether the user is "free", i.e. not currently using any peripheral. In the event the user is "busy", i.e. currently using a peripheral, then the present incoming IP Process request for that user can not be processed at this time and must wait until the user becomes "free". In this case, decision block 5620 routes execution, via its NO path, to block 5625. This latter block, when executed, pushes the incoming IP Process request as the latest entry into a queue (first in, first out) of pending IP Process requests for that user. These requests will be sequentially processed in the order received once the status of the user becomes "free". Once the incoming request has been queued, then execution proceeds to block 5630 which, when executed, increments an appropriate entry (request counter), stored in the resource table for that user, which indicates the current number of pending IP Process requests existing in the queue for the user. Thereafter, execution returns from IP Request routine 5600 and re-enters IP Process routine 5500 (see FIG. 55).

Now, in the event the status of the user is "free", thereby indicating that the user can now utilize a peripheral, decision block 5620 routes execution, via its YES path, to block 5635. This latter block, when executed, changes the status of the user, as stored in the resource table, from "free" to "busy". Thereafter, execution proceeds to block 5640 which stores the present incoming IP request as the current request, i.e. the request that is being processed. Once this has occurred, execution proceeds to decision block 5645 to decode the request and invoke the appropriate driver. Specifically, if the request is to produce a synthesized message (spk), then decision block 5645 routes execution, via paths 5648 and 5651, to block 5670. This latter block, when executed, invokes the driver for the speech synthesizer. When invoked, this driver performs a database access to locate the circuit number of an available speech synthesizer. Thereafter, the driver assigns an available synthesizer to the user and instructs this synthesizer to generate a desired message. If, however, the request is to cause the speech recognition system to commence training (trs) or undertake speech recognition (res), then decision block 5645 routes execution, via paths 5648 and 5652, to block 5675. This latter block, when executed, invokes the driver for the speech recognition system. When invoked, this driver performs a database access to locate the circuit number assigned to the speech recognition system. Thereafter, the driver assigns the speech recognition synthesizer to the user and appropriately instructs this system to commence training or speech recognition. Lastly, if the request is to record or play a digitized voice message, then decision block 5645 routes execution, via paths 5648 and 5653, to block 5680. This latter block, when executed, invokes the driver for the voice messaging system (voice digitizers). When invoked, this driver performs a database access to locate the circuit number of an available voice digitizer. Thereafter, the driver assigns an available digitizer to the user and instructs this digitizer to play a message from or record a message into a specified file existing on the voice messaging system. After the desired peripheral has concluded its operation, it is released by its driver. Now, once block 5670, 5675 or 5680 has fully executed, block 5687 executes, via respective path 5673, 5678 or 5683, to update the resource table in indicate the availability of this peripheral. Thereafter, execution returns from routine 5600 and re-enters IP Process routine 5500 (see FIG. 55).

2. IP Process Ready Message Routine 5700

Figure 57B:
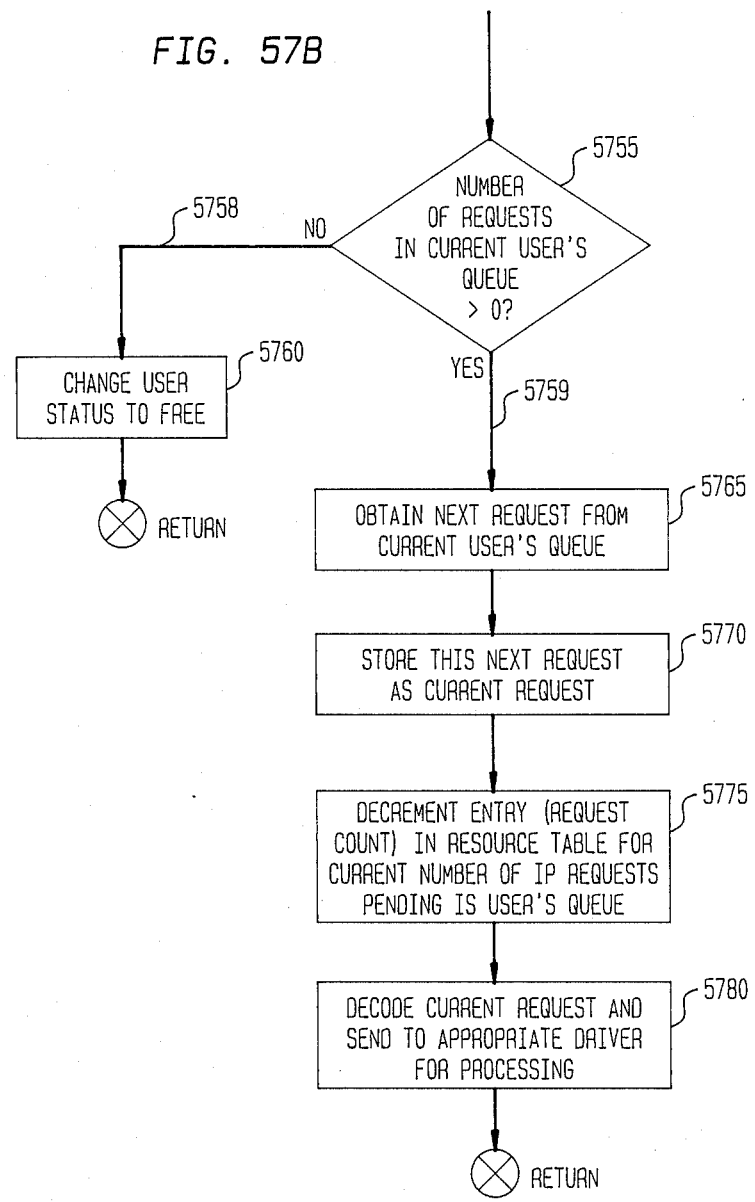

A flowchart of IP Process Ready Message Routine 5700 is collectively depicted in FIGS. 57A and 57B, for which the correct alignment of the drawing sheets for these figures is shown in FIG. 57. As noted above, this routine provides a suitable acknowledgement message in SSP mailbox 642 after a desired peripheral has finished operating.

Upon entry into routine 5700, execution proceeds to block 5705 which reads the entry for the current user in the resource table. Thereafter, execution proceeds to block 5710 which, when executed, analyzes the current request for this user to determine if a ready reply (acknowledgement) is desired. Next, decision block 5715 is executed to determine if a ready reply was requested and the peripheral in use that has just completed its task for the current user is not a speech synthesizer. If this condition is true, then execution proceeds, via YES path 5717, to decision block 5720. This decision block, when executed, routes execution based upon the current IP Process request that has just executed. In the event the current IP Process request is a record (rec) instruction to the voice messaging system (voice digitizer), then decision block 5720 routes execution, via paths 5723 and 5726, to block 5735. This latter block, when executed, places a ready (acknowledgement) message in SSP mailbox 642 for use in completing the execution of a RECORD_MESSAGE FC currently in process. In the event the current request is a speech recognize (res) instruction to the speech recognition system, then decision block 5720 routes execution, via paths 5723 and 5727, to block 5740. This latter block, when executed, places a ready (acknowledgement) message in SSP mailbox 642 for use in completing the execution of a SPEECH_REG_REC FC currently in process. Now, in the event the current request is a speech training (trs) instruction to the speech recognition system, then decision block 5720 routes execution, via paths 5723 and 5728, to block 5745. This latter block, when executed, places a ready (acknowledgement) message in SSP mailbox 642 for use in completing the execution of a SPEECH_REG_TRN FC currently in process. Lastly, in the event the current request is anything else involving the voice messaging system, then decision block 5720 routes execution, via paths 5723 and 5729, to block 5750. This latter block, when executed, places a ready (acknowledgement) message in SSP mailbox 642 for use in completing the execution of a PLAY_ANNOUNCEMENT FC currently in process. Once block 5735, 5740, 5745 or 5750 executes, then execution proceeds via path 5738, 5743, 5748 or 5753, respectively, to decision block 5755. Execution also reaches this decision block, via NO path 5719, emanating from decision block 5715. Path 5719 is taken in the event a ready reply was not requested or if the peripheral presently in use and which has just completed its task for the current user was a speech synthesizer.

Decision block 5755, when executed, determines whether any IP Process requests are still pending in the queue for the current user. In the event no such requests now exist, then decision block 5755 routes execution, via NO path 5758, to block 5760. This latter block, when executed, changes the status, as stored in the resource table, of the current user to "free". Thereafter, execution returns from routine 5700 and re-enters IP Process routine 5500 (see FIG. 55). Alternatively, if the user still has IP Process requests pending in his queue, then decision block 5755 routes execution, via YES path 5759, to block 5765. This latter block obtains the next request from the queue. Block 5770 is then executed to store this request as the current request for processing. Thereafter, execution proceeds to block 5775 which decrements the request counter stored in the resource table and associated with the queue for the current user. Finally, execution proceeds to block 5780 which sends the current request onward to the appropriate peripheral driver for processing. Once this has occurred, execution returns from routine 5700 and re-enters IP Process routine 5500 (see FIG. 55).

3. IP Process Special Case Instructions Routine 5800

Figure 58B:
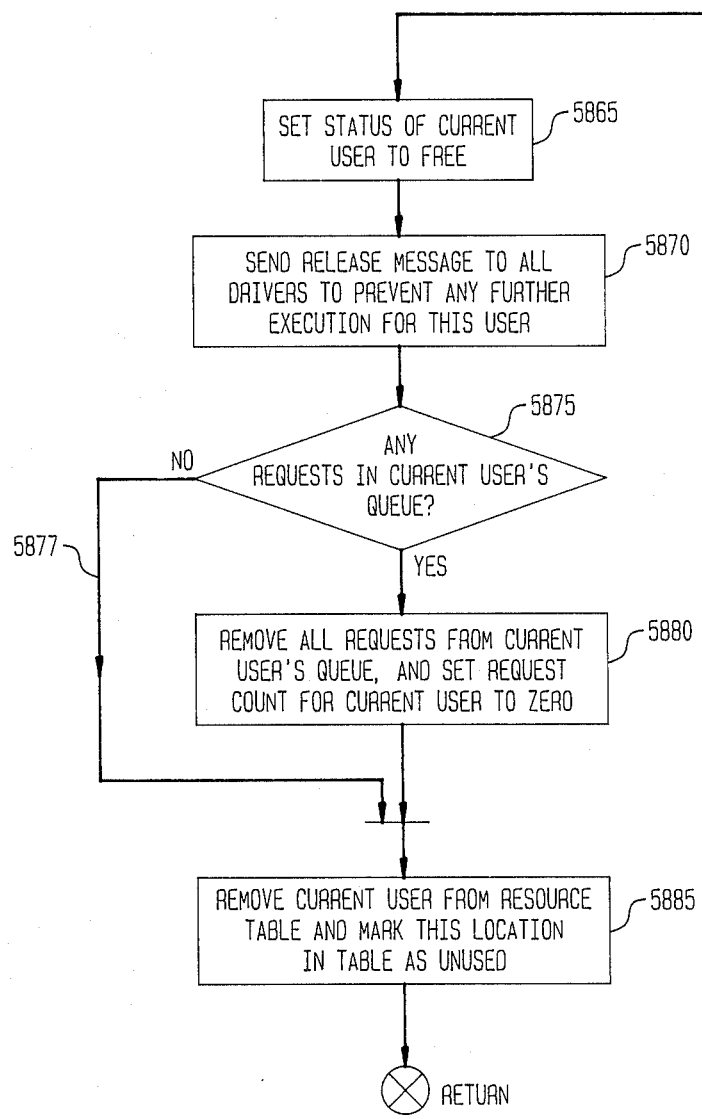

A flowchart of IP Process Special Case Instructions Routine 5800 is collectively depicted in FIGS. 58A and 58B, for which the correct alignment of the drawing sheets for these figures is shown in FIG. 58. As noted above, this routine processes each special case instruction to the IP Process, such as delete an IP request, process a digit detection interrupt originating from either the voice digitizer or programmable switch, or release a user from the IP Process because he or she went on-hook.

Specifically, upon entry into routine 5800, execution proceeds to block 5805. This block, when executed, accesses the resource table to locate the entry for the current user. Execution then passes to decision block 5810 which decodes the current request to ascertain the special case instruction that is to occur for the current user. In the event the current request is a delete instruction, i.e. to delete a digitized voice message, then decision block 5810 routes execution, via paths 5811 and 5812, to block 5820. This latter block, when executed, instructs computer 489, located within the voice messaging system, to delete the voice message file specified in the delete instruction from disk 487. Once this occurs, execution returns from routine 5800 and re-enters IP Process routine 5500 (see FIG. 55). Now, in the event, the current request is an interrupt ("ers" instruction) that occurs as the result of a digit being detected by a voice digitizer while it is playing a previously recorded voice message, then no further pending voice messages are played for that user. This permits the user to cut off (but not delete) all his pre-recorded voice messages by depressing a pushbutton on the telephone keypad anytime such a message is being played. Consequently, in this case, decision block, 5810 routes execution, via paths 5811 and 5814, to block 5825. This latter block, when executed, removes all voice message requests from the queue within the IP Process, for the current user, and sets the value of a message counter for that user to zero. Thereafter, execution returns from routine 5800 and re-enters IP Process routine 5500 (see FIG. 55). Now, if the current request is a stop instruction ("stp" instruction), which is generated by host processor 490 in response to a digit being detected by the programmable switch and entered by the user, then all currently active peripheral operations for that user are terminated and the user is set to a "free" state. Thereafter, execution proceeds to decision block 5835 which checks the status of the user, as stored in the resource table, to determine if the user is "busy". In the event that the user is "free", then nothing further needs to be done. Accordingly, execution returns from routine 5800, via the NO path emanating from decision block 5835, and re-enters IP Process routine 5500 (see FIG. 55). Alternatively, if the status of the user indicates that user is currently busy, then execution proceeds, via the YES path emanating from decision block 5835, to decision block 5840. This latter decision block routes execution based upon the IP Process request that is currently being processed for that user in order to terminate that request. Specifically, if the request involves a speech synthesizer ("spk" instruction), then decision block 5840 routes execution, via paths 5841 and 5842, to block 5850. This latter block, when executed, sends a stop command to the driver for the speech synthesizer to instruct the driver to immediately terminate the speech synthesis process. Alternatively, if the request involves the speech recognition system ("trs" or "res" instructions), then decision block 5840 routes execution, via paths 5841 and 5844, to block 5855. This latter block, when executed, sends a stop command to the driver for the speech recognition system to instruct the driver for this system to immediately terminate any speech training or recognition operation currently in process. If, however, the current IP Process request involves voice messaging (i.e. involves use of a speech digitizer), then decision block 5840 routes execution, via paths 5841 and 5846, to block 5860. This latter block, when executed, sends a stop command to the driver for the voice messaging system to instruct the driver to immediately terminate any voice recording or playback operation that is occurring for the current user. Once, block 5850, 5855 or 5860 has executed, then execution returns from routine 5800, via path 5852, 5858 or 5862, respectively, and re-enters IP Process Routine 5500.

Lastly, if the current request to the IP Process is a release instruction, which occurs in response to the user going on-hook, then decision block 5810 routes execution, via paths 5811 and 5818, to block 5865. This latter block, when executed, changes the status of the user, as stored in the resource table, from "busy" to "free". Thereafter, execution proceeds to block 5870 which sends a release message to all peripheral drivers to prevent any further processes involving these peripherals from being executed for this user. Once this occurs, execution proceeds to decision block 5875. This block determines whether any IP Process requests exist in the queue for this user. If any such requests exist, then decision block 5875 routes execution, via its YES path, to block 5880. This latter block, when executed, removes all requests from the queue for this user and sets the request counter associated with this queue to zero. Thereafter, execution proceeds to block 5885. Execution can alternatively reach this block, via NO path 5877 emanating from decision block 5875, in the event the user has no pending requests in his queue. Block 5885, when executed, removes the current user from the resource table and marks the location, in the resource table that held this user, as being unused. As a result, this location can subsequently be assigned to another user. Once block 5885 has executed, execution returns from routine 5800 and re-enters IP Process Routine 5500 (see FIG. 55).

At present, and as described above, a call must be routed through the MSN throughout its entire duration in order to obtain enhanced services for that call. This is due to the inability of the local switch, i.e. the 1AESS, to directly connect the caller to a called party after the call has been forwarded to a hunt group line. However, those skilled in the art can readily provide this capability to a 1AESS switch Specifcally, the generics in the 1AESS switch could be suitably modified to permit the switch to accept an appropriate message over the SMD datalink, from the MSN host computer, instructing the switch itself to connect two calls that are currently terminated on separate message desk hunt group lines. In this manner, the MSN can initially route a call through the local switch, and later, when necessary and in response to a message received from the SMD datalink such as in a call waiting situation, send a subsequent message to the switch instructing the switch to connect the call to a different called party, such as that specified by the called party's service script. Although once the MSN acquired control of the call and thereafter would retain complete control over the call substantially throughout the remainder of its duration, the call would not need to be routed during its entire duration through the programmable switch in the MSN. Consequently, an MSN having a relatively small switching capacity can advantageously serve a relatively large number of customers.

Moreover, the requirement of using two separate numbers, i.e. the logical-physical scenario, could be easily eliminated in favor of one number by suitably re-programming the local switch generics. In this case, the local switch would be programmed to enable all calls to a subscriber's telephone number to be forwarded to the MSN, via an available hunt group line, except calls coming from the MSN which would ring that subscriber's telephone.

The multi-service node can also be utilized in conjunction with an ISDN (Integrated Services Digital Network) switch to provide enhanced voice and voice/data services to ISDN customers served by that switch. Owing to the large number of 1AESS, or similar, switches that are in service today and the relatively long time period needed to deploy a fully functional ISDN network across the country, trunk side ISDN adjuncts and line side ISDN adjuncts to a 1AESS, and similar, switches are becoming available. Trunk side ISDN adjuncts are typified by the EWSD switch manufactured by the Siemens Corporation. Line side adjuncts are typified by the NEAX 61E switch manufactured by the Nippon Electric Corporation (NEC). Generally speaking, these ISDN adjuncts are typically used to directly provide a relatively small number of customers with ISDN (2B+D channel) capability while at the same time provide these customers with compatibility to the existing voice telephone network for call routing through an existing 1AESS or similar switch.

Functional components and service scripts, as described above in connection with enhanced voice services, can be readily applied, through use of an MSN connected to line or trunk side ISDN adjunct to a voice switch (such as a 1AESS switch) or to a stand-alone ISDN switch, to provide enhanced data services. In this manner, enhanced data services can be quickly created, trialed and/or modified to meet specific needs of an ISDN customer. This, in turn, advantageously permits the local operating companies to quickly respond to the demands of the ISDN marketplace.

Specifically, in the absence of the MSN, a trunk side ISDN adjunct would be connected, through an appropriate trunk group, to the 1AESS switch Incoming calls to an ISDN subscriber served by the ISDN adjunct, but not originating within the adjunct, would be routed by the 1AESS switch over an available trunk within the group to the trunk side ISDN adjunct. The MSN would be coupled to both switches to provide essentially the same enhanced services, particularly though not limited to ANI based services, to both analog (voice) and ISDN customers. Specifically, the trunk side ISDN adjunct would be connected, via a 2B+D hunt group of lines present on the adjunct, to typical ISDN 2B+D interfaces located within the MSN. These interfaces would be connected, in turn, to both the programmable switch and the host computer situated within the MSN. In particular, each pair of B channels would be connected from its associated interface to the programmable switch; while, each D channel, which provides signaling information, would be connected from its associated interface to a port on the host computer. The programmable switch would be also connected, as described above, to an SMD hunt group emanating from the 1AESS. Also, as discussed, the host computer would be connected, via a modem connection, to the SMD datalink provided by the 1AESS switch. An ISDN customer would be provided with two telephone numbers: a logical (published) number and a physical number. The logical number is simply a "virtual" number that is maintained in translation tables stored within both the 1AESS switch and trunk side ISDN adjunct Calls to that number originating within the trunk side ISDN adjunct would be routed by the adjunct over the 2B+D interface to the MSN; while, calls to that number reaching or originating within the 1AESS switch would be routed by that switch to the MSN, via the hunt group. The physical number is a number associated with the actual 2D+B lines provided by the trunk side ISDN adjunct to the ISDN customer. A typical sequence of events for an incoming voice call from an individual served by a 1AESS switch to an ISDN customer served by the trunk side adjunct would be as follows. First, the individual served by the 1AESS switch would dial the logical number of the ISDN customer. The local switch would forward the call along with the calling and called numbers, via the SMD datalink and associated hunt group, to the MSN. Upon receipt of the call, the host processor within the MSN would perform a database look-up operation to locate the physical number of the ISDN customer. The MSN would initiate a call to this customer over one of the available 2B +D hunt group lines on the trunk side ISDN adjunct. If appropriate functional components exist in an incoming service script that has been defined within the MSN for the ISDN customer, then the MSN would transmit the caller's identity (telephone number and name, if number to name translation occurred) and various additional information regarding how the call should be handled to the ISDN adjunct. The trunk side ISDN adjunct, in turn, would route the identity and additional information to the customer's ISDN terminal via user information elements that form part of a setup message. This message would be transmitted during call setup by the trunk side ISDN adjunct on a D channel associated with the physical number of the ISDN customer. If the customer accepts the call, then the MSN would continue to maintain control of the call throughout the remainder of its duration. If, alternatively, the customer does not accept the call or does not answer, then the call is processed by the MSN in the manner specified by the customer's service scripts.

A line side ISDN adjunct is connected between a number of standard voice grade lines and ISDN customers. This type of ISDN adjunct converts voice calls to standard analog telephone format and hands the calls off to the 1AESS switch which, in turn, treats these calls as ordinary telephone (POTS) calls with in-band signaling (on/off hook and DTMF signaling). Specifically, a DS-1 link, provided by the line side ISDN adjunct, is connected, via the programmable switch situated within the MSN, to the MSN host computer. The line side ISDN adjunct directly switches data calls among customers terminated on the adjunct and routes calls to the DS-1 interface for access to various wide area services, such as the Public Switched Digital Service. With this type of adjunct, incoming calls to an ISDN customer would be forwarded by the 1AESS switch to the MSN which, in turn, dials the physical number to reach an appropriate ISDN terminal through the line side adjunct. ISDN signaling information may be transmitted as text over one of the B channels, over a packet data portion of the D channel or in one of the information fields in the D channel. Through the use of service scripts and appropriate functional components, enhanced ISDN services such as, for example, data messaging on no-answer or busy, data-call re-direction, data conferencing (with or without voice) and access to directories, can be readily provided through the MSN.

The MSN can also be used in conjunction with a stand-alone ISDN switch, such as the 5ESS currently manufactured by AT&T. The interface between the ISDN switch and the MSN is a set of 2B+D lines arranged as a hunt group (sometimes referred to as a multiple appearance directory number). If an ISDN customer desires to utilize an enhanced service that is not yet or never will be provided by the ISDN switch, then the MSN would be involved in setup of incoming and outgoing data calls to and from the ISDN customer. Due to the use of out-of-band signaling over the D channel between the ISDN switch and the MSN, the call may not need to be routed through the MSN during the entire duration of the call. However, once the MSN gains control of the call, the MSN still retains complete control over the call throughout the remainder of its duration. A typical sequence of events involving an incoming call routed through an ISDN switch and the MSN would be as follows. First, the call is forwarded to the MSN, via an available 2B+D line in the hunt group provided by the ISDN switch, along with a suitable message giving the caller's number and the reason the call was forwarded. The MSN sends a D channel message to the ISDN switch to place the caller on hold and then provide a ringback tone to the caller. Thereafter, the MSN initiates a call to the called party's physical number, to set up what is in effect a three way call. In doing so, the MSN provides calling party information and call treatment options in user information elements as part of the setup message transmitted in the D channel. If the called party answers and accepts the call, the MSN sends another D channel message to the ISDN switch to take the caller off hold and establish a three way connection between the called party, the caller and the MSN. Once this has occurred, the MSN transmits another D channel message to drop itself as a party from the call. Since the MSN has the ability, due to D channel signaling, to drop itself off a call while still retaining control over that call, this advantageously allows an MSN having a relatively small capacity to handle a relatively large number of calls.

Although a single embodiment that incorporates the teachings of the present invention has been fully shown and described herein, those skilled in the art can readily devise many other varied embodiments that incorporate these teachings.

We claim:

1. A switching system adjunct for use in conjunction with a telephone switch to provide enhanced telephone services to at least one telephone subscriber served by said telephone switch and comprising:

> a programmable switch providing first and second sets of interfaces, wherein one of said interfaces within said first set is for connection to at least one path in a plurality of paths emanating from a telephone switch;
> at least one peripheral device connected to an interface within said second set;
> means for storing a sequence of functional components which form a service script and which collectively define an enhanced service; and
> a host processor connected to said storing means, said peripheral device and said programmable switch and for connection through a datalink to said telephone switch for controlling said peripheral device and said programmable switch in a manner defined by said service script in order to provide the enhanced service to a telephone subscriber; wherein the adjunct, in response to a message received over said datalink regarding a corresponding telephone call that is routed by said telephone switch over said one path to said adjunct, is able to take control over said telephone call substantially throughout the remainder of its duration in order to provide said enhanced service to said one subscriber.

2. The adjunct of claim 1 further comprising means for controllably terminating the routed call within said adjunct or directing the routed call through said programmable switch to a second one of said paths substantially throughout the remainder of the duration of said routed call.

3. The adjunct of claim 2 wherein said host processor includes service control means operative in conjunction with said storing means for executing the service script to provide said enhanced service, wherein said service control means comprises:

> means responsive to a trigger for accessing the service script from said storing means in order to provide an accessed service script; and
> means responsive to a returned result and a state of said accessed service script for selecting one of said functional components in said accessed service script for current execution; and
> said host processor further includes switching control means operative in conjunction with said storing means for appropriately controlling said programmable switch to selectively perform telephone switching operations involving individual ones of said paths, wherein said switching control means comprises:
> means responsive to said one functional component for invoking said programmable switch to perform a desired switching operation involving said routed telephone call appearing on a first one of said paths and for producing, when appropriate, said returned result;
> means responsive to said programmable switch for detecting an event associated with a corresponding condition of said telephone call; and
> means responsive to said detected event for generating said trigger.

4. The adjunct of claim 3 wherein said switch invoking means further comprises means for decoding said one functional component into a corresponding sequence of instructions for appropriately controlling said programmable switch.

5. The adjunct of claim 4 wherein said host processor further comprises: means operative in conjunction with said storing means and responsive to a code existing within said message for invoking a pre-defined sequence of functional components so as to appropriately process said routed call.

6. The adjunct of claim 5 further comprising: means for receiving a telephone call appearing over one of said paths and placed to a logical number associated with a particular subscriber and for re-directing the received call over another one of said paths to a physical number associated with the particular subscriber.

7. The adjunct of claim 6 wherein the adjunct further comprises means for producing a different trigger for an incoming call, an outgoing call, a no-answer, a busy line, a remote access or an occurrence of a specified time and date.

8. The adjunct of claim 7 wherein said event detecting means further comprises means for detecting timer events.

9. The adjunct of claim 3 further comprising: means responsive to said one functional component for appropriately controlling the peripheral device.

10. The adjunct of claim 9 wherein the peripheral device controlling means further comprises: means responsive to said one functional component for generating, when appropriate, a request for service by said peripheral device.

11. The adjunct of claim 10 wherein said peripheral device controlling means further comprises: means for decoding said one functional component into a corresponding sequence of instructions for appropriately controlling said peripheral device.

12. The adjunct of claim 11 further comprising: means responsive to said service request for scheduling a task as requested by said one functional component for said peripheral device and, upon availability of said peripheral device to perform a task, instructing said peripheral to perform the scheduled task.

13. The adjunct of claim 12 wherein said peripheral device comprises: a voice messaging system for recording and playing back voice messages.

14. A telephone switching system for providing an enhanced telephone service comprising:

> a telephone switch for serving at least one telephone subscriber connected thereto; and
> a switching system adjunct connected to said telephone switch by a datalink and at least one path in a plurality of paths emanating from said telephone switch, wherein the adjunct stores a corresponding service script associated with the one subscriber and which defines an enhanced service for the subscriber such that the adjunct, in response to a message that is received over said datalink from said telephone switch regarding a corresponding telephone call that is routed by said telephone switch over said one path to said adjunct, executes said service script and takes control over said telephone call substantially throughout the remainder of the duration of the telephone call in order to provide the enhanced service to said one subscriber, wherein the adjunct comprises:
> a programmable switch providing first and second sets of interfaces wherein an interface within said first set is connected to said one path;

at least one peripheral device connected to an interface within said second set;

means for storing a sequence of functional components which form the service script; and a host processor connected to said storing means, said peripheral device and said programmable switch and connected through said datalink to said telephone switch for controlling said peripheral device and said programmable switch in a manner defined by said service script in order to provide the enhanced service to said one subscriber.

15. The telephone switching system of claim 14 further comprising: means for controllably terminating the routed call within said adjunct or directing the routed call through said programmable switch to a second one of said paths substantially throughout the remainder of the duration of said telephone call in order to provide said enhanced service.

16. The telephone switching system of claim 15 wherein the message comprises a telephone number for a calling party and a code indicative of a condition under which the telephone switch routed the telephone call to said one path.

17. The telephone switching system of claim 16 wherein said host processor includes service control means operative in conjunction with said storing means for executing the service script to provide said enhanced service, wherein said service control means comprises:

means responsive to a trigger for accessing said service script from said storing means in order to provide an accessed service script; and means responsive to a returned result and a state of said accessed service script for selecting one of said functional components in said accessed service script for current execution; and said host processor further includes switching control means operative in conjunction with said storing means for appropriately controlling said programmable switch to selectively perform telephone switching operations involving individual ones of said paths, wherein said switching control means comprises:

means responsive to said one functional component for invoking said programmable switch to perform a desired switching operation involving said routed telephone call appearing on a first one of said paths and for producing, when appropriate, said returned result;

means responsive to said programmable switch for detecting an event associated with a corresponding condition of said telephone call; and means responsive to said detected event for generating said trigger.

18. The telephone switching system of claim 17 wherein said switch invoking means further comprises means for decoding said one functional component into a corresponding sequence of instructions for appropriately controlling said programmable switch.

19. The telephone switching system of claim 18 wherein said host processor further comprises: means operative in conjunction with said storage means and responsive to said code existing within said message for invoking a pre-defined sequence of functional components so as to appropriately process said routed call.

20. The telephone switching system of claim 19 further comprising: means for receiving a call appearing over one of said paths and placed to a logical number associated with a particular subscriber and for re-directing the received call over another one of said paths to a physical number associated with the particular subscriber.

21. The telephone switching system of claim 17 further comprising: means responsive to said one functional component for appropriately controlling the peripheral device.

22. The telephone switching system of claim 21 wherein the peripheral device controlling means further comprises: means responsive to said one functional component for generating, when appropriate, a request for service by said peripheral device.

23. The telephone switching system of claim 22 wherein said peripheral device controlling means further comprises: means for decoding said one functional component into a corresponding sequence of instructions for appropriately controlling said peripheral device.

24. The telephone switching system of claim 23 further comprising: means responsive to said service request for scheduling a task as requested by said one functional component for said peripheral device and, upon availability of said peripheral device to perform a task, instructing said peripheral device to perform the scheduled task.

25. In a telephone switching system, a method for providing enhanced telephone services to at least one telephone subscriber connected to a telephone switch comprising:

in said telephone switch routing a telephone call involving a subscriber from the telephone switch over a first path connecting said telephone switch to a switching system adjunct and generating a message, regarding said routed telephone call, over a datalink connecting said telephone switch to said switching system adjunct, wherein said message includes a telephone number for a calling party and a code indicative of a condition under which the telephone switch routed the telephone call to said first path; and in said switching system adjunct and in response to said message executing a pre-defined corresponding service script which is associated with said subscriber and which defines an enhanced service for that subscriber, taking control of said routed telephone call substantially throughout the remainder of its duration so as to provide the enhanced service to said subscriber and controllably terminating the routed call within said adjunct or directing the routed call to a second path connecting said telephone switch to said adjunct substantially throughout the remainder of the duration of said telephone call in order to provide said enhanced service.

26. The method in claim 25 further comprising in said adjunct:

executing the service script within a host processor to provide said enhanced service, wherein said service script contains a sequence of functional components that collectively define said enhanced service and wherein said executing comprises:

accessing in response to a trigger said service script from a storage means connected to said host processor in order to provide an accessed service script; and selecting in response to a returned result and a state of said accessed service script one of said functional components in said accessed service script for current execution; and selectively performing telephone switching operations within said host processor, wherein said selective performing comprises:

invoking in response to said one functional component a programmable switch connected to said host processor and to said first and second paths to perform a desired switching operation involving said routed telephone call appearing on the first path and producing, when appropriate, said returned result;

detecting through said programmable switch an event associated with a corresponding condition of said routed telephone call; and generating said trigger in response to said detected event.

27. The method in claim 26 wherein said switch invoking further comprises: appropriately decoding said one functional component into a corresponding sequence of instructions for controlling said programmable switch.

28. The method in claim 27 further comprising in the adjunct: invoking in response to said code existing within said message a pre-defined sequence of functional components so as to appropriately process said routed call.

29. The method in claim 28 further comprising in the adjunct: receiving a call appearing over one of said paths and placed to a logical number associated with a particular subscriber, and re-directing the received call over another one of said paths to a physical number associated with the particular subscriber.

30. The method in claim 26 wherein said selective performing further comprises: controlling, when appropriate and in response to said one functional component, a peripheral device that is connected to said programmable switch and to said host processor.

31. The method in claim 30 wherein said peripheral device controlling further comprises: generating in response to said one functional component a request for service by said peripheral device.

32. The method in claim 21 wherein said peripheral device controlling further comprises: decoding said one functional component into a corresponding sequence of instructions for appropriately controlling said peripheral device.

33. The method in claim 32 wherein said peripheral device controlling further comprises:

scheduling in response to said service request a task requested by said one functional component for said peripheral device; and instructing said peripheral device to perform the scheduled task in response to availability of said peripheral to perform said task.

34. A telephone switching system for providing an enhanced telephone service comprising:

a telephone switch for serving at least one telephone subscriber connected thereto; and a switching system adjunct connected to said telephone switch by a datalink and at least one path in a plurality of paths emanating from said telephone switch, wherein the adjunct stores a corresponding service script associated with the one subscriber and which defines an enhanced service for the subscriber such that the adjunct, in response to a message that is received over said datalink from said telephone switch regarding a corresponding telephone call that is routed by said telephone switch over said one path to said adjunct, executes said service script and takes control over said telephone call substantially throughout the remainder of the duration of the telephone call in order to provide the enhanced service to said one subscriber.

35. In a telephone switching system, a method for providing enhanced telephone services to at least one telephone subscriber connected to a telephone switch comprising:

in said telephone switch routing a telephone call involving a subscriber from the telephone switch over a path connecting said telephone switch to a switching system adjunct and generating a message, regarding said routed telephone call, over a datalink connecting said telephone switch to said switching system adjunct; and in said switching system adjunct and in response to said message executing a pre-defined corresponding service script which is associated with said subscriber and which defines an enhanced service for that subscriber and taking control of said routed telephone call substantially throughout the remainder of its duration so as to provide the enhanced service to said subscriber.

* * * * *

UNITED STATES PATENT AND TRADEMARK OFFICE
CERTIFICATE OF CORRECTION

PATENT NO. : 4,878,240

DATED : October 31, 1989

INVENTOR(S) : Steve M. Lin and Joseph F. Rizzo

It is certified that error appears in the above-identified patent and that said Letters Patent is hereby corrected as shown below:

Column 5, line 18, "tansportable" should read --transportable--.
Column 6, line 52, "Hook Routine" should read --Hook Routine 1600--;
    line 53, "SSP Process Routine" should read --SSP Process Routine 800--.
Column 7, line 21, "depict" should read --depicts--.
Column 8, line 23, "49C:" should read --49C;--;
    line 35, "51B" should read --51B;--;
    line 51, "7A" should read --17A--.
Column 16, line 29, "receivers 433" should read --receivers located within DTMF receiver/transmitters 433--.
Column 21, line 56, "at present five" should read --at present, five--.
Column 25, line 42, "date add time" should read --date and time--.
Column 33, line 16, "SCP n.d" should read --SCP_n.d--;
    line 43, "FLAG" should read --flag--.
Column 34, line 15, "!130" should read --1130--.
Column 45, line 12, after "number." add --The calling statement for this FC is basically--.
Column 60, line 14, "$A_1$, $A_2$, $A_3$, $A_4$, $A_5$ and $A_6$," should read --A1, A2, A3, A4, A5 and A6--;
    line 15, "$A_1$" should read --A1--;
    line 48, "$A_2$" should read --A2--.
Column 63, line 18, "601?" should read --6010--.
Column 65, line 19, "42!5" should read --4215--.
Column 71, line 22, before "Decision" delete "25" and begin new paragraph with "Decision".
Column 81, line 20, "5011" should read --5000-.
Column 87, line 12, "TELford" should read --TELfor.d--.
Column 89, line 35, "$G_{13}$ COUNT" should read --G_COUNT--.
Column 99, line 62, "IAESS" should read --1AESS--;
    line 66, "switch Specifically" should read --switch. Specifically--.

UNITED STATES PATENT AND TRADEMARK OFFICE
CERTIFICATE OF CORRECTION

PATENT NO. : 4,878,240

DATED : October 31, 1989

INVENTOR(S) : Steve M. Lin and Joseph F. Rizzo

It is certified that error appears in the above-identified patent and that said Letters Patent is hereby corrected as shown below:

```
Column 100, line 32, "IAESS" should read --1AESS--;
            line 36, "IAESS" should read --1AESS--;
            line 52, "IAESS" should read --1AESS--;
            line 61, "switch Incoming" should read --switch.  Incoming--.
Column 101, line 21, "adjunct" should read --adjunct.--.
Column 107, line 48, "claim 21" should read --claim 31--.
```

Signed and Sealed this

Twenty-first Day of June, 1994

Attest:

BRUCE LEHMAN

*Attesting Officer*   *Commissioner of Patents and Trademarks*